(12) United States Patent
Yui

(10) Patent No.: US 7,904,390 B2
(45) Date of Patent: Mar. 8, 2011

(54) MANAGEMENT SYSTEM AND MANAGEMENT METHOD FOR CHARGING OBJECT APPARATUS, MANAGEMENT APPARATUS AND CHARGING OBJECT APPARATUS

(75) Inventor: Yasuji Yui, Kanagawa (JP)

(73) Assignee: Sony Corporation, Tokyo (JP)

( * ) Notice: Subject to any disclaimer, the term of this patent is extended or adjusted under 35 U.S.C. 154(b) by 2490 days.

(21) Appl. No.: 10/251,620

(22) Filed: Sep. 20, 2002

(65) Prior Publication Data
US 2003/0069805 A1    Apr. 10, 2003

(30) Foreign Application Priority Data

Sep. 20, 2001  (JP) ................................. 2001-287808

(51) Int. Cl.
*G06F 21/00* (2006.01)
*G06Q 30/00* (2006.01)

(52) U.S. Cl. ................. 705/52; 705/50; 705/51; 705/53; 705/54; 705/55; 705/56; 705/57; 705/58; 705/59; 705/1; 705/14; 705/26; 705/44; 370/248; 370/252; 370/253; 370/352; 370/353; 370/354; 370/355; 370/356; 700/231; 700/232; 700/233; 700/234; 700/235; 700/236; 700/237; 700/238; 700/239; 700/240; 700/241; 700/242; 700/243; 700/244; 713/183; 713/200; 713/201; 713/202

(58) Field of Classification Search ................. 370/248, 370/252, 253, 352–356; 705/50–59, 1, 14, 705/26, 44; 700/231–244; 713/183, 200–202
See application file for complete search history.

(56) References Cited

U.S. PATENT DOCUMENTS

| | | | |
|---|---|---|---|
| 5,956,697 A * | 9/1999 | Usui | 705/32 |
| 6,198,915 B1 * | 3/2001 | McGregor et al. | 455/406 |
| 6,347,136 B1 * | 2/2002 | Horan | 379/142.01 |
| 6,754,181 B1 * | 6/2004 | Elliott et al. | 370/252 |
| 6,763,336 B1 * | 7/2004 | Kolls | 705/44 |
| 7,082,607 B2 * | 7/2006 | Lake et al. | 718/107 |
| 7,421,472 B1 * | 9/2008 | Ross, Jr. | 709/206 |
| 2002/0116234 A1 * | 8/2002 | Nagasawa | 705/5 |
| 2003/0041123 A1 | 2/2003 | Sato et al. | |
| 2003/0055914 A1 | 3/2003 | Tanaka | |
| 2003/0078941 A1 | 4/2003 | Kawakami et al. | |
| 2003/0088523 A1 | 5/2003 | Yui | |

FOREIGN PATENT DOCUMENTS
JP        05127926   *   5/1993

* cited by examiner

Primary Examiner — Calvin Loyd Hewitt, II
Assistant Examiner — Cristina Owen Sherr
(74) Attorney, Agent, or Firm — Wolf, Greenfield & Sacks, P.C.

(57) ABSTRACT

A management apparatus, a charging object apparatus and a management system and method by which a product of an object of use can be used in an efficiency as high as possible when it is used commonly by a plurality of people. In the management system, the management apparatus includes a storage section into which reservation information including information regarding a use time of a charging object apparatus and information regarding a user is stored, an updating section for updating the reservation information stored in the storage section based on information that the user requests for reservation of use of the charging object apparatus, and a permission information signaling section for signaling, when the reservation information updated by the updating section is different from reservation information of any other user stored in the storage section, permission information for permitting use of the charging object apparatus to the outside based on the use reservation information stored in the storage section.

19 Claims, 92 Drawing Sheets

F I G. 2
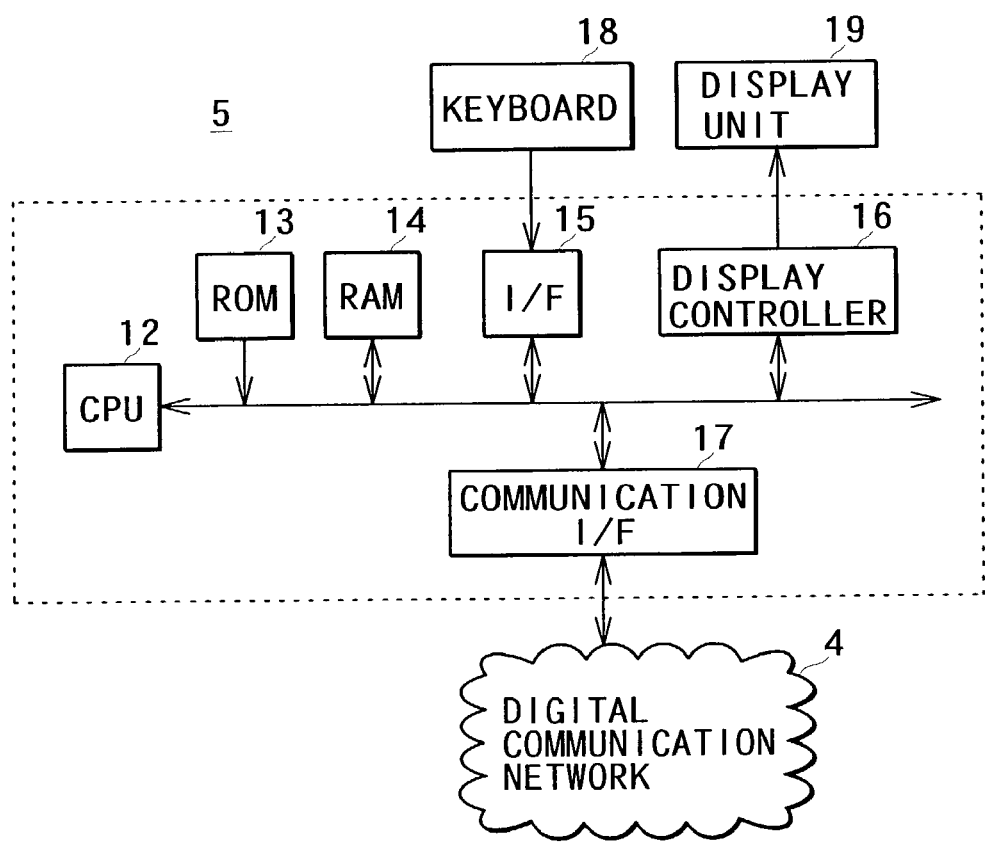

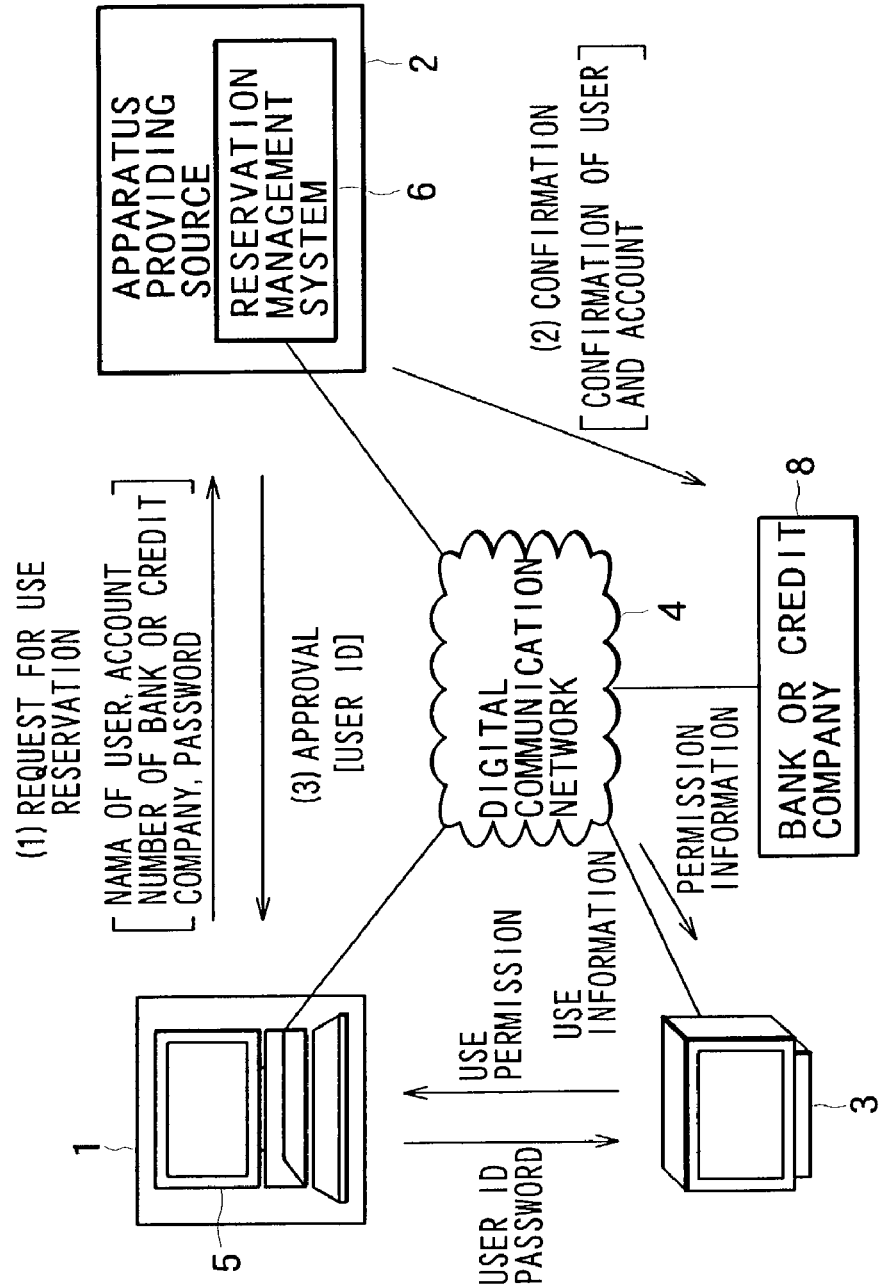

F I G. 1 2
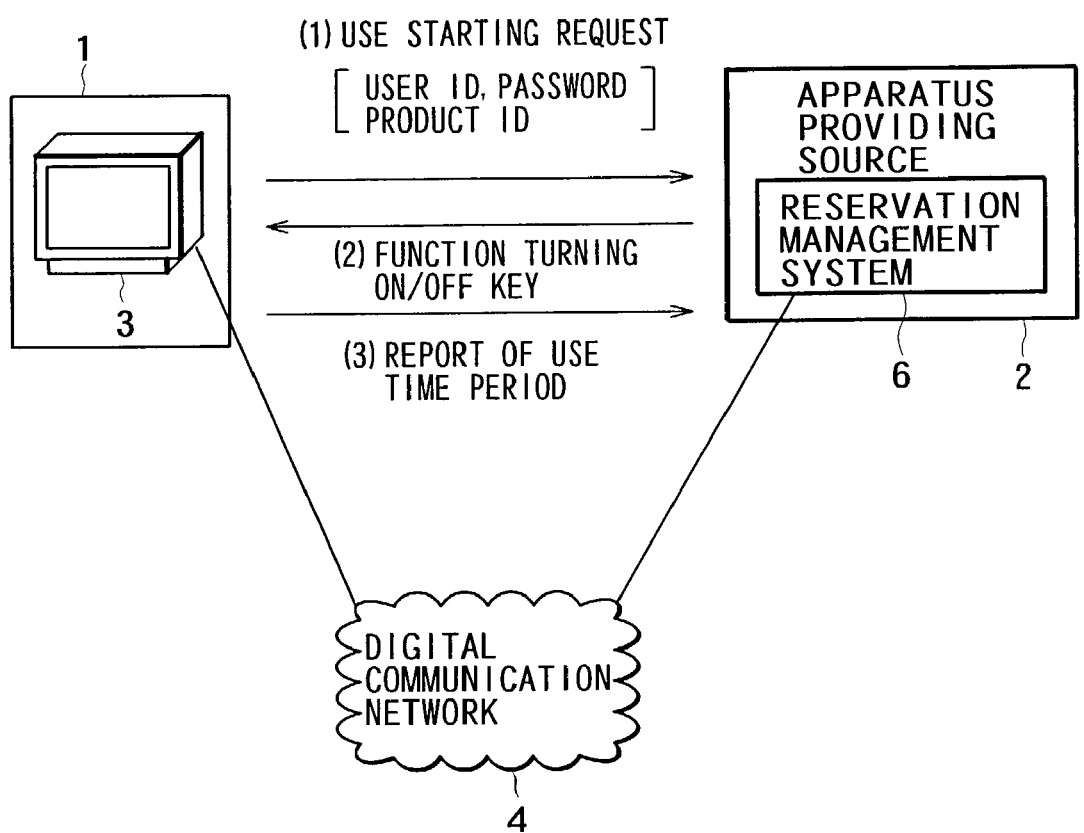

F I G. 1 3
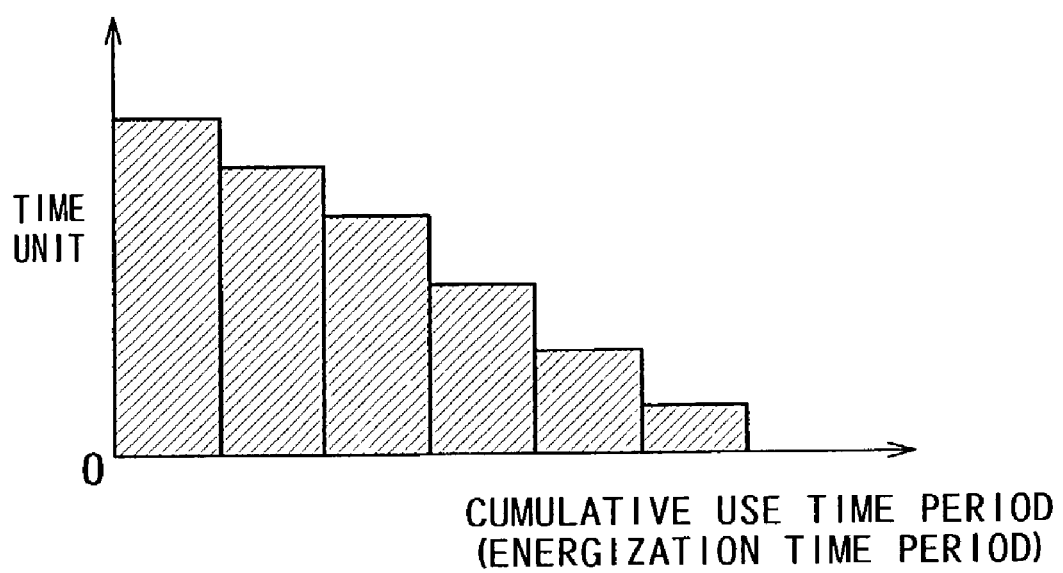

F I G. 1 5
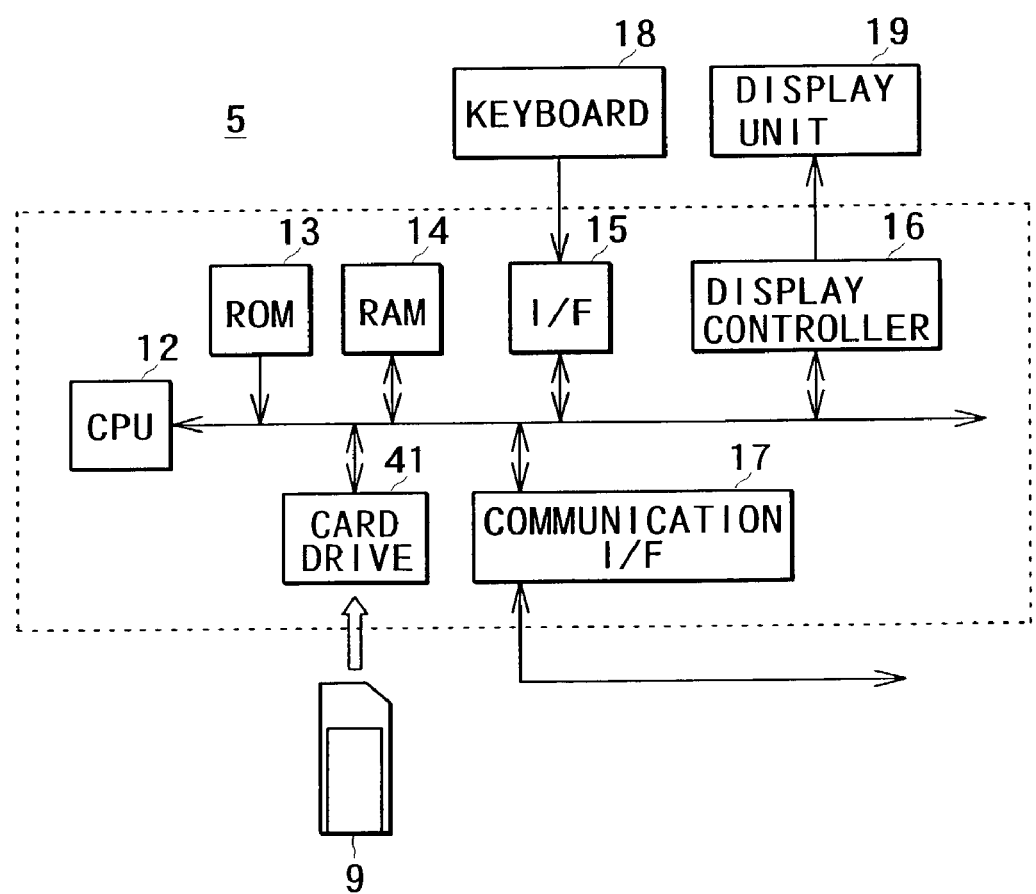

F I G. 1 6
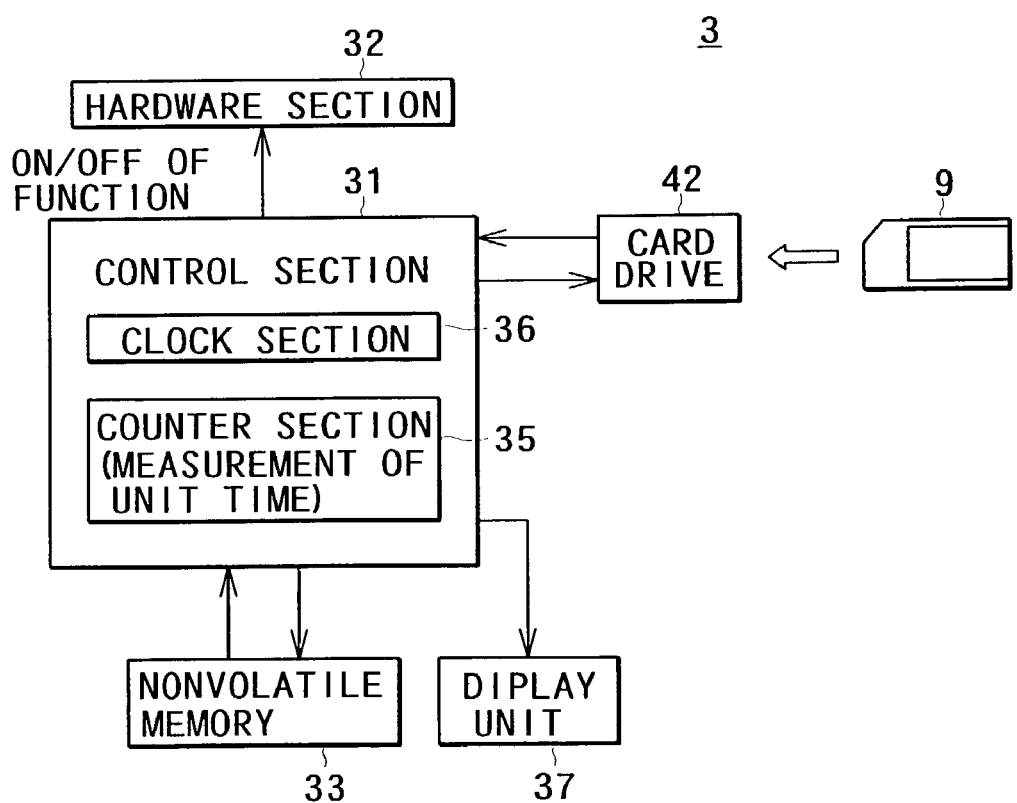

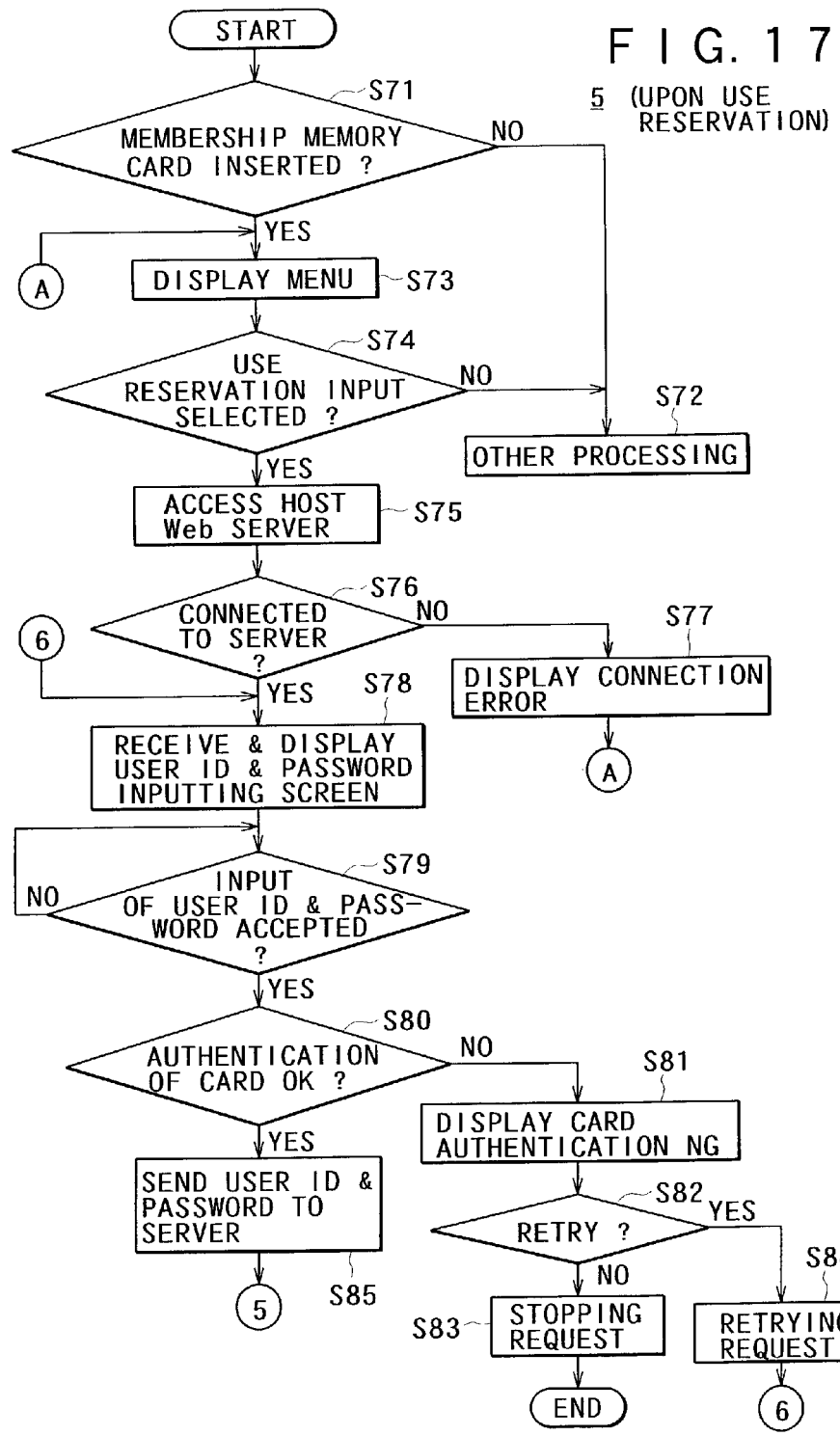

F I G. 3 0
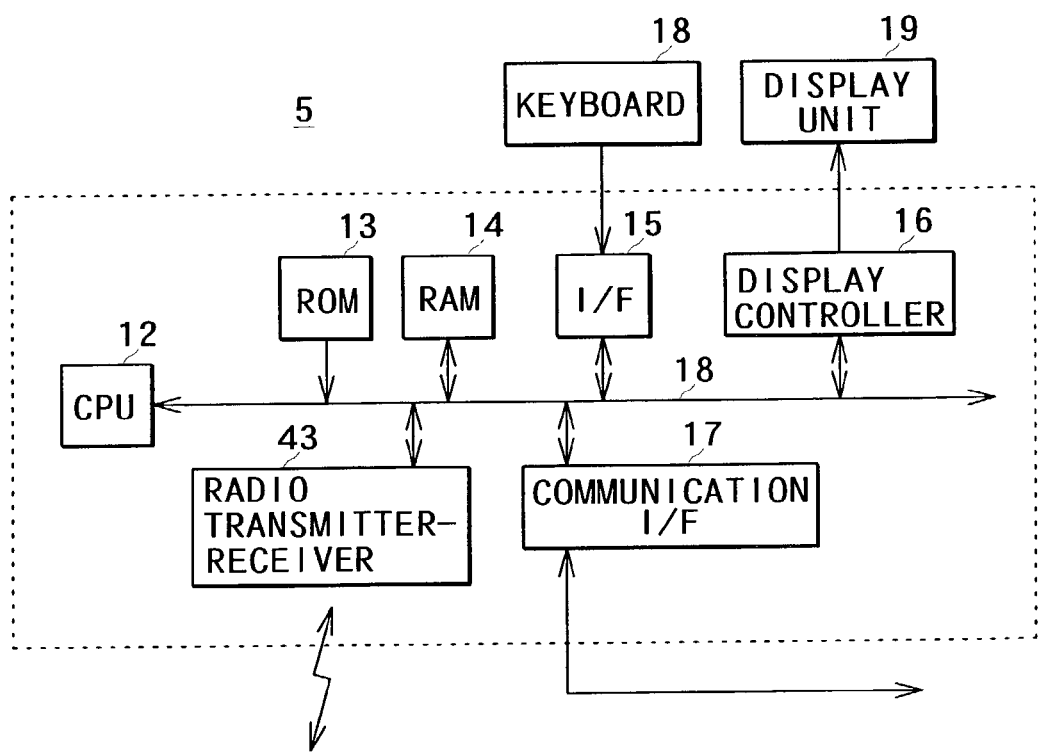

F I G. 3 1
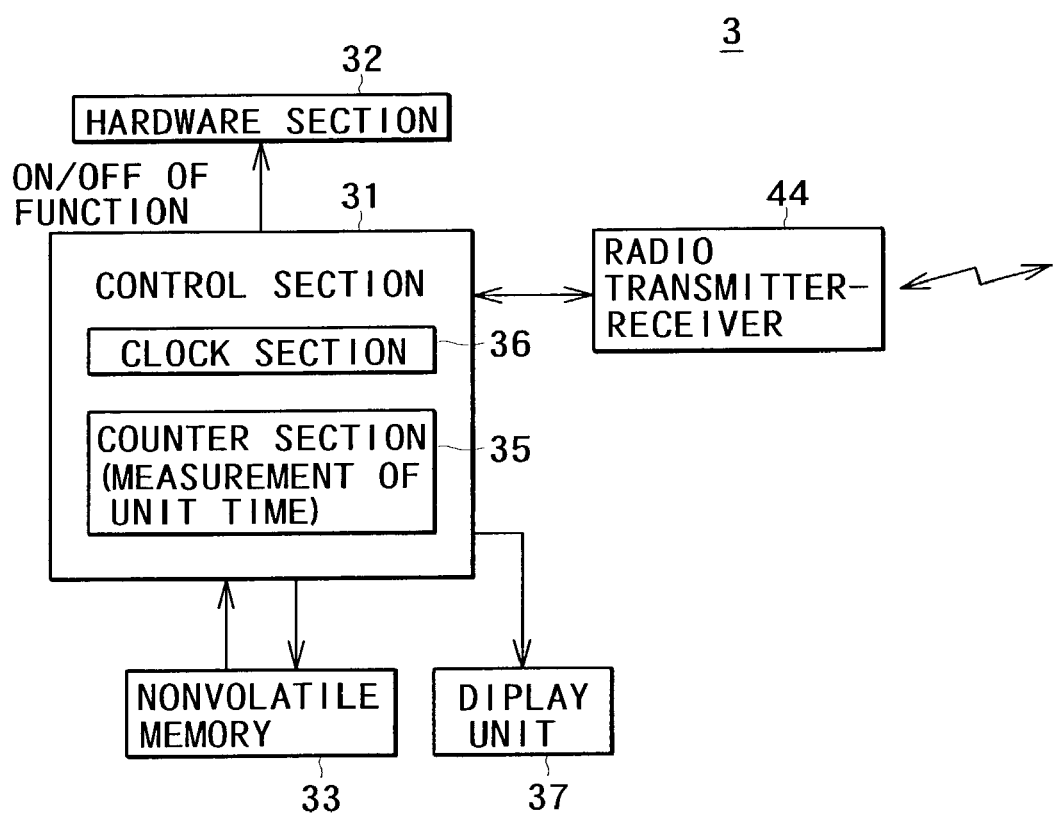

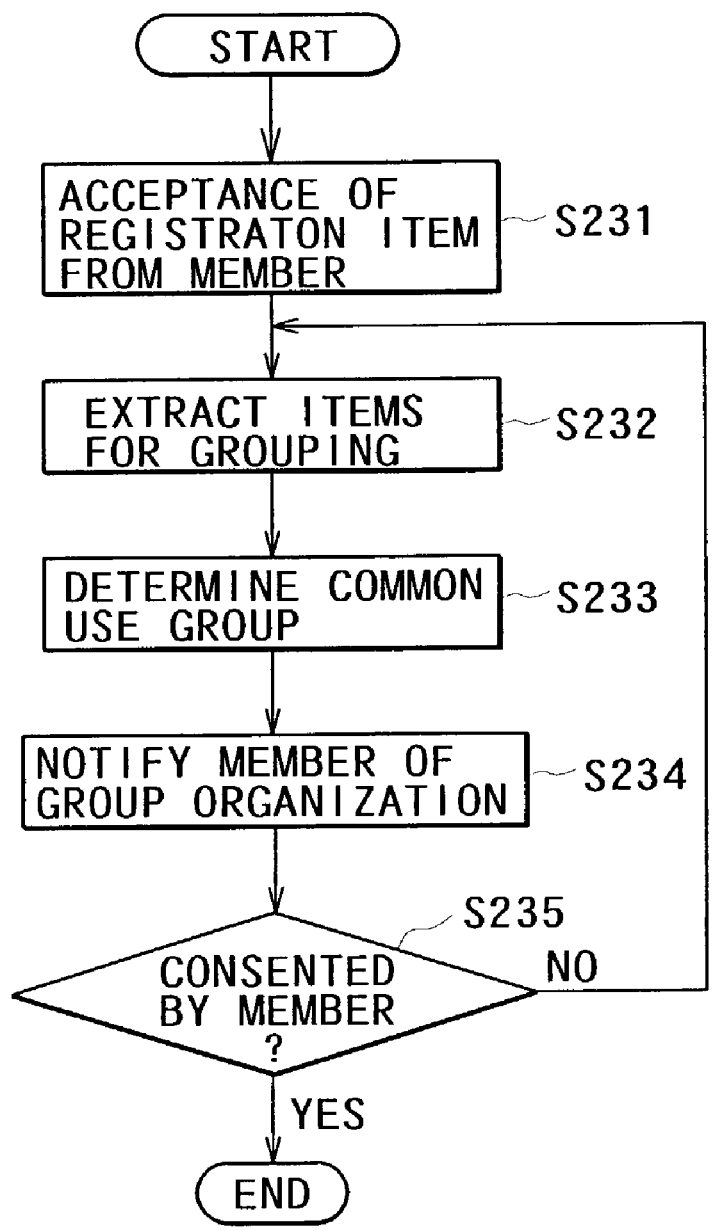

F I G. 3 7
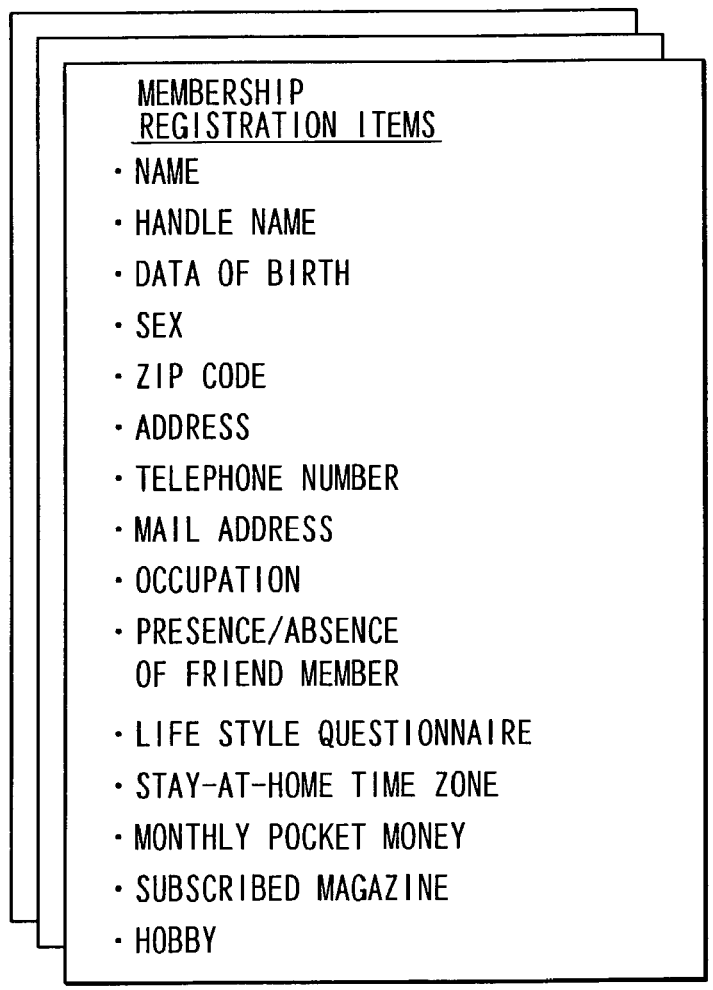
MEMBERSHIP REGISTRATION ITEMS
- NAME
- HANDLE NAME
- DATA OF BIRTH
- SEX
- ZIP CODE
- ADDRESS
- TELEPHONE NUMBER
- MAIL ADDRESS
- OCCUPATION
- PRESENCE/ABSENCE OF FRIEND MEMBER
- LIFE STYLE QUESTIONNAIRE
- STAY-AT-HOME TIME ZONE
- MONTHLY POCKET MONEY
- SUBSCRIBED MAGAZINE
- HOBBY

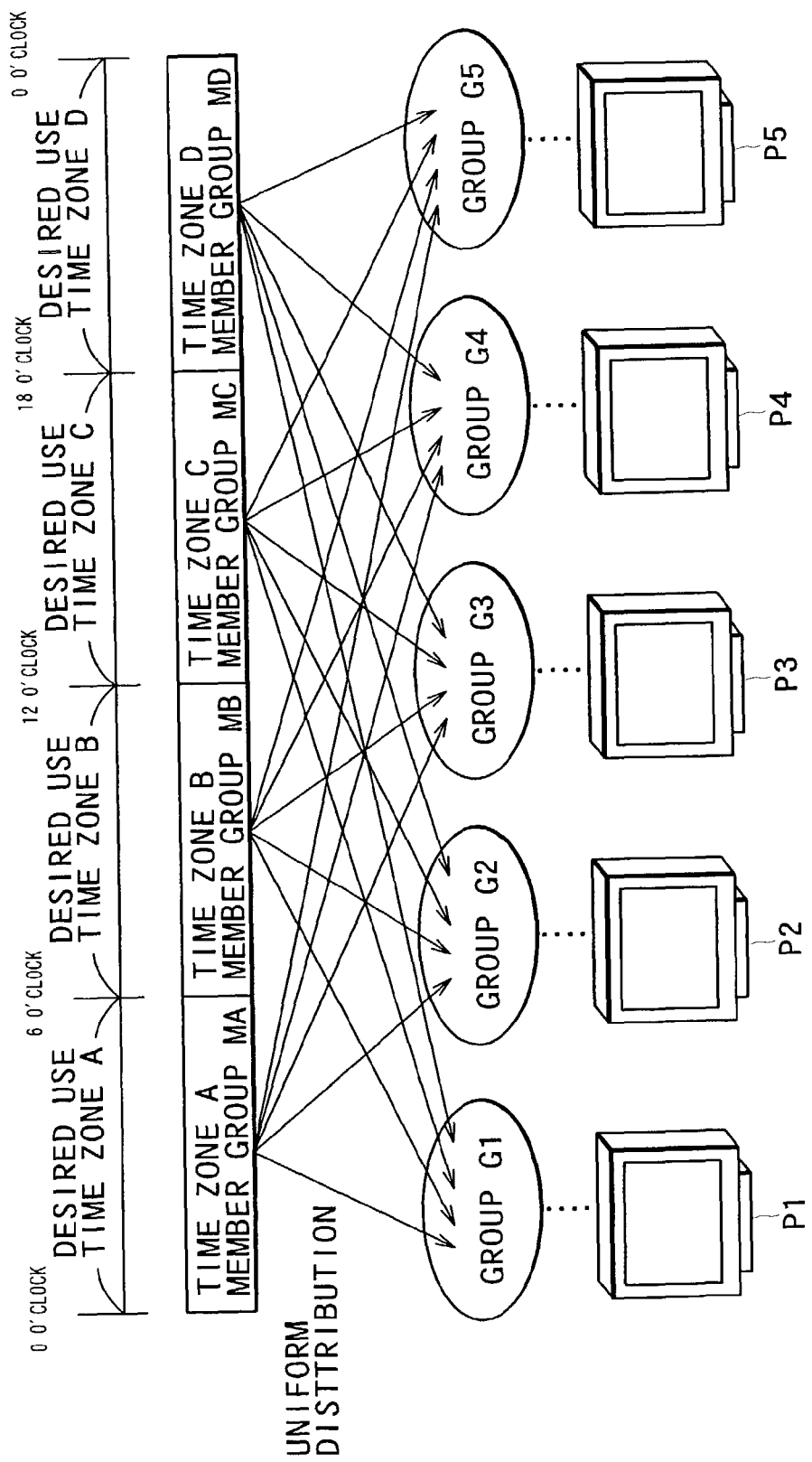

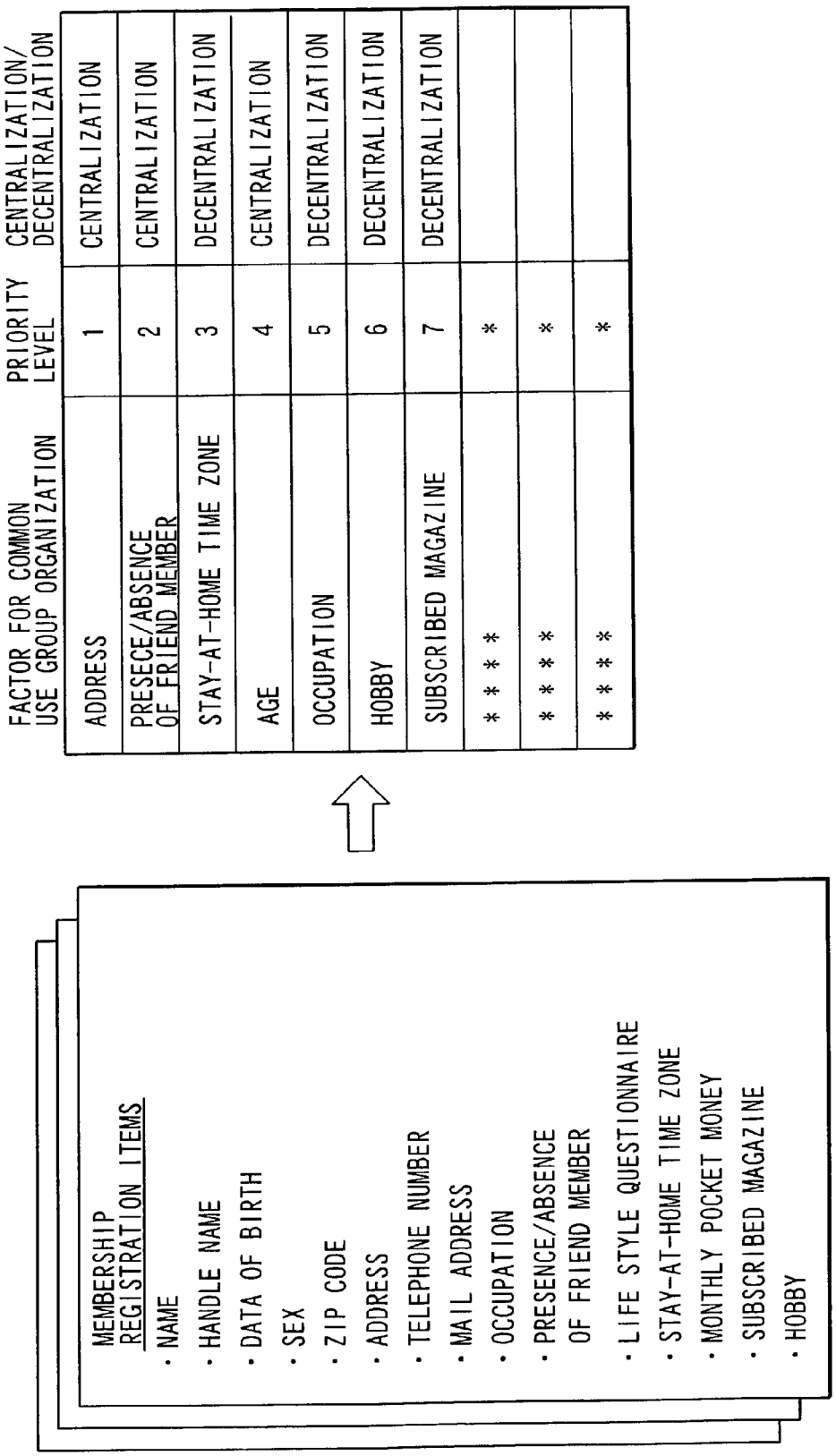

FIG. 42

EXAMPLE) THREE GROUPS ARE ORGANIZED FROM 15 MEMBERS (FIVE MEMBERS PEL 1 Gp) IN A CERTAIN DISTRICT (MEMBERS:K1, K2, K3, ..., K15)

GROUP ORGANIZATION STEP ORDER
(IN ORDER OF PRIORTY LEVEL) →

| MEMBER | PRESENCE/ ABSENCE OF FRIEND | STAYING TIME ZONE | AGE | OCCUPATION | HOBBY |
|---|---|---|---|---|---|
| K1 | K3 | MORNING | 30 | COMPANY MAN | TENNIS |
| K2 | | MORNING | 20 | STUDENT | READING |
| K3 | K1 | DAYTIME | 35 | SELF-EMPLOYED BUSINESSMAN | MOVIE |
| K4 | | DAYTIME | 25 | COMPANY MAN | TENNIS |
| K5 | | DAYTIME | 30 | COMPANY MAN | GOLF |
| K6 | | DAYTIME | 35 | SELF-EMPLOYED BUSINESSMAN | MOVIE |
| K7 | | NIGHT | 40 | COMPANY MAN | NONE |
| K8 | K15 | DAYTIME | 45 | COMPANY MAN | GOLF |
| K9 | | DAYTIME | 30 | COMPANY MAN | NONE |
| K10 | | MORNING | 30 | TEMPORARY WORKER | GOLF |
| K11 | | DAYTIME | 35 | TEACHER | TENNIS |
| K12 | | DAYTIME | 40 | COMPANY MAN | GOLF |
| K13 | | MORNING | 20 | STUDENT | MOVIE |
| K14 | | MORNING | 35 | TEMPORARY WORKER | TENNIS |
| K15 | K8 | DAYTIME | 40 | COMPANY MAN | GOLF |

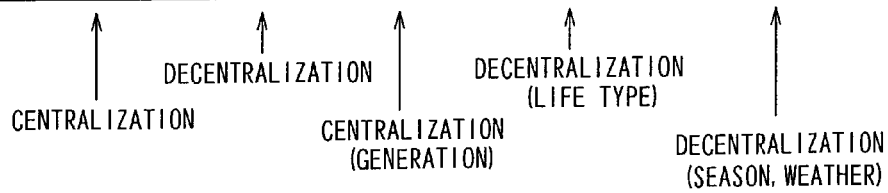

CENTRALIZATION
DECENTRALIZATION
CENTRALIZATION (GENERATION)
DECENTRALIZATION (LIFE TYPE)
DECENTRALIZATION (SEASON, WEATHER)

FIG. 43

NUMERAL INDICATES MEMBER NO. (Ex. 1=K1)

| FACTOR CLASSIFICATION | STAYING TIME ZONE | | | AGE | | | | OCCUPATION | | | | | HOBBY | | | | |
|---|---|---|---|---|---|---|---|---|---|---|---|---|---|---|---|---|---|
| | MORNING | DAYTIME | NIGHT | TWENTIETH | THIRTIETH | FORTIETH | COMPANY MAN | STUDENT | SELF-EMPLOYED BUSINESSMAN | TEMPORARY WORKER | TEACHER | TENNIS | READING | MOVIE | GOLF | NONE |
| | 1 | 3 | 7 | 2 | 1 | 7 | 1 | 2 | 3 | 10 | 11 | 1 | 2 | 3 | 8 | 7 |
| | 2 | 4 | | 4 | 3 | 8 | 4 | 13 | 6 | 14 | | 4 | | 6 | 5 | 9 |
| | 10 | 5 | | 13 | 5 | 12 | 5 | | | | | 11 | | 13 | 10 | |
| | 13 | 6 | | | 6 | 15 | 7 | | | | | 14 | | | 12 | |
| | 14 | 8 | | | 9 | | 8 | | | | | | | | 15 | |
| | | 9 | | | 10 | | 9 | | | | | | | | | |
| | | 11 | | | 11 | | 12 | | | | | | | | | |
| | | 12 | | | 14 | | 15 | | | | | | | | | |
| | | 15 | | | | | | | | | | | | | | |

FIG. 44

| | STEP1 | STEP2 (TIME ZONE) | STEP3 (GENERATION) | STEP4 (OCCUPATION) | STEP5 (HOBBY) |
|---|---|---|---|---|---|
| | FRIENDS ARE AUTOMATICALLY ORGANIZED INTO THE SAME Gp. WHETHER DIFFERENT FRIENDS SHOULD BE ORGANIZED INTO THE SAME Gp IS DETERMINED BY TAKING INTO CONSIDERATION THE FOLLOWING STAYING TIME ZONES. IN THIS INSTANCE, SINCE DAYTIME TYPE FRIENDS ARE CONCENTRATED, THEY ARE ORGANIZED INTO DIFFERENT GROUPS. | MEMBERS ARE SUCCESSIVELY DISTRIBUTED AND COLLATED BEGINNING WITH THE MORNING TYPE AND CLASSIFIED BY TAKING INTO CONSIDERATION THE GENERATION TENDENCIES OF THE GROUPS. FOR EXAMPLE, SINCE K2 IS OF THE MORNING TYPE AND IN ITS TWENTIETH, IT IS GROUPED INTO Gp3. K10 AND K14 OF THE MORNING TYPE MAY BE GROUPED INTO ANY OF Gp1 AND Gp2, AND THEREFORE, THEY ARE GROUPED AT A FOLLOWING STEP. | SINCE K7 MAY BE GROUPED INTO ANY GROUP, IT IS COLLATED AND GROUPED WITH ITS GENERATION. K4, K12 AND K13 ARE GROUPED WITH THEIR GENERATIONS. | SINCE MANY MEMBERS ARE OF THE DAYTIME TYPE, THEY ARE COLLATED AND GROUPED IN A DECENTRALIZATION FASHION WITH OCCUPATIONS. K5, K6, K9 AND K11 ARE OF THE SAME GENERATION. Gp2 IS DETERMINED ALREADY. SINCE Gp1 INCLUDES AN INDIVIDUAL PROPRIETOR MEMBER, K6 IS GROUPED INTO Gp3. | PENDING K10 AND K14 ARE GROUPED BY TAKING HOBBY TENDENCIES OF THE GROUPS INTO CONSIDERATION. SINCE Gp1 DOES NOT INCLUDE A MEMBER WHOSE HOBBY IS THE GOLF, K10 IS GROUPED INTO Gp1. SINCE Gp3 DOES NOT INCLUDE A MEMBER WHOSE HOBBY IS THE GOLF, K5 IS GROUPED INTO Gp3. THE REMAINING K9 AND K11 ARE GROUPED INTO Gp1. |
| Gp1 | K1, K3 | K1, K3 | K1, K3 | K1, K3 | K1, K3, K10, K9, K11 |
| Gp2 | K8, K15 | K8, K15 | K8, K15, K7, K12 | K8, K15, K7, K12 | K8, K15, K7, K12, K14 |
| Gp3 | | K2 | K2, K4, K13 | K2, K4, K13, K6 | K2, K4, K13, K6, K5 |

FIG. 50

XTH MONTH MACHINE #001 N1 GROUP TIME BOOKING TABLE
(PREFERENTIAL USE IN UNIT OF DAY)

| | 1 | 2 | 3 | 4 | 5 | 6 | 7 | 8 | ... | 27 | 28 | 29 | 30 | 31 |
|---|---|---|---|---|---|---|---|---|---|---|---|---|---|---|
| A | ○ | ○ | | | | | | | ... | ☼ | | | | |
| B | | | ○ | | | | | | ... | | | | | |
| C | | | | | | | | ○ | ... | | ○ | | | |
| D | | | | ○ | | | | | ... | | | ○ | ○ | |
| E | | | | | ○ | ○ | ○ | | ... | | | | | |

FIG. 51

XTH MONTH MACHINE #001 N1 GROUP TIME BOOKING TABLE
(PREFERENTIALLY USED DAY BY MR. A)

USE STARTING (RECEIVED) HOUR [ ] HOUR [ ] MINUTE TO
USE ENDING (RETURNED) HOUR [ ] HOUR [ ] MINUTE
(RESERVED) (CHANGE) (CANCEL)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | | | | | | | ○ | ○ | ○ | ○ | ○ (12:30) | | | | | | | | | ○ | ○ | | |
| B | | | | | | | | | | | | | | | | | ○ | ○ | | | | | |
| C | | | | | | | | | | | | | | | | | | | | | | | |
| D | ○ | ○ | ○ | ○ | | | | | | | | | | | | | | | | | | | |
| E | | | | | | | | | | | | | | | | | | | | | | | |

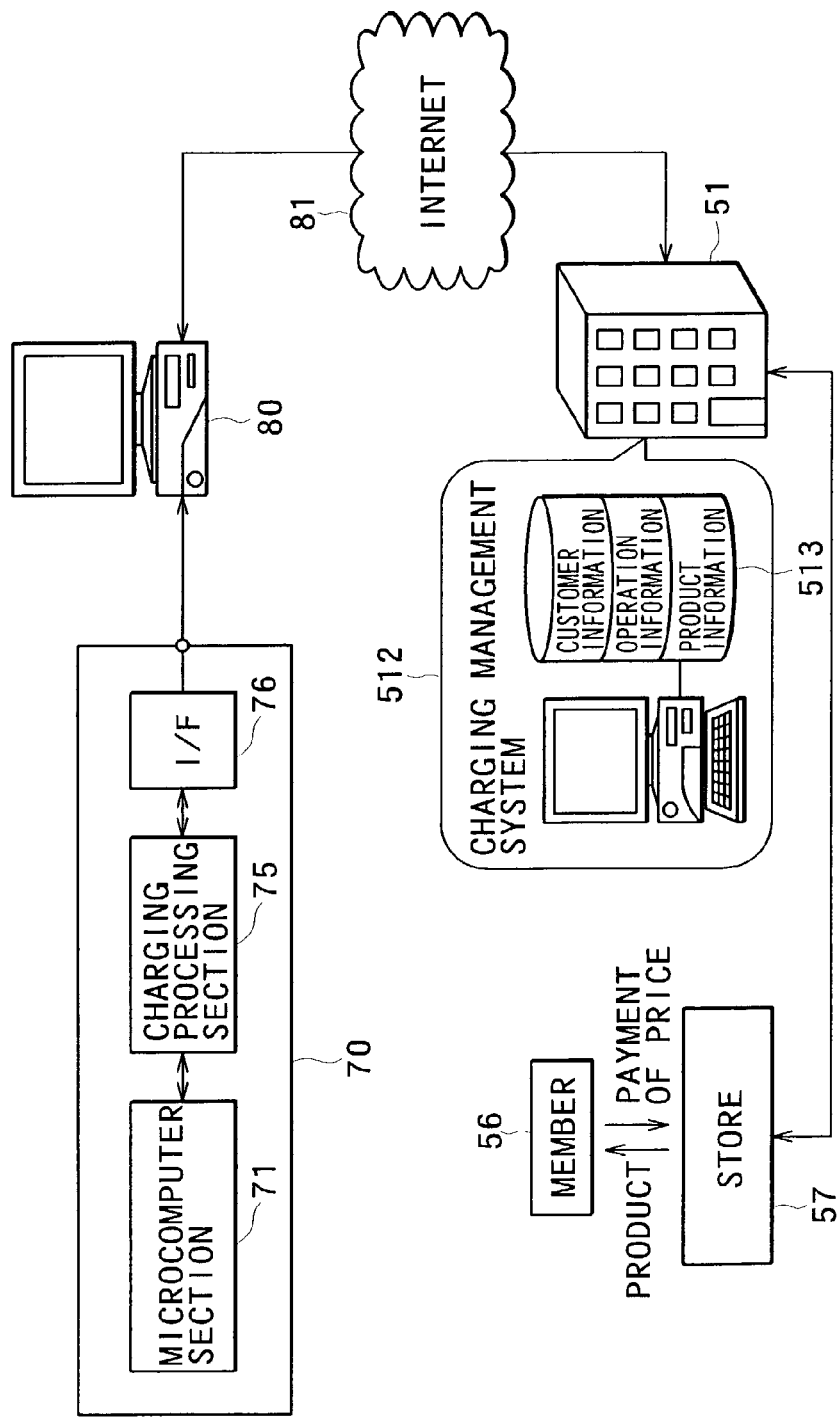

F I G. 6 1
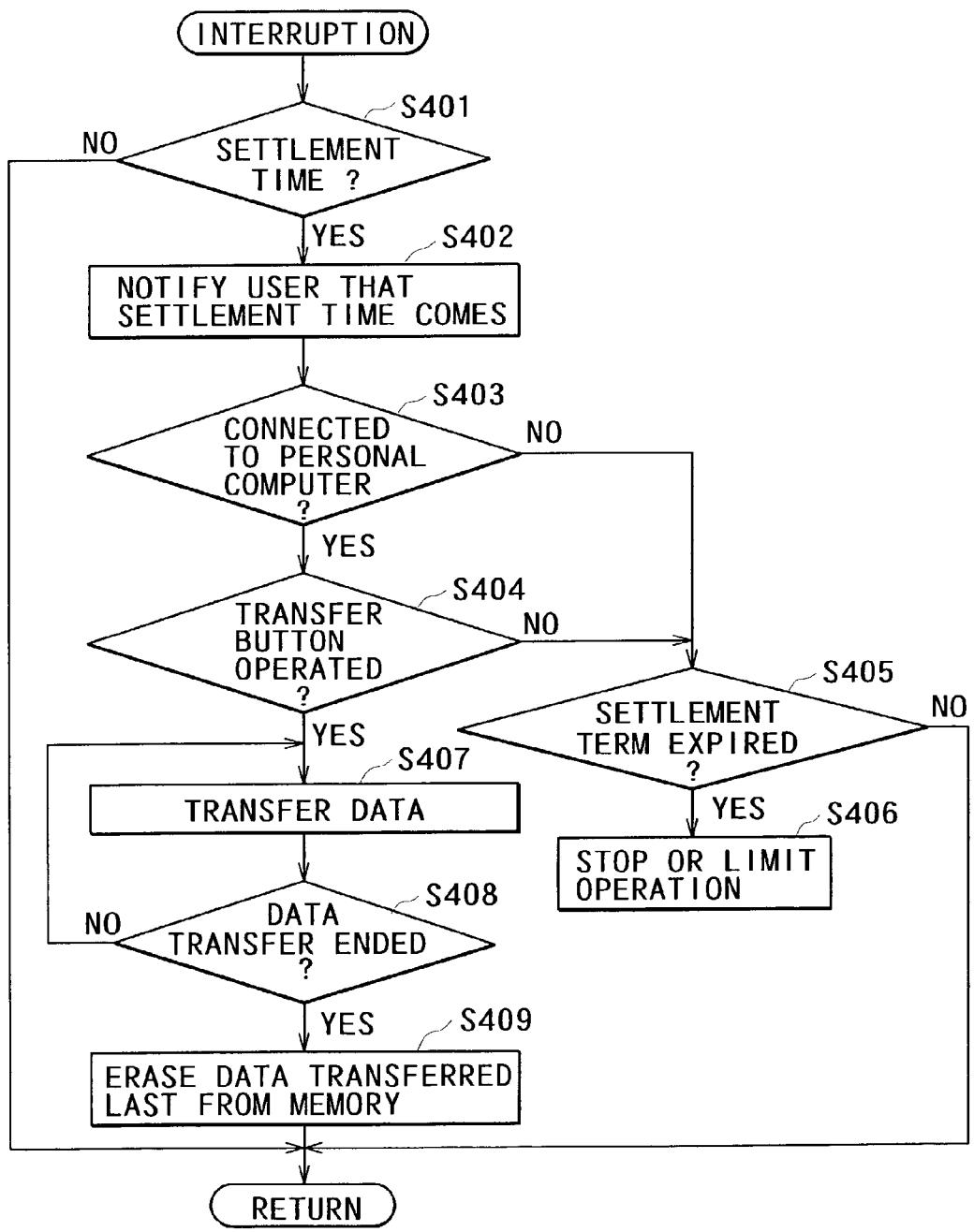

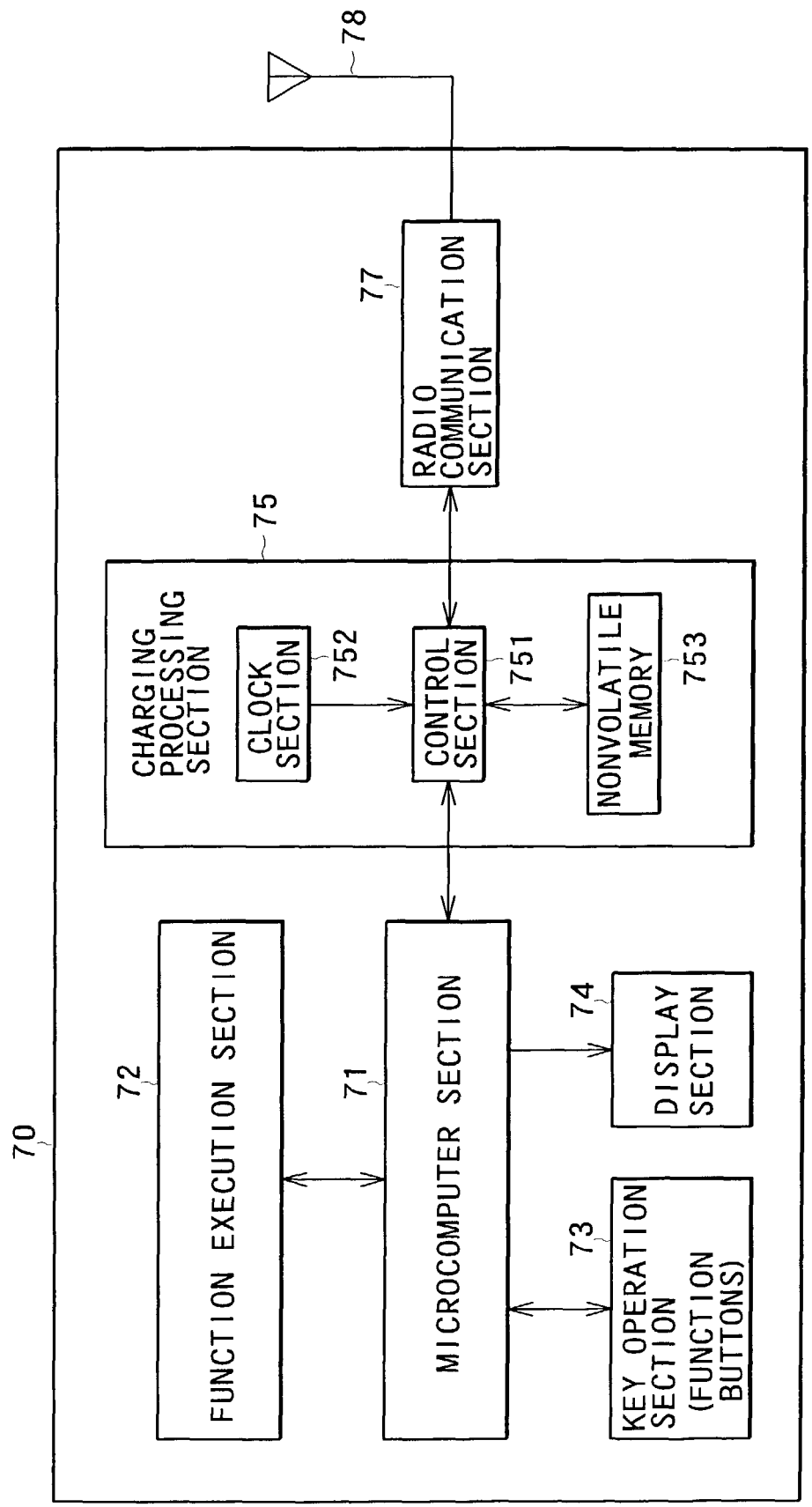

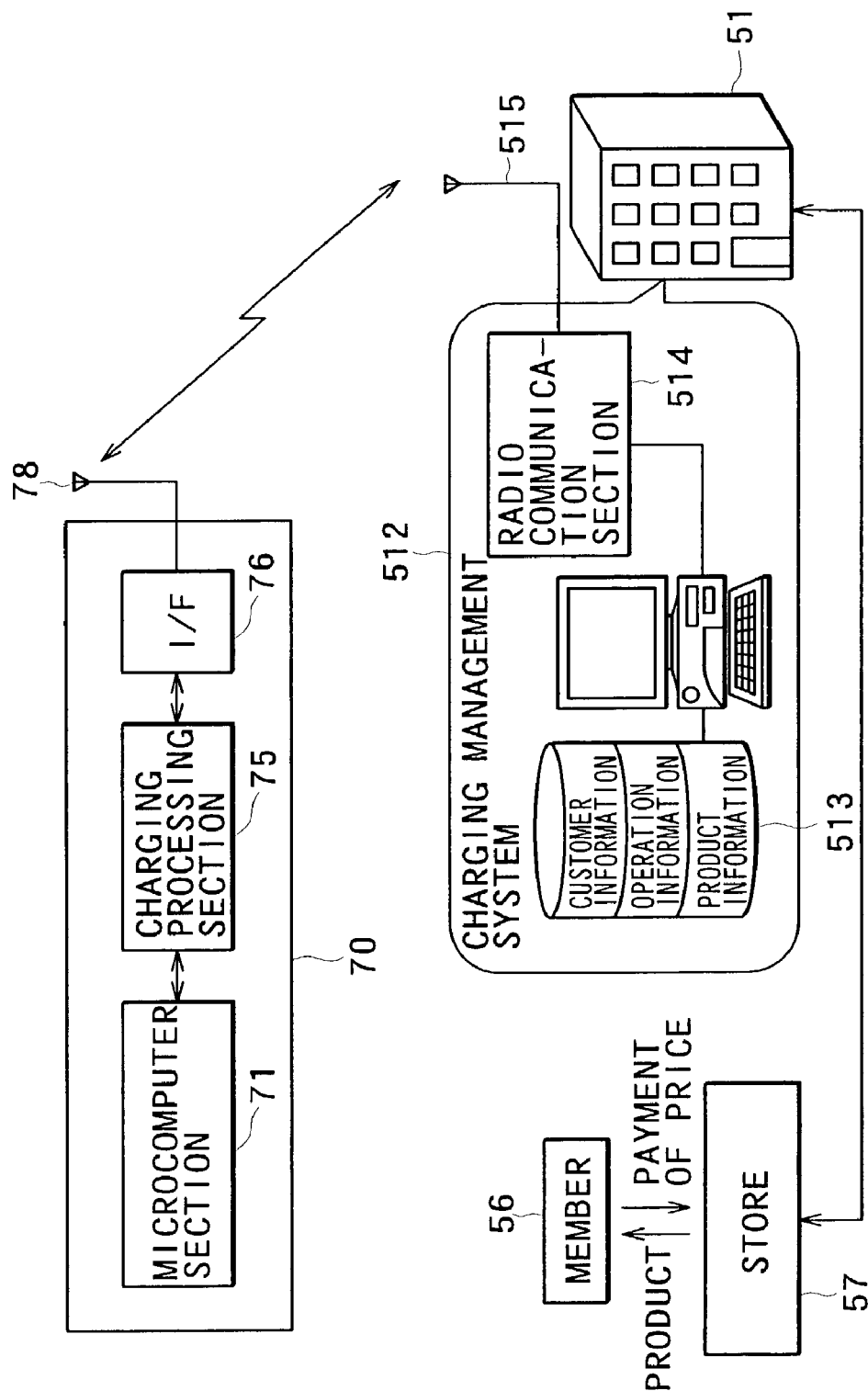

F I G. 6 6
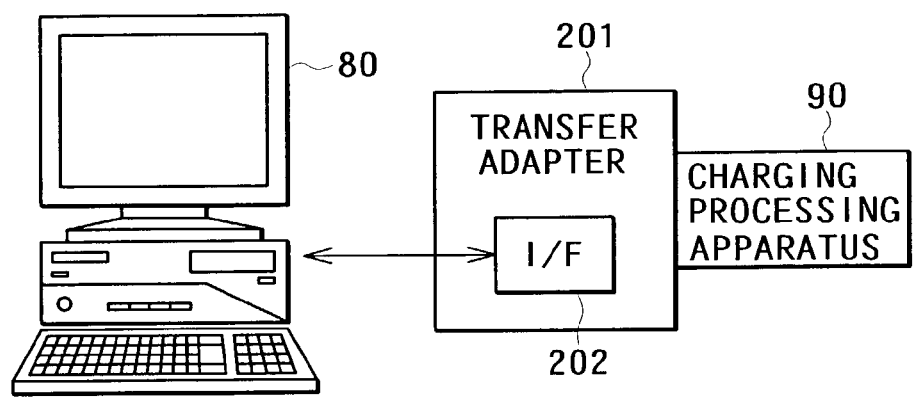

F I G. 7 6
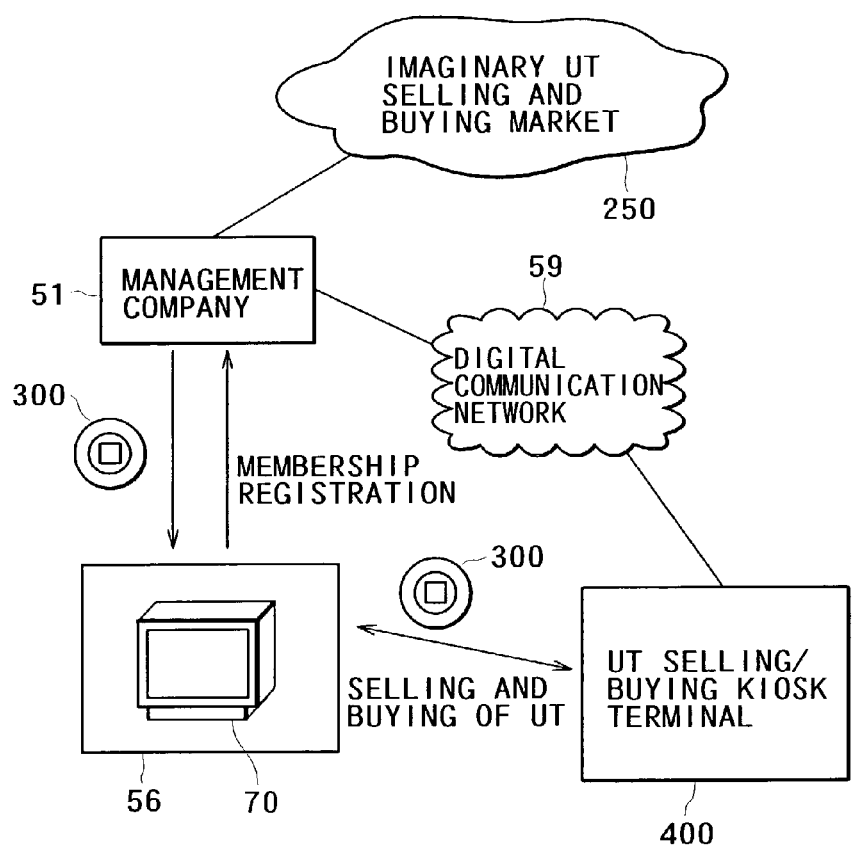

F I G. 7 8 A        F I G. 7 8 B
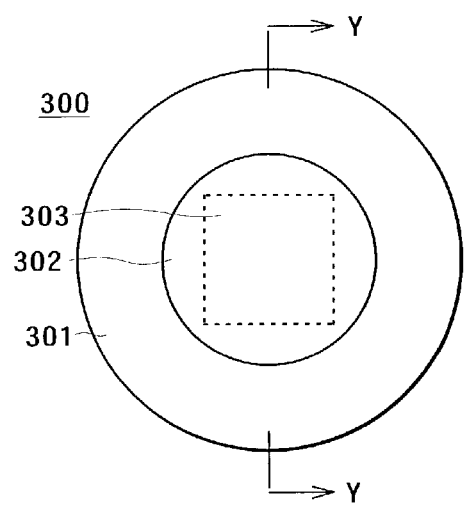
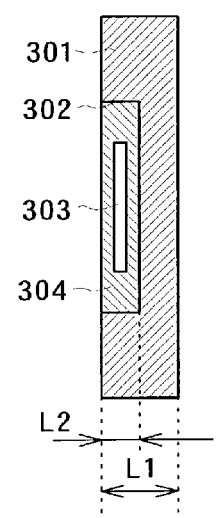

F I G. 7 9
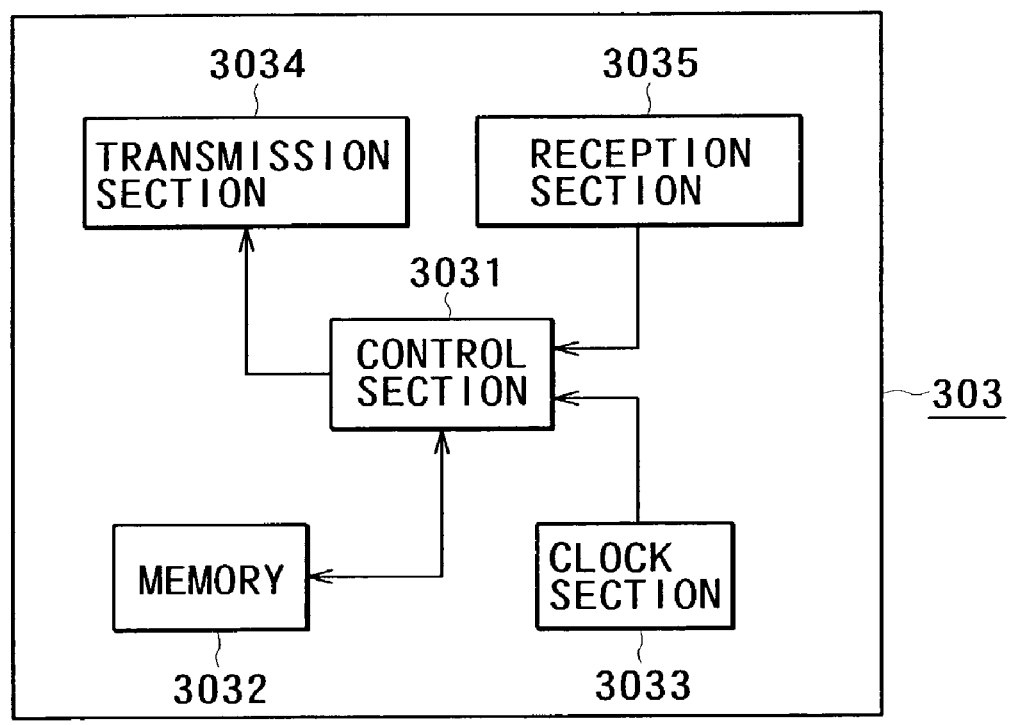

FIG. 80A
FIG. 80B
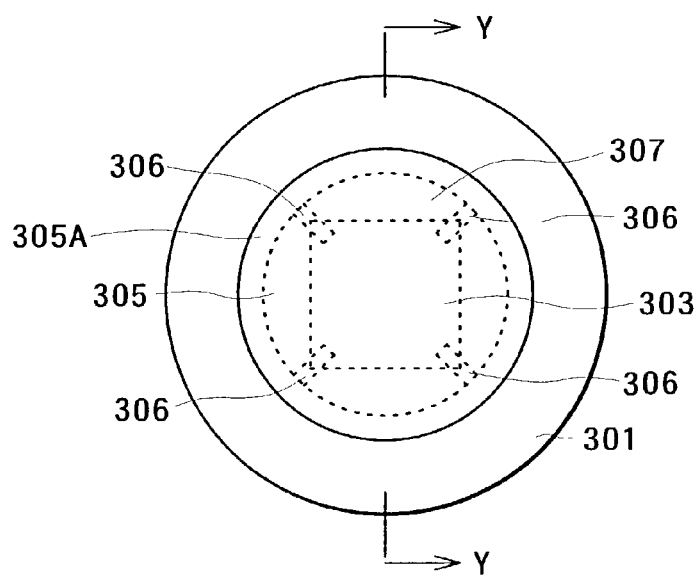
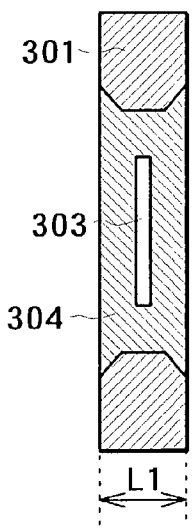

F I G. 8 1 A
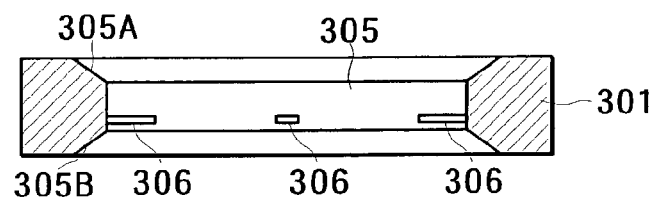
F I G. 8 1 B
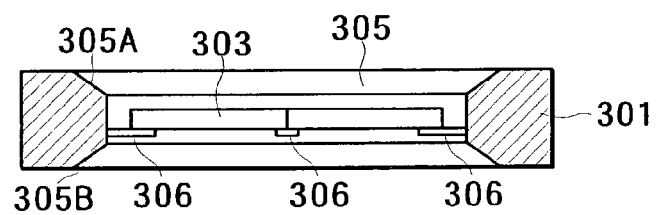
F I G. 8 1 C
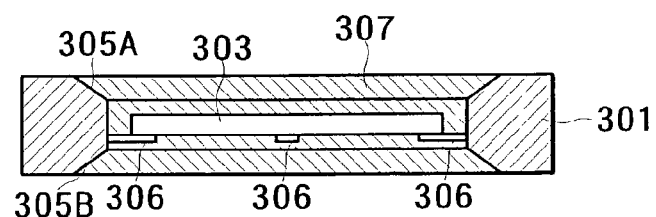

MANAGEMENT SYSTEM AND MANAGEMENT METHOD FOR CHARGING OBJECT APPARATUS, MANAGEMENT APPARATUS AND CHARGING OBJECT APPARATUS

BACKGROUND OF THE INVENTION

This invention relates to a system for and a method of imposing a charge for a substantial period of time of use of an apparatus without selling the apparatus itself and further to a charging object apparatus for use with the system and the method.

Conventionally, a system is employed commonly wherein a user buys a product and pays the price as an equivalent for the product itself to acquire the proprietary right of the product.

According to the conventional system, a buyer of a product pays the price for the product irrespective of whether the product is used or not used. In other words, according to the conventional system, the buyer pays the price also for a period of time within which the product is not used merely because the product is owned by the buyer. Since the value of a product can be enjoyed originally when it is used, it is regarded that, for the product which has not been used after it was purchased, the unnecessary money was paid.

Further, the product cycle of high-technology products such as a computer in recent years is so short that, after a product is purchased, a new product is placed on the market before the product is used sufficiently. Therefore, a user who has bought an old product before a new product is placed on the market may feel unprofitable in that, when such a new product is placed on the market, the user has purchased too early.

Furthermore, a user who wants to have a product which has advanced functions will have to pay, every time a new product is placed on the market, the total amount of the price as an equivalent to the product, and this imposes a significant economical burden on the user.

Taking the foregoing into consideration, another system wherein an equivalent is paid for a substantial period of time of use of a product to eliminate the problems described above has been proposed by the assignee of the present patent application (Japanese Patent Laid-Open No. 2000-85453).

In the system just described, a user occupies a product only while the user uses the product, and therefore, after the use of the product comes to an end, another user can use the same product. Thus, if an apparatus can be used efficiently by a greater number of people, then the cost per unit time of use can be reduced as much. Therefore, it is significant to construct a system by which a high efficiency in use of a use object product can be achieved to minimize the burden of a charge on every user.

SUMMARY OF THE INVENTION

It is an object of the present invention to provide a management apparatus, a charging object apparatus, a management system and a management method by which a product of an object of use can be used in an efficiency as high as possible when it is used commonly by a plurality of people.

In order to attain the object described above, according to the first aspect of the present invention, there is provided a management apparatus, including storage means into which reservation information including information regarding a use time of a charging object apparatus and information regarding a user is stored, updating means for updating the reservation information stored in the storage means based on information that the user requests for reservation of use of the charging object apparatus, and permission information signaling means for signaling, when the reservation information updated by the updating means is different from reservation information of any other user stored in the storage means, permission information for permitting use of the charging object apparatus to the outside based on the use reservation information stored in the storage means.

According to the second aspect of the present invention, there is provided a management apparatus, including grouping means for distributing member registration information representing registered members each into one of a plural number of groups equal to the number of charging object apparatus, storage means into which reservation information regarding times at which the members are scheduled to use the charging object apparatus is stored for each of the groups, updating means for updating, based on information representing a request for use of the charging object apparatus from any of the members, the reservation information stored in the storage means regarding the group in which the member is included, and permission information signaling means for signaling, based on the reservation information stored in the storage means, permission information regarding the member who has made the registration and a time at which the reserved charging object apparatus is scheduled to be used, the management apparatus managing the information regarding the reservation by the registered member.

According to the third aspect of the present invention, there is provided a charging object apparatus, including permission information acquisition means for acquiring permission information from the outside, discrimination means for discriminating based on the permission information whether or not use of the charging object apparatus by a user should be permitted, use time period measurement means for measuring an operation time period of the charging object apparatus as a use time period when the use of the charging object apparatus is permitted by the discrimination means, and charging control means for producing information which makes an object of charging based on information regarding the use time period.

According to the fourth aspect of the present invention, there is provided a management system for managing a charging object apparatus, including a management apparatus, and a charging object apparatus for being managed by the management apparatus, the management apparatus including storage means into which reservation information including information regarding a use time of a charging object apparatus and information regarding a user is stored, updating means for updating the reservation information stored in the storage means based on information that the user requests for reservation of use of the charging object apparatus, and permission information signaling means for signaling, when the reservation information updated by the updating means is different from reservation information of any other user stored in the storage means, permission information for permitting use of the charging object apparatus to the outside based on the use reservation information stored in the storage means, the charging object apparatus including permission information acquisition means for acquiring the permission information, discrimination means for discriminating based on the permission information whether or not use of the charging object apparatus by a user should be permitted, use time period measurement means for measuring an operation time period of the charging object apparatus as a use time period when the use of the charging object apparatus is permitted by the discrimination means, and charging control means for producing information which makes an object of charging based on information regarding the use time period.

According to the fifth aspect of the present invention, there is provided a management system for managing a charging object apparatus, including a management apparatus, and a charging object apparatus for being managed by the management apparatus, the management apparatus including grouping means for distributing member registration information representing registered members each into one of a plural number of groups equal to the number of charging object apparatus, storage means into which reservation information regarding times at which the members are scheduled to use the charging object apparatus is stored for each of the groups, updating means for updating, based on information representing a request for use of the charging object apparatus from any of the members, the reservation information stored in the storage means regarding the group in which the member is included, and permission information signaling means for signaling, based on the reservation information stored in the storage means, permission information regarding the member who has made the registration and a time at which the reserved charging object apparatus is scheduled to be used, the charging object apparatus including permission information acquisition means for acquiring permission information from the outside, discrimination means for discriminating based on the permission information whether or not use of the charging object apparatus by a user should be permitted, use time period measurement means for measuring an operation time period of the charging object apparatus as a use time period when the use of the charging object apparatus is permitted by the discrimination means, and charging control means for producing information which makes an object of charging based on information regarding the use time period.

According to the sixth aspect of the present invention, there is provided a management method, including the steps performed by a management apparatus of storing reservation information including at least information regarding a use time of a charging object apparatus and information regarding a user, updating the stored reservation information based on information that the user requests for reservation of use of the charging object apparatus, and signaling, when the reservation information updated by the updating step is different from reservation information of any other user stored, permission information for permitting use of the charging object apparatus to the outside based on the stored use reservation information, and the steps performed by the charging object apparatus of acquiring the permission information signaled from the management apparatus, discriminating based on the permission information whether or not use of the charging object apparatus by the user should be permitted, measuring an operation time period of the charging object apparatus as a use time period when the use of the charging object apparatus is permitted by the discriminating step, and producing information which makes an object of charging based on information regarding the use time period, the management apparatus managing the information regarding the reservation by the registered member.

According to the seventh aspect of the present invention, there is provided a management method, including the steps performed by a management apparatus of distributing member registration information representing registered members each into one of a plural number of groups equal to the number of charging object apparatus, storing reservation information regarding times at which the members are scheduled to use the charging object apparatus for each of the groups, updating, based on information representing a request for use of the charging object apparatus from any of the members, the stored reservation information regarding the group in which the member is included, and signaling, based on the stored reservation information, permission information regarding the member who has made the registration and a time at which the reserved charging object apparatus is scheduled to be used, and the steps performed by each of the charging object apparatus of acquiring the permission information signaled from the management apparatus, discriminating based on the permission information whether or not use of the charging object apparatus by a user should be permitted, measuring an operation time period of the charging object apparatus as a use time period wherein charging object apparatus is scheduled to be used when the use of the charging object apparatus is permitted by the discrimination, and producing information which makes an object of charging on the member based on the information regarding the measured time period within which the charging apparatus object apparatus is used, the management apparatus managing the information regarding the reservation by the registered member.

With the management apparatus, charging object apparatus and management systems and methods, if a user reserves a charging object apparatus for a use time period in advance, then use of the charging object apparatus within the reserved use time period by the reserving user is permitted with permission information issued by the management apparatus which has accepted the use reservation information. Consequently, the management apparatus can manage the information regarding the reservation readily upon such reservation so that use time periods of the charging object apparatus may not overlap with each other. Consequently, augmentation of the use efficiency of the charging object apparatus can be anticipated.

Further, since the registered members are distributed by the grouping means to a number of groups corresponding to the number of charging object apparatus managed by the management apparatus and the use reservation information is managed for each of the groups, the plurality of charging object apparatus can be managed so that they are used efficiently.

Further, where the registered members are grouped such that a plurality of members having addresses near to each other are included in one group, delivery and returning of the charging object apparatus can be performed readily and efficiently.

Further, where each group is organized such that it includes users whose use reservation time zones are different from each other, overlapping of use reservation times by a plurality of users for the charging object apparatus is reduced. Accordingly, each user can use the charging object apparatus when it wants to use. Meanwhile, since the operating ratio of the charging object apparatus rises, the manager side can anticipate an increase of the revenue by charging.

Further, since any user pays only for the time period within which it uses the charging object apparatus, the value of the product to the user becomes definite. Further, where the charging rate is changed for each function, the user can consent to the charging.

Furthermore, since the concept of the sales of a merchandise changes from the assignment of the possessing period of time of the merchandise to an equivalent to the use time period and the product possessing consciousness is eliminated, recovery and recycled use of products are facilitated and realization of a true circulation type society can be anticipated.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a block diagram showing an example of a configuration of a user side apparatus in the first embodiment;

FIGS. 11 and 12 are diagrammatic views showing first and second modifications to the first embodiment;

FIG. 13 is a diagram illustrating a third modification of the first embodiment

FIG. 15 is a block diagram showing an example of a configuration of a user side apparatus in the second embodiment;

FIG. 16 is a block diagram showing an example of a configuration of a manager side apparatus in the second embodiment;

FIGS. 17 and 18 are flow charts illustrating a use reservation requesting process for a charging object apparatus by the user side apparatus in the second embodiment;

FIG. 30 is a block diagram showing an example of a configuration of a user side apparatus in the fourth embodiment of the present invention;

FIG. 31 is a block diagram showing an example of a configuration of a charging object apparatus in the fourth embodiment;

FIG. 36 is a flow chart illustrating a process upon registration by a management apparatus side in the fifth embodiment;

FIG. 37 is a view illustrating an example of items to be registered by a user as a member in the fifth embodiment;

FIG. 40 is a diagrammatic view illustrating a second example of a grouping process in the fifth embodiment;

FIGS. 41 to 44 are views illustrating a third example of a grouping process in the fifth embodiment;

FIGS. 50 and 51 are diagrammatic views illustrating examples of a reservation table (booking table) used upon use reservation in the fifth embodiment;

FIG. 56 is a block diagram illustrating a settlement process in the charging system of the fifth embodiment;

FIG. 61 is a flow chart illustrating a data transfer processing in the settlement process performed by the electronic apparatus used in the charging system of the fifth embodiment;

FIG. 62 is a block diagram showing an example of a configuration of an electronic apparatus used in a sixth embodiment of the present invention;

FIG. 63 is a block diagram illustrating a settlement process in the charging system of the sixth embodiment;

FIG. 66 is a block diagram illustrating a data transfer processing involved in a settlement process in the seventh embodiment;

FIG. 76 is a block diagram illustrating a business model to which a twelfth embodiment of the present invention is applied;

FIGS. 78A and 78B are schematic views showing a structure of an example of an electronic coin used in the twelfth embodiment;

FIG. 79 is a block diagram showing a configuration of an example of an electronic apparatus built in the electronic coin used in the twelfth embodiment;

FIGS. 80A and 80B are schematic views showing a structure of another example of an electronic coin used in the twelfth embodiment;

FIGS. 81A, 81B and 81C are schematic sectional views illustrating different steps of a procedure of production of the electronic coin of FIGS. 80A and 80B;

DESCRIPTION OF THE PREFERRED EMBODIMENTS

First Embodiment

Figure 1:
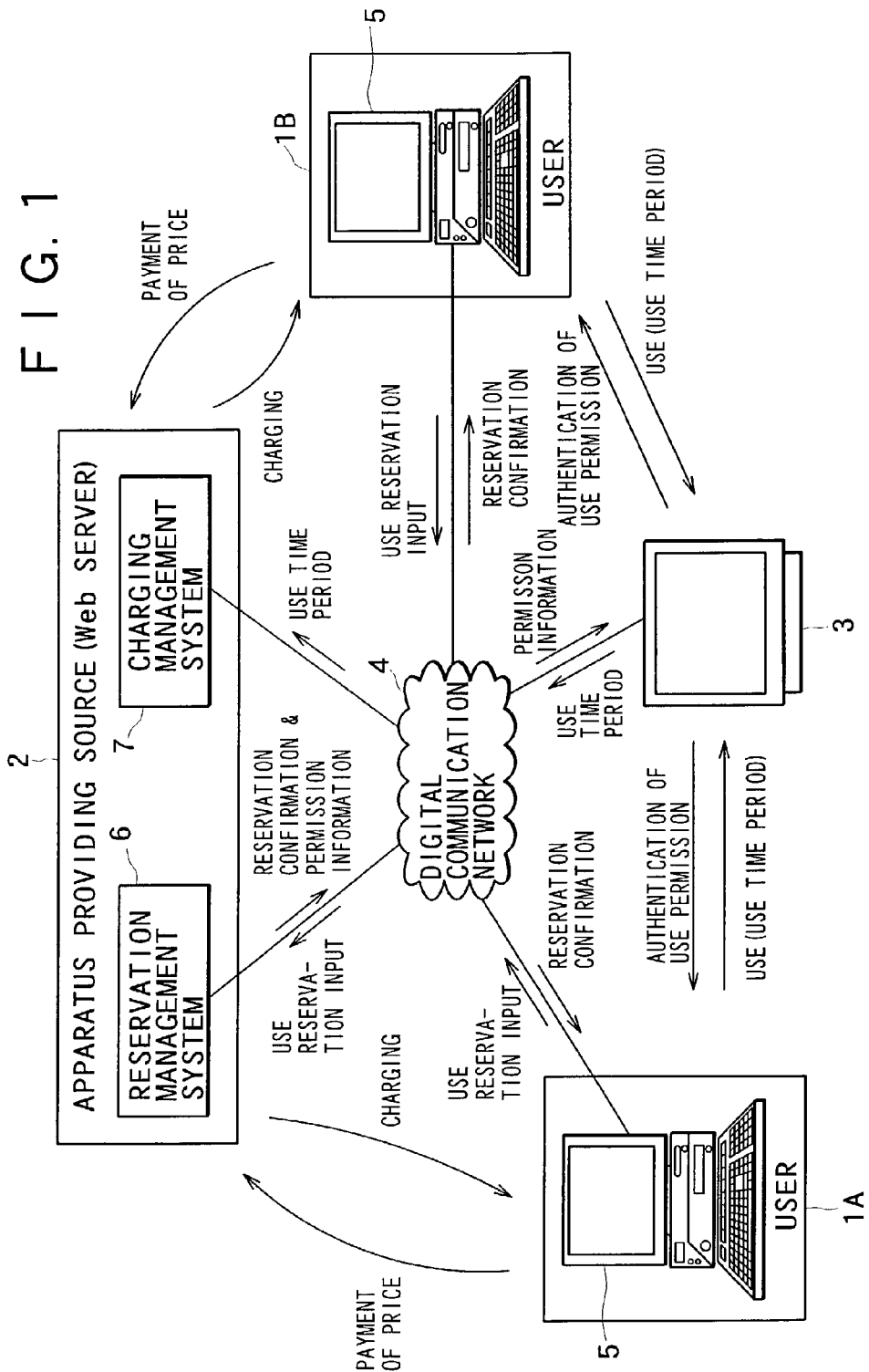
FIG. 1 is a diagrammatic view showing an example of a system configuration of a management system for a charging object apparatus to which the present invention is applied.

Referring first to FIG. 1, there is shown a management system for a charging object apparatus to which the present invention is applied. The management system includes, as a charging object apparatus, an electronic apparatus which incorporates a microcomputer system like, for example, an Internet television receiver and can be connected to a digital communication network such as the Internet. In the present management system, an equivalent for a used period of time of the charging object apparatus is paid later.

In the management system, a plurality of users such as a user 1A and another user 1B conclude a contract of use of the electronic apparatus 3 as a charging object apparatus to be provided with an apparatus providing source 2.

A user identifier (hereinafter referred to as user ID (Identification)) formed form, for example, a plurality of numerals and/or symbols is applied to each of the contracting users and registered into the apparatus providing source 2. Through the contract, each user is regarded as a member regarding a use providing service, and the user ID of each user becomes a membership number (member ID). Upon conclusion of the contract, each user registers a personal identification number or password determined by the user itself. This registration may be made at a storefront of the apparatus providing source 2 or may be Web registration.

Further, upon conclusion of the contract with the apparatus providing source 2, each of the users 1A and 1B makes an agreement with the apparatus providing source 2 on a method of settlement of the price for a period of time (time period) of use and registers the agreement into the apparatus providing source 2. While various settlement methods are applicable, it is assumed that, in the management system of FIG. 1, a bank or a credit company is utilized to make the settlement of the price.

The apparatus providing source 2 stores, for each of the users who have made such registration as described above, information of the name, the user ID, the password, the number of an applicable account of a bank or the credit card number (number of an account in a credit company), the settlement method for the charge and so forth. The registration may be made at a storefront of the apparatus providing source 2 or may be Web registration.

It is to be noted that, since the contract is not a sales contract, any user does not pay the price at a point of time at which it accepts the object product but pays the price based on a substantial time period of use of the electronic apparatus 3 as hereinafter described.

In the management system of FIG. 1, the electronic apparatus 3 is used commonly by a plurality of users such as the users 1A and 1B. When each user wants to use the electronic apparatus 3, it sends a use reservation request to the apparatus providing source 2 to make a reservation for the time of use of the electronic apparatus 3. The apparatus providing source 2 issues permission information in response to the use reservation request and gives the right of use of the electronic apparatus 3 for the reserved time of use to the user who has issued the use reservation request in preference to the other users.

In the management system shown in FIG. 1, the use reservation request from each user such as the user 1A or 1B is sent from a personal computer 5 owned by the user to the apparatus providing source 2 over a digital communication network 4 such as the Internet. The apparatus providing source 2 has functions of a Web server and includes a reservation management system 6 which accepts the use reservation request from the personal computer 5 of each user.

If the apparatus providing source 2 determines to permit the use of the reserved charging object apparatus at the reservation time by the reserving user in response to the use reservation request, then it signals such permission information so as to be stored into the memory of the charging object apparatus. Details of a process by the personal computer 5 and a process by the reservation management system 6 upon such reservation of use are hereinafter described.

Further, in the management system shown in FIG. 1, also the electronic apparatus 3 is connected to the digital communication network 4, and the permission information responsive to the use reservation request is sent from the reservation management system 6 of the apparatus providing source 2 to the electronic apparatus 3 over the digital communication network 4. The electronic apparatus 3 stores the received permission information into a built-in memory thereof. As hereinafter described, the permission information includes information for specifying the user who reserved the use, information for specifying the apparatus whose use was reserved, information of the time of the reserved use and so forth.

As the information for specifying the user, the user ID and the personal identification number or password determined by the user are used. As the information for specifying the apparatus, a product identifier (hereinafter referred to as product ID) is used in the management system of FIG. 1.

When a user tries to start use of the electronic apparatus 3, the electronic apparatus 3 performs confirmation authentication of the user and the time of use as hereinafter described to permit the use.

After the use of the electronic apparatus 3 is started, it measures a substantial operation time period thereof as the time of use for which the user should be charged and sends information of the time of use as a result of the measurement to the apparatus providing source 2 together with information for specifying the user over the digital communication network 4. The apparatus providing source 2 receives the information at a charging management system 7 thereof and performs a charging process for the user.

In order to allow each electronic apparatus to be specified, a product ID is written in the memory of the electronic apparatus 3. The product ID may be written into the memory upon production of the product in advance or may be written into the memory when the product is provided, that is, when the product is sold. The product ID and the user ID are written in a mapped relationship as use reservation data management information in the memory of the apparatus providing source 2. The product ID and the user ID are added to the information of the time of use sent from the electronic apparatus 3 to the charging management system 7.

The permission information described hereinabove may also include the product ID. In this instance, the apparatus providing source 2 may collate the product ID stored in the memory of the electronic apparatus 3 and the product ID included in the permission information with each other and permit the use by the user when the two product IDs coincide with each other.

The electronic apparatus 3 has a function of measuring a substantial operation time period as a time period of use and storing a cumulative time period of use into the built-in memory or an external memory. In the management system of FIG. 1, the time period within which the electronic apparatus 3 is energized after the power supply to it is made available is used as the substantial operation time period. In this instance, the time period is counted by incrementing a count value for each unit time period such as, for example, 10 seconds or 1 minute. The electronic apparatus 3 reports the cumulative time period of use stored in the memory to the apparatus providing source 2 over the digital communication network 4.

The charging management system 7 of the apparatus providing source 2 calculates the charge for use based on the reported cumulative time period of use and issues a request for the calculated charge for use to the user 1 (1A or 1B). The user 1 pays the charge for use in response to the request in accordance with the settlement method registered in advance in the apparatus providing source 2. The charging management system 7 of the apparatus providing source 2 confirms the payment of the charge for use.

If such payment of the charge for use is not made by the date for the settlement, then the charging management system 7 stores the fact and may take such measures as to convey this to the user, for example, when the user tries to make a next reservation for use and reject the reservation for use.

[Example of a Hardware Configuration of the Components]

An example of a configuration of each of the components of the management system of FIG. 1 is described below.

FIG. 2 shows an example of a configuration of the personal computer 5 of each user. Referring to FIG. 2, the personal computer 5 shown has a configuration same as that of popular personal computers and includes a central processing unit (CPU) 12, a read only memory (ROM) 13, a random access memory (RAM) 14, a keyboard interface (I/F) 15, a display controller 16 and a communication interface (I/F) 17 all connected to a system bus 11. A keyboard 18 is connected to the keyboard interface 15, and a display unit 19 is connected to the display controller 16. The communication interface 17 is connected to the digital communication network 4.

Programs stored in the ROM 13 include a program necessary to connect the personal computer 5 to the apparatus providing source 2 serving as a Web server to issue a use reservation request. Also it is possible for each member to receive a necessary application supplied from the apparatus providing source 2 upon membership registration of the member and install the application program into the personal computer 5.

Figure 3:
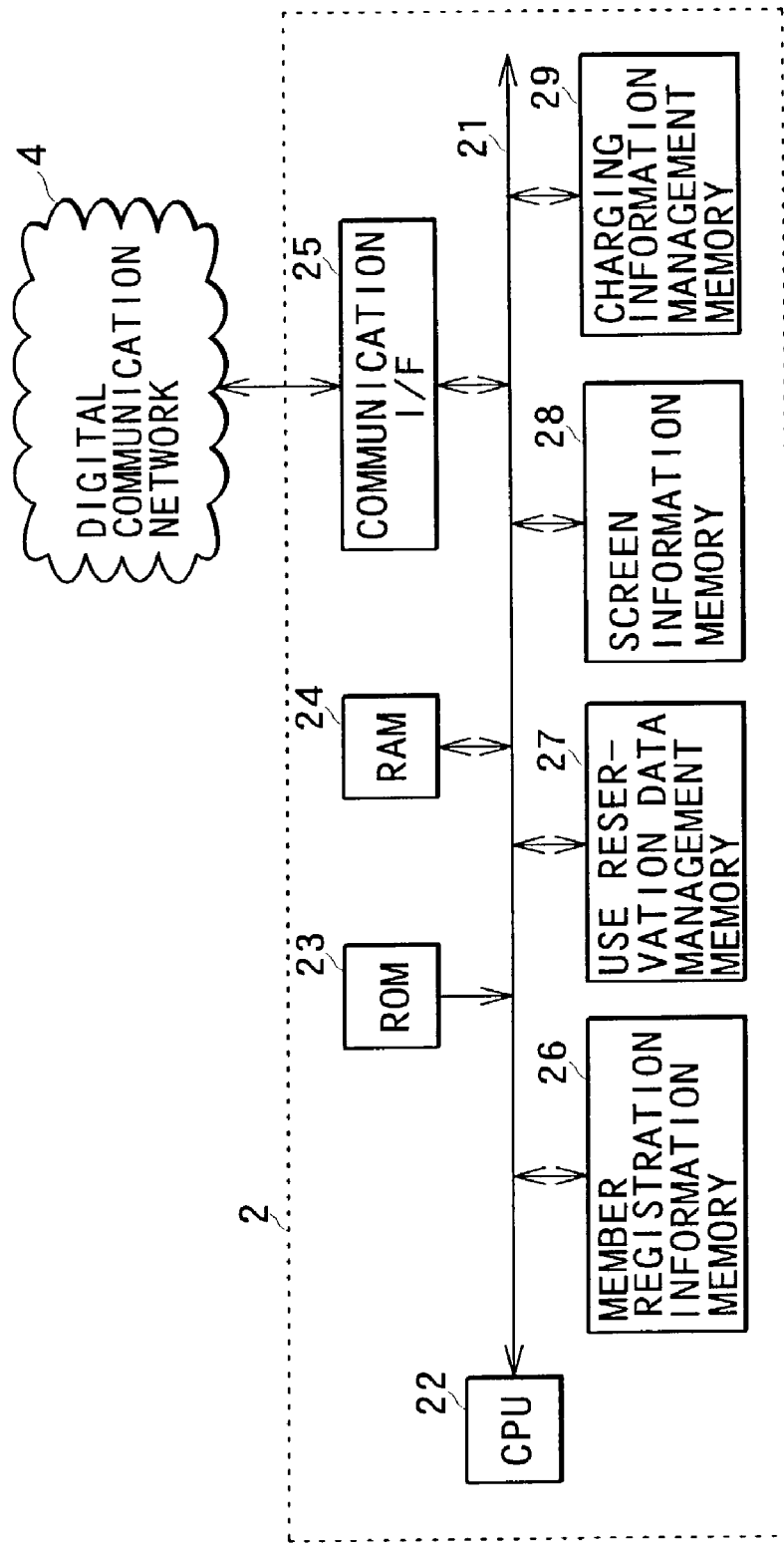
FIG. 3 is a block diagram showing an example of a configuration of a manager side apparatus in the first embodiment.

FIG. 3 shows an example of a configuration of the apparatus providing source 2. Referring to FIG. 3, the apparatus providing source 2 shown has a basically the same configuration as that of a personal computer. In particular, the apparatus providing source 2 includes a CPU 22, a ROM 23, a RAM 24, a communication interface 25, a member registration information memory 26, a use reservation data management memory 27, a screen information memory 28 and a charging information management memory 29 all connected to a system bus 21. The communication interface 25 is connected to the digital communication network 4.

The member registration information memory 26 stores, for each of the registered users, information of the name, the user ID, the password, the number of an account of a bank or a credit card number (number of an account in a credit company), the settlement method for the charge and so forth as member registration information.

The use reservation data management memory 27 stores therein information regarding uses reserved in accordance with use reservation requests. In particular, data including the user IDs of the reserving users, the reserved times of use and the product IDs of the reserved apparatus are stored as reservation data in the use reservation data management memory 27.

The screen information memory 28 stores information of a screen to be sent from the apparatus providing source 2 serving as a Web server to the personal computer 5 of a user when the user issues a use reservation request or the like. As hereinafter described, suitable screen information is read out from the screen information memory 28 in accordance with an instruction from the CPU 22 and sent to the personal computer 5 over the digital communication network 4.

The charging information management memory 29 stores, for each user, information of the time period of use of a charging object apparatus, the user ID and the product ID sent from the charging object apparatus to the apparatus providing source 2 after the user uses the charging object apparatus, a charged amount of money calculated based on the received information and a payment history such as whether or not the charged amount of money is paid, and other necessary information. The apparatus providing source 2 executes a charging process based on the stored contents of the charging information management memory 29 to manage whether or not payment is performed.

For the memories 26 to 29, not only a semiconductor memory but also a disk recording medium such as a hard disk or an optical disk or some other storage medium such as a magnetic tape can be used. The memories 26 to 29 need not necessarily be formed as separate hardware elements but may naturally be formed as a single memory means whose memory area is divided into a plurality of different sections which are used as such memories 26 to 29.

The personal computer of the configuration of FIG. 3 has functions of both of the reservation management system 6 and the charging management system 7. Naturally, the portion corresponding to the reservation management system 6 and the portion corresponding to the charging management system 7 may be formed from personal computers separate from each other. However, where separate personal computers are used in this manner, in order to allow payment information for charges to be reflected on reservation management, preferably the two personal computers are connected in a single network so that they may cooperate with each other.

Figure 4:
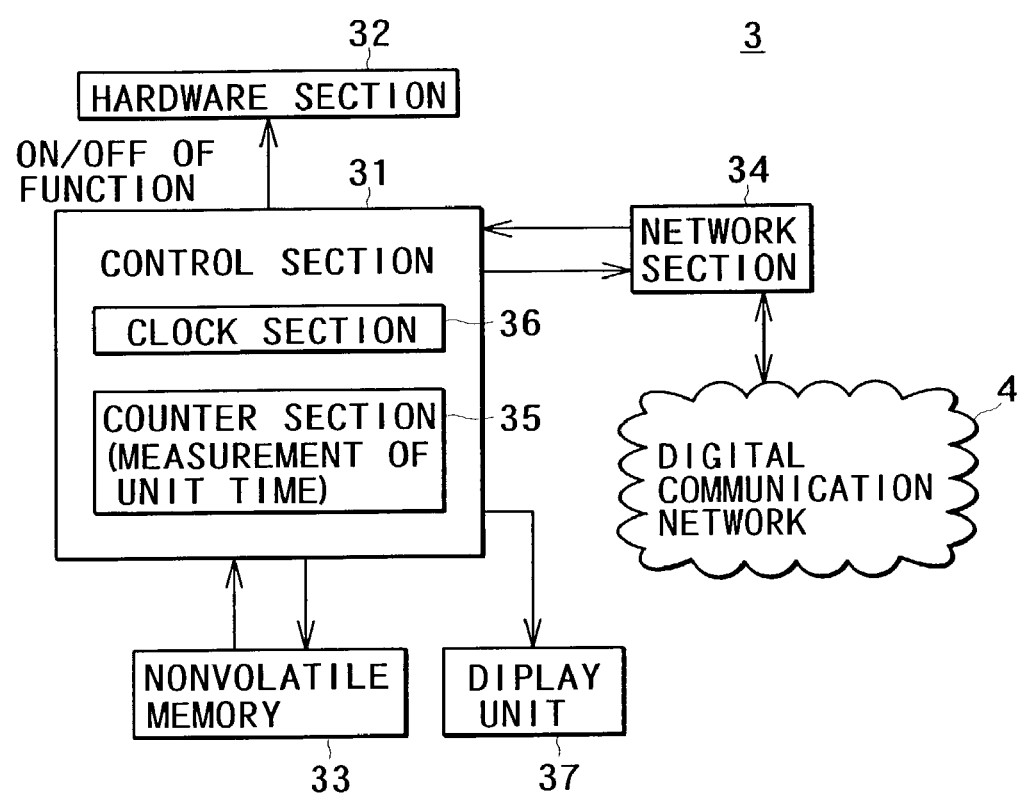
FIG. 4 is a block diagram showing an example of a configuration of a charging object apparatus in the first embodiment.

FIG. 4 shows an example of a configuration of the electronic apparatus 3 in the management system of FIG. 1. Referring to FIG. 4, the electronic apparatus 3 shown includes a control section 31 for controlling the entire electronic apparatus 3, a hardware section 32 for executing functioning actions of the electronic apparatus 3, a nonvolatile memory 33 formed form, for example, an electronic erasable programmable ROM (EEPROM), and a network section 34 for establishing a connection to the digital communication network 4.

Though not shown, the control section 31 includes firmware for controlling the electronic apparatus 3, software for controlling the charging system, software for controlling on/off of functions and so forth. Further, the control section 31 includes a counter section 35 for measuring a unit time serving as a unit for charging. Furthermore, the control section 31 includes a clock section 36 for authenticating reserved time of use and so forth.

The control section 31 uses the software for controlling on/off of functions to perform on/off control of the hardware section 32 based on permission information acquired from the reservation management system 6 of the apparatus providing source 2 through the network section 34.

The nonvolatile memory 33 stores the product ID and permission information acquired over the digital communication network 4. Further, the nonvolatile memory 33 stores a cumulative value of a time period of use (cumulative time period of use) as a substantial operation time period measured by the charging system controlling software of the control section 31.

The counter section 35 of the control section 31 measures the time period within which the electronic apparatus 3 remains energized after the power supply to the electronic apparatus 3 is made available, and issues a unit time lapse output signal such as a carry signal when the measured time amounts to the unit time. It is to be noted that the clock signal of the counter section 35 is suitably corrected in accordance with correction information received from the apparatus providing source 2 serving as a host server over the digital communication network 4 so that it normally is an accurate clock signal.

The charging system controlling software of the control section 31 reads out the cumulative use time period from the nonvolatile memory 33 when a unit time lapse output signal is outputted from the counter section 35, and increments the cumulative use time period by "1". Then, the charging system controlling software writes the incremented cumulative use time period back into the nonvolatile memory 33. Consequently, the cumulative use time period is always stored in the nonvolatile memory 33.

Further, if the charging system controlling software of the control section 31 discriminates based on the clock information from the clock section 36 that the reserved use time comes to an end, that is, a settlement time comes, then it reads out data including information of the cumulative use time period and information of the product ID and the user ID from the nonvolatile memory 33 and signals the data into the digital communication network 4 through the network section 34 designating the charging management system 7 of the apparatus providing source 2 as a destination. Also the clock signal of the clock section 36 is an accurate clock signal because it is corrected with such correction information from the apparatus providing source 2 as described above.

In response to transmission of a cumulative time period of use and so forth at the settlement time, a debit note for the price for the present time period of use is transmitted from the charging management system 7 to the electronic apparatus 3. Consequently, the control section 31 of the electronic apparatus 3 displays the price on a screen of a display unit 37 which may be, for example, a liquid crystal display (LCD) unit. Thereupon, since also a due date is transmitted from the charging management system 7, the control section 31 displays it on the screen of the display unit 37.

If the user does not pay the price even after the due date elapses, the charging management system 7 stores this fact into the charging information management memory 29 together with the user ID of the user. Then, as described hereinabove, when the reservation management system 6 receives a use reservation request, if the user who has issued the request is the user who did not pay the price described above, then the control section 31 of the electronic apparatus 3 determines that the authentication results in failure and rejects acceptance of the use reservation request of the user or takes some other suitable countermeasure.

[Use Reservation Requesting Process in the First Embodiment]

Now, processing operation of the personal computer 5 of a user and processing operation of the reservation management system 6 of the apparatus providing source 2 upon use reservation in the first embodiment are described.

Processing by the Personal Computer 5

First, use reservation requesting processing operation of the personal computer 5 is described with reference to flow charts of FIGS. 5 and 6. The process is performed principally by the CPU 12.

Before the user of the personal computer 5 issues a use reservation request, it signals a request for connection from the personal computer 5 to the apparatus providing source 2 (Web server) over the digital communication network 4 to perform an operation for establishing a connection between the reservation management system 6 and the personal computer 5 (step S1). Then, the CPU 12 discriminates whether or not a connection is established to the apparatus providing source 2 (step S2). If the CPU 12 discriminates that a connection is not established, then the CPU 12 displays a connection error on the display unit 19, whereafter the processing routine is quitted. The user will perform operation of the personal computer 5 again from the beginning.

If it is discriminated at step S2 that a connection to the apparatus providing source 2 is established, then since a reservation information inputting screen for urging the user to input its user ID and password is transmitted from the apparatus providing source 2 to the personal computer 5, the CPU 12 receives the reservation information inputting screen and displays it on the screen of the display unit 19 (step S4). Then, the CPU 12 waits for inputting of a user ID and a password by the user (step S5). Then, after the user inputs its user ID and password, the CPU 12 sends the user ID and the password inputted to the apparatus providing source 2 over the digital communication network 4 (step S6).

The apparatus providing source 2 discriminates whether or not the user specified with the user ID and the password received from the personal computer 5 is one of the members stored in the member registration information memory 26 and refers to the payment information for a charge stored in the charging information management memory 29 to discriminate whether or not the user has completed the payment for the charge in the past thereby to discriminate whether or not the use reservation request of the user may be accepted. Then, if it is discriminated that the user reservation request of the user may be accepted, then the apparatus providing source 2 sends a reservation inputting screen, but in any other case, the apparatus providing source 2 sends information representing failure in the authentication of the user back to the personal computer 5 of the user.

Figure 6:
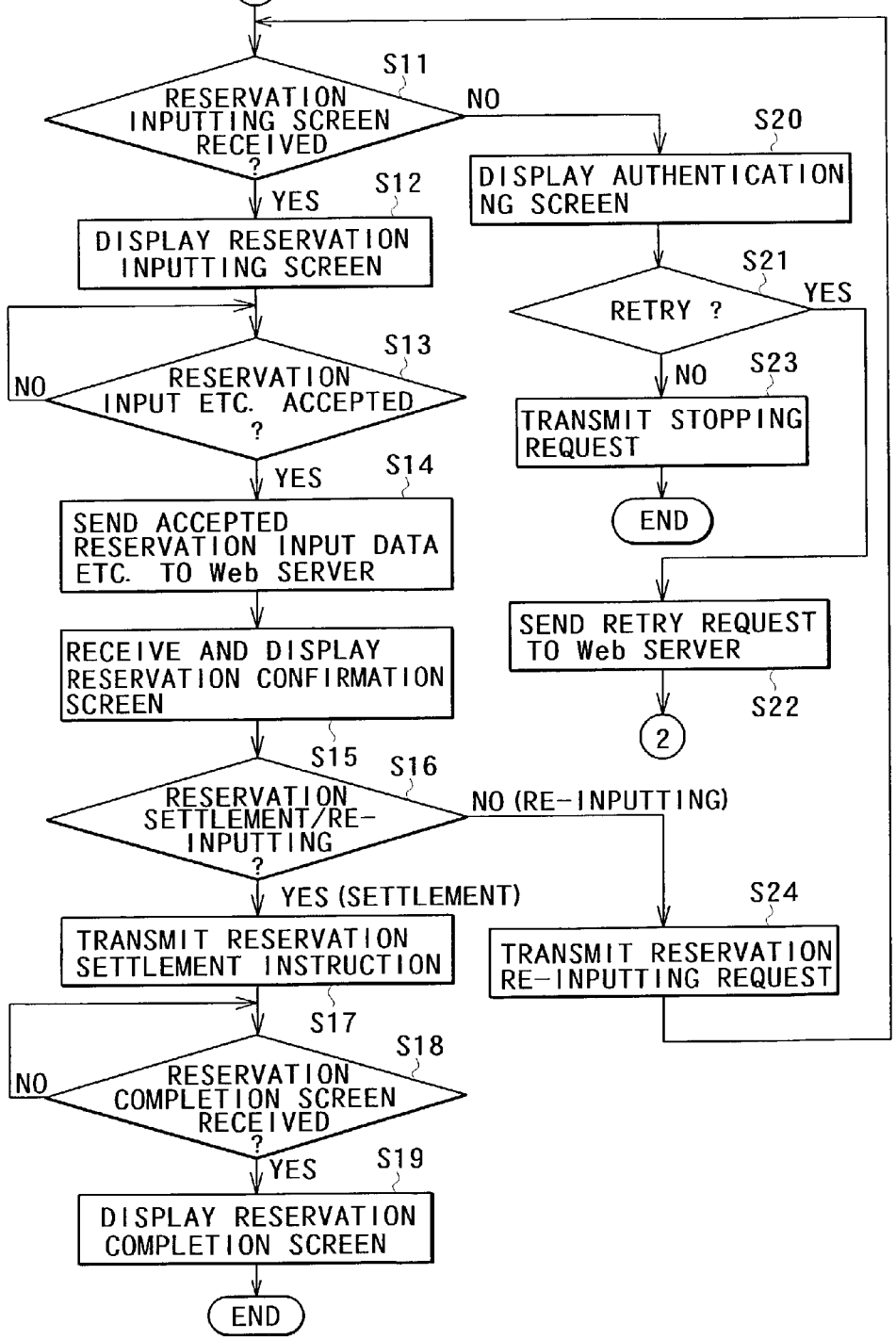

Thus, the personal computer 5 discriminates whether or not a reservation inputting screen is received (step S11 of FIG. 6). If the personal computer 5 discriminates that no reservation inputting screen is received but an authentication NG screen representing the failure in the authentication is received, then the personal computer 5 displays the received authentication NG screen on the display unit 19. The authentication NG screen includes a display of, for example, a selection button for selection of whether or not re-inputting of a user ID and a password should be performed (step S20).

Then, the personal computer 5 discriminates whether or not the user selects to perform re-inputting through the selection button described above (step S21). If it is discriminated that the user selects to perform re-inputting, then the personal computer 5 sends a re-inputting request to the apparatus providing source 2 (step S22). Thereafter, the processing advances to step S4, at which the personal computer 5 receives a reservation information inputting screen for urging the user to input its user ID and password from the apparatus providing source 2, whereafter the processing at the processing steps following the step S4 is repeated.

On the other hand, if the personal computer 5 discriminates at step S21 that the user selects not to perform re-inputting through the selection button, then it sends a stopping request for the use reservation requesting process to the apparatus providing source 2 (step S23), thereby ending the use reservation requesting routine.

It is to be noted that, since actually the personal computer 5 checks an operation input of the re-inputting button or the stopping button by the user and transmits a button operation instruction operated and inputted by the user to the apparatus providing source 2, but a stopping request for a use reservation requesting process or a re-inputting request is not sent directly. The apparatus providing source 2 discriminates based on information sent thereto from the personal computer 5 which one of the two instructions the instruction inputted by the user is, and sends necessary information to the personal computer 5. However, in order to facilitate recognition of operation of the management system, such a manner of illustration and description is taken in the drawings and the specification of the present application. This applies in the same say as processes of the other flow charts which are hereinafter described.

If it is discriminated at step S11 that a reservation inputting screen is received, then the personal computer 5 displays the received reservation inputting screen on the display unit 19 (step S12) to urge the user to perform a reservation inputting operation. It is to be noted that, on the reservation inputting screen, the user can perform not only inputting of a novel reservation of use but also alteration or cancellation of an item relating to a preceding reservation.

Then, the personal computer 5 waits for inputting of reservation information or inputting of alteration or cancellation of a reservation item by the user (step S13). If the personal computer 5 accepts one of such inputs, then it sends the accepted reservation information, alteration information or cancellation information to the apparatus providing source 2 (step S14).

When the apparatus providing source 2 receives the information, it sends a reservation confirmation screen for urging the user to confirm the information to the personal computer 5 of the user over the digital communication network 4. The personal computer 5 receives the reservation confirmation screen and displays it on the display unit 19 (step S15).

The reservation confirmation screen includes a display of a correction button for redoing inputting and a confirmation button for indicating that the input may be settled. The user will confirm the contents inputted by the user itself on the reservation confirmation screen, and if the user wants to settle the inputted contents, then the user depresses the confirmation button, but if the user wants to perform re-inputting for correction or the like, then the user depresses the correction button.

The personal computer 5 checks the operation input of the confirmation button or the correction button by the user (step SI 6), and if the personal computer 5 discriminates that the operation input is a re-inputting instruction of the reservation contents, then the personal computer 5 transmits a reservation re-inputting request to the apparatus providing source 2 over the digital communication network 4 (step S24). Thereafter, the processing returns to step S11, at which the personal computer 5 waits for reception of the reservation inputting screen.

If the personal computer 5 discriminates at step S 16 that a settlement instruction of the reservation contents is issued, then it transmits a reservation settlement instruction to the apparatus providing source 2 over the digital communication network 4 (step S17). Then, the personal computer 5 waits for reception of a reservation completion screen from the apparatus providing source 2 (step S18). Then, after the personal computer 5 receives the reservation completion screen, it displays the reservation completion screen on the display unit 19 (step S19), thereby ending the reservation inputting processing routine.

It is to be noted that actually the personal computer 5 checks an operation input of the confirmation button or the correction button by the user and transmits a button operation instruction operated and inputted by the user to the apparatus providing source 2, but does not discriminate whether the operation input is a settlement instruction of the reservation contents or a re-inputting instruction and transmit the same. The apparatus providing source 2 confirms based on the information received from the personal computer 5 which one of a settlement instruction of the reservation contents and a re-inputting instruction the operation input is, and sends necessary screen information to the personal computer 5. However, in order to facilitate recognition of operation of the management system, such a manner of description is taken in the specification of the present application. This applies in the same way as processes of the other flow charts which are hereinafter described.

Process by the Apparatus Providing Source (Web Server) 2

Figure 7:
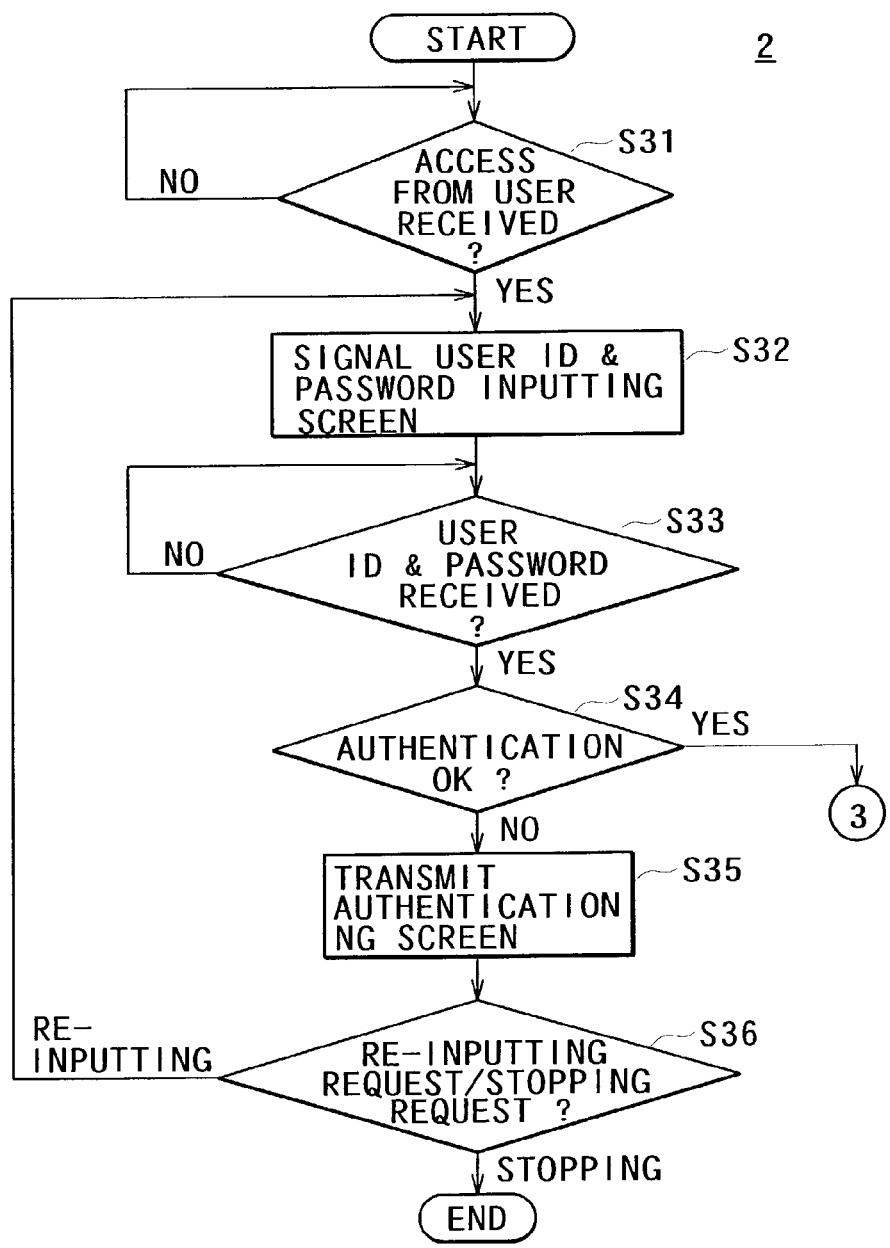
FIGS. 7 and 8 are flow charts illustrating an acceptance process of a use reservation request for a charging object apparatus by the manager side apparatus of FIG. 3.
Figure 8:
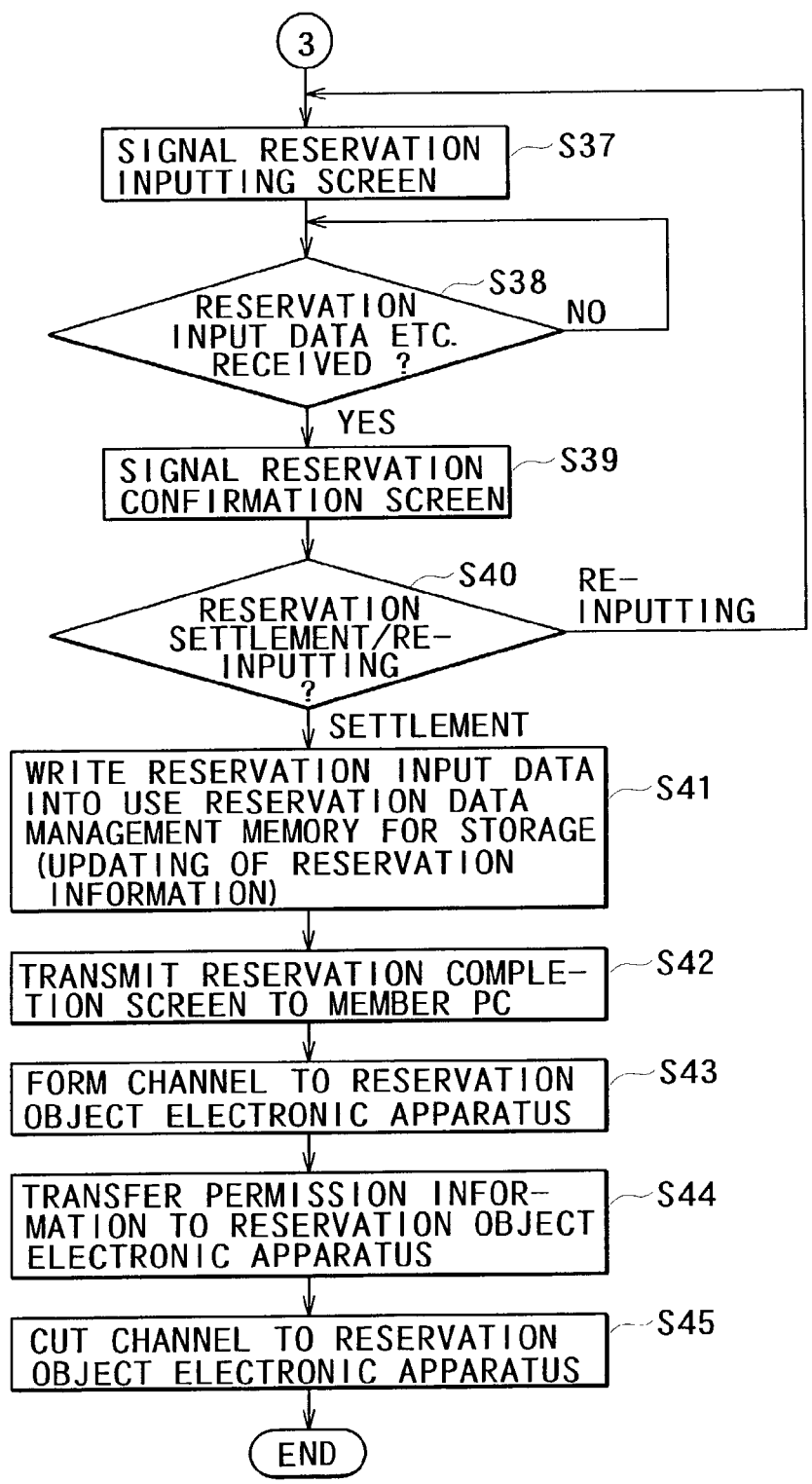

Now, processing operation of the apparatus providing source 2 which operates as a Web server upon use reservation inputting is described with reference to FIGS. 7 and 8. The processing steps illustrated in FIGS. 7 and 8 are executed by the CPU 22 in accordance with a program of the ROM 23.

The apparatus providing source 2 discriminates first whether or not an access request sent from the personal computer 5 of a user to the apparatus providing source 2 over the digital communication network 4 is received (step S31). If an access request is received, then the apparatus providing source 2 performs a connection process, reads out an inputting screen for a user ID and a personal identification number or password from the screen information memory 28 and signals the inputting screen to the personal computer 5 of the user from which the access request has been issued (step S32).

Then, the apparatus providing source 2 waits for a user ID and a personal identification number or password sent from the personal computer 5 (step S33). When the apparatus providing source 2 confirms reception of them, it discriminates whether or not authentication of the membership is OK (step S34).

In the authentication at step S34, the apparatus providing source 2 compares the membership registration information stored in the member registration information memory 26 and the user ID and personal identification number or password with each other to discriminate whether or not the user is one of the registered members. Then, if it is discriminated that the user is one of the registered members, then the apparatus providing source 2 checks the payment history for a charge of the charging information management memory 29 to discriminate whether or not the user has completed its payment for the use in the past by the due date.

If it is discriminated in the authentication at step S34 that the user who has issued the access request is none of the registered members, then the apparatus providing source 2 sends an authentication NG screen including a message representing such discrimination to the personal computer 5 (step S35).

If it is discriminated in the authentication at step S34 that the user who has issued the access request is one of the registered members but has not completed its payment for the user in the past by the due date, then the apparatus providing source 2 sends an authentication NG screen including a message representing such discrimination to the personal computer 5 (step S35). As described hereinabove, the authentication NG screen includes a display of the selection button for selection of whether or not re-inputting of a user ID and a password should be performed.

After the authentication NG screen is received, the apparatus providing source 2 discriminates which one of a re-inputting instruction and a stopping instruction is received from the personal computer 5 (step S36). If it is discriminated that a re-inputting instruction is received, then the processing returns to step S32, at which the apparatus providing source 2 sends a password inputting screen to the personal computer 5 and waits for re-inputting of a user ID and a password. On the other hand, if it is discriminated that a stopping instruction is received, then the apparatus providing source 2 ends the use reservation request acceptance processing routine.

If it is discriminated in the authentication at step S34 that the user who has issued the access request is one of the registered members and has completed its payment for the use in the past by the due date (including a case wherein the user has issued a user reservation request for the first time and has no payment history in the past), then the apparatus providing source 2 signals the reservation inputting screen to the personal computer 5 (step S37 of FIG. 8).

As described hereinabove, a person who wants to perform use reservation performs reservation inputting regarding a reservation use time on the reservation inputting screen. Since the personal computer 5 thereafter sends the reservation input information, the apparatus providing source 2 waits for reception of such reservation input information (step S38). Then, if the apparatus providing source 2 confirms reception of the reservation input screen, then it reads out the reservation confirmation screen from the screen information memory 28 and sends it to the personal computer 5 (step S39).

Since, on the reservation confirmation screen, the user performs instruction inputting of either one of a settlement instruction of the reservation contents and a re-inputting instruction as described hereinabove, the apparatus providing source 2 discriminates which one of a reservation settlement instruction and a reservation re-inputting instruction is received from the personal computer 5 (step S40). If it is discriminated at step S40 that a re-inputting instruction is received, then the processing returns to step S37, at which the apparatus providing source 2 sends the reservation inputting screen and waits for re-inputting.

If it is discriminated at step S40 that the reservation settlement instruction is received, then the apparatus providing source 2 writes the reservation input data into the use reservation data management memory 27 to update the use reservation data (step S41). Then, the apparatus providing source 2 reads out the reservation completion screen from the screen information memory 28 and transmits it to the personal computer 5 (step S42).

Thereafter, the apparatus providing source 2 disconnects the communication with the personal computer 5 and connects a channel to the electronic apparatus 3 of the reservation object over the digital communication network 4 (step S43), and sends permission information for the completed reservation to the electronic apparatus 3 (step S44). The electronic apparatus 3 stores the permission information into the nonvolatile memory 33.

The apparatus providing source 2 thereafter disconnects the channel to the electronic apparatus 3 of the reservation object (step S45), thereby ending the use reservation request acceptance processing routine.

[Execution of Use of the Electronic Apparatus 3]

Figure 9:
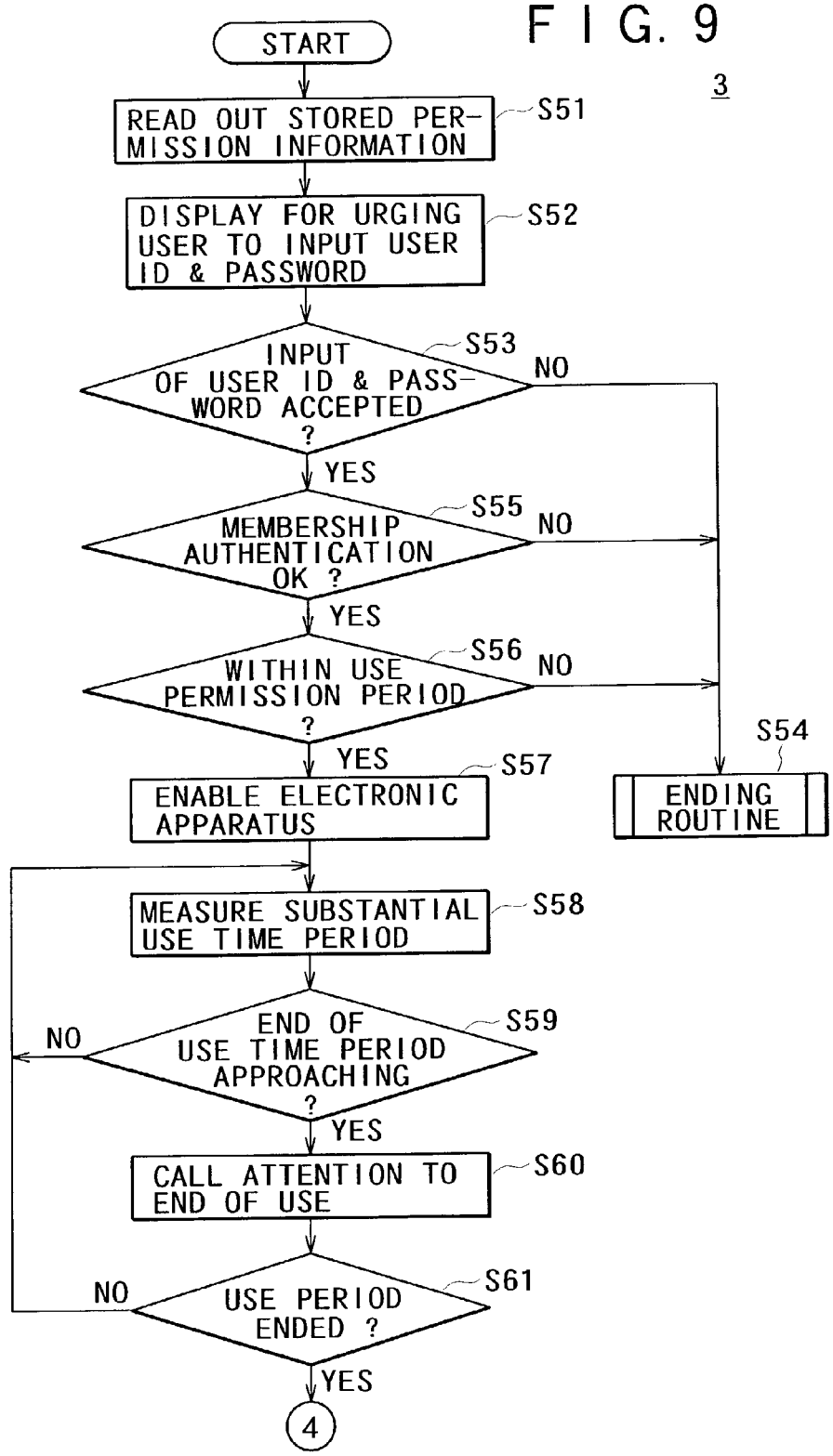
FIGS. 9 and 10 are flow charts illustrating processing operation by the charging object apparatus of FIG. 4.
Figure 10:
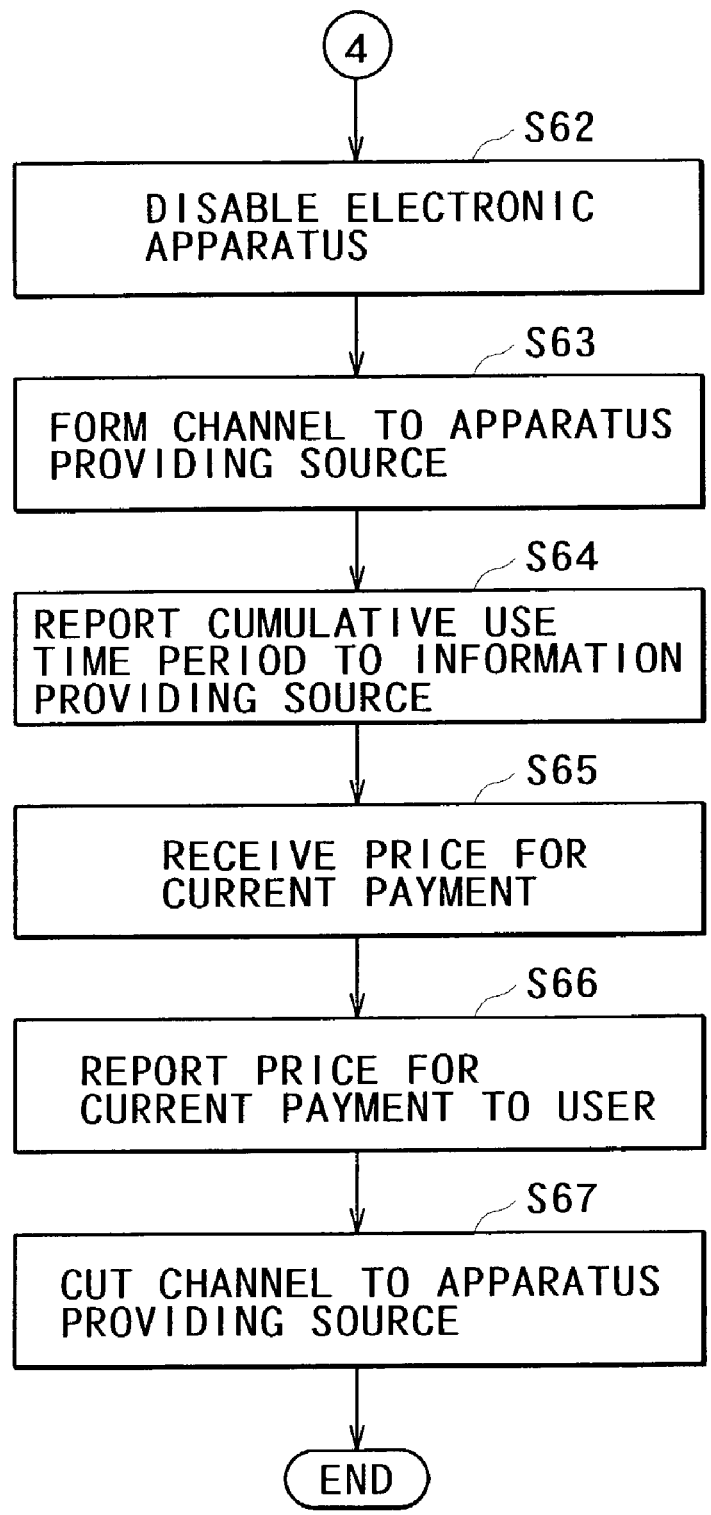

FIGS. 9 and 10 are flow charts illustrating a processing routine of the electronic apparatus 3 when the electronic apparatus 3 is passed to a user of a member who has reserved use of the electronic apparatus 3 and the user executes use of the electronic apparatus 3. It is to be noted that the processing steps involved are executed by a CPU provided in the control section 31.

After the power supply to the electronic apparatus 3 is made available, the electronic apparatus 3 starts the processing routine of FIG. 9, and the control section 31 of the electronic apparatus 3 first reads out permission information written in the nonvolatile memory 33 (step S51) and displays the inputting screen for a user ID and a password on the display unit 37 to urge the user to input the specified information (step S52). Then, the control section 31 waits for inputting of a user ID and a password by the user (step S53).

If the control section 31 does not discriminate inputting of a user ID and a password for more than a predetermined time period, then it performs an ending routine to disconnect the power supply to the electronic apparatus 3 (step S54).

If the control section 31 confirms inputting of a user ID and a password by the user at step S53, then it compares the inputted user ID and password with the user ID and the password included in the read out permission information to perform an authentication check to discriminate whether or not the user is the user who has made the reservation (step S55). If the authentication reveals that the user is not the user who has made the reservation, then the control section 31 performs the ending routine to disconnect the power supply to the electronic apparatus 3 (step S54).

On the other hand, if the authentication at step S55 proves that the user is the user who has made the reservation, then the control section 31 compares information of the reservation use time included in the permission information with the date and hour at present of the clock section 36 to discriminate the date and hour at present is within the use permission period of the reservation (step S56). If the date and hour at present is not within the use permission period of the reservation, then the control section 31 executes the ending routine to disable the electronic apparatus 3. Here, the control section 31 disconnects the power supply to the electronic apparatus 3 (step S54).

On the other hand, if the date and hour at present falls within the use permission period of the reservation at step S56, then the control section 31 sends a control signal for enabling the function of the hardware section 32 to the hardware section 32 to permit use of the electronic apparatus 3 by the user (step S57). Then, the control section 31 uses a result of counting of the counter section 35 to measure a substantial time period of use which is an operating time period of the electronic apparatus 3 and suitably stores a result of the measurement into the nonvolatile memory 33 (step S58).

Then, the control section 31 supervises the ending time of the use permission period of the reservation, and if it detects that the ending time of the use permission time is approaching (step S59), then it notifies the user that the ending time of the use permission time is approaching to call an attention of the user (step S60). In this instance, an attention of the user may be called otherwise through a display on the display unit 37 or through voice.

Then, the control section 31 supervises the ending time of the reserved use period (step S61), and if it discriminates that the ending time of the reserved use period comes, then it sends a function off control signal to the hardware section 32 to disable the use of the electronic apparatus 3 by the user (step S62).

Then, the control section 31 of the electronic apparatus 3 establishes a communication path to the apparatus providing source 2 over the digital communication network 4 (step S63), and reads out the substantial use time period by the user from the nonvolatile memory 33 and sends the read out substantial use time period to the apparatus providing source 2 together with the user ID and the product ID from the RAM 14 through the network section 34 over the digital communication network 4 (step S64).

Upon reception of the substantial use time period, the apparatus providing source 2 calculates a chargeable price for the present use and settles the charge for use of a result of the calculation in accordance with the settlement method stored in the member registration information memory 26. Then, the apparatus providing source 2 sends the charge for use of the result of the calculation to the electronic apparatus 3 over the digital communication network 4.

The control section 31 of the electronic apparatus 3 receives the information of the charge for use through the network section 34 (step S65) and displays the price on the display unit 37 to notify the user (step S66). Then, the control section 31 disconnects the communication path to the apparatus providing source 2 and disconnects the power supply to the electronic apparatus 3 (step S67), thereby ending the processing routine.

It is to be noted that the process at step S65 may be replaced by such a process by the electronic apparatus 3 that the control section 31 calculates a chargeable price and reports a result of the calculation to the user. In this instance, the electronic apparatus 3 may calculate a chargeable price and transmit information of the calculated chargeable price to the charging management system 7.

It is to be noted that, although the foregoing description does not include description of disconnection of the power supply to the electronic apparatus 3 within the reserved use period, arbitrarily disconnect the power supply to the electronic apparatus 3 at any time within the reserved use period. When the power supply is disconnected in this manner, information regarding the substantial use time period of the electronic apparatus 3 before the disconnection of the power supply is successively accumulated to the use time period till the time at which the power supply was disconnected last, and the accumulated use time period is stored into the nonvolatile memory 33 of the electronic apparatus 3.

It is to be noted that, although the process described above proceeds such that, if the power supply is disconnected once, then when the power supply is connected subsequently, the member authentication and the authentication of the use time are performed again, it may be modified such that such member authentication and authentication of the use time are performed only when the power supply to the electronic apparatus is made available for the first time after the electronic apparatus is passed to the user.

With the management system described above, since a user can reserve the use of an electronic apparatus and use the electronic apparatus, it can use the apparatus with certainty at time at which it wants to use the apparatus. Besides, since the time period of the charging object is not the entire span of time of the period of the reservation for use but a substantial period of use time, for example, only of a period within which the power supply is on, the charge amount is readily acceptable for the user.

Meanwhile, to the apparatus providing source 2, the use efficiency of the electronic apparatus can be augmented by managing use reservations of the electronic apparatus by users. In other words, the apparatus providing source 2 can readily manage the electronic apparatus so that the use times of the electronic apparatus by different users may not overlap with each other.

[First Modification to the First Embodiment]

In the first embodiment described above, each user performs membership registration into the apparatus providing source 2 in advance. However, the management system may be modified such that, when a user performs inputting for use reservation, it reports a bank account or a credit number of it to the apparatus providing source 2, and the apparatus providing source 2 confirms the account of the user from the bank or the credit company over the digital communication network 4 to accept a use reservation input. In this instance, use reservation can be performed without a membership contract.

FIG. 11 shows a mechanism for use reservation by a first modification to the first embodiment.

Referring to FIG. 11, a user 1 who wants to make a use reservation uses its personal computer 5 to access the apparatus providing source 2 serving as a Web server and issue a use reservation request as indicated by "(1) Request for use reservation" in FIG. 11. Upon the issuance of the use reservation request, the user 1 sends the name, a bank account number, a credit card number or a personal identification number or password of the user 1 itself to the reservation management system 6 of the apparatus providing source 2.

The reservation management system 6 of the apparatus providing source 2 uses the name, account number or card number of the user 1 in the information of the use reservation request to confirm the user I and its account to a credit company 8 as indicated by "(2) Confirmation" in FIG. 11.

If the user 1 and the account are confirmed, then the personal computer 5 accepts a reservation input by the user 1 and sends a user ID as approval of permission of the reserved use as indicated by "(3) Approval" in FIG. 3.

Then, the reservation management system 6 sends permission information to the electronic apparatus 3 reserved for use over the digital communication network 4 in the same manner as in the embodiment described above. Then, the user 1 will input the received user ID and its password to the electronic apparatus 3 for the confirmation of the user, and only when the electronic apparatus 3 is available at the use time, use of the electronic apparatus 3 by the user is enabled in the same manner as in the embodiment described hereinabove.

[Second Modification to the First Embodiment]

In the modified management system described above, the apparatus providing source 2 sends permission information to the electronic apparatus 3 and the electronic apparatus 3 receiving the permission information stores the permission information and performs permission authentication when the user tries to start use of the electronic apparatus 3. However, the modified management system may be further modified such that the apparatus providing source 2 keeps the permission information without sending it to the electronic apparatus 3 and, when a user tries to start the use of the electronic apparatus 3, the apparatus providing source 2 performs reservation confirmation authentication by the user.

FIG. 12 shows a mechanism of the use authentication process by the second modification to the first embodiment.

When the user switches on the power supply to the electronic apparatus 3 in order to use the electronic apparatus 3, then the electronic apparatus 3 establishes a communication path to the apparatus providing source 2 over the digital communication network 4 and sends a user ID and a password inputted by the user and the product ID stored in the electronic apparatus 3 to the apparatus providing source 2.

The apparatus providing source 2 collates the information transmitted thereto with the permission information stored therein. Then, if the authentication is successful, then the apparatus providing source 2 sends use permission information (a key for enabling the function) to the electronic apparatus 3, but if the authentication results in failure, then the apparatus providing source 2 sends a use inhibition signal (a key for disabling the function) to the electronic apparatus 3.

The control section 31 of the electronic apparatus 3 controls on/off (enabling/disabling) of the function of the hardware based on the key information for enabling or disabling the function from the apparatus providing source 2.

In the second modification to the first embodiment, when the authentication is successful and the use is permitted and then the reserved use period comes to an end, the electronic apparatus 3 sends information of this to the apparatus providing source 2. Consequently, the apparatus providing source 2 sends a key for disabling the function of the hardware section 32 of the electronic apparatus 3 to the electronic apparatus 3. Thereafter, the electronic apparatus 3 sends an accumulated value of the substantial use time period within the use reservation time period to the apparatus providing source 2 in the same way as in the management systems described hereinabove.

The second modified management system is advantageous in that, since permission information is included in the apparatus providing source 2, even if a person who intends to illegally use the electronic apparatus 3 tries to alter the permission information, such alteration is very difficult.

[Third Modification to the First Embodiment]

The management system of the first embodiment described above may be modified such that the unit time price upon charging is not fixed but decreases as the cumulative use time period accumulated after the use of a user is started increases. Here, the unit time price is a charge for use per unit time period.

FIG. 13 illustrates a relationship between the cumulative use time period and the unit time price. As seen from FIG. 13, as the cumulative use time period increases, the unit time price gradually decreases, and after the cumulative use time period reaches a predetermined time period, that is, after the amount of money to be paid comes to a certain amount, the unit time price is zero.

The charging management system 7 of the apparatus providing source 2 stores a unit time price table of the relationship illustrated in FIG. 13 and stores a total cumulative use time period in the past with regard to the same product ID and the same user ID, that is, a cumulative value of substantial use periods of time by a plural number of times of reserved use with regard to the same product ID and the same user ID.

Then, the charging management system 7 of the apparatus providing source 2 adds a cumulative use time period reported from the electronic apparatus 3 to the total cumulative use time period in the past with regard to the same product ID and the same user ID and refers to the total cumulative time period of a result of the addition and the unit time price table described above to determine a unit time price to be used for the charging then. Then, the charging management system 7 of the apparatus providing source 2 multiplies the determined unit time price by the cumulative use time period reported in the present cycle and representing a time period for charging to calculate a charge for use for the present use, and claims the user 1 to pay the calculated charge for use.

Then the charging management system 7 discriminates whether or not the total cumulative use time period of the electronic apparatus 3 of the product ID by the user of the user ID reaches a prescribed time period at which the unit time period is zero. If the prescribed time period is not reached, then the charging management system 7 performs a settling process on the next date of settlement.

Further, when the charging management system 7 discriminates that the prescribed time at which the unit time period is zero is reached, although not shown in the drawings, the charging management system 7 issues a notification to the electronic apparatus 3 that later settlement is unnecessary and then ends the charging process. The electronic apparatus 3 receiving the notification displays it on the display unit 37 to notify the user and does not thereafter perform the charging process described above. Accordingly, the user 1 can later use the electronic apparatus 3 charge-free.

With the charging method as in the third modification described above, it is anticipated to promote utilization by a user. It is to be noted that, while, in the foregoing description, the change of the unit time price is applied only to the use of the same ID, this restriction is provided taking the depreciation through the use of the product into consideration. However, if the value of decrease of the unit time price is found only in the span of the use time period by a user, then the charging method described above may be applied also to the use of products of the same criterion by the user ID.

[Fourth Modification to the First Embodiment]

A use reservation request by a user may be issued not using such a personal computer as described above but using, for example, a portable telephone terminal. The portable telephone terminal in this instance can access the apparatus providing source 2 serving as a Web server over a radio communication network and over the digital communication network 4 to perform a user reservation requesting process in the same manner as described hereinabove.

Second Embodiment

In the first embodiment described above, the management system is configured such that the electronic apparatus 3 serving as a charging object apparatus and the apparatus providing source 2 are connected to each other over the digital communication network 4 such that permission information is sent from the apparatus providing source 2 to the electronic apparatus 3 over the digital communication network 4 and information of a use time period of a charging object is sent from the electronic apparatus 3 to the apparatus providing source 2.

However, where there is the necessity to connect the electronic apparatus 3 to the digital communication network 4 in this manner, the apparatus which can be used as a charging object apparatus are limited. The second embodiment of the present invention is improved in this regard.

Also in the second embodiment, a charging object apparatus is the electronic apparatus 3. However, the electronic apparatus 3 is not connected to the digital communication network 4. Further, in the second embodiment, communication of permission information and information of a use time period of a charging object between the apparatus providing source 2 and the electronic apparatus 3 is performed through a personal computer of a user using an external storage medium.

The external storage medium may be, for example, a tape recording medium such as a magnetic tape or an optical tape, a disk recording medium such as an optical disk, a magneto-optical disk or a flexible magnetic disk, or a card recording medium such as an IC memory card or a semiconductor memory card. In the example described as the second embodiment below, a memory card which is small in size and easy to handle and is suitable for power saving is used as the external storage medium.

Figure 14:
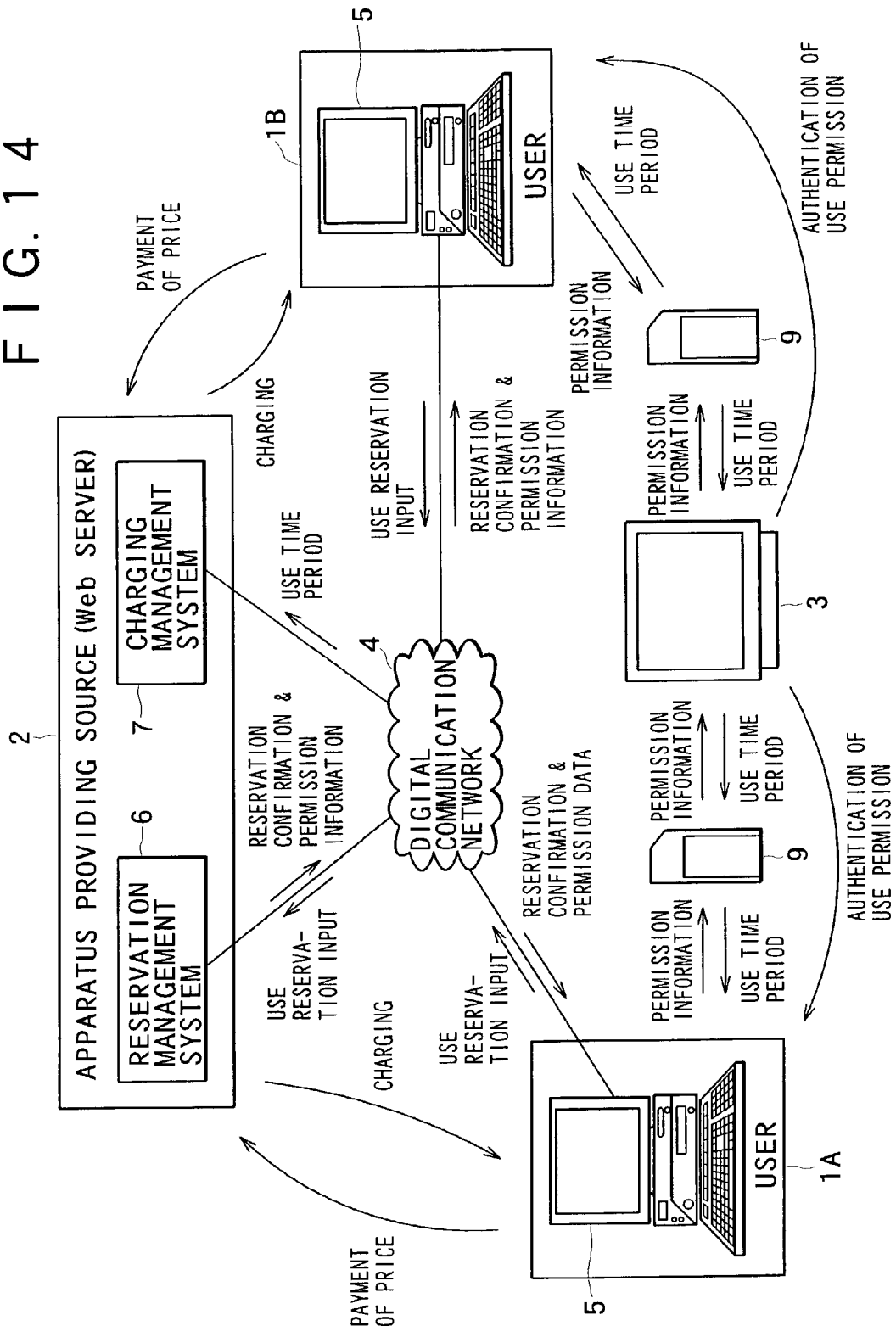
FIG. 14 is a diagrammatic view showing an outline of a management system for a charging object apparatus according to a second embodiment of the present invention.

FIG. 14 shows an outline of a management system for a charging object apparatus of the second embodiment. The management system of FIG. 14 has a configuration different from the configuration of the management system of the first embodiment shown in FIG. 1 in three points that the electronic apparatus 3 is not connected to the digital communication network 4, that permission information regarding the use of the electronic apparatus 3 and information of a use time period of the electronic apparatus 3 are communicated between the personal computer 5 and the apparatus providing source 2 and that the permission information regarding the use and the information of the use time period are communicated between the personal computer 5 and the electronic apparatus 3.

In the management system of FIG. 14, a memory card 9 is lent as a membership certificate to a user when each of users such as the users 1A and 1B is registered as a member into the apparatus providing source 2. The memory card 9 has, for example, a user ID (member ID) and a password written therein as information for specifying the user to which the memory card 9 is lent. Further, additional information such as a bank account number or a credit card number registered by the user may be written in the memory card 9.

Further, in the management system of FIG. 14, an application program which is used to issue a use reservation request to the apparatus providing source 2 and another application program which is used to report a use time period of the electronic apparatus 3 to the apparatus providing source 2, when the memory card 9 is loaded into the personal computer 5, are stored in the memory card 9.

FIG. 15 shows a configuration of the personal computer 5 in the management system of the second embodiment. Referring to FIG. 15, the personal computer 5 shown includes a card drive 41 including a loading section for the memory card 9 for reading out data from the memory card 9 and writing data into the memory card 9. The card drive 41 is connected to the system bus 11 through an interface which is not shown in FIG. 15. The other configuration of the personal computer 5 is the same as that of the personal computer 5 in the management system of the first embodiment shown in FIG. 2.

FIG. 16 shows an example of a configuration of the electronic apparatus 3 in the management system of the second embodiment. Referring to FIG. 16, the electronic apparatus 3 shown does not include the network section 34 but includes a card drive 42 including a loading section for the memory card 9 and connected to a control section 31 for reading and writing data onto and from the memory card 9.

[Use Reservation Requesting Process in the Second Embodiment]

Processing operation of the personal computer 5 of a user and processing operation of the reservation management system 6 of the apparatus providing source 2 upon use reservation in the management system of the second embodiment are described below.

Processing by the Personal Computer 5

First, use reservation requesting processing operation of the personal computer 5 is described with reference to flow charts of FIGS. 17 and 18. This process is executed principally by the CPU 12.

First, the CPU 12 discriminates whether or not a memory card 9 is loaded in the personal computer 5 (step S71). If no memory card 9 is loaded in the personal computer 5, then the CPU 12 executes some other required process (step S72). On the other hand, if a memory card 9 is loaded in the personal computer 5, then the CPU 12 reads out an application menu written in the memory card 9 and displays the application menu (step S73).

Then, the CPU 12 discriminates whether or not the use reservation inputting application is selected on the menu display (step S74). If any other application than the use reservation inputting application is selected, then the CPU 12 executes the selected application (step S72).

However, if the use reservation inputting application is selected at step S74, then the CPU 12 signals a connection request to the apparatus providing source 2 serving as a Web server over the digital communication network 4 in accordance with the application program to perform a process of establishing a connection between the reservation management system 6 and the personal computer 5 (step S75).

Then, the CPU 12 discriminates whether or not a connection to the apparatus providing source 2 is established (step S76). If it is discriminated that a connection to the apparatus providing source 2 is not established, then the CPU 12 display a connection error (step S77), and then the processing returns to step S73 to display the application menu. The user will thus perform such operation as described above again.

If it is discriminated at step S76 that a connection is established to the apparatus providing source 2, then since the inputting screen for a user ID and a password is sent from the apparatus providing source 2, the personal computer 5 receives the inputting screen and displays it on the screen of the display unit 19 (step S78). Then, the CPU 12 waits for inputting of a user ID and a password by the user (step S79).

Then, if the CPU 12 confirms inputting of a user ID and a password by the user, then it reads out the user ID and the password written in the memory card 9 and discriminates whether or not the read out user ID and password coincide with the user ID and the password inputted by the user thereby to perform authentication of whether or not the memory card 9 is owned legally by the user (step S80).

If the CPU 12 discriminates failure in the authentication of the memory card 9, then the CPU 12 displays a card authentication NG screen on the display unit 19 (step S81) and then discriminates whether or not either one of a re-inputting (retry) button or a stop button on the card authentication NG screen is operated by a user (step S82). If it is discriminated that the stop button is depressed, then the CPU 12 sends a stopping request to the apparatus providing source 2 (step S83), thereby ending the reservation inputting processing routine.

On the other hand, if it is discriminated at step S82 that the re-inputting button is depressed, then the personal computer 5 sends a retrying request (re-inputting request) to the apparatus providing source 2 (step S84), whereafter the processing returns to step S78 to receive and display the inputting screen for a user ID and a password and repeat authentication of a user ID and a password.

If it is discriminated at step S80 that the authentication of the memory card 9 is successful, then the personal computer 5 sends the user ID and password inputted thereto to the apparatus providing source 2 over the digital communication network 4 (step S85).

The apparatus providing source 2 discriminates whether or not the user specified based on the user ID and the password sent thereto is one of the members stored in the member registration information memory 26 and refers to the payment information for a charge stored in the charging information management memory 29 to discriminate whether or not the user has completed payment for a charge in the past thereby to discriminate whether or not the use reservation request from the user may be accepted. Then, if it is discriminated that the use reservation request of the user may be accepted, then the apparatus providing source 2 sends the reservation inputting screen, but in any other case, the apparatus providing source 2 sends information representing the failure in the authentication to the personal computer 5 of the user.

Figure 18:
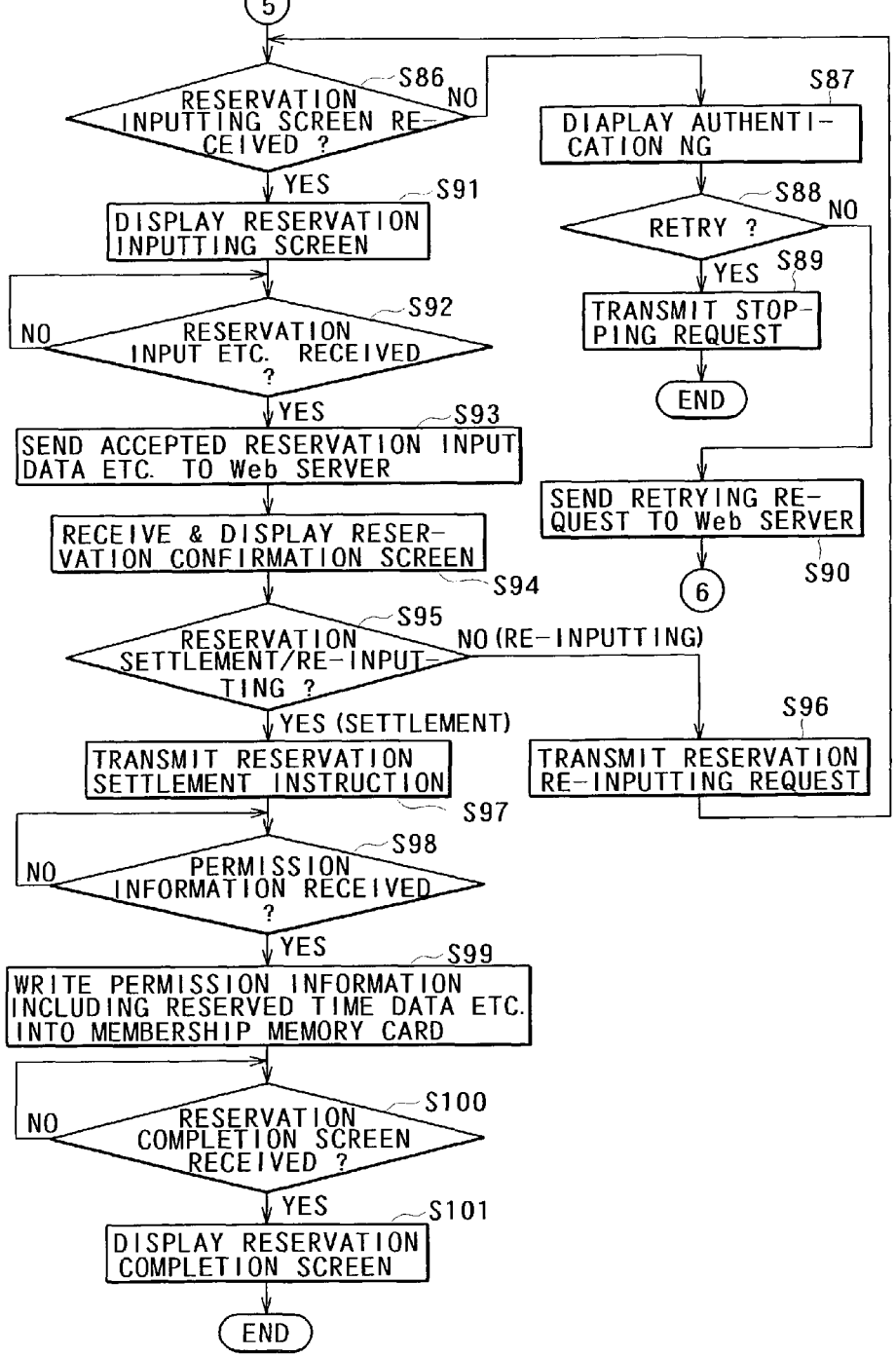

Thus, the personal computer 5 discriminates whether or not the reservation inputting screen is received (step S86 of FIG. 18). If the personal computer 5 receives not the reservation inputting screen but the authentication NG screen which represents failure in the authentication, then it displays the received authentication NG screen on the display unit 19. The authentication NG screen includes a display of, for example, a selection button for selection of whether or not re-inputting of a user ID and a password should be performed again (step S87).

Then, the personal computer 5 discriminates whether or not the user inputs a selection instruction to perform re-inputting through the selection button (step S88), and if it discriminates that a selection instruction to perform re-inputting is issued, then the personal computer 5 sends a retrying request to the apparatus providing source 2 (step S90). Thereafter, the processing advances to step S78, at which the personal computer 5 receives the reservation information inputting screen for urging the user to input a user ID and a password from the apparatus providing source 2, whereafter the succeeding processing steps are repeated.

If the personal computer 5 discriminates at step S88 that a selection instruction not to perform re-inputting is issued through the selection button described above, then the personal computer 5 sends a stopping request for the use reservation requesting process to the apparatus providing source 2 (step S89), thereby ending the use reservation requesting routine.

If the personal computer 5 discriminates at step S86 that the reservation inputting screen is received, then it displays the received reservation inputting screen on the display unit 19 (step S91) to urge the user to perform a reservation inputting operation. It is to be noted that the reservation inputting screen allows not only inputting of a new use reservation but also alteration or cancellation of a matter in a preceding reservation.

Then, the personal computer 5 waits for inputting of reservation information or inputting of alteration or cancellation of an item of a preceding reservation by the user (step S92). If one of such inputs is entered, then the personal computer 5 sends the entered reservation information, alteration information or cancellation information to the apparatus providing source 2 (step S93).

When the apparatus providing source 2 receives the information from the personal computer 5, it sends a reservation confirmation screen for urging the user to confirm the information to the personal computer 5 of the user over the digital communication network 4. Therefore, the personal computer 5 displays the reservation confirmation screen on the display unit 19 (step S94).

The reservation confirmation screen includes a display of a correction button for performing inputting again and a confirmation button for instructing that the input may be settled. The user will confirm the contents inputted by the user itself on the reservation confirmation screen, and when the user wants to settle the input contents, the user will depress the confirmation button, but if the user wants to perform re-inputting for the object of correction or the like, then the user will depress the correction button.

The personal computer 5 checks the operation input of the confirmation button or the correction button by the user to discriminate whether the instruction is the settlement instruction of the reservation contents or the re-inputting instruction (step S95). If the personal computer 5 discriminates that the instruction is the re-inputting instruction, then it transmits a reservation re-inputting request to the apparatus providing source 2 over the digital communication network 4 (step S96). Thereafter, the processing returns to step S86, at which the personal computer 5 waits for reception of the reservation inputting screen.

If the personal computer 5 discriminates at step S95 that the instruction is the settlement instruction of the reservation contents, then it transmits a reservation settlement instruction to the apparatus providing source 2 over the digital communication network 4 (step S87). Then, the personal computer 5 waits for reception of permission information for the completed reservation from the apparatus providing source 2 (step S98). When the personal computer 5 receives such permission information, it writes the permission information into the memory card 9 (step S99). The permission information includes the user ID, the password, the product ID of the electronic apparatus of the reservation object, the use time reserved and so forth in the same way as in the management system of the first embodiment described hereinabove. It is to be noted the contents of such permission information apply in the same way as in the other embodiments described below.

After writing of the permission information into the memory card 9 is completed, the personal computer 5 waits for reception of the reservation completion screen from the apparatus providing source 2 (step S100). If the reservation completion screen is received, then the personal computer 5 displays the reservation completion screen on the display unit 19 (step S101), thereby ending the reservation inputting processing routine.

Processing by the Apparatus Providing Source 2 (Web Server)

Now, processing operation of the apparatus providing source 2 which operates as a Web server upon use reservation inputting is described with reference to a flow chart of FIG. 19. The processing steps in FIG. 19 are the processing steps executed by the CPU 22 in accordance with a program of the ROM 23.

Figure 19:
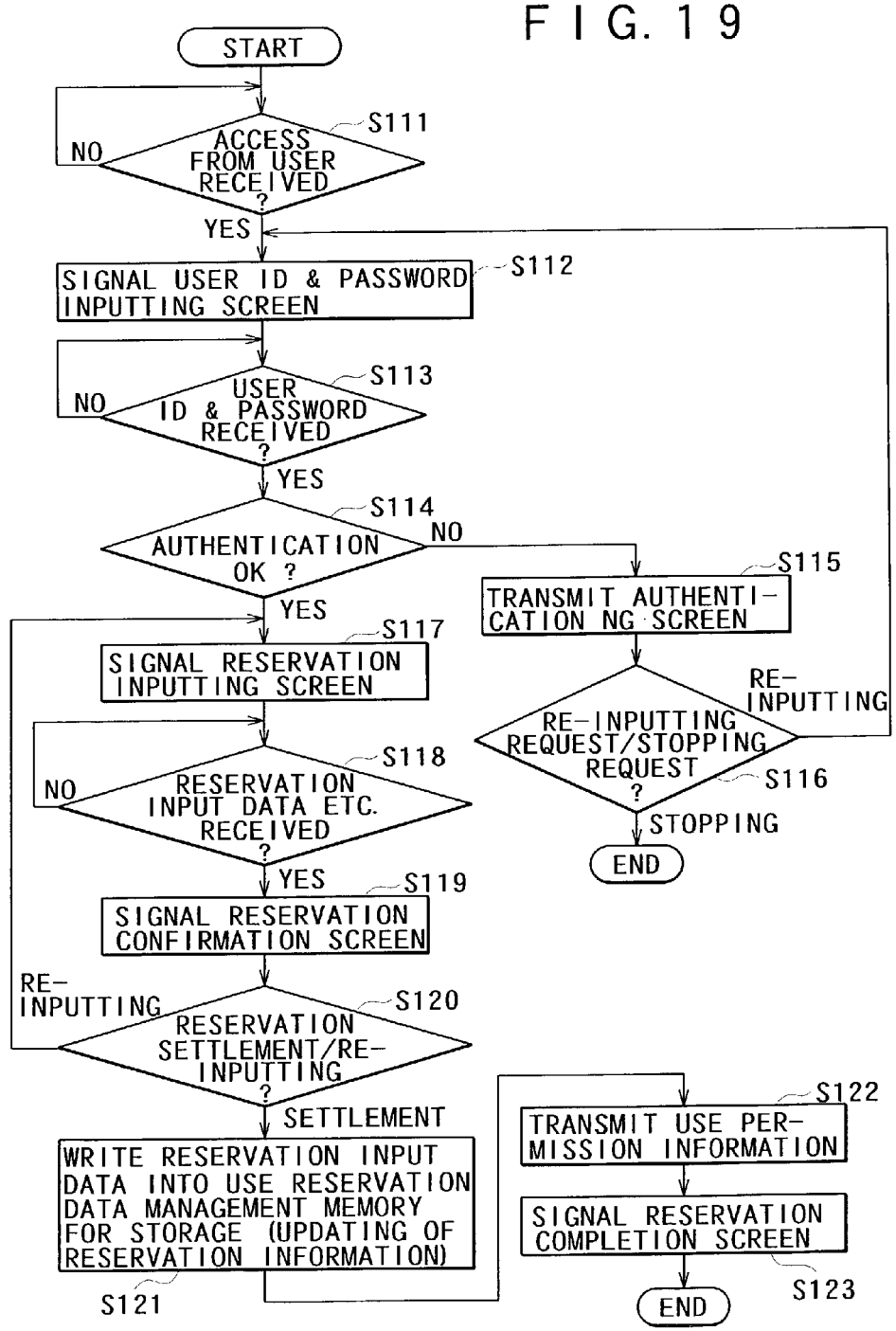
FIG. 19 is a flow chart illustrating an acceptance process of a use reservation request for a charging object apparatus by a manager side apparatus in the second embodiment.

Referring to FIG. 19, the processing steps S111 to S121 are completely the same as the processing steps S31 to S41 of FIGS. 7 and 8, respectively. In the management system of the second embodiment, after reservation information is written into the use reservation data management memory 27, the apparatus providing source 2 transmits permission information including a user ID, a password, a product ID, a reservation use time and so forth to the personal computer 5 over the digital communication network 4 (step S122).

Then, after the transmission of the permission information is completed, the apparatus providing source 2 transmits the reservation completion screen to the personal computer 5 (step S123), thereby ending the use reservation request acceptance processing routine by the apparatus providing source 2.

[Execution of Use of the Electronic Apparatus 3]

Figure 20:
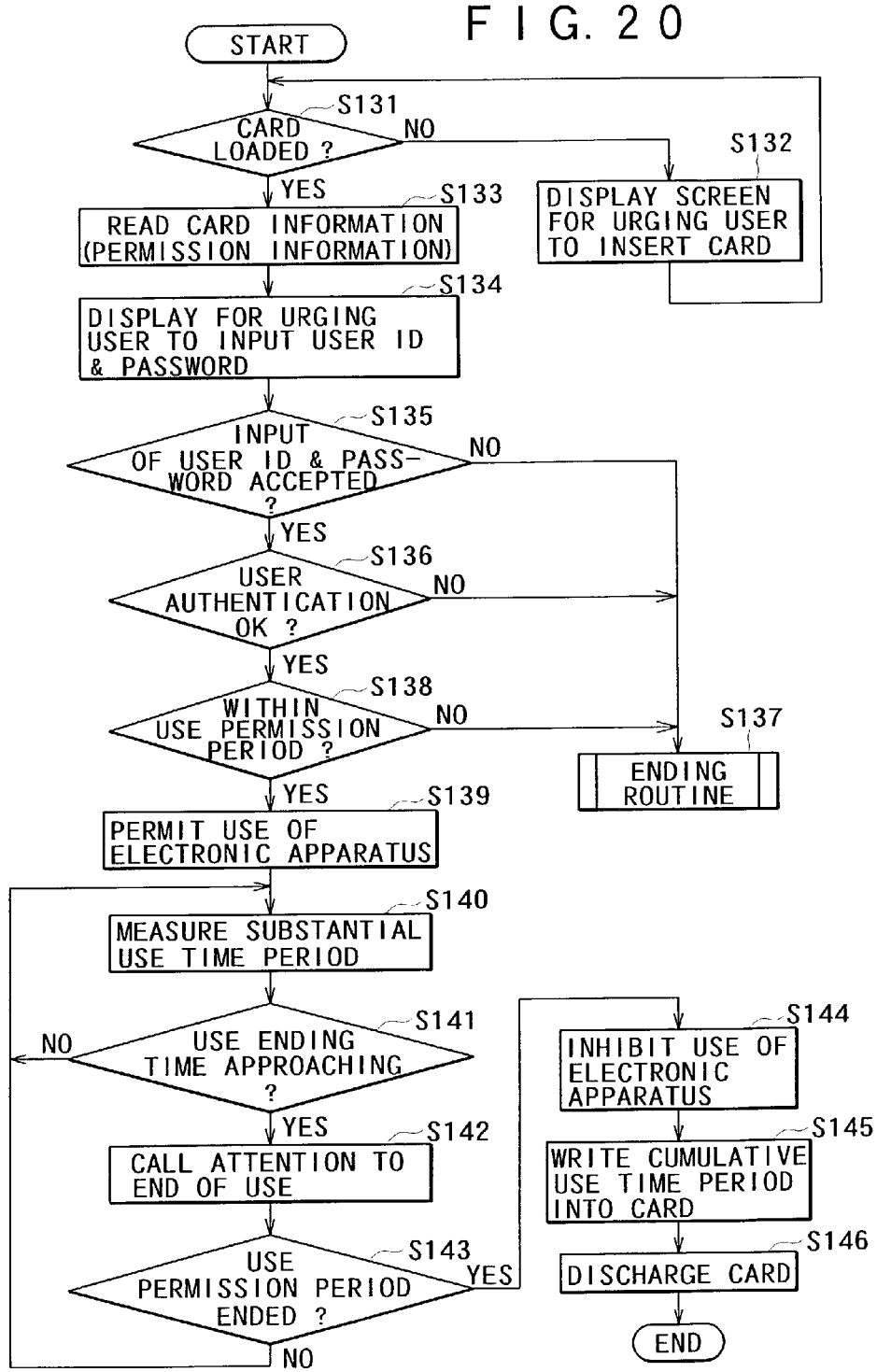
FIG. 20 is a flow chart illustrating processing operation by the charging object apparatus in the second embodiment.

FIG. 20 illustrates a processing routine of the electronic apparatus 3 when the electronic apparatus 3 is passed to a membership user who has made a reservation for use and the use of the electronic apparatus 3 is executed in the management system of second embodiment. It is to be noted that the processing steps of FIG. 20 are executed by the CPU included in the electronic apparatus 3. In the management system of the second embodiment, the loading of a memory card 9 into the electronic apparatus 3 is a presupposition for starting of use of the electronic apparatus 3.

After the power supply to the electronic apparatus 3 is made available, the electronic apparatus 3 starts the processing illustrated in FIG. 20, and the control section 31 of the electronic apparatus 3 first discriminates whether or not a memory card 9 is loaded in the electronic apparatus 3 (step S131). If the control section 31 discriminates that no memory card 9 is loaded in the electronic apparatus 3, then the electronic apparatus 3 displays a screen for urging the user to load its memory card 9 on the display unit 37 (step S132).

If it is discriminated at step S131 that a memory card 9 is loaded in the electronic apparatus 3, then the control section 31 reads out the permission information stored in the memory card 9 (step S133) and displays the inputting screen for a user ID and a password on the display unit 37 to urge the user to input such information (step S134). Then, the control section 31 waits for inputting of a user ID and a password by the user (step S135).

If inputting of a user ID and a password is not discriminated for more than a predetermined time period at step S135, then the control section 31 performs an ending routine to disconnect the power supply to the electronic apparatus 3 (step S137).

On the other hand, if the control section 31 confirms inputting of a user ID and a password at step S135, then the control section 31 performs comparison between the user ID and the password included in the read out permission information and the inputted user ID and password to perform an authentication check of whether or not the user is the user who has reserved (step S316). If the authentication reveals that the user is not the user who has reserved, then the control section 31 performs the ending routine to disconnect the power supply to the electronic apparatus 3 (step S137).

On the other hand, if the authentication at step S136 proves that the user is the user who has reserved, then the control section 31 compares the information of the reservation use time included in the permission information and the date and hour at present of the clock section 36 with each other to discriminate whether or not the date and hour at present is within the reserved use permission period (step S138). If the date and hour at present is not within the reserved use permission period, then the control section 31 executes the ending routine to disconnect the power supply to the electronic apparatus 3 (step S137).

On the other hand, if the date and hour at present does not fall within the reserved use permission period, then the control section 31 sends a control signal for enabling a function to the hardware section 32 to permit use of the electronic apparatus 3 by the user (step S139). Then, the control section 31 performs measurement of a substantial use time period using a result of counting of the counter section 35 and stores the substantial use time period of a result of the measurement into the nonvolatile memory 33 (step S140). The information of the substantial use time period in the nonvolatile memory 33 is successively updated.

The control section 31 supervises the ending time of the reserved use time period, and if it detects that the ending time of the reserved use period is approaching (step S141), then the control section 31 notifies the user that the ending time of the reserved use time period is approaching to call an attention of the user (step S142). In this instance, the calling of an attention of the user may be an attention calling display on the display unit 37 or may be calling of an attention through voice.

Then, the control section 31 supervises the end of the reserved use time period (step S145). If the control section 31 discriminates that the end of the reserved use time period comes, then it sends a controlling signal for disabling the function to the hardware section 32 to effect control to disable the use of the electronic apparatus 3 by the user (step S144).

Then, the control section 31 of the electronic apparatus 3 reads out the cumulative use time period stored in the non-volatile memory 33 and writes it into the memory card 9 (step S145). Thereafter, the electronic apparatus 3 discharges the memory card 9 (step S146), thereby ending the processing routine of FIG. 20.

It is to be noted that, although the foregoing description does not include description of disconnection of the power supply to the electronic apparatus 3 within the reserved use period, the user can arbitrarily disconnect the power supply to the electronic apparatus 3 at any time within the reserved use period. When the power supply is disconnected in this manner, information regarding the substantial use time period of the electronic apparatus 3 before the disconnection of the power supply is successively accumulated to the use time period till the time at which the power supply was disconnected last, and the accumulated use time period is stored into the memory card 9.

It is to be noted that, although the process described above proceeds such that, if the power supply is disconnected once, then when the power supply is connected, the member authentication and the authentication of the use time are performed again, it may be modified such that such member authentication and authentication of the use time are performed only when the power supply to the electronic apparatus is made available for the first time after the electronic apparatus is passed to the user.

[Reporting of a Use Time Period to the Apparatus Providing Source 2 through the Personal Computer 5]

The information of the cumulative use time period, which is a substantial use time period within a reserved and permitted use period, having been written into the memory card 9 in such a manner as described above is reported to the apparatus providing source 2 by the user sending the information to the apparatus providing source 2 through the personal computer 5.

It is to be noted that the apparatus providing source 2 supervises a report of the cumulative use time period within the reserved use period after the end of the reserved use period from a member who is the user of the electronic apparatus 3, and if the user does not issue a report of the cumulative use time period, then a mail to the user is sent or an electric mail to the personal computer 5 of the user is sent to urge the user to issue the report.

Upon such urging, the apparatus providing source 2 issues, for example, a message "If you do not report your use time period, then a charge will be imposed on you regarding that you've used the apparatus over the entirety of the reserved use time period" to urge the user to issue a report of the use time period of the user. If no report of the use time period is still received, then the charging process is performed regarding that the user used the apparatus over the entirety of the reserved use time period.

Figure 21:
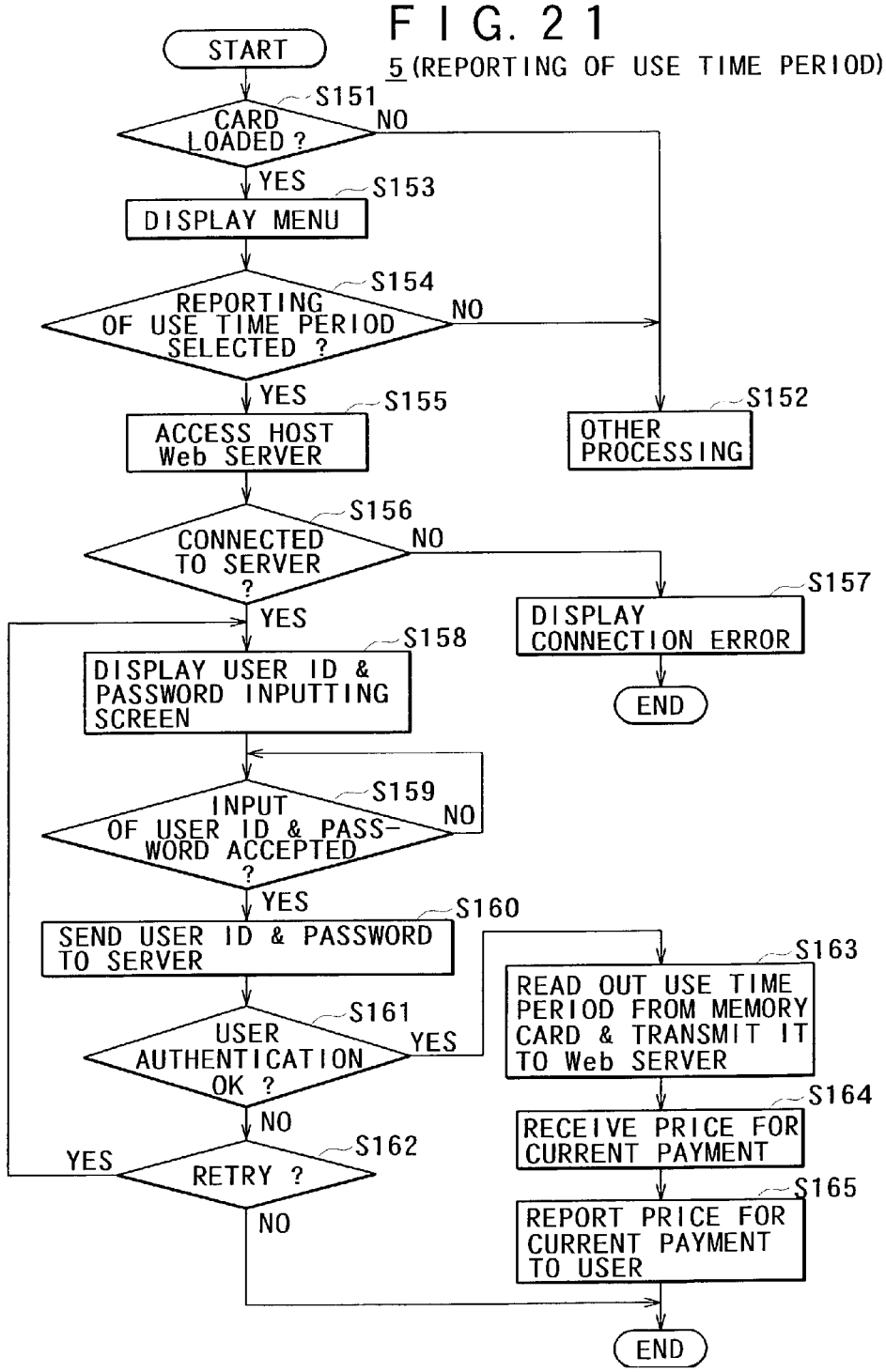
FIG. 21 is a flow chart illustrating a use time reporting process of the charging object apparatus from the user side apparatus in the second embodiment.

FIG. 21 illustrates a process of the personal computer 5 when a report of a use time period is received from the personal computer 5. In the following, processing operation when a report of a use time period is received is described with reference to FIG. 21. The process of FIG. 21 is executed principally by the CPU 12.

First, the personal computer 5 discriminates whether or not a memory card 9 is loaded therein (step S151). If no memory card 9 is loaded in the personal computer 5, then the personal computer 5 performs some other required process (step S152). On the other hand, if a memory card 9 is loaded in the personal computer 5, then the personal computer 5 reads in an application menu written in the memory card 9 and displays the application menu (step S153).

Then, the personal computer 5 discriminates whether or not the use time period reporting application is selected on the menu display (step S154). If any other application than the use time period reporting application is selected, then the personal computer 5 executes the selected application (step S152).

However, if the use time period reporting application is selected at step S174, then the personal computer 5 signals a connection request to the apparatus providing source 2 serving as a Web server over the digital communication network 4 in accordance with the application program to perform a process of establishing a connection between the reservation management system 6 and the personal computer 5 (step S155).

Then, the personal computer 5 discriminates whether or not a connection to the apparatus providing source 2 is established (step S156). If it is discriminated that a connection to the apparatus providing source 2 is not established, then the personal computer 5 displays a connection error (step S157), and then the processing returns to step S153 to display the application menu. The user will thus perform such operation as described above again.

If it is discriminated at step S156 that a connection is established to the apparatus providing source 2, then since the reservation information inputting screen for urging the user to input a password is sent from the apparatus providing source 2, the personal computer 5 receives the reservation information inputting screen and displays it on the screen of the display unit 19 (step S158). Then, the personal computer 5 waits for inputting of a user ID and a password by the user (step S159).

Then, if the personal computer 5 confirms inputting of a user ID and a password by the user, then it sends the user ID and password inputted thereto to the apparatus providing source 2 over the digital communication network 4 (step S160).

The apparatus providing source 2 performs authentication of discriminating whether or not the user specified based on the user ID and the password sent thereto is one of the members stored in the member registration information memory 26 and sends a result of the authentication to the personal computer 5 over the digital communication network 4.

The personal computer 5 receives the result of the authentication and discriminates whether the authentication results in success or failure (step S161). If the authentication results in failure, then the personal computer 5 issues an enquiry to the user regarding whether the user performs re-inputting of a user ID and a password (step S162). If the personal computer 5 discriminates that the user does not perform re-inputting, then it ends the processing routine. On the other hand, if the personal computer 5 discriminates that the user performs re-inputting, then it sends a notification of this to the apparatus providing source 2. Thereafter, the processing returns to step S158, at which the personal computer 5 displays the screen for urging the user to input a user ID and a password and accepts re-inputting.

If it is discriminated at step S161 that the authentication results in success, then the personal computer 5 reads out information of the cumulative use time period to be reported from the memory card 9 and sends the information to the apparatus providing source 2 over the digital communication network 4 (step S163).

Consequently, the apparatus providing source 2 calculates a price for the payment for the present charge, and notifies the personal computer 5 of information of the price over the digital communication network 4 and performs an accounting process in accordance with the method of payment registered in advance by the member user.

The personal computer 5 receives the information of the price for the payment for the present charge from the apparatus providing source 2 (step S164) and displays the price for the payment on the display unit 19 to notify the user (step S165). The reporting processing routine of the use time period is ended thereby.

With the system of the second embodiment described above, a charging object apparatus need not be connected to the apparatus providing source 2 over a digital communication network. Thus, restrictions to such charging object apparatus are reduced.

Third Embodiment

In the system of the second embodiment described above, the electronic apparatus 3 writes information of a use time period into the memory card 9 and the user uses the personal computer 5 to send the information of the use time period written in the memory card 9 to the apparatus providing source 2 to report the use time period to the apparatus providing source 2. In contrast, while a system according to a third embodiment is common to the system of the second embodiment in that it uses a memory card 9, it is different from the system of the second embodiment in that prepayment information regarding a payable price is recorded in the memory card 9 and the electronic apparatus 3 executes a charging process regarding a use time period.

The system of the third embodiment has a system configuration same as that of the second embodiment shown in FIG. 14. Also the personal computer 5 and the electronic apparatus 3 have the same configurations. However, the system of the third embodiment is different from the system of the second embodiment in that the control section 31 includes an application for a charging process in which the prepayment information of the memory card 9 is used.

Further, in the system of the third embodiment, an application for a use reservation request is provided in the memory card 9, and a use reservation requesting process is performed in the same manner as that in the system of the second embodiment described hereinabove with reference to FIGS. 17 to 19. However, in the system of the third embodiment, an application for reporting a use time period is not included in the memory card 9. Instead, in the system of the third embodiment, an application for installing prepayment information is included in the memory card 9.

In the description of the system of the third embodiment, a value obtained by converting a substantial use time period of a charging object apparatus into an imaginary currency UT (Used Time) is referred to as prepayment information. The charging management system 7 of the apparatus providing source 2 settles the price corresponding to the prepayment information in accordance with the settlement method registered by the user (member) identified with the user ID.

Here, the imaginary currency UT is a unit currency per unit time period determined imaginarily as an equivalent to the use time. If the imaginary currency UT is determined like, for example, 1 UT=0.1 minute unit time period price=0.01 yen/second then the exchange rate between the imaginary currency UT and the currency "yen" is given as 1 UT=0.06 yen As hereinafter described, if an installation request for prepayment information is received from a user through the personal computer 5, then the charging management system 7 converts information of a use time period or an amount of money included in the installation request for prepayment information into the imaginary currency UT to produce prepayment information and transmits the prepayment information back to the personal computer 5.

Thus, the personal computer 5 receives the prepayment information by the imaginary currency UT and writes the received prepayment information into the memory card 9 to install the prepayment information.

In the system of the third embodiment, the electronic apparatus 3 decrements available time period information represented in the imaginary currency UT for each unit time period to decrease the remaining time period of the available time period. For example, when the charging time period is one minute, the available time period information is decremented by 10 UT. A display of the remaining time period of the available time period is performed by converting the information represented in the imaginary currency unit UT into time period information.

[Installation of Prepayment Information]

Figure 22:
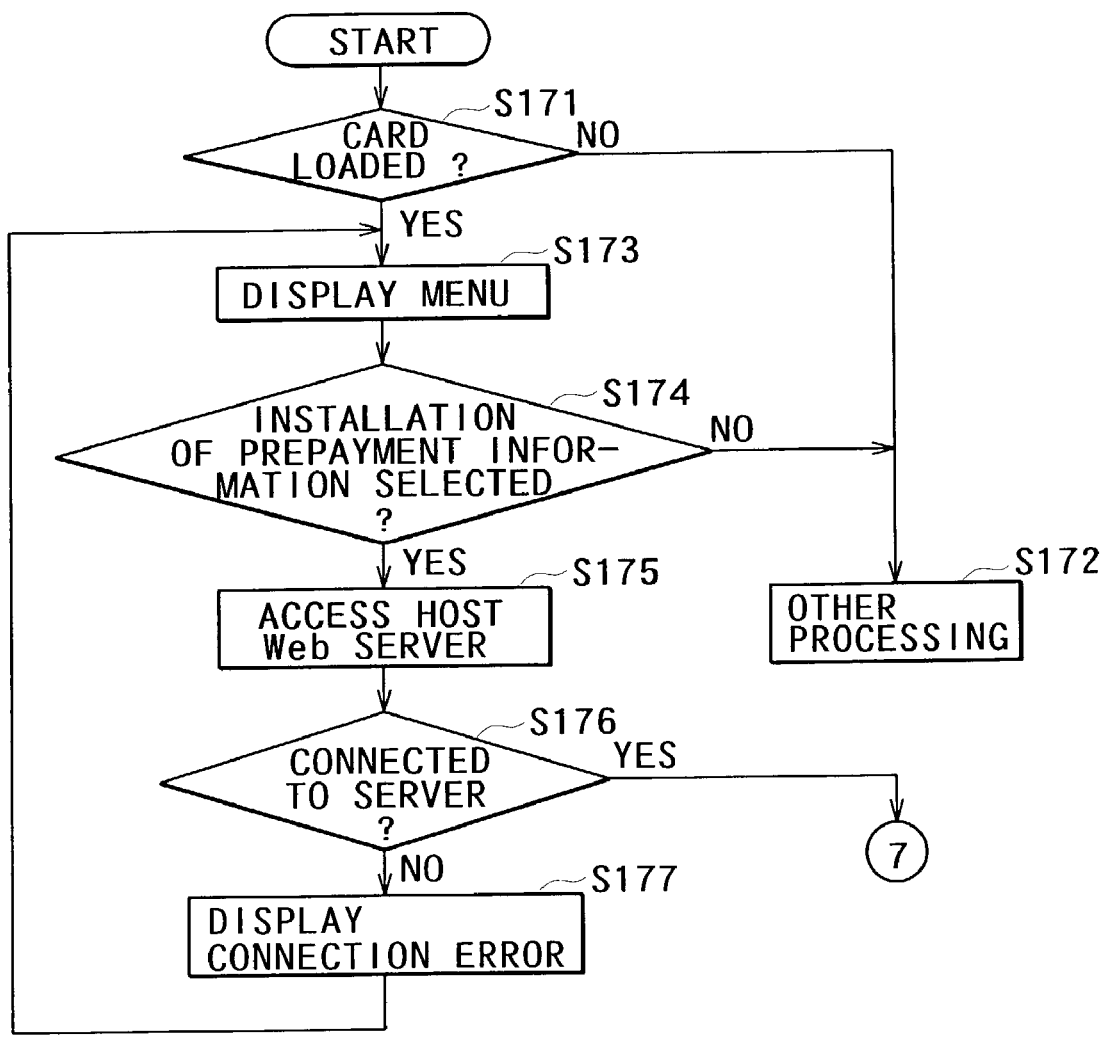
FIGS. 22 and 23 are flow charts illustrating an installation process of prepayment information in a third embodiment of the present invention.
Figure 23:
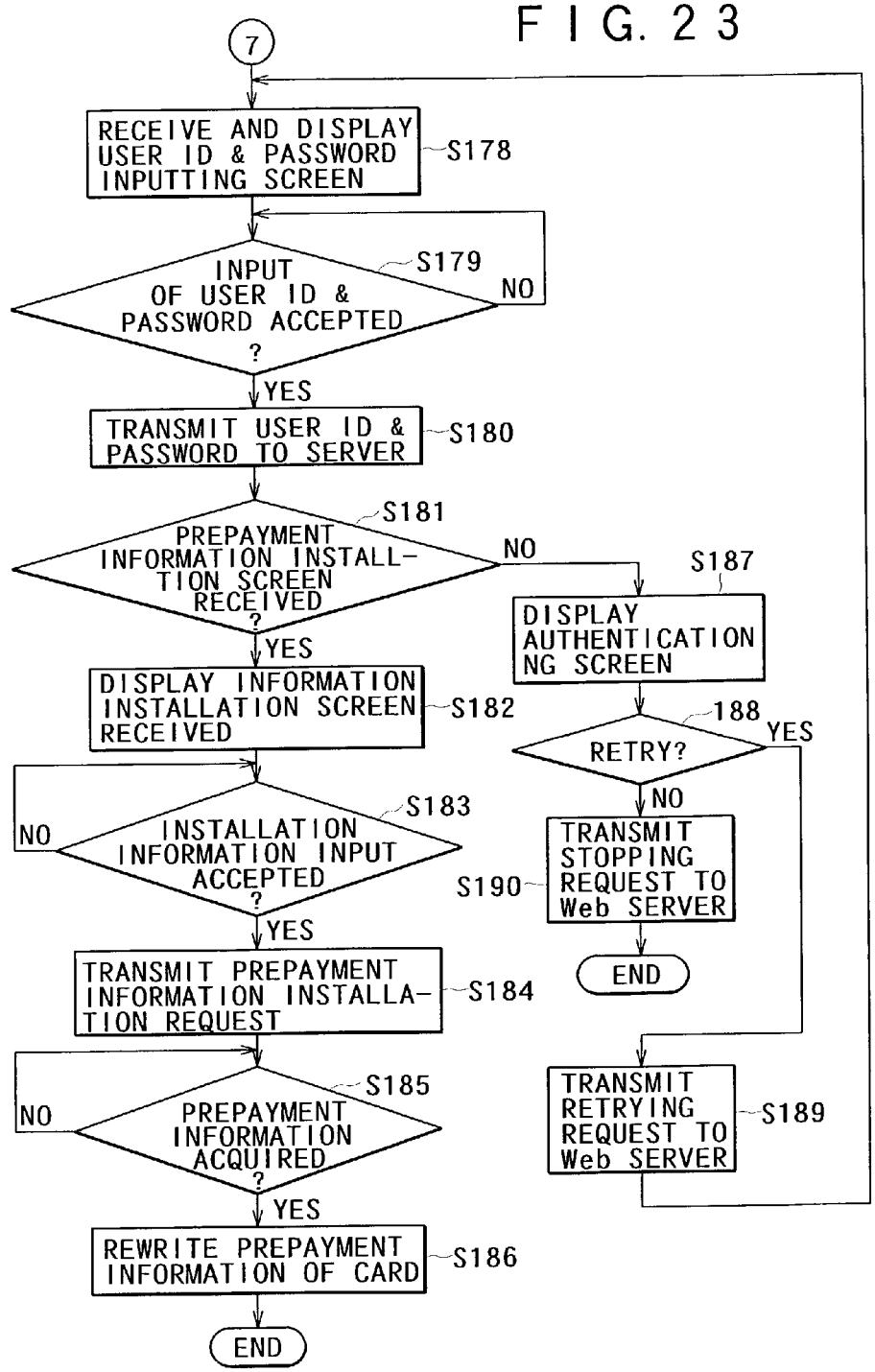

FIGS. 22 and 23 illustrate a processing routine for installation of prepayment information into a memory card 9. In the following, installation of prepayment information is described with reference to FIGS. 22 and 23.

First, it is discriminated whether or not a memory card 9 is loaded in the personal computer 5 (step S171). If no memory card 9 is loaded in the personal computer 5, then the personal computer 5 executes some other necessary process (step S172). However, if a memory card 9 is loaded in the personal computer 5, then the personal computer 5 reads out the application menu written in the memory card 9 and displays it (step S173).

Then, the personal computer 5 discriminates whether or not the application for installation of prepayment information is selected on the menu display (step S174). If any other application than the application for installation of prepayment information is selected, then the personal computer 5 executes the selected application (step S172).

If the application for installation of prepayment information is selected, then the personal computer 5 signals a connection request to the apparatus providing source 2 serving as a Web server over the digital communication network 4 in accordance with the application program and performs a process to establish a connection between the charging management system 7 and the personal computer 5 (step S175).

Then, the personal computer 5 discriminates whether or not a connection to the apparatus providing source 2 is established (step S176). If it is not detected that a connection is established, then the personal computer 5 displays a connection error (step S177), and the processing returns to step S173, at which the menu screen is displayed. Thus, the user restarts such operation as described above.

If it is discriminated at step S176 that a connection to the apparatus providing source 2 is established, then since the electronic apparatus 3 sends the inputting screen for a user ID and a password to the personal computer 5, the personal computer 5 receives the inputting screen and displays it on the screen of the display unit 19 (step S178 of FIG. 23). Then, the personal computer 5 waits for inputting of a user ID and a password by the user.

Then, when the personal computer 5 confirms inputting of a user ID and a password by the user, the personal computer 5 sends the user ID and the password inputted thereto to the apparatus providing source 2 over the digital communication network 4 (step S180).

The apparatus providing source 2 discriminates whether or not the user specified by the user ID and the ID password received is one of the members stored in the member registration information memory 26, and refers to the payment information for the prepayment information in the past stored in the charging information management memory 29 to discriminate whether or not the user is a member who has completed the payment for the prepayment information in the past to discriminate whether or not the installation request for prepayment information from the user may be accepted.

Then, if the personal computer 5 discriminates that the installation request for prepayment information from the user may be accepted, then it sends an installation screen of prepayment information, but in any other case, the personal computer 5 sends information representing failure in the authentication back to the personal computer 5 of the user.

Thus, the personal computer 5 discriminates whether or not the installation screen for prepayment information is received (step S181). If the personal computer 5 does not receive the installation screen for prepayment information but receives the authentication NG screen representing failure in the authentication, then it displays the received authentication NG screen on the display unit 19 (step S187). The authentication NG screen includes a display of, for example, a selection button for selection of whether or not re-inputting of a user ID and a password should be performed.

Then, the personal computer 5 discriminates whether or not the user operates the selection button to issue a selection instruction to perform re-inputting (step S188). If the personal computer 5 discriminates that a selection instruction to perform re-inputting is issued, then it sends a retrying request to the apparatus providing source 2 (step Si 89). Thereafter, the processing returns to step S178, at which the personal computer 5 receives the inputting screen for a user ID and a password from the apparatus providing source 2, whereafter the succeeding processing steps described hereinabove are repeated.

On the other hand, if the personal computer 5 discriminates at step S188 that the user operates the selection button to issue a selection instruction not to perform re-inputting, then it sends a stopping request for the installation requesting process of prepayment information to the apparatus providing source 2 (step S190), thereby ending the prepayment information installation requesting processing routine.

If the personal computer 5 discriminates at step S181 that it receives the installation screen of prepayment information, then it displays the received installation screen of prepayment information on the display unit 19 (step S182) to urge the user to perform an inputting operation for installation of prepayment information.

Then, the personal computer 5 waits for inputting for installation of prepayment information by the user, that is, inputting of a use time period or an amount of prepayment money which the user desires (step S183). Then, if the personal computer 5 accepts the input, then it sends an installation request for prepayment information including the accepted information to the apparatus providing source 2 (step S184).

Upon reception of the installation request for prepayment information, the apparatus providing source 2 converts the information of the use time period or the amount of prepayment money included in the installation request for prepayment information into the imaginary currency UT to produce prepayment information and sends the produced prepayment information to the personal computer 5 over the digital communication network 4. Then, the charging management system 7 of the apparatus providing source 2 performs a charging process for the produced prepayment information for the user (member), who issued the installation request, in accordance with the registered payment method.

The personal computer 5 waits for reception of prepayment information from the apparatus providing source 2 (step SI 85). If the personal computer 5 confirms reception of such prepayment information, then it performs a process of rewriting the prepayment information of the memory card 9 so as to additionally include the prepayment information newly acquired (step S186), thereby ending the installation process of prepayment information.

It is to be noted that, while, in the description above, a user inputs a desired use time period or a desired prepayment amount of money when it issues an installation request for prepayment information, alternatively the UT number of the imaginary currency UT may directly be inputted directly.

[Execution of the Use of the Electronic Apparatus 3]

Figure 24:
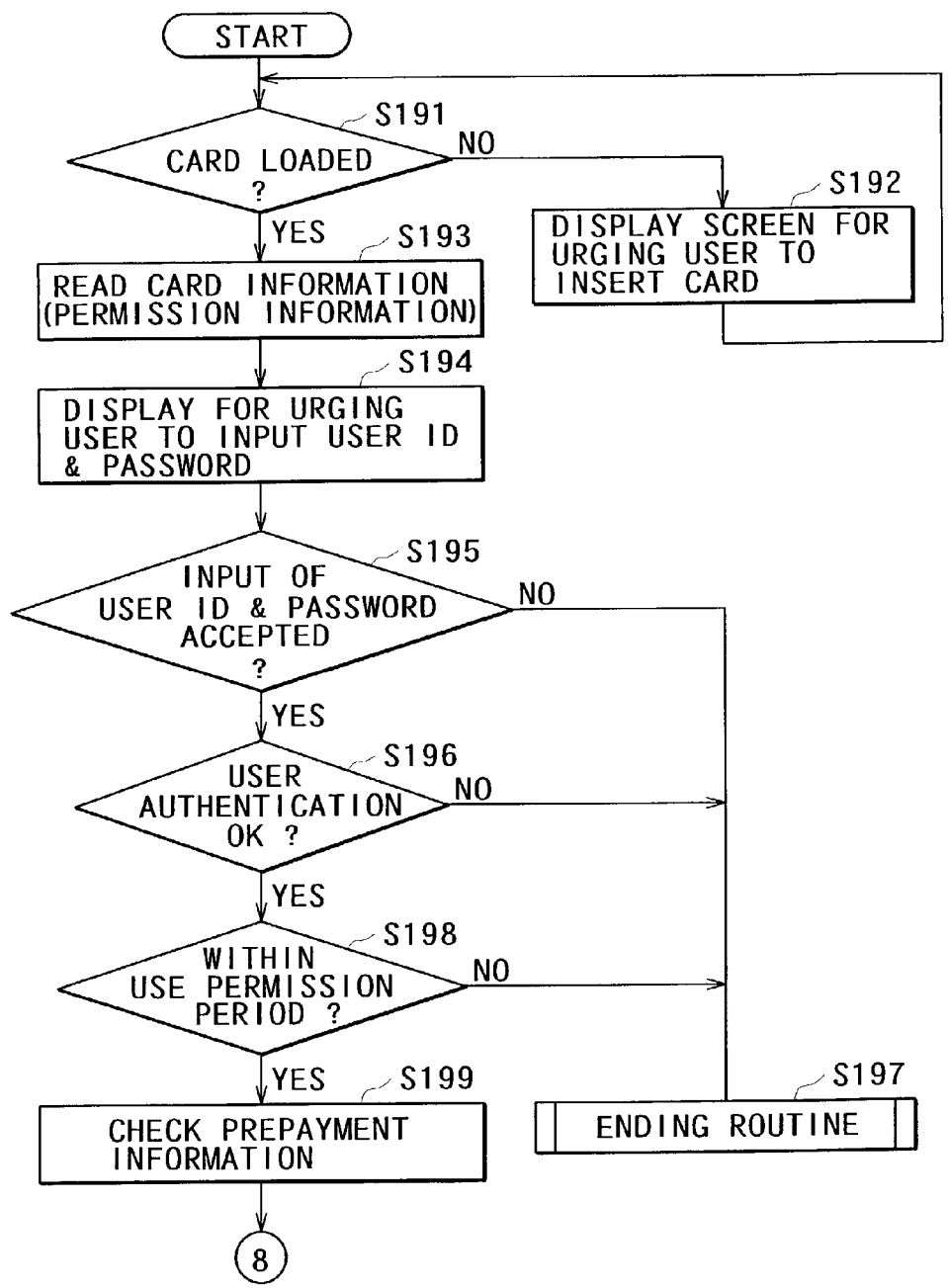
FIGS. 24 and 25 are flow charts illustrating processing operation by a charging object apparatus in the third embodiment.
Figure 25:
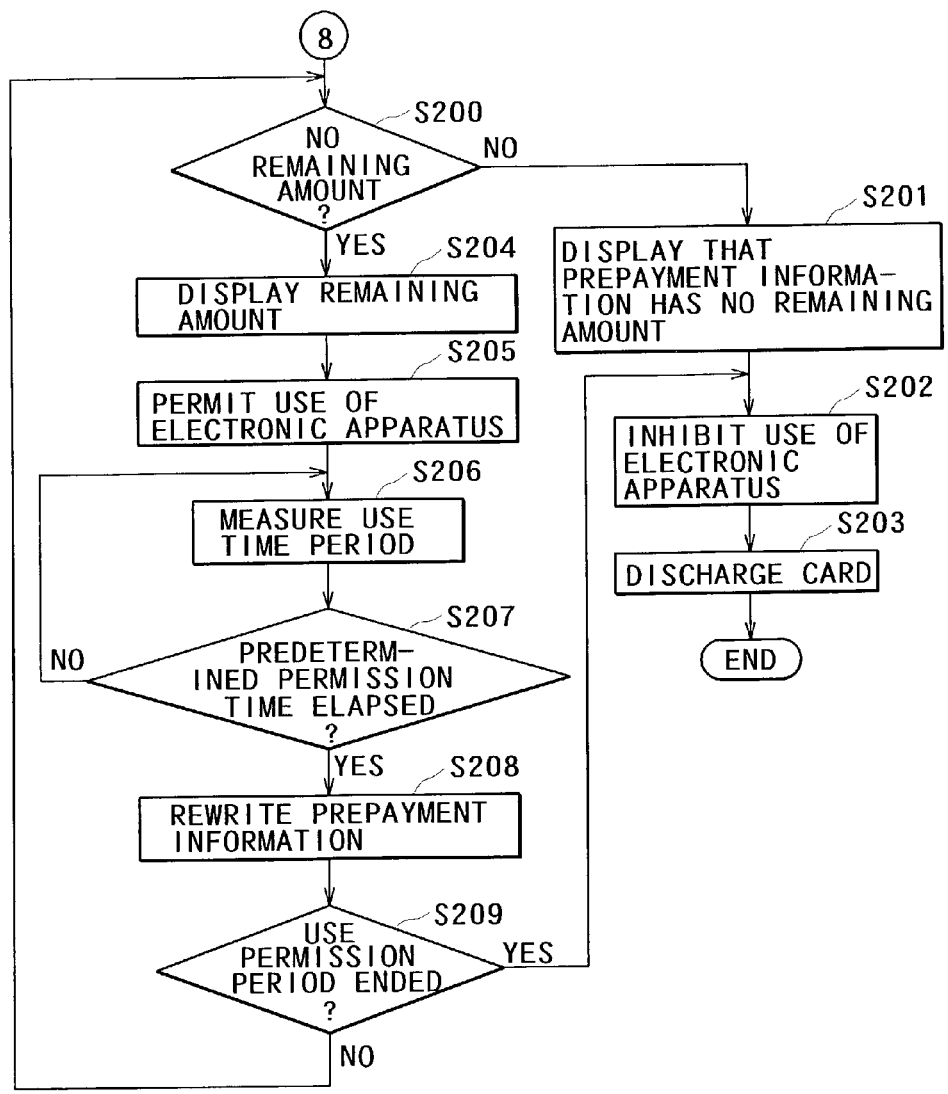

FIGS. 24 and 25 illustrate a processing routine of the electronic apparatus 3 in the system of the third embodiment when the electronic apparatus 3 is passed to a member user who has reserved the use of the electronic apparatus 3 and the use of the electronic apparatus 3 is executed by the user. It is to be noted that the processing steps are executed by the CPU included in the control section 31. In the system of the third embodiment, it is a presupposition for starting of use of the electronic apparatus 3 that a memory card 9 is loaded into the electronic apparatus 3, and the electronic apparatus 3 performs a charging process for a use time period using prepayment information stored in the memory card 9.

Referring first to FIG. 24, after the power supply to the electronic apparatus 3 is made available, the electronic apparatus 3 starts its processing. An authentication process regarding a user and a reservation use period at steps S191 to S198 in FIG. 24 is quite the same as the processing at steps S131 to S138 of FIG. 20, respectively, and therefore, overlapping description of the processing at the steps is omitted.

In the system of the third embodiment, if it is discriminated at step S198 that the date and hour at present is within the reserved use permission period, then the electronic apparatus 3 reads out and checks the prepayment information of the memory card 9 (step S199).

Then, the electronic apparatus 3 discriminates whether or not the prepayment information indicates that there remains some amount of the imaginary currency UT (step S200 of FIG. 25). If there remains no amount of the imaginary currency UT, then the electronic apparatus 3 displays on the display unit 37 that there remains no amount of the imaginary currency UT of the prepayment information to urge the user to install prepayment information (step S201). Then, the electronic apparatus 3 disables the use of the electronic apparatus 3 itself (step S202) and discharges the memory card 9 (step S203), thereby ending the processing routine.

If the electronic apparatus 3 discriminates at step S200 that the prepayment information indicates that there remains some amount of the imaginary currency UT, then it displays the remaining amount of the imaginary currency UT. Although the UT number of the imaginary currency UT may be displayed as the display of the remaining amount in this instance, the remaining UT number is converted into a remaining time period, which is displayed as a remaining amount of the use time period.

Then, since the prepayment information indicates that there is some remaining amount, the electronic apparatus 3 permits the use of the electronic apparatus 3 itself. In particular, the control section 31 controls the hardware section 32 to enable the function in the same way as described hereinabove (step S205). Then, the electronic apparatus 3 performs measurement of a substantial use time period (step S206) and supervises to detect whether or not the measured use time period reaches a predetermined time period, for example, 0.1 minute corresponding to 1 UT (step S207). If the predetermined time period passes, then the electronic apparatus 3 rewrites the prepayment information of the memory card 9 so as to decrement the prepayment information by the predetermined time period, that is, by 1 UT (step S208).

Then, the electronic apparatus 3 discriminates whether or not the reserved use permission period comes to an end (step S209). If the electronic apparatus 3 discriminates that the reserved use permission period comes to an end, then the processing advances to step S202, at which the electronic apparatus 3 disables the use of the electronic apparatus 3 itself and discharges the memory card 9 (step S203), thereby ending the processing routine.

On the other hand, if it is discriminated at step S209 that the use permission period does not come to an end, then the processing returns to step S200, at which the electronic apparatus 3 checks to detect whether or not the remaining amount indicated by the rewritten prepayment information is zero. Then, the electronic apparatus 3 repeats the processing at the steps following the step S200 described above.

It is to be noted that, although the foregoing description does not include description of disconnection of the power supply to the electronic apparatus 3 within the reserved use period, the user can arbitrarily disconnect the power supply to the electronic apparatus 3 at any time within the reserved use period. When the power supply is disconnected in this manner, information regarding the substantial use time period of the electronic apparatus 3 before the disconnection of the power supply is successively accumulated to the use time period till the time at which the power supply was disconnected last, and the accumulated use time period is stored into the memory card 9.

It is to be noted that, the process described above proceeds such that, when the power supply is disconnected once, the member authentication and the authentication of the use time are performed again when the power supply is connected subsequently, but it may be modified such that such member authentication and authentication of the use time are performed only when the power supply to the electronic apparatus is made available for the first time after the electronic apparatus is passed to the user.

With the system of the third embodiment described above, since a charging process for a substantial use time period of an electronic apparatus is performed using prepayment information written in the memory card 9, the user need not report information of a use time period of the electronic apparatus using a personal computer or the like. Further, the system is advantageous also in that, when an installation request for prepayment information is received, the apparatus providing source 2 can perform charging for a use time period with certainty by performing a charging process with regard to the requested amount of the prepayment information.

[Examples of the Electronic Apparatus Suitable for the Second and Third Embodiments]

Recently, an entertainment robot (hereinafter referred to merely as a robot) having a learning ability has been provided. The robot learns address of a user to the robot itself and therefore acquires a different characteristic depending upon the user. Therefore, if it is tried to use a robot of the type described as a charging object apparatus according to the present invention, then if the personality corresponding to a particular user is fixed to the robot, then this makes an obstacle to the use of the robot by a plurality of different users.

Incidentally, one of robots of the type described is configured such that learned information of the robot can be stored into an external memory such as a memory card. It is expected that a robot of the type which employs an external memory can be used as a charging object apparatus if each of users possesses an external memory for individual use and one of the external memories is used exchangeably for the robot.

Since the electronic apparatus in each of the systems of the second and third embodiments described above can be used with a memory card exchangeably loaded therein, the systems of the second and third embodiments are suitable for a robot which uses an external memory as described above and which is used as an electronic apparatus as a charging object apparatus.

A configuration of the robot described above is described with reference to FIGS. 26 to 28.

[Appearance of the Entertainment Robot]

Figure 26:
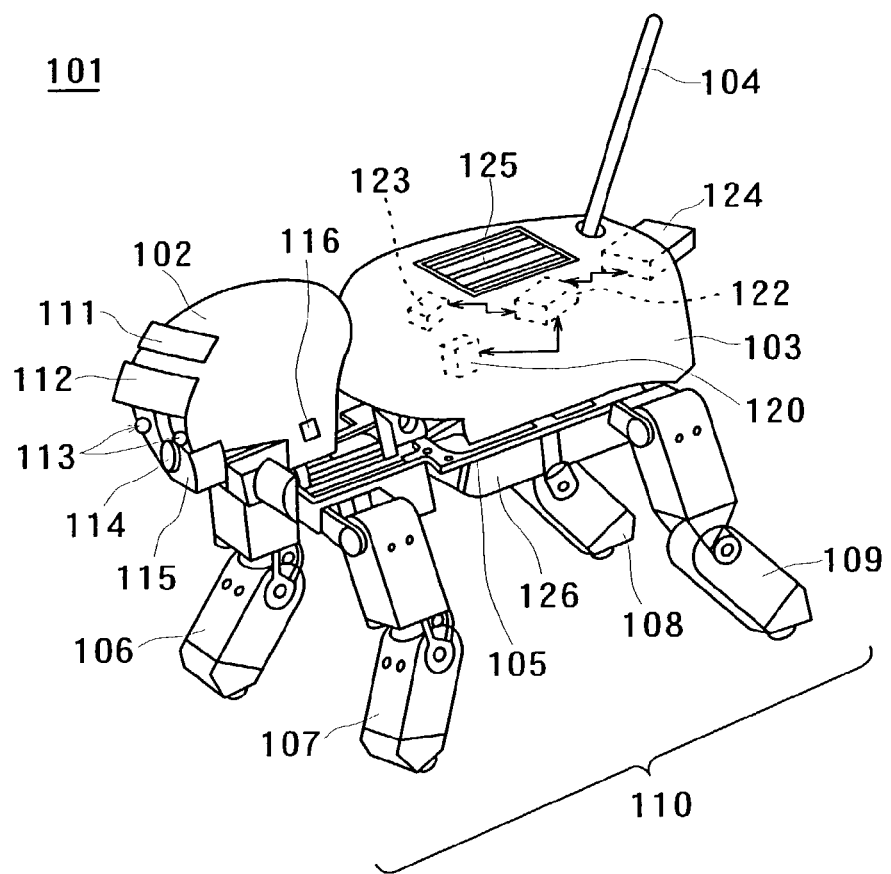
FIG. 26 is a schematic view showing an appearance of an example of the charging object apparatus in the third embodiment.

Referring first to FIG. 26, the entertainment robot is generally denoted by 101 and includes a head part 102, a body part 103, a tail 104, a body frame 105, and a moving unit 110 including a right foreleg 106, a left foreleg 107, a right hind leg 108 and a left hind leg 109 attached to the body frame 105. The body frame 105 of the moving unit 110 supports the head part 102 and the body part 103 thereon, and the tail 104 is attached to the body part 103 such that it projects from part of the body part 103.

The head part 102 includes a touch sensor 111, an image display section 112 formed from a liquid crystal display element, a camera section 113 formed from a CCD (Charge Coupled Device) unit, a speaker 114 serving as a sound outputting element, an infrared remote controller 115 and a microphone 116. The body part 103 includes a controller 120 including a CPU provided therein and serving as a control element, a main storage section 122 formed from a RAM, and an internal storage memory 123 formed from a nonvolatile flash memory attached fixedly at a predetermined position and serving as a fixed storage element. Further, the body part 103 includes a key inputting section 125 provided on the back of the body part 103 which includes a plurality of inputting keys, and an external storage memory 124 provided at the hip of the body part 103 and serving as a removable storage element formed from a removable memory card.

It is to be noted that the moving unit 110 has a battery 126 carried at the belly of the body frame 105 thereof. The battery 126 can be charged using a charging apparatus (not shown) for exclusive use.

[Circuit Configuration of the Entertainment Robot]

Figure 27:
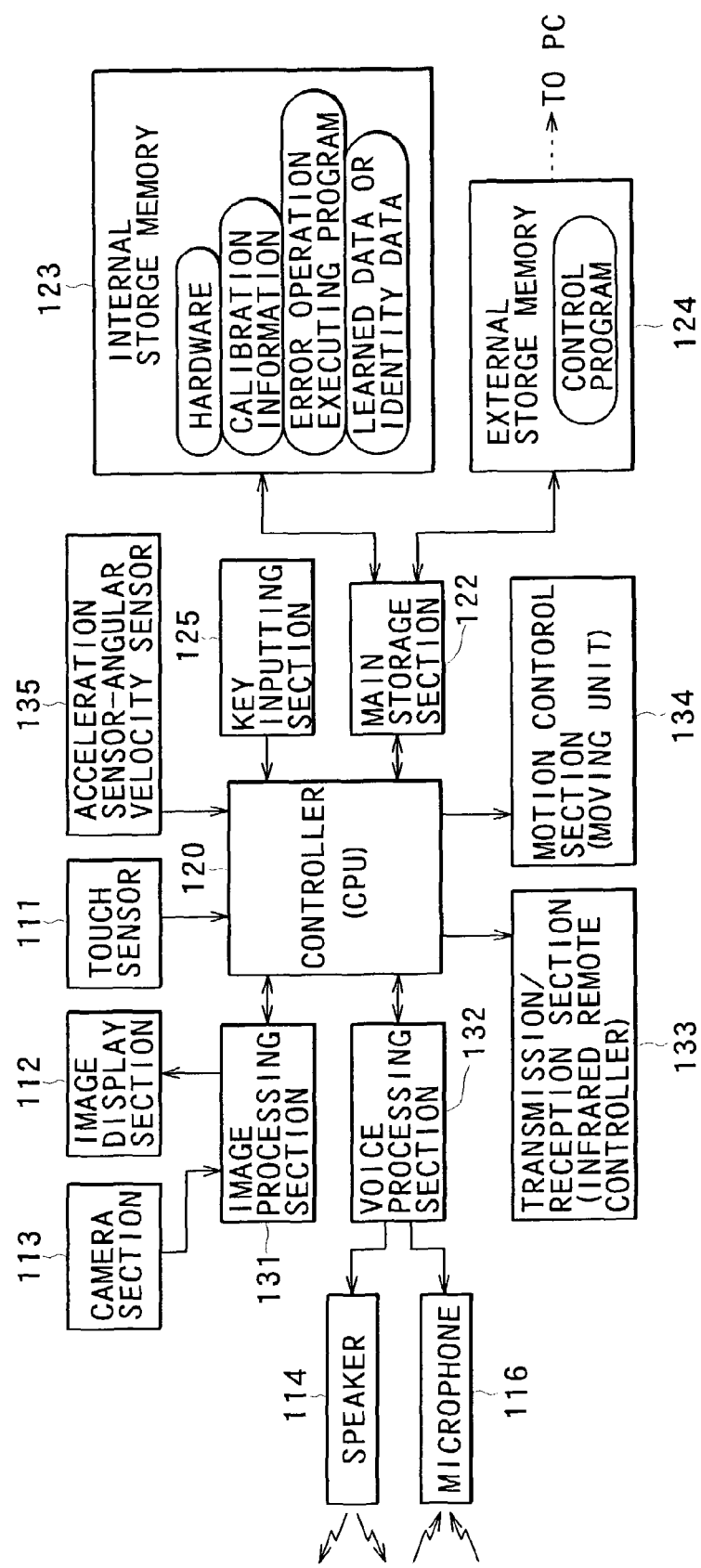
FIG. 27 is a block diagram showing an example of a configuration of the charging object apparatus in the third embodiment.

Now, a circuit configuration of the robot 101 is described with reference to FIG. 27. The robot 101 includes a controller 120 for controlling operation of the entire robot 101, and a image processing section 131 for performing predetermined image processing for an image signal picked up by the camera section 113 and signaling resulting data as image data to the controller 120.

Further, the image processing section 131 performs another predetermined image processing for reproduction data read out from the internal storage memory 123 or the external storage memory 124 through the main storage section 122 by the controller 120 and displays the resulting data as a reproduction image on the image display section 112.

The robot 101 further includes a voice processing section 132 for performing predetermined voice processing for a sound signal collected by the microphone 116 and signaling resulting data as sound data to the controller 120. Further, the voice processing section 132 performs another predetermined sound processing for reproduction data read out from the internal storage memory 123 or the external storage memory 124 through the main storage section 122 by the controller 120 and outputs the resulting data as reproduction sound such as, for example, a "cry" from the speaker 114.

The robot 101 further includes a transmission/reception section 133 for transmitting a control signal wirelessly using infrared rays for an external apparatus (not shown) in accordance with an instruction of the controller 120. The robot 101 further includes a motion control section 134 built in each of the head part 102, right foreleg 106, left foreleg 107, right hind leg 108 and left hind leg 109, a motor for controlling a movement of a joint part, a driver and a position sensor. Accordingly, the controller 120 controls the motion control sections 134 of the head part 102, right foreleg 106, left foreleg 107, right hind leg 108 and left hind leg 109 to move in accordance with instructions and detect the positions of them when they are moved.

Further, the robot 101 detects touch information representing whether or not an operation button of a predetermined apparatus is depressed using the touch sensor 111 and detects touch information representing whether the robot 101 is stroked or patted by the user depending upon a time period of the touch or an impact upon the touch. Further, the robot 101 recognizes the posture when it moves or the current position of the robot 101 itself based on acceleration and/or an angular velocity detected by an acceleration sensor-angular velocity sensor 135.

It is to be noted that, although the robot 101 is designed such that it usually acts autonomously, by performing a predetermine key inputting operation for a keyboard of the key inputting section 125, a predetermined arbitrary instruction can be sent to the controller 120 so that the robot 101 may act in a manner desired by the user.

Figure 28:
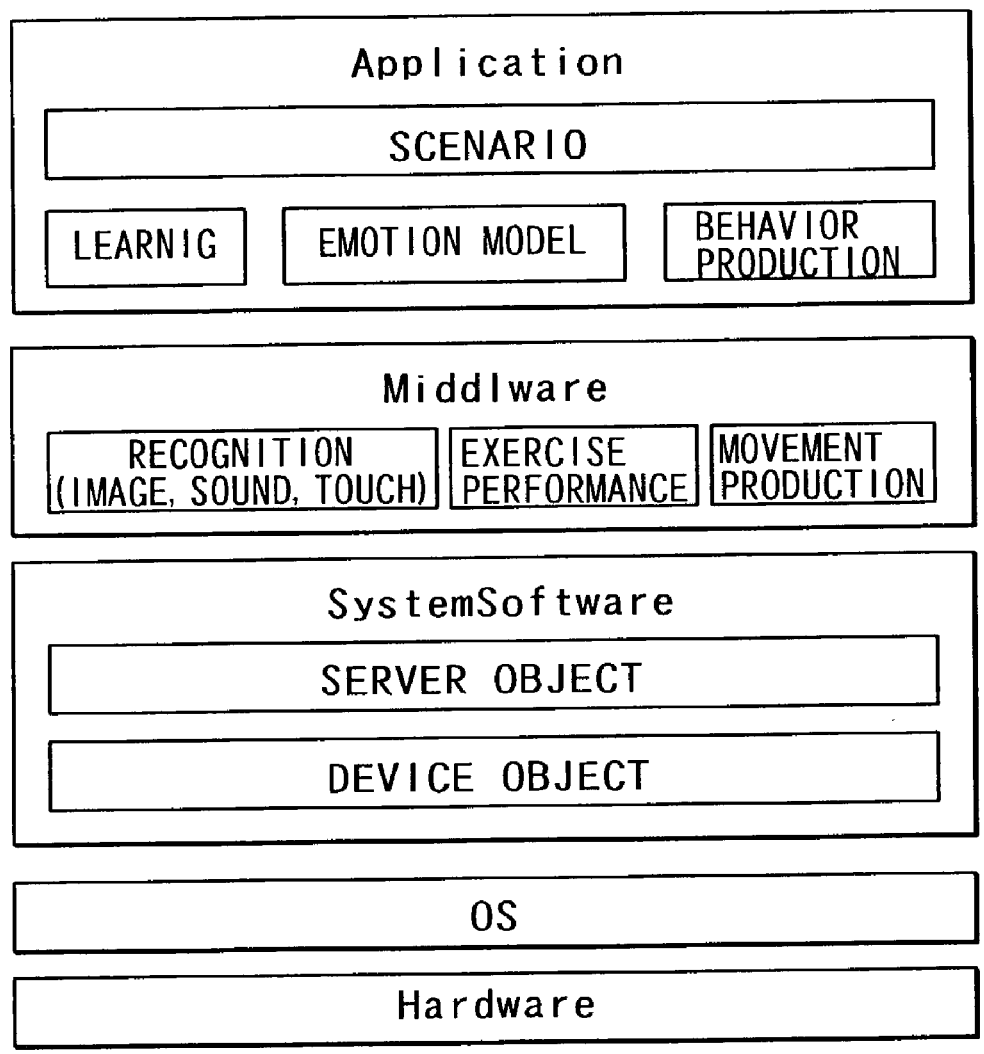
FIG. 28 is a diagrammatic view illustrating functions and operation of the charging object apparatus in the third embodiment.

Incidentally, in the external storage memory 124, control programs for controlling the motion or the emotion of the entire robot 101 are stored hierarchically as seen in FIG. 28. In particular, referring to FIG. 28, three hierarchies of a system software hierarchy, a middleware hierarchy and an application hierarchy are formed on a real time OS (Operating System) for installation which operates on the hardware of the robot 101 described hereinabove.

The system software hierarchy is formed from device drivers for directly driving various devices such as, for example, the head part 102, right foreleg 106, left foreleg 107, right hind leg 108 and left hind leg 109, and a server object for providing a service to an object in a higher hierarchy.

The middleware hierarchy includes a recognition object for processing, for example, an image signal, a sound signal and touch information, a motion control object for controlling motion of the robot 101 such as walking or the posture, and a motion generation object for moving the legs, head part 102 and/or tail 104 to represent an emotion.

The application hierarchy includes, for example, a learning object for performing learning, an emotion model object for handling an emotion, an action generation object for determining a behavior, and a scenario object for characterizing the entire user 1.

The emotion model object includes an emotion module. The emotion module handles a plurality of different emotion units called six emotion models (joy, sorrow, anger, fear, surprise and hatred) as data. Each of the emotion units includes, for example, the level of the emotion at present (the level is hereinafter referred to as an emotion level), a minimum emotion level, a maximum emotion level, and a threshold value used as a reference for indication of an emotion.

The emotion levels mentioned are first initialized with the values of emotion parameters and thereafter vary in response to information from the outside such as an object of recognition or in response to lapse of time. Further, the emotion units have a nature that they have an influence on one another and cooperatively raise or lower the emotion levels. For example, when the emotion level of the emotion unit of the sorrow is high, the emotion level of the emotion unit of anger is also raised. Further, when the emotion level of the emotion unit of the joy is high, the emotion level of the emotion units of anger and hatred is raised.

The recognition object of the middleware handles input information as various sensor information obtained from various devices of the head part 102, right foreleg 106, left foreleg 107, right hind leg 108, left hind leg 109 and so forth such as, for example, color information of an image from a color sensor, a sound signal collected by the microphone 116, and touch information by the touch sensor 111, and notifies the emotion module of the emotion model object of the input information as a result of recognition.

The emotion module discriminates, when a result of recognition is inputted thereto from the recognition object, the type of the inputted result of the recognition and varies the emotion levels of the emotion units using the parameter of the type. Then, the emotion module selects, from among those of the emotion units which are higher than the threshold value, that motion unit which exhibits the highest emotion level.

The selected emotion unit conveys the information to an object which demands an output such as, for example, the action generation object. It is to be noted that it is necessary for an object which demands an output to register the object itself as an observer into the emotion module with an observer pattern oriented to the object in advance.

The action generation object controls the hardware through the motion generation object or the like. In particular, the robot 101 moves various devices such as the head part 102, right foreleg 106, left foreleg 107, right hind leg 108 and left hind leg 109 to represent an emotion thereof.

If such a memory card 9 as described hereinabove is used as the external storage memory 124 to be loaded into the robot 101 described above, then each of a plurality of users can normally use the robot 101 as if the robot 101 were a robot for exclusive use for the user itself.

[Modifications to the Second and Third Embodiments]

In the foregoing description, the electronic apparatus 3 as a charging object apparatus performs authentication of a card of a user. However, in the system of the second embodiment which does not involve prepayment information, the card authentication may be omitted. In contrast, where prepayment information is involved as with a memory card used in the system of the third embodiment, such a situation that a third party uses the memory card illegally can be prevented.

Further, while, in the description of the systems of the second and third embodiments, a memory card is used as an external memory, the external memory is not limited to this and an IC card or the like may be used.

Fourth Embodiment

In the system of the second embodiment described hereinabove, a memory card is used for communication of permission information and information of a use time period between the personal computer 5 and the electronic apparatus 3. However, in the system of the fourth embodiment, not a memory card but wireless communication is used for such communication. While a radio wave, a light beam, an ultrasonic wave or the like can be used for the wireless communication, the system of the fourth embodiment uses the Bluetooth by a radio wave for the wireless communication.

Figure 29:
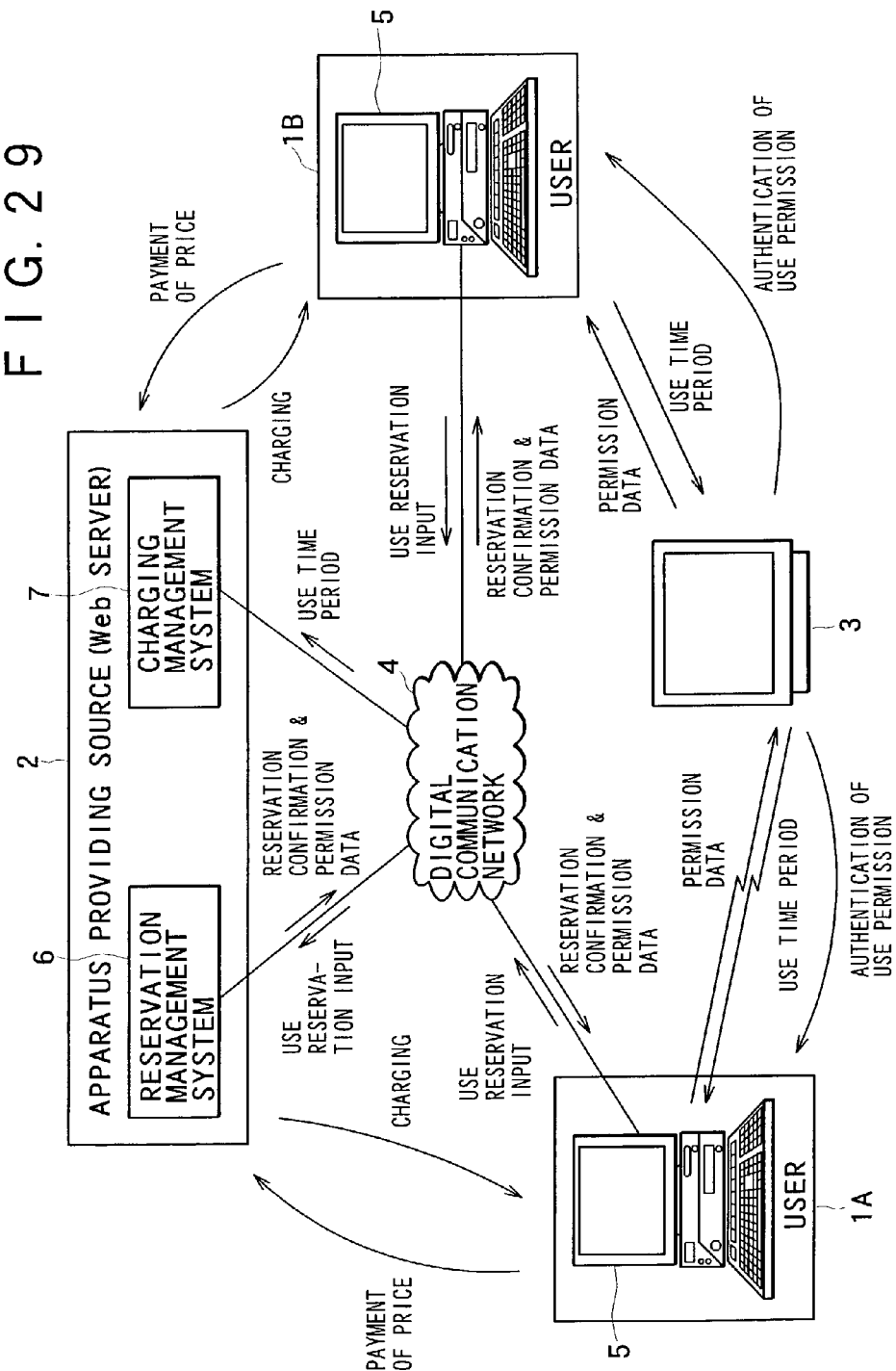
FIG. 29 is a diagrammatic view showing an outline of a management system for a charging object apparatus according to a fourth embodiment of the present invention.

FIG. 29 shows an outline of a management system for a charging object apparatus according to the fourth embodiment. The management system of FIG. 29 is common in configuration to the system of the first embodiment described hereinabove with reference to FIG. 1 except in three points that the electronic apparatus 3 is not connected to the digital communication network 4, that communication of permission information with regard to the use of the electronic apparatus 3 and information of a use time period of the electronic apparatus 3 is performed between the personal computer 5 and the electronic apparatus 3 and that communication of permission information regarding the use of the electronic apparatus 3 and information of a use time period of the electronic apparatus 3 is performed between the personal computer 5 of a user and the electronic apparatus 3 using the wireless communication.

FIG. 30 shows a configuration of the personal computer 5 of the system of the fourth embodiment. Referring to FIG. 30, the personal computer 5 shown includes a radio transmitter-receiver 43 of the Bluetooth connected to a system bus 11 through an interface not shown. The other configuration of the personal computer 5 is the same as that of the system of the first embodiment described hereinabove with reference to FIG. 2.

FIG. 31 shows an example of a configuration of the electronic apparatus 3 in the system of the fourth embodiment. Referring to FIG. 31, the electronic apparatus 3 shown does not include the network section 34 but instead includes a radio transmitter-receiver 44 of the Bluetooth connected to the control section 31.

Figure 5:
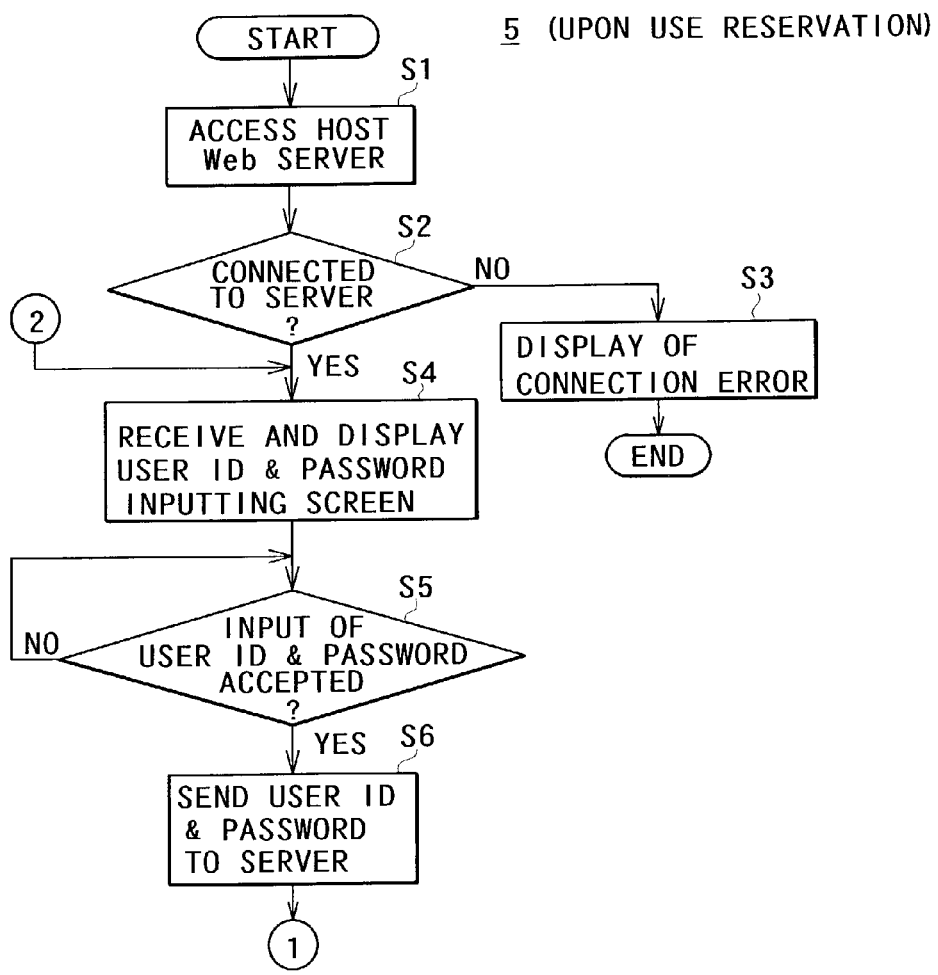
FIGS. 5 and 6 are flow charts illustrating a use reservation requesting process of the charging object apparatus of FIG. 4 by the user side apparatus of FIG. 2.
Figure 32:
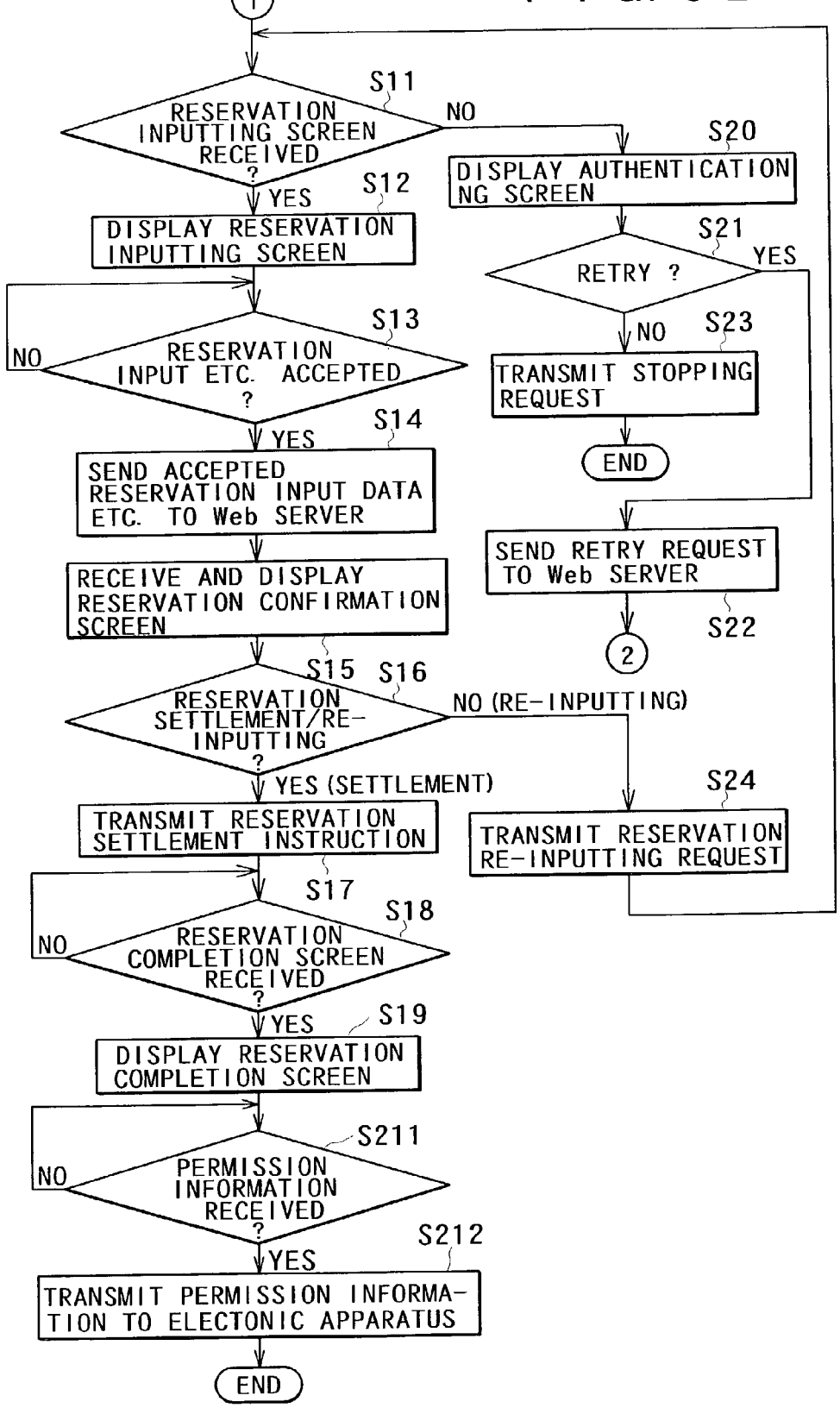
FIGS. 32 and 33 are flow charts illustrating a use reservation requesting process for a charging object apparatus by the user side in the fourth embodiment.

Processing operation of the personal computer 5 upon use reservation in the system of the fourth embodiment is almost the same as that in the first embodiment illustrated in the flow charts of FIGS. 5 and 6. However, the processing illustrated in FIG. 6 is replaced by such processing as illustrated in FIG. 32. In particular, after a reservation completion screen is displayed at step S 19 of FIG. 6, the processing advances to step S211, at which the personal computer 5 acquires permission information from the apparatus providing source 2, and then to step S212 at which the personal computer 5 transfers the acquired permission information to the electronic apparatus 3 through the radio transmitter-receiver 43. Except the two steps S211 and S212 added in this manner, the processing of the personal computer 5 in the system of the fourth embodiment is quite the same as that illustrated in FIGS. 5 and 6.

Figure 33:
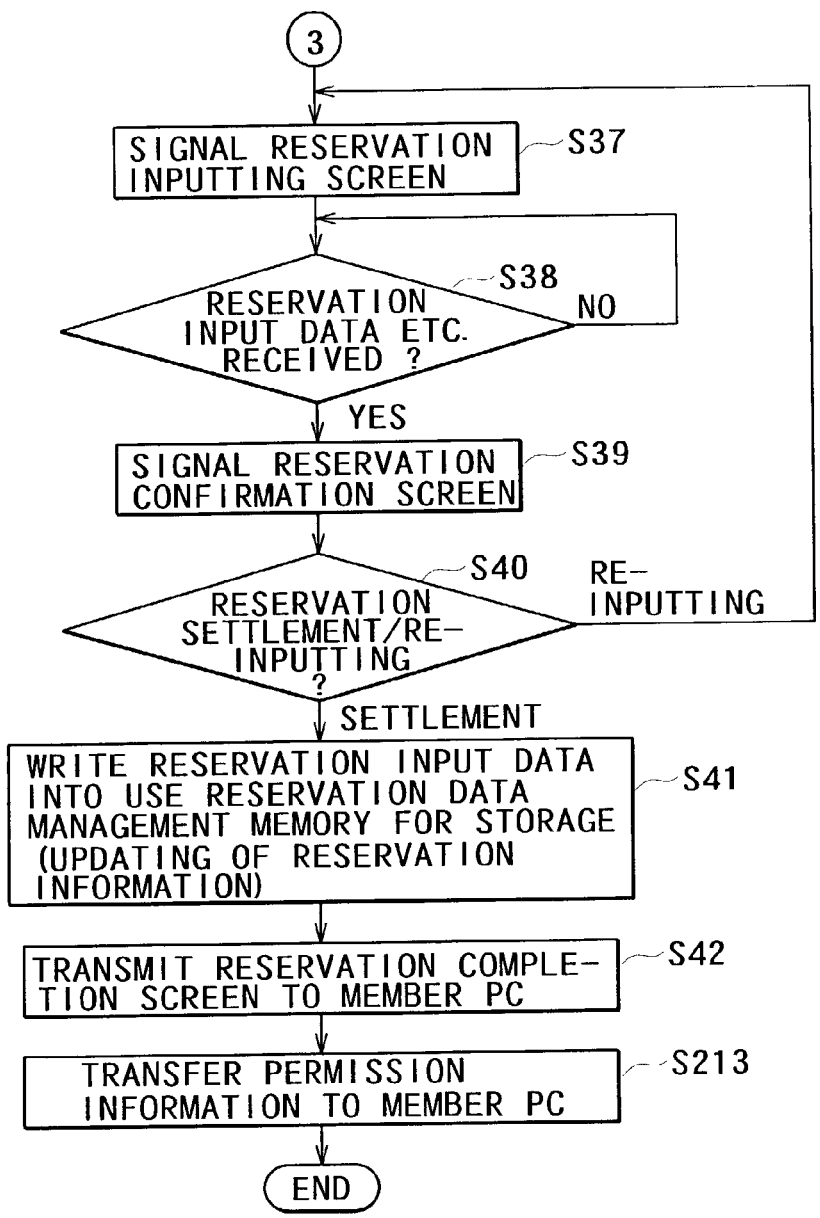

Processing operation of the apparatus providing source 2 upon acceptance of a use reservation request is substantially the same as that in the system of the first embodiment described hereinabove with reference to the flow charts of FIGS. 7 and 8. However, the processing illustrated in FIG. 8 is replaced by such processing as illustrated in FIG. 33. In particular, after the reservation completion screen is transmitted to the personal computer 5 of the user at step S42 of FIG. 8, the apparatus providing source 2 transmits permission information to the same personal computer 5 at step S213. Except the step S213 added in this manner, the processing of the apparatus providing source 2 in the system of the fourth embodiment is quite the same as that illustrated in FIGS. 7 and 8.

Further, in the system of the fourth embodiment, when a use permission period comes to an end, the electronic apparatus 3 issues a message to urge the user to send a report of a use time period to the apparatus providing source 2. The user receiving the message then receives the information of the use time period from the electronic apparatus 3 through the radio transmitter-receiver 44 and then reports the information of the use time period to the apparatus providing source 2 through the personal computer 5. If the user does not send such a report to the apparatus providing source 2, then the apparatus providing source 2 issues a message to urge the user again in the same manner as in the system of the second embodiment described hereinabove.

Fifth Embodiment

Also in a system of the fifth embodiment, the charging object product is an electronic apparatus, and an equivalent for a use time period of the charging object product is paid later. The system of the fifth embodiment is configured such that, where a plurality of charging object products are involved, a plurality of members can use the charging object products with a higher efficiency. To this end, the members are grouped into a number of groups corresponding to the number of charging object products.

In particular, in the system of the fifth embodiment, the members are grouped based on principal grouping factors so as to facilitate delivery of returning of a charging object product and to collect those members whose use times do not overlap with one another into one group. A particular example of grouping is hereinafter described in detail.

Figure 34:
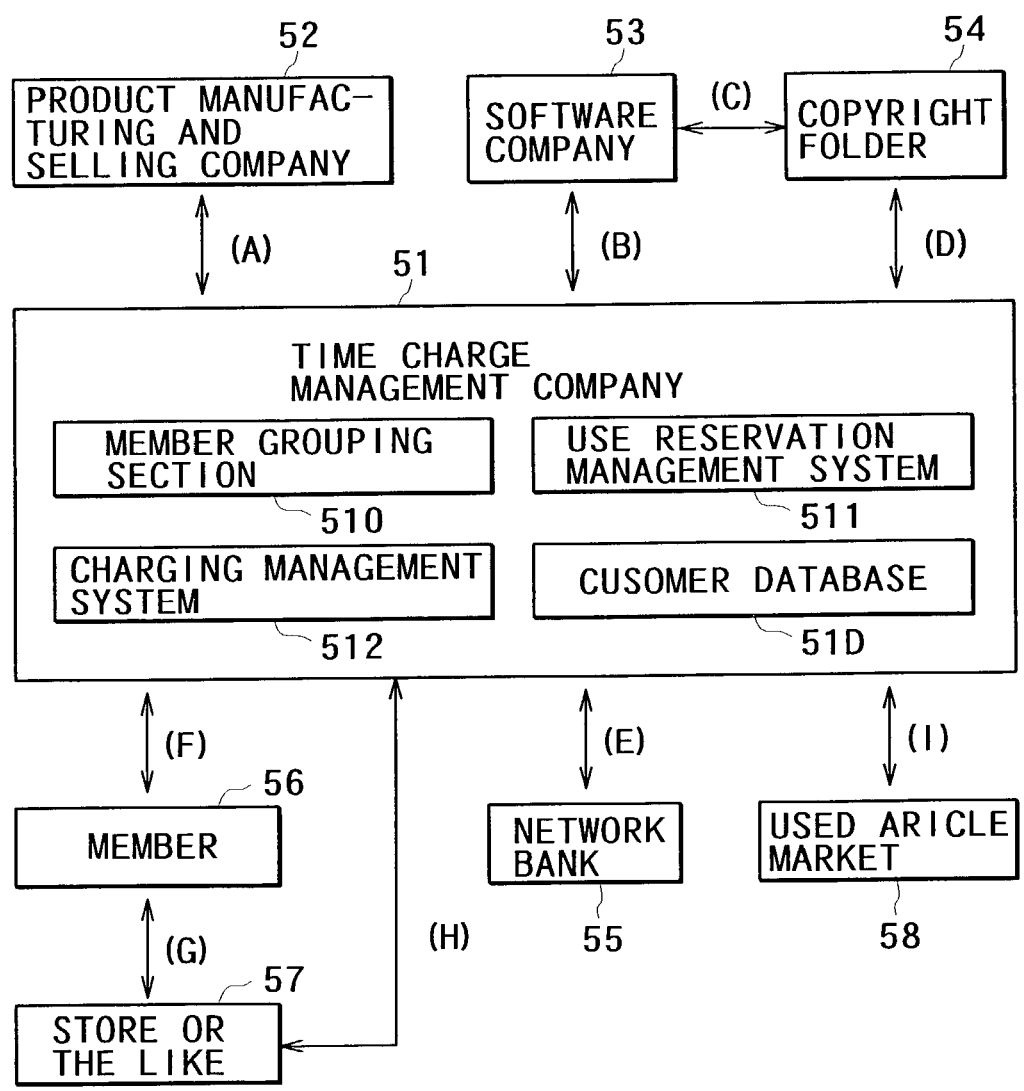
FIG. 34 is a block diagram showing a business model of a system for a charging object apparatus according to the fifth embodiment of the present invention.
Figure 35:
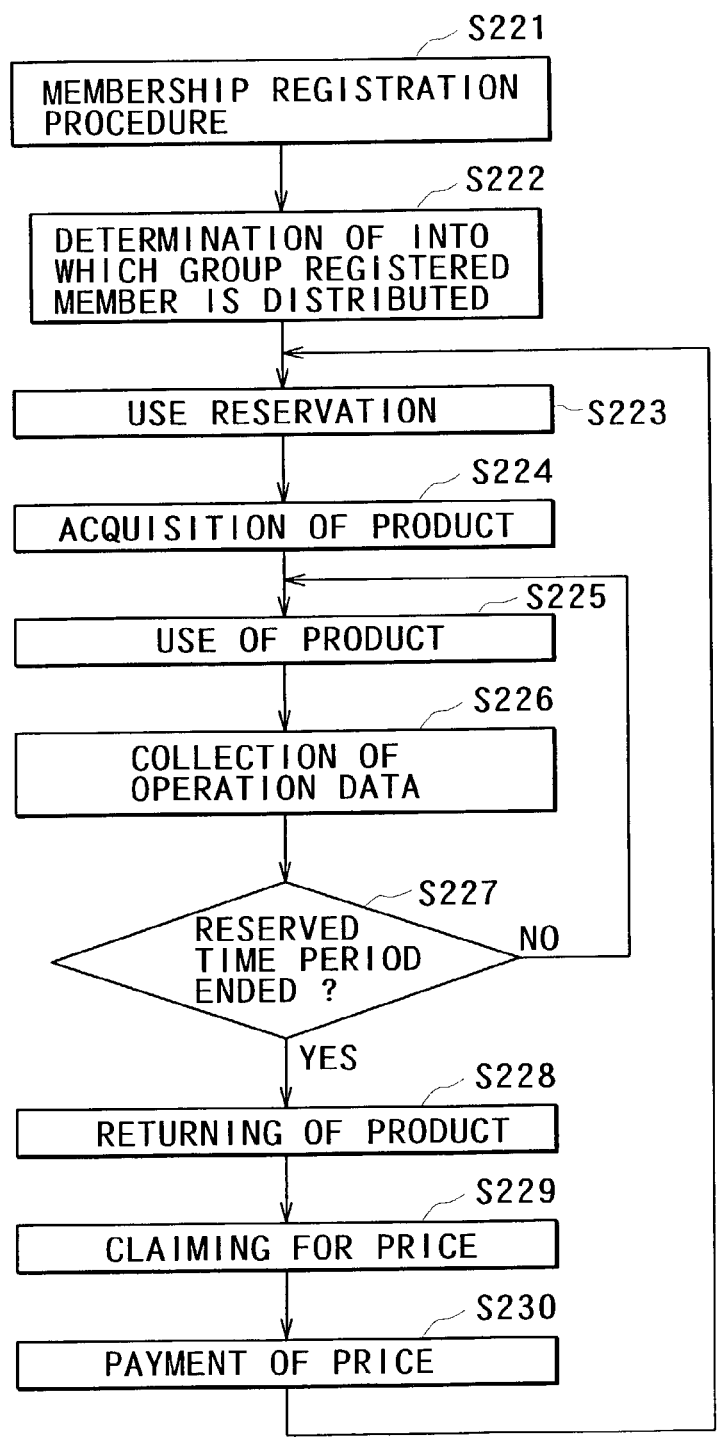
FIG. 35 is a flow chart illustrating a general flow of operation of a business model in a fifth embodiment of the present invention.

FIG. 34 shows an outline of an entire business model of the system of the fifth embodiment wherein charging is based on a use time period and illustrates a relationship of a time charge management company 51, which manages charging based on a use time period of a charging object product, to various organizations and clients. Meanwhile, FIG. 35 illustrates a general flow of operation of the system of the fifth embodiment.

Referring first to FIG. 34, in the system of the fifth embodiment shown, the time charge management company 51 has a relationship to a product manufacturing and selling company 52 that "it entrusts the product manufacturing and selling company 52 with development and manufacture of products and stocks the manufactured products as objects of charging by a use time period from the product manufacturing and selling company 52" ((A) of FIG. 34).

The stocking contract of manufactured products in this instance may take various forms including a form wherein it includes only a contract of sales of the products between the time charge management company 51 and the product manufacturing and selling company 52 (the proprietary right of the products is possessed by the time charge management company 51), another form wherein it includes both of a contract of sales of the products (the proprietary right of the products is possessed by the time charge management company 51) and a distribution contract of part of the price paid in accordance with the use time period hereinafter described, and a further form wherein it does not include a contract of sales of the products (the proprietary right of the products is owned by the product manufacturing and selling company 52) but includes a distribution contract of part of the price paid in accordance with the use time period.

A software company 53 has a relationship to a copyright holder 54 that "it buys software from the copyright holder 54 and entrusts the copyright holder 54 with production of software ((C) of FIG. 34). Further, the software company 53 has a relationship of "supplying software" to the time charge management company 51 ((B) of FIG. 34). The time charge management company 51 has such direct relationships as entrusting with production of software and buying of software to the copyright holder 54 ((D) of FIG. 34).

The time charge management company 51 has a relationship in settlement operation and funds to a network bank 55 ((E) of FIG. 34).

The time charge management company 51 has a relationship to a member 56 in supply of a product, data transfer of data of a time period of a charging object (the time is hereinafter referred to as chargeable time period) and other data and so forth ((F) of FIG. 34). The member 56 has a relationship to a store 57 in payment ((G) of FIG. 34). The time charge management company 51 has a relationship to the store 57 in collection of the price from the member 56, delivery of a product and so forth ((H) of FIG. 34).

Further, the time charge management company 51 has a relationship to a used article market 58 such as a network auction market as a destination of an exchanged article when a charging object product is exchanged by a new product ((I) of FIG. 34).

A customer becomes a member 56 by registering the customer itself into the time charge management company 51 to obtain the membership (step S221 of FIG. 35). Such membership registration can be performed on the shop-front of the time charge management company 51. However, also electronic registration (Web registration) through the Internet can be used. Upon the membership registration, a member identifier (which is used also as a user identifier; hereinafter referred to as member ID) is given to the member 56.

The time charge management company 51 includes a customer database 51D in which, for each member such as the member 56, member information such as the member ID, name or title (in the case of a corporation), age, address, electronic mail address, term of contract, settlement method of the charged price, and bank account number or credit card number of the member 56 is stored.

After a client is registered as a member, the time charge management company 51 groups the registered member into one of groups by means of a member grouping section 510. In particular, the time charge management company 51 determines a group to which the registered member should be distributed (step S222). The group information is stored into the customer database 51D.

When the member 56 wants to use a charging object apparatus, it issues a use reservation request of the charge object apparatus in advance into the time charge management company 51 to perform use reservation (step S223 of FIG. 35). The time charge management company 51 performs reservation management of the use reservation by means of a use reservation management system 511 thereof.

When the reserved use time comes, the member 56 receives the reserved charging object product, in this instance, an electronic apparatus (step S224 of FIG. 35) and performs membership authentication and use authentication as described hereinabove, whereafter the member 56 can start the use of the electronic apparatus (step S225 of FIG. 35).

The charging object product is passed to the member 56 through the store 57 such as, for example, a convenience store or the like which has a contract with the time charge management company 51. Otherwise, the charging object product may be distributed from the time charge management company 51 to the member 56.

In addition to the production identifier (hereinafter referred to as product ID), personal information of the member who has reserved the use such as the member ID, address and name, day and hour information of the reserved use time are written into the memory of the electronic apparatus of the charging object product. In the system of the fifth embodiment, the charging object product is passed to the member 56 after such information as just mentioned is written into the memory.

In the use reservation management system 511 of the time charge management company 51, use reservation times, member IDs and product IDs of products to be used by the members are stored in a mapped relationship to each other. It is to be noted that writing of the product ID into a charging object product may be performed by the time charge management company 51 or otherwise by the product manufacturing and selling company 52.

The member 56 registers also a settlement method thereof into the time charge management company 51. The time charge management company 51 adds the registered settlement method to the record regarding the member 56. As the settlement method, a method wherein a bank account of the member 56 is used, another method wherein an account of a credit card of the member 56 is used, a further method wherein money is remitted into an account of the time charge management company through a bank, a post office or a convenience store, a still further method wherein an electronic money settlement system constructed originally by a time charge management company and so forth are available. The settlement method can be changed also within the term of contract.

Where the member 56 utilizes the method wherein a bank account is used or the method wherein an account of a credit card is used, it notifies the time charge management company 51 of the account number or credit number, password and so forth. Such information is stored into the customer database 5ID as described hereinabove.

The member 56 sends operation data regarding a period (charging period) from the last settlement time to the present settlement time, that is, operation data within the period reserved for the use, to the time charge management company 51 at every settlement time determined in advance such as time immediately after the end of the reservation use or in response to a settlement request from the charging object product itself or otherwise in accordance with a settlement time coming notification from the time charge management company 51 (step S226 of FIG. 35).

The operation data here include the number of times of on/off operations of the power supply, operation information of each function of the electronic apparatus, media information, television channel information, music information, video information and failure information as hereinafter described. The operation information of each function of the electronic apparatus includes on/off information of the function button, operation time period information of the function and so forth.

The member 56 can continue its use of the charging object apparatus until the reserved use time comes to an end (step S227 of FIG. 35). When the reserved use time comes to an end, the member 56 will return the charging object product (step S228 of FIG. 35).

Meanwhile, the time charge management company 51 calculates the price by the use time period of a charging object product by each member such as the member 56 based on the operation data sent thereto from the member 56 and issues a debit note for the charge to the member 56 (step S229 of FIG. 35). Each member such as the member 56 thus pays the price of the debit note in accordance with the registered settlement method (step S230 of FIG. 35).

[Grouping Method]

FIG. 36 illustrates a procedure of a grouping process executed by the member grouping section 510. Referring to FIG. 36, the member grouping section 510 first accepts registration items from a member (step S231). An example of membership registration items in this instance is illustrated in FIG. 37. The member fills, for example, a member registration form with the name, birthday, sex, zip code, address, telephone number, electronic mail address, and occupation of the member itself, presence/absence of a friend member and lifestyle questionnaire for a member to register itself for membership. The same items are registered also when the member tries to perform Web registration through the Internet.

After the registration items of the member are accepted, the member grouping section 510 extracts those items which are used as factors for grouping from among the registration items (step S232). Then, the member grouping section 510 uses the extracted factor items to determine a common use group by which a charging object apparatus is to be used commonly (step S233). After the common use group is determined, the member grouping section 510 notifies the member of the group organization (step S234) and inquires the member of approval of the member (step S235).

If the member does not approve in response to the inquiry notification, then the processing returns to step S1 82, at which the member grouping section 510 performs group organization again to search for an optimum group organization for the member in order to obtain approval of the member. The group organization is settled at a point of time when the member approves of it.

Example 1 of Group Organization

In the present embodiment, since a plurality of members in a group use a single charging object apparatus, delivery and returning of the charging object apparatus become a problem. Therefore, from among the member registration items, the zip code, address and/or telephone number are used to organize a group so that the group may be formed from those members whose locations are comparatively near to each other.

Figure 38:
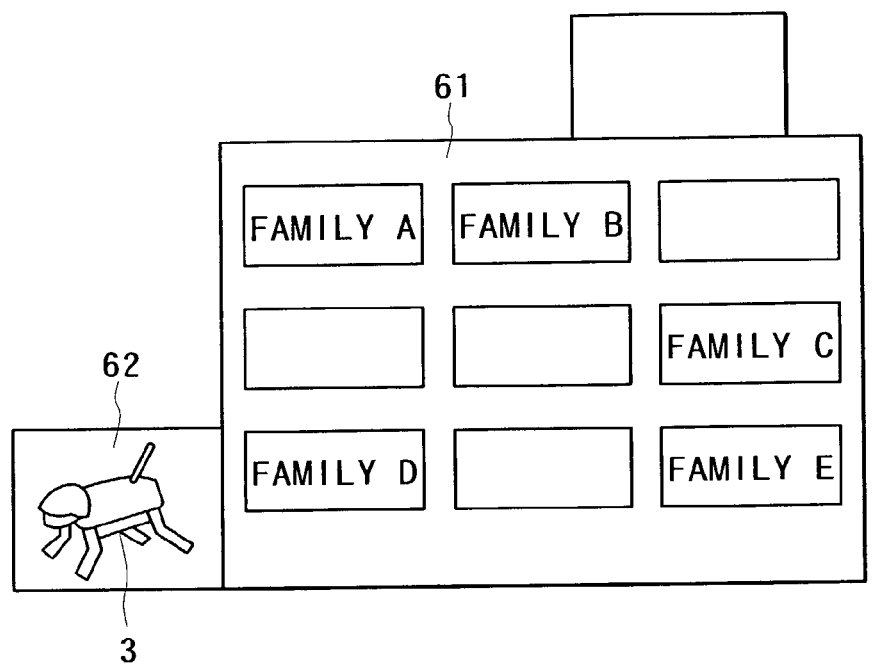
FIGS. 38 and 39 are diagrammatic views illustrating a first example of a grouping process in the fifth embodiment.

In an example of a group of FIG. 38, the members of the group are residents of one multiple dwelling house 61. In the example of FIG. 38, for delivery or returning of the electronic apparatus 3 as the charging object apparatus, for example, a parcel delivery locker or a community room 62 is used. This applies in the same way as in a case wherein in-patients or the personnel of a hospital are members.

Figure 39:
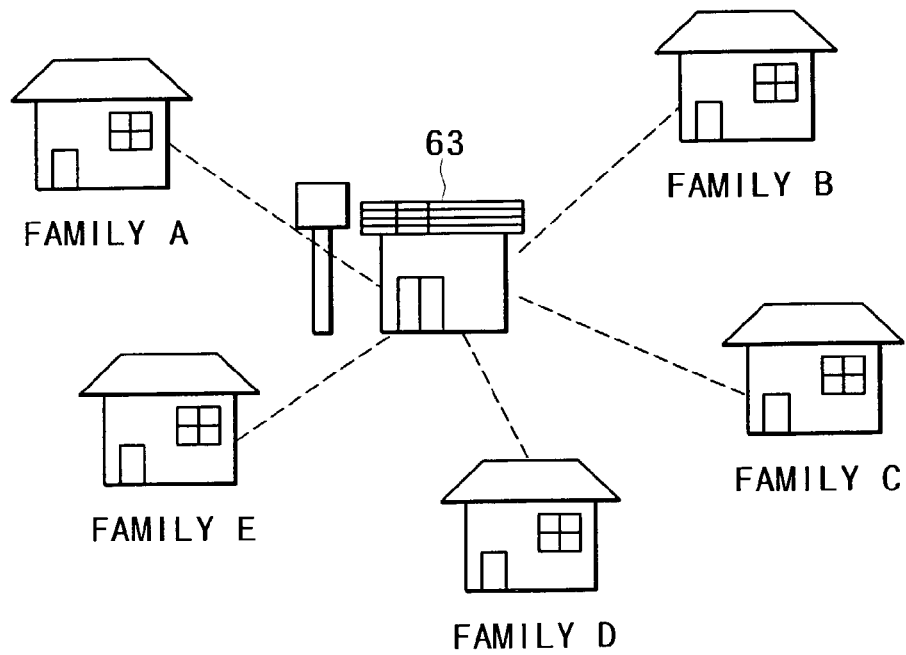

In another example of a group shown in FIG. 39, a plurality of members who utilize the same convenience store 63 form a common use group. In the example of FIG. 39, delivery or returning of an electronic apparatus 3 as the charging object apparatus is carried out as proxy by the convenience store 63 which has a contract concluded with the time charge management company 51.

Example 2 of Group Organization

Where a great number of members are included in one group like those who live in a large-scale multiple dwelling house, if only their locations are used to group them, then the number of members per one group is so great that use requests of different members may frequently be issued at the same timings, and therefore, there is the possibility that the substantial opportunities of use by the members may decrease, resulting in deterioration of the utilization efficiency of the charging object apparatus. Therefore, finer group organization is required.

FIG. 40 illustrates an example of a method of finer group organization. In the example of FIG. 40, the time charge management company 51 manages a plurality of charging object apparatus and allocates an electronic apparatus as a charging object apparatus to each of the groups. It is to be noted that a plurality of charging object apparatus may naturally be applied to one group.

Referring to FIG. 40, the example illustrates group organization where a desired use time zone is included as one of registration items upon membership registration. In the example illustrated, the desired use time zones of the members are first divided into several time zones. Specifically in the example of FIG. 40, the desired use time zones are divided into four equally divided time zones of six hours within a day including a time zone A, another time zone B, a further time zone C and a still further time zone D. Then, groups MA, MB, MC and MD of those members whose desired use time zones are the time zones A, B, C and D, respectively, are formed.

In the example illustrated in FIG. 40, groups to be formed are five groups from group 1 to group 5 because five charging object apparatus P1, P2, P3, P4 and P5 are involved.

Thus, from within the groups MA, MB, MC and MD of members whose desired use time zones are the time zones A, B, C and D, respectively, the members are successively distributed to the five groups from group 1 to group 5. The grouping of the members is completed thereby.

If a new member enters in the grouping method described above, then the desired use time zone of the member is checked and the member is distributed to a group next to the group to which the last member who belongs to the desired use time zone has been distributed.

According to the grouping method described above, those members whose desired use time zones least overlap with each other are distributed uniformly to the individual groups to perform member organization, and therefore, it is anticipated that the use efficiency of the charging object apparatus is augmented.

It is to be noted that, if a charging object apparatus has a characteristic that it is used by a member while the member stays at home, then the desired use time zone may be set as a stay-at-home time zone of the member included in the lifestyle questionnaire of one of the registration items illustrated in FIG. 37.

Example 3 of Group Organization

In the example 3 of group organization, further finer group organization is involved. In the present example, a plurality of organization factors for common use groups in each of which one or a plurality of charging object apparatus are used commonly are selected, for example, from among member registration items as seen in FIG. 41. Then, priority levels are applied to the selected factor items for group organization.

Further, a classification type is determined in advance for each of the factor items. The classification type here represents whether the item is to be used to classify the same members into the same group (this classification type is hereinafter referred to as centralization type) or into different groups (this classification type is hereinafter referred to as decentralization).

Which factor should be used as a classification type can be determined arbitrarily when grouping is performed. However, the address should be determined as a centralization type without fail when the convenience in delivery and returning of a charging object apparatus is taken into consideration as described hereinabove, and the stay-at-home time zone should be allocated to a decentralization factor in order that use times of the members may not overlap with each other.

In the example illustrated in FIG. 41, seven organization factors for common use groups are used including the address, whether or not the member has a friend member, the stay-at-home time zone, the age, the occupation, the hobby and the subscribed magazine. The priority levels of the organization factors are determined such that the priority decreases in order of the address, whether or not the member has a friend member, the stay-at-home time zone, the age, the occupation, the hobby and the subscribed magazine. Further, the address, whether or not the member has a friend member and the age are used as centralization factors while the stay-at-home time zone, the occupation, the hobby and the subscribed magazine are used as decentralization factors.

Organization of common groups is performed by applying the organization factors successively in order of the priority. First, a plurality of members having addresses near to each other are collected to produce a large group. Then, a factor or factors of the second or second and succeeding priority levels are used to subdivide the large group to organize object common use groups. The priority level of whether or not the member has a friend member is set comparatively high because the members can adjust the schedules with each other readily.

Further description is given below of an example wherein, where a large group is produced from fifteen members K1 to K15 in a certain district, the large group is subdivided into three common use groups Gp1 to Gp3 each including five members.

FIG. 42 illustrates detailed item contents of different factor items regarding the fifteen members K1 to K15 from which the large group mentioned above is formed. Processing steps for group organization are executed in order of the priority levels of the factors, that is, whether or not the member has a friend member, the stay-at-home time zone, the age, the occupation and the hobby. It is to be noted that the factor "subscribed magazine" in FIG. 41 is not taken into consideration.

A table of FIG. 43 was obtained by sorting and putting the members in order with regard to which members belong to the detailed item contents of the factor items of the stay-at-home time zone, the age, the occupation and the hobby.

Based on the detailed item contents of the factor items regarding the members K1 to K15 of FIG. 42 and the classification table of the detailed item contents of the factor items of FIG. 43, the factor items are adapted in order of the priority levels to determine the group organization.

FIG. 44 illustrates processing contents at different processing steps Step1 to Step5 for the group organization and members organized into three groups Gp1 to Gp3 at ending stages of the processing steps Step1 to Step5.

At the first processing step Step1, a group organization process is performed based on the factor of whether or not the member has a friend member. Since the factor of whether or not the member has a friend member is a centralization factor, friends are automatically organized into the same group. In this instance, whether or not some friends and some other friends should be organized into the same group is determined taking the stay-at-home time zone of the next highest priority level into consideration.

In the example of FIG. 42, the members K1 and K3 are friends to each other and the members K8 and K15 are friends to each other. Therefore, the friend members are organized into the same group or groups. However, if the members K1 and K3 and the members K8 and K15 are organized into the same one group, then since the stay-at-home time zones of the three members K3, K8 and K15 are "daytime", the members K1 and K3 and the members K8 and K15 are organized into two different groups.

At the next step Step2, the factor item of the stay-at-home time zone is applied to successively distribute the members beginning with the morning type of the factor item and the age tendencies of the groups Gp1 to Gp3 are taken into consideration to determine the group organizations. Here, since the member K2 has the morning type stay-at-home time zone and has the age in its twentieth, it is determined to organize the member K2 into the group Gp3 different from the group Gp1 which includes the members K1 and K3 who are in their thirtieth and the group Gp2 which includes the members K8 and K15 who are in their fortieth.

It is to be noted that, since the members K10 and K14 whose stay-at-home time zones are the morning type may be organized into any of the group Gp1 and the group Gp2, they are organized in a later step process. Meanwhile, since the number of those members whose stay-at-home time zones are the daytime type is great, they are organized in a group organization process at a later step using the factor item "occupation".

At the next step Step3, a group organization process is performed in accordance with the factor item of the age. Since only the member K7 is a member whose stay-at-home time zone is of the night type, it may be organized into any group, and therefore, the age is applied to organize the member K7 into the group Gp2 of the same generation. Since the members K4 and K12 whose stay-at-home time zones are of the daytime type are different in age, the group organization of them is determined based on the item factor of the age such that the member K4 is organized into the group Gp3 and the member K12 is organized into the group Gp2. Further, the member K13 whose stay-at-home time zone is of the morning type is organized into the group Gp3 based on the age.

At the next step Step4, a group organization process is performed in accordance with the factor item of the occupation. As described hereinabove, those members whose stay-at-home time zones are of the daytime type and the number of whom is comparatively great are organized based on the occupation factor. Here, since the group Gp1 includes the member K3 whose occupation is self-employment, the member K6 whose occupation is also self-employment is organized into the group Gp3.

At the final step Step5, a group organization process is performed based on the factor item of the hobby. First, taking the hobbies of the organization members of the individual groups into consideration, the member K10 whose hobby is the golf and whose organization was retained at the step Step2 is organized into the group Gp1 because the group Gp1 does not include a member whose hobby is the golf. Then, the member K14 whose organization was retained at step Step2 is organized into the group Gp2.

Then, since also the group Gp3 does not include a member whose hobby is the golf, the member K5 whose hobby is the golf is organized into the group Gp3. Finally, the remaining members K9 and K11 are organized into the group Gp1. The group organization of the three groups Gp1 to Gp3 is completed thereby.

Figure 45:
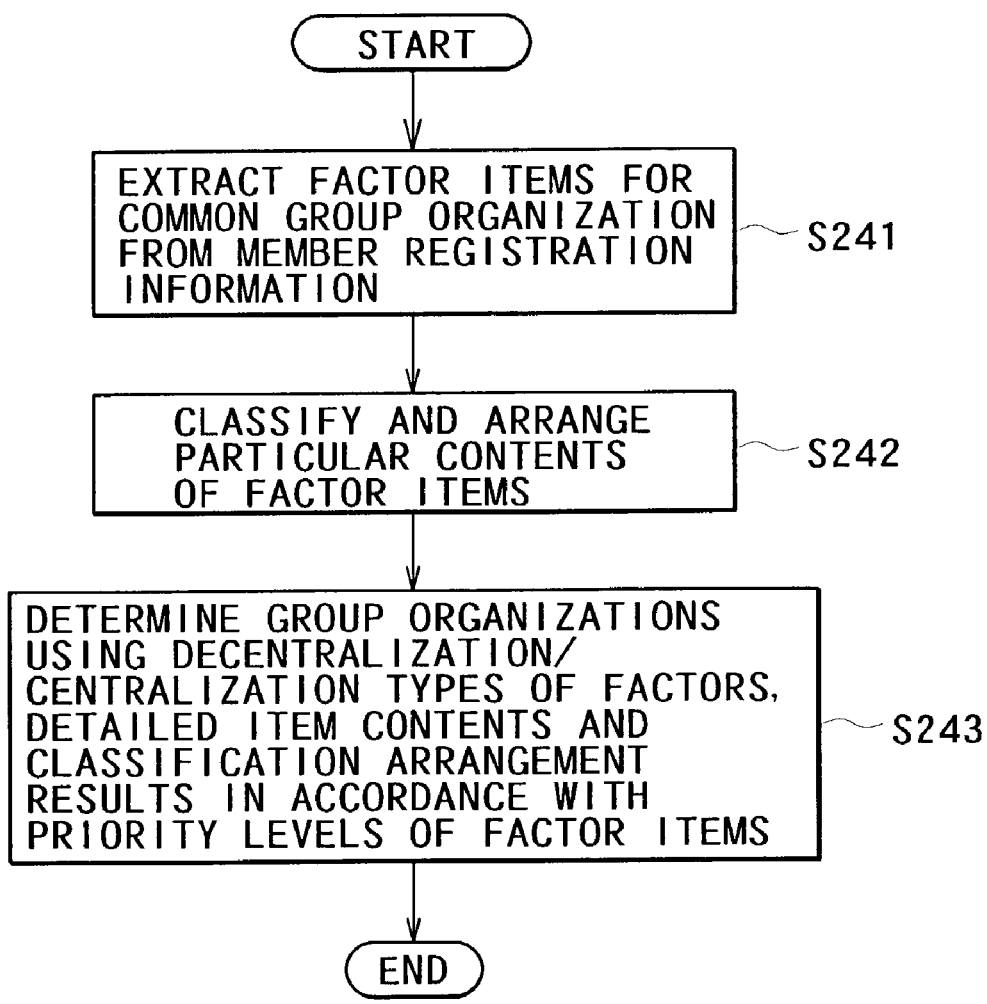
FIG. 45 is a flow chart illustrating the third example of a grouping processing the fifth embodiment.

The procedure of the group organization process described above can be summarized into steps S241 to S243 illustrated in FIG. 45.

By grouping the members in such a manner as described above, each of electronic apparatus as charging object apparatus is used commonly by a plurality of particular members, and therefore, it is comparatively easy to manage the charging object apparatus and find out a responsible person when a failure occurs with any of the charging object apparatus. Further, since an electronic apparatus is used commonly by particular users, it can be anticipated that the schedules of the members may be adjusted among them, and the availability of the charging object apparatus can be further raised.

It is to be noted that it is possible to construct the system such that an electronic apparatus as a charging object apparatus is used not fixedly for each group but can be reserved for use if it is available when a use reservation request from a member of a different group is issued.

[Use Reservation Requesting Process in the Fifth Embodiment]

Subsequently, a processing operation of the personal computer of a user and a processing operation of the use reservation management system 511 of the time charge management company 51 as an apparatus providing source upon use reservation in the fifth embodiment are described below.

Also in the present embodiment, in the same way as in the embodiments described hereinabove, a member uses its personal computer to access the use reservation management system 511 of the time charge management company 51, which has a role of a Web server, and issue a use reservation request.

In response to the use reservation request, the use reservation management system 511 performs membership authentication and accepts the use reservation request if the authentication results in success, and then transfers permission information of the reserved use time to an electronic apparatus of a charging object apparatus of the object of the use reservation. Thereafter, the use reservation management system 511 passes the electronic apparatus of the object of the use reservation to the reserving member at the reserved use time so that the member may use the electronic apparatus.

In the fifth embodiment, use reservation can be performed in a unit of an hour, and upon use reservation request, a use reservation date is designated first and then a desired reservation time zone on the designated date is inputted.

Thus, a member who first reserves a certain date acquires the priority right of use with regard to the date. However, if another member wants to reserve hour use with regard to the date, then the use reservation is acquired if the charging object apparatus is available within a free hour or hours on the date.

Figure 46:
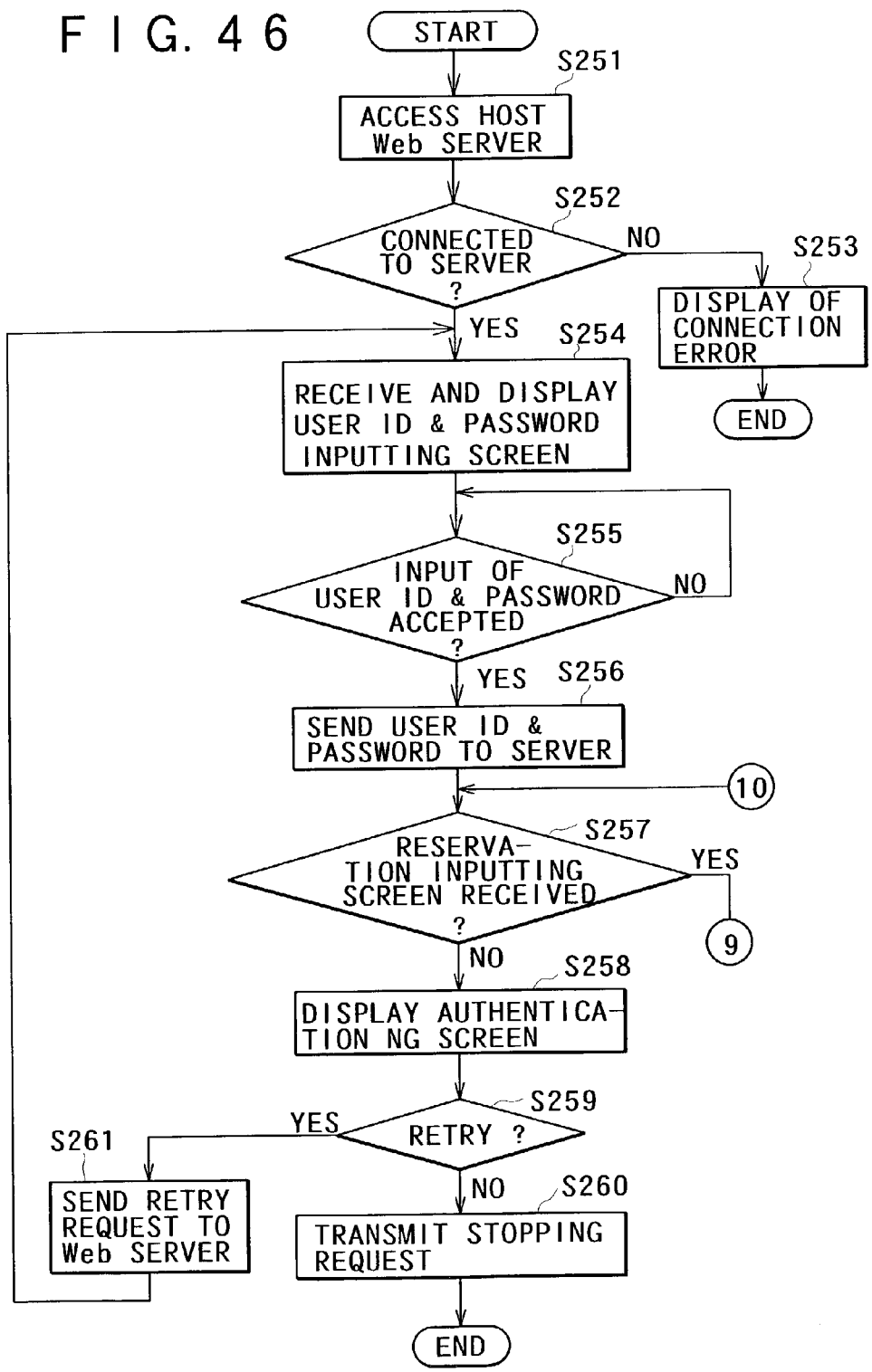
FIGS. 46 and 47 are flow charts illustrating a use reservation requesting process for a charging reservation apparatus by the user side in the fifth embodiment.
Figure 47:
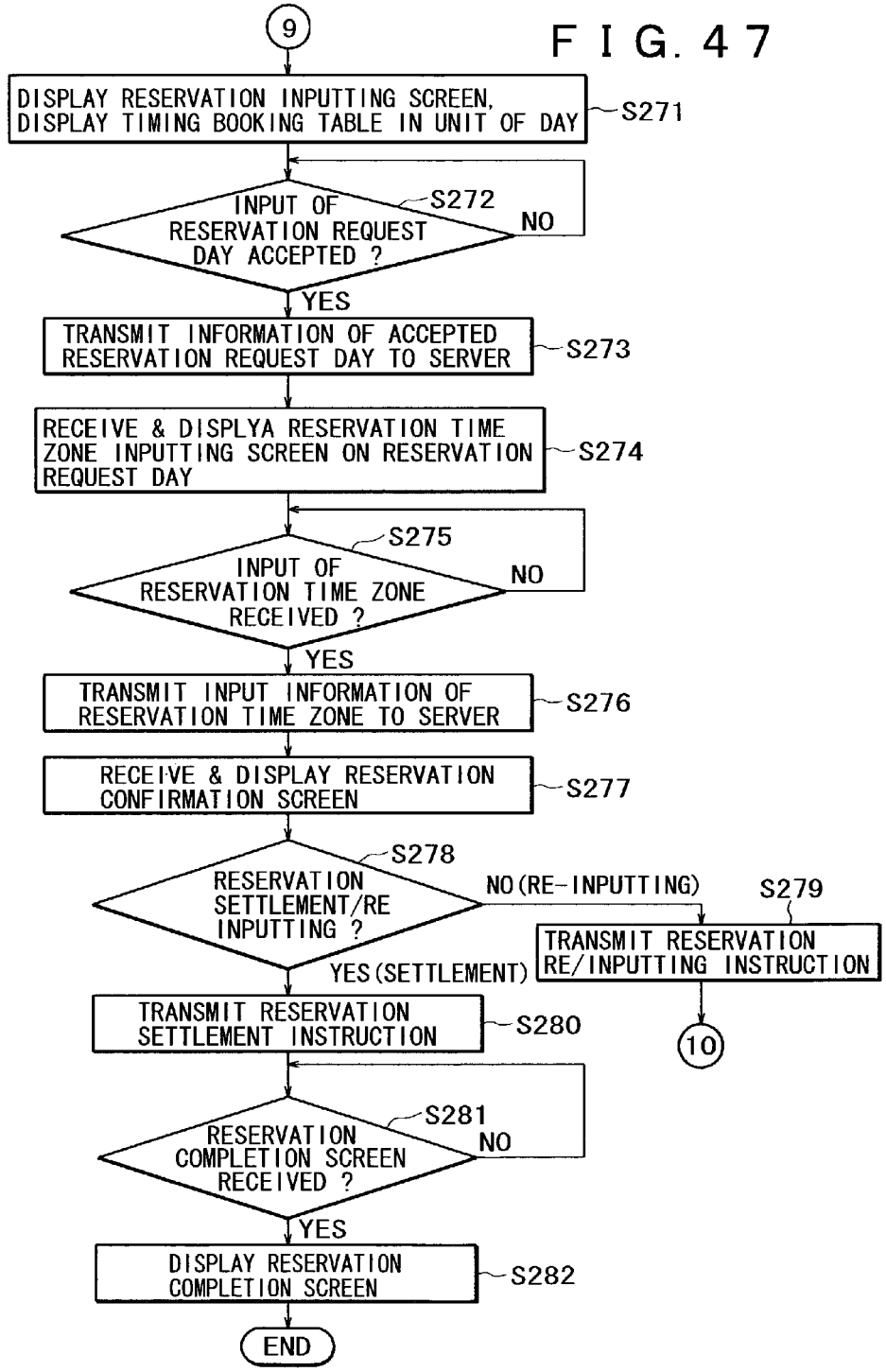
Figure 48:
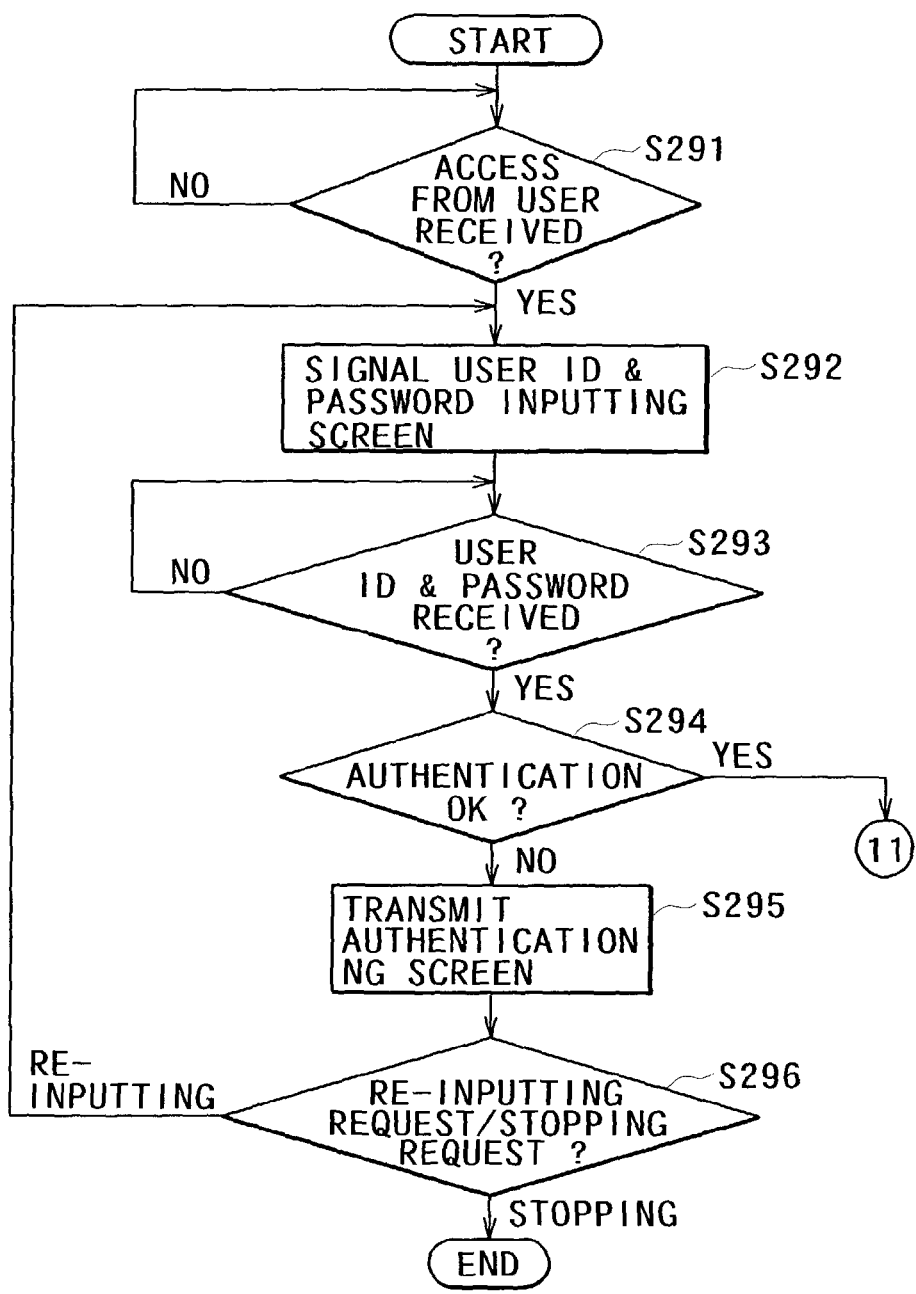
FIGS. 48 and 49 are flow charts illustrating an acceptance of a user reservation request for a charging object apparatus by the manager side in the fifth embodiment.
Figure 49:
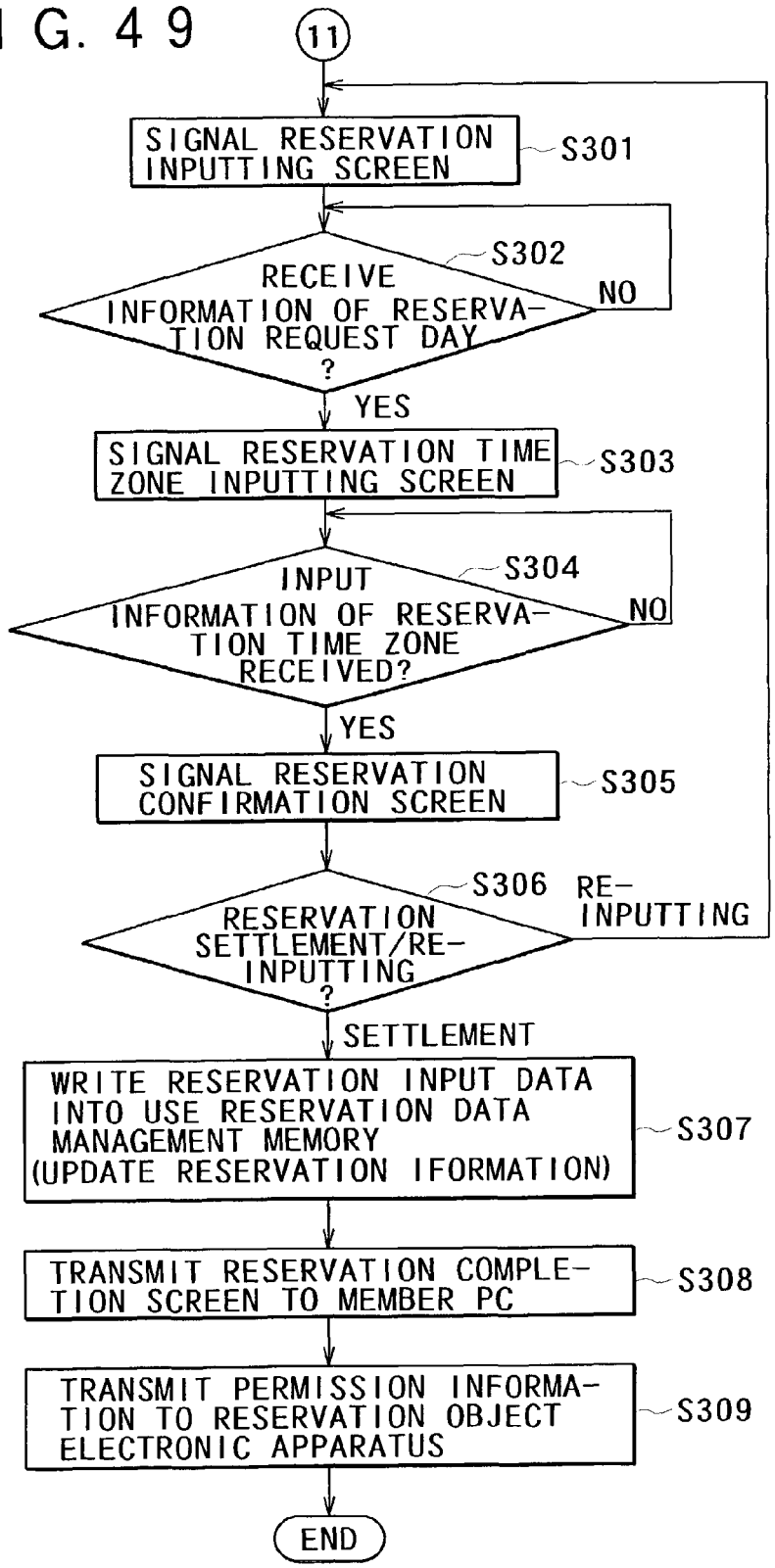

FIGS. 46 and 47 illustrate a use reservation request processing operation of the personal computer of a member. Meanwhile, FIGS. 48 and 49 illustrate a use reservation request acceptance process of the use reservation management system 511. Further, FIGS. 50 and 51 show different examples of an input screen display displayed on the screen of the personal computer when a use reservation request is issued.

Processing of the Personal Computer of a Member

Processing at processing steps S251 to S256 of FIG. 46 from between FIGS. 46 and 47 which illustrate the use reservation request processing operation of the personal computer is quite the same as that at steps S1 to S6 of FIG. 5 in the first embodiment, respectively, and processing at steps S257 to S261 of FIG. 6 is quite the same as that at steps S11 and S20 to S23 of FIG. 6 in the first embodiment, respectively.

It is to be noted, however, that, in the fifth embodiment, the use reservation management system 511 of the time charge management company 51 recognizes, in the membership authentication, to which one of the groups a member who has issued a use reservation request belongs and processes the reservation request as a use reservation request with regard to the recognized group.

In the fifth embodiment, when the membership authentication results in success and the reservation inputting screen is received, then the reservation inputting screen is displayed as seen in FIG. 47 (step S271). On the reservation inputting screen, though not illustrated in the drawings, a designation input of a month in which the date for which it is desired to reserve the use is accepted. If a designation of a month in which the date for which the user desires to reserve the use is included is inputted, then a time booking table in a unit of a day in the designated month regarding the group to which the member belongs is displayed as seen in FIG. 50.

In the table of FIG. 50, each of numerals included in a horizontal row on the upper side represents a day of the month, and alphabetical letters A, B, C, D and E in a vertical column on the left side represents the members A, B, C, D and E, respectively. A mark "○" applied to any day represents that the day is reserved as a preferential use day of a member corresponding to the row of the mark. If a member reserves a certain day first, then the day is determined as a preferential use day of the member.

However, since each member does not always reserve the full 24 hours of a preferential use day thereof as its use time zone, even if a day is a preferential use day of some member, another member can reserve a free time zone of the day.

Thus, a member may designate a free day or one of preferential use days of another member or other members in the time booking table shown in FIG. 50 as a reservation request day. If the personal computer accepts a designation input of a reservation request day by the member (step S272), then it sends the information of the reservation request day by the designation input to the use reservation management system 511 as a Web server (step S273).

Consequently, the use reservation management system 511 discriminates whether or not the designated reservation request day is a preferential use day as hereinafter described. If the designated reservation request day is a preferential use day, then the use reservation management system 511 transmits such a reservation time zone inputting screen as shown in FIG. 51.

Referring to FIG. 51, an open circle "○" indicates a reserved time zone of a member having the priority use right while a black circle "●" indicates a reserved time zone of any other member. It is to be noted that a reserved time zone can be designated not in a unit of one hour but in a unit of one minute, and if an operator (member) clicks an open circle or a black circle or passes a cursor through an open circle or a black circle, then a particular hour and minute at the place is displayed as seen from a balloon 64 in FIG. 51.

On the other hand, if the designated reservation request day is not a preferential use day, then the use reservation management system 511 transmits an inputting screen which is the same as the reservation time zone inputting screen shown in FIG. 51 but on which no reservation is indicated for all time zones of the designated reservation request day.

The personal computer thus receives one of the two reservation time zone inputting screens described above depending upon whether the reservation request day designated by the member is a preferential use day and displays the received reservation time zone inputting screen (step S274). Then, the personal computer waits for inputting of a reservation time zone from the member (step S275). If the personal computer confirms an input of a reservation time zone, then it transmits the input information of the reservation time zone to the use reservation management system 511 (step S276). It is to be noted that, on the reservation time zone inputting screen, not only reservation inputting of a new use time zone but also alteration or cancellation of a formerly reserved item can be performed.

When the use reservation management system 511 receives the input information of the reservation time zone, it sends a reservation confirmation screen for urging for confirmation of the information to the personal computer of the member. Therefore, the personal computer displays the reservation confirmation screen on the display unit thereof (step S277).

The reservation confirmation screen includes a display of a correction button for performing inputting again and a confirmation button for indicating that the inputted item may be settled. The member will confirm the contents inputted by the user itself on the reservation confirmation screen, and if the member wants to settle the inputted contents, then the member will operate to depress the confirmation button, but if the member wants to perform re-inputting in order to perform correction or the like, then the member will operate to depress the correction button.

The personal computer checks an operation input of the confirmation button or the correction button by the user to discriminate whether the inputted instruction is a reservation contents settlement instruction or a re-inputting instruction (step S278). Then, if the personal computer discriminates that the inputted instruction is a re-inputting instruction, then it transmits a reservation re-inputting request to the reservation management system (step S279). Then, the processing returns to step S257, at which the personal computer waits for reception of a reservation inputting screen.

On the other hand, if the personal computer discriminates at step S278 that the inputted instruction is a reservation contents settlement instruction, then it transmits a reservation settlement instruction to the use reservation management system 511 (step S280). Then, the personal computer waits for reception of a reservation completion screen from the use reservation management system 511 (step S281). If the personal computer receives a reservation completion screen, then it displays the reservation completion screen on the display unit thereof (step S282), thereby ending the reservation inputting processing routine.

Processing by the Reservation Management System (Web Server) 511

Subsequently, processing operation of the apparatus providing source 2 which serves as a Web server upon use reservation inputting is described with reference to FIGS. 48 and 49.

The membership authentication processing at steps S291 to 296 of FIG. 48 is quite the same as the user (membership) authentication processing at steps S31 to S36 of FIG. 7 in the first embodiment, respectively, and therefore, overlapping description of it is omitted herein to avoid redundancy.

In the fifth embodiment, if it is confirmed at step S294 that the membership authentication results in success, then the use reservation management system 511 signals a reservation inputting screen which includes a time booking table in a unit of a day in a designated month described hereinabove with reference to FIG. 50 (step S301 of FIG. 49). In response to the reservation inputting screen, information of a reservation request day is sent from the personal computer of the member to the use reservation management system 511. Therefore, the use reservation management system 511 waits for reception of such information of the reservation request day (step S302).

Then, after the use reservation management system 511 confirms reception of information of the reservation request day, then it sends a reservation time zone inputting screen to the personal computer of the member (step S303). The reservation time zone inputting screen sent to the personal computer of the member in this instance differs depending upon whether a preferential use day is selected or a free day is selected as the reservation request day as described hereinabove.

On the reservation time zone inputting screen, the member will input a reservation time zone as described hereinabove, and therefore, the use reservation management system 511 waits for reception of input information of the reservation time zone (step S304). Then, after the use reservation management system 511 receives input information of the reservation time zone from the member, it signals a reservation confirmation screen to the personal computer of the user (step S305).

In response to the reservation confirmation screen, either a reservation confirmation instruction or a re-inputting instruction is sent from the personal computer of the member to the use reservation management system 511. Therefore, the use reservation management system 511 discriminates which one of the instructions is received (step S306). If the received instruction is the re-inputting instruction, then the processing returns to step S301, at which the use reservation management system 511 signals the reservation inputting screen, whereafter the processing at the steps following step S301 is repeated.

On the other hand, if the received instruction is the reservation confirmation instruction at step S306, then the use reservation management system 511 writes the reservation input information into a use reservation data management memory provided therein to update the reservation information (step S307). Then, the use reservation management system 511 transmits a reservation completion screen to the personal computer of the member (step S308). Thereafter, the use reservation management system 511 transfers permission information of use at the reserved use time by the reserving member to the reservation object electronic apparatus of the group to which the member belongs (step S309).

The transfer of the permission information to the electronic apparatus at step S309 need not necessarily be performed immediately after the reservation completion screen is signaled, but may be performed before the electronic apparatus is passed to the member who has reserved it for the use. Further, the transfer described need not necessarily be performed in the processing routine illustrated in FIGS. 48 and 49, but may be performed later at a suitable point of time. Further, for the transfer, various methods can be used such as, for example, a method which uses a communication interface or another method which uses an external storage medium.

As described above, in the fifth embodiment, since reservation setting can be performed in a unit of a day and besides a use time zone of each reservation day can be designated such that, even if some reservation is present already for a certain day, a free time zone of the day is released to the other users so that it can be reserved, it is anticipated that the use efficiency of an electronic apparatus as a charging object apparatus is raised.

[Execution of Use and Use Time Measurement Process of an Electronic Apparatus]

In the fifth embodiment, an electronic apparatus which has a plurality of functions like, for example, a recording and/or reproduction apparatus which has a reproduction function, a recording function, a fast-forward function, a fast-rewind function, a pause function and a stop function may be used as a charging object product. Further, a use time period of each function is not used as it is as a use time period (chargeable time period) of an object of charging, but it is multiplied by a one of weighting coefficients set in advance for the individual functions to calculate a chargeable time period.

The weighting coefficients for the functions are set such that, for example, a high weighting coefficient is set for a function which participates directly in a substantial use condition while a low weighting coefficient is set for another function which does not directly participate in a substantial use condition. Further, such a weighting method that a comparatively high weighting coefficient is applied, for example, to a function for which a comparatively high cost for development has been required or a like weighting method may be used.

For example, for a video apparatus or an audio apparatus, a reproduction button (reproduction function) is used as a reference function, and the weighting coefficient for it is set to "1". Further, other weighting coefficients are set in advance such that the weighting coefficient for a stop button (stopping function) or a rewinding button (fast-rewind function) is "0"; the weighting coefficient for a fast feeding button (fast-forward function) is "0.5"; the weighting coefficient for a recording button (recording function) is "1.2"; and the weighting coefficient for an effect button (effect function) is "2".

Further, in the fifth embodiment, the weighting coefficient when a chargeable time period is calculated from a use time period is varied depending upon the type of the electronic apparatus. In particular, different weighting coefficients are set for different types of electronic apparatus such that, for example, where the weighting coefficient for an apparatus for music is set to "1", the weighting coefficient for a video apparatus is set to "1.5" taking it into consideration that the apparatus involves reproduction also of audio information while the weighting coefficient for an apparatus for characters is set to "0.8" because the apparatus has comparatively simple functions.

It is to be noted that the weighting coefficient may be further varied depending upon media such as a CD (Compact Disc), an MD (Mini Disc), a DVD (Digital Video Disc), a television set and a radio set.

In the foregoing description of the fifth embodiment, both of weighting based on the type of an electronic apparatus and weighting based on the function is used. The weighting for each function is based on a load factor P of the CPU of a microcomputer section 71 which is hereinafter described. The load factor P of the CPU is a rate of a time period within which the CPU continuously operates from within a time period which includes a sleep time period and has a value corresponding to each function.

Figure 52:
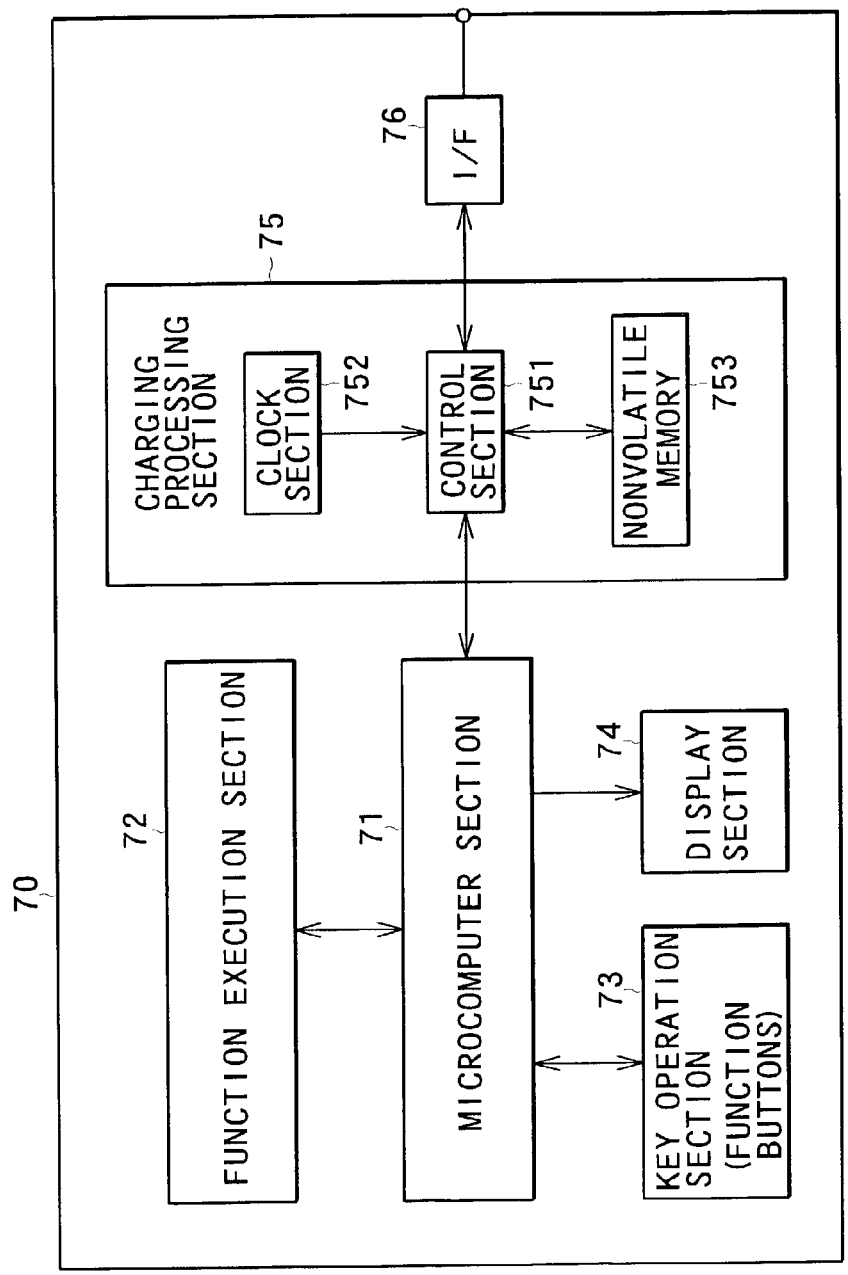
FIG. 52 is a block diagram showing an example of a configuration of an electronic apparatus used in the fifth embodiment.

FIG. 52 shows an example of a configuration of an electronic apparatus 70 used in the charging system based on a use time period in the fifth embodiment. Referring to FIG. 52, the electronic apparatus 70 shown includes a microcomputer section 71 which serves as a control section for controlling the entire electronic apparatus 70, a function execution section 72 including medium drives, a digital signal processing section, an analog signal processing section and so forth, a key operation section 73 including a plurality of function buttons, a display section 74 which may be, for example, a liquid crystal display unit, a charging processing section 75, and an interface section 76 for interfacing with a personal computer.

The charging processing section 75 includes a control section 751 formed from a microcomputer, a clock section 752 for measuring the time, and a nonvolatile memory 753. The charging processing section 75 may be formed as a one-chip IC which has the nonvolatile memory 753 externally connected thereto or another one-chip IC which includes also the nonvolatile memory 753. A clock signal to be used for time measurement of the clock section 752 is corrected to an accurate clock signal by the time charge management company 51 before it is passed to and used by a user so that time measurement may normally be performed correctly.

The microcomputer section 71 discriminates, when an inputting operation for the key operation section 73 is performed by a user, which one of the function buttons is operated, and controls the function execution section 72 so that a function based on a result of the discrimination may be executed. Further, the microcomputer section 71 sends information of the operated function button to the control section 751 of the charging processing section 75.

The control section 751 of the charging processing section 75 stores permission information from the use reservation management system 511 received through the interface section 76 into the nonvolatile memory 753. Further, the control section 751 of the charging processing section 75 recognizes from the information of the function button from the microcomputer section 71 that a particular function corresponding to the function button has been selected and is being executed. Furthermore, the control section 751 refers to time information from the clock section 752 to measure a time period of execution of the function, that is, the use time period of the function, calculates a chargeable time period in such a manner as described above from the measured use time period and stores the calculated chargeable time period into the nonvolatile memory 753.

Further, the control section 751 of the charging processing section 75 reads out the permission information stored in the nonvolatile memory 753 in response to an instruction from the microcomputer section 71 and passes the permission information to the microcomputer section 71 so that the microcomputer section 71 may perform authentication of the reserving member and authentication of the reservation use day. Furthermore, the control section 751 of the charging processing section 75 reads out, in response to an instruction from the microcomputer section 71, the information of the use time period stored in the nonvolatile memory 753 and transmits the information to the charging management system of the time charge management company.

Figure 53:
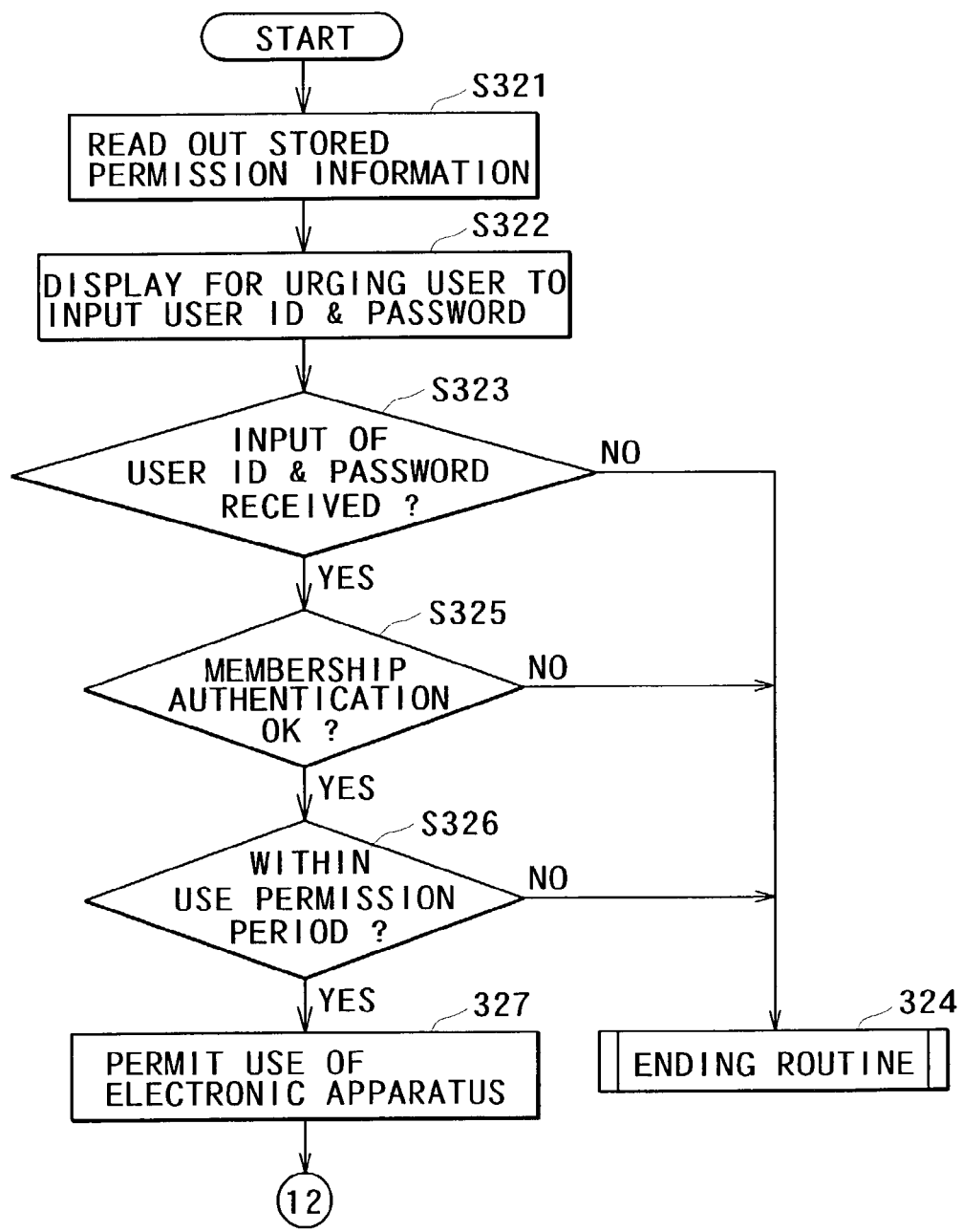
FIGS. 53 and 54 are flow charts illustrating a flow of process by the electronic apparatus used in the fifth embodiment.
Figure 54:
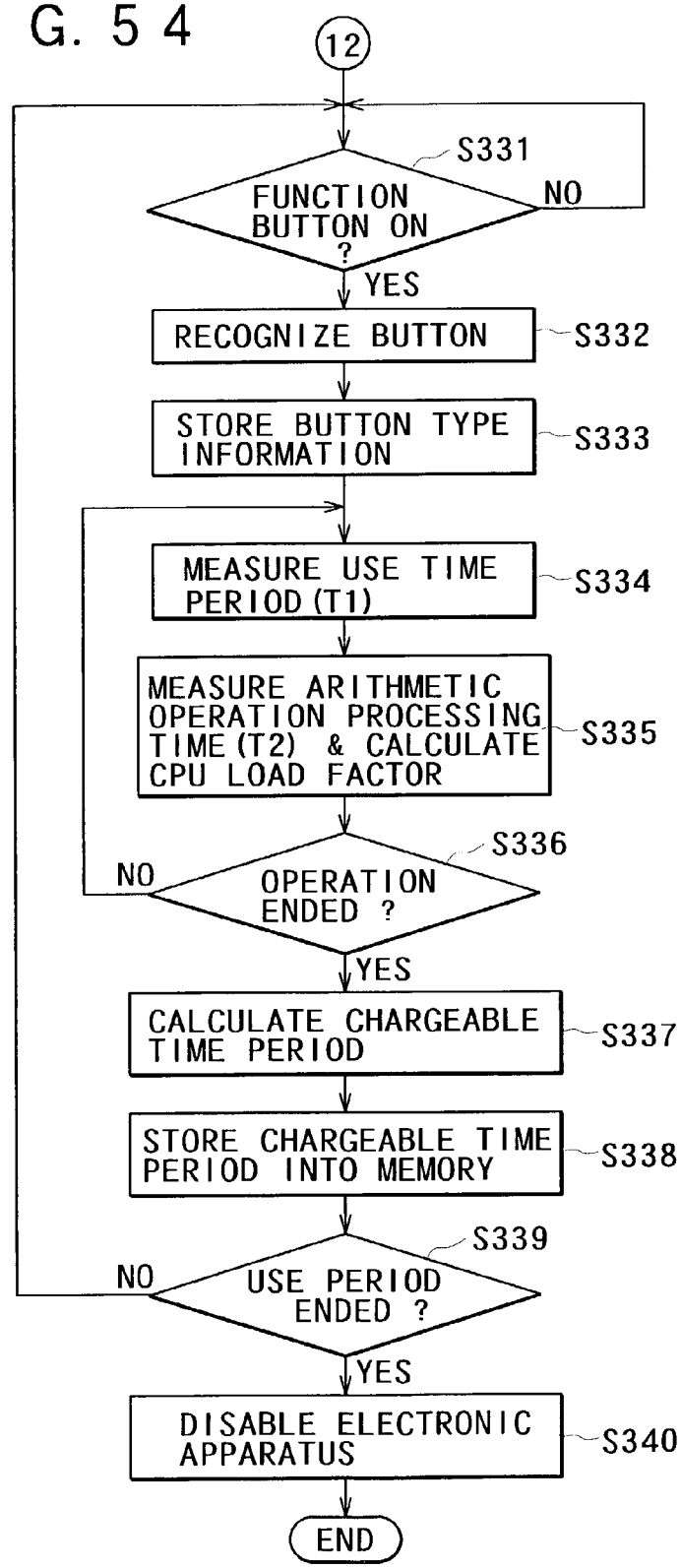

FIGS. 53 and 54 illustrate a process of calculation and storage of a chargeable time period for each function by the electronic apparatus 70. The processing steps of the process are executed by the CPU provided in the microcomputer section 71.

When the power supply to the electronic apparatus 70 is made available, the microcomputer section 71 starts the processing of FIG. 53. First, the microcomputer section 71 of the electronic apparatus 70 reads out permission information written in the nonvolatile memory 753 of the charging processing section 75 (step S321) and displays an inputting screen for a user ID and a password on the display section 74 to urge the user to input its user ID and password (step S322). Then, the electronic apparatus 70 waits for inputting of a user ID and a password by the user (step S323).

If the electronic apparatus 70 discriminates no inputting of a user ID and a password for more than a predetermined time period, then it executes an ending routine to switch off the power supply to the electronic apparatus 70 (step S324).

On the other hand, if the electronic apparatus 70 confirms inputting of a user ID and a password at step S323, then it collates them with a user ID and a password included in the permission information read out from the nonvolatile memory 753 of the charging processing section 75 to perform an authentication check of whether or not the user is the reserving user (step S325). If the authentication reveals that the user is not the reserving user, then the electronic apparatus 70 performs the ending routine to switch off the power supply to the electronic apparatus 70 (step S324).

On the other hand, if the authentication at step S325 proves that the user is the reserving user, then the electronic apparatus 70 compares the information of the reservation use period included in the permission information with the day and hour at present of the clock section 36 to discriminate whether or not the present day and hour falls within the reserved use permission period (step S326). If the date and hour at present does not fall within the reserved use permission period, then the electronic apparatus 70 performs the ending routine to switch off the power supply to the electronic apparatus 70 (step S324).

On the other hand, if the date and hour at present falls within the reserved use permission period at step S326, then the control section 751 sends a control signal for turning on the function of the hardware section 32 to the hardware section 32 to permit the use of the electronic apparatus 3 by the user (step S327).

Then, the microcomputer section 71 discriminates whether or not a function button is operated and turned on (step S331 of FIG. 54). If the microcomputer section 71 discriminates that a function button is turned on, then it recognizes what the function button turned on is (step S332). The processes described above are executed by the microcomputer section 71.

Information of the recognized function button is sent from the microcomputer section 71 to the control section 751 of the charging processing section 75. Consequently, the control section 751 recognizes what the function button turned on is, and stores button type information representing the recognized function button into the nonvolatile memory 753 (step S333).

Further, the control section 751 measures a time period of execution of the function tuned on, that is, a use time period T1 of the turned on function, using information of the clock section 752 (step S334). The use time period T1 includes a sleep time period within which the CPU of the microcomputer section 71 is in a sleeping state. Then, the control section 751 measures an arithmetic operation processing time period which is a time period within which the CPU of the microcomputer section 71 continuously operates, that is, a time period T2 except the sleeping time period, and calculates a load factor P of the CPU of the microcomputer section 71 (step S335).

For the calculation of the load factor P, the following expression:

$$P=(T2/T1)\times K$$

where K is a coefficient of variation which depends upon a video apparatus, an audio apparatus, a television receiver, a medium type and so forth. Since the coefficient K depends upon the type of the apparatus, it can be referred to as a type-dependent coefficient of the apparatus.

The operations at step S334 for the measurement of the use time period T1 and step S335 for the measurement of the time period T2 and the load factor P are repeated until the operation of the function being executed comes to an end (step S336). It is to be noted that, although, in the foregoing description, the load factor P is arithmetically operated repetitively during execution of the function, the load factor P may otherwise be arithmetically operated at a point of time when the execution of the function comes to an end.

Then, when the control section 751 of the charging processing section 75 discriminates that the operation of the function being executed comes to an end, it calculates a chargeable time period t using the following calculation expression (step S337):

$$\text{chargeable time period } t = \text{use time period } T1 \times \text{CPU load factor } P$$

Then, the control section 751 stores the information of the chargeable time period t of a result of the calculation into the nonvolatile memory 753 (step S338). Here, since the chargeable time period t is $t=T2\times K$ from the expression above, only the arithmetic operation processing time period T2 may be measured without measuring the use time period T1.

Thereafter, the microcomputer section 71 issues an inquiry to the control section 751 of the charging processing section 75 to discriminate whether or not the reserved use time period comes to an end (step S339). If the reserved use time period does not come to an end, then the processing returns to step S331, at which the microcomputer section 71 waits for next turning on of a function button. On the other hand, if the microcomputer section 71 discriminates that the reserved use time period comes to an end, then it switches off the power supply to the electronic apparatus 70 (step S340), thereby ending the present processing routine.

It is to be noted that, while, in the foregoing description, no description is given of a case wherein the user switches off the power supply to the electronic apparatus 70 within the reserved use time period, the user can naturally switch off the power supply at any time within the reserved use time period. In this instance, information of a substantial use time period of the electronic apparatus 70, until the power supply is switched off, is successively accumulated on the use time period up to the point of time at which the power supply was switched off last and is stored into the nonvolatile memory 753 of the charging processing section 75.

It is to be noted that, in the case of the example described above, once the power supply is switched off, membership authentication and authentication of a use time period are performed again when the power supply is switched on subsequently. However, such membership authentication and authentication of a use time period as described above may be performed otherwise only when the power supply is switched on first after the electronic apparatus is passed to the user.

Figure 55:
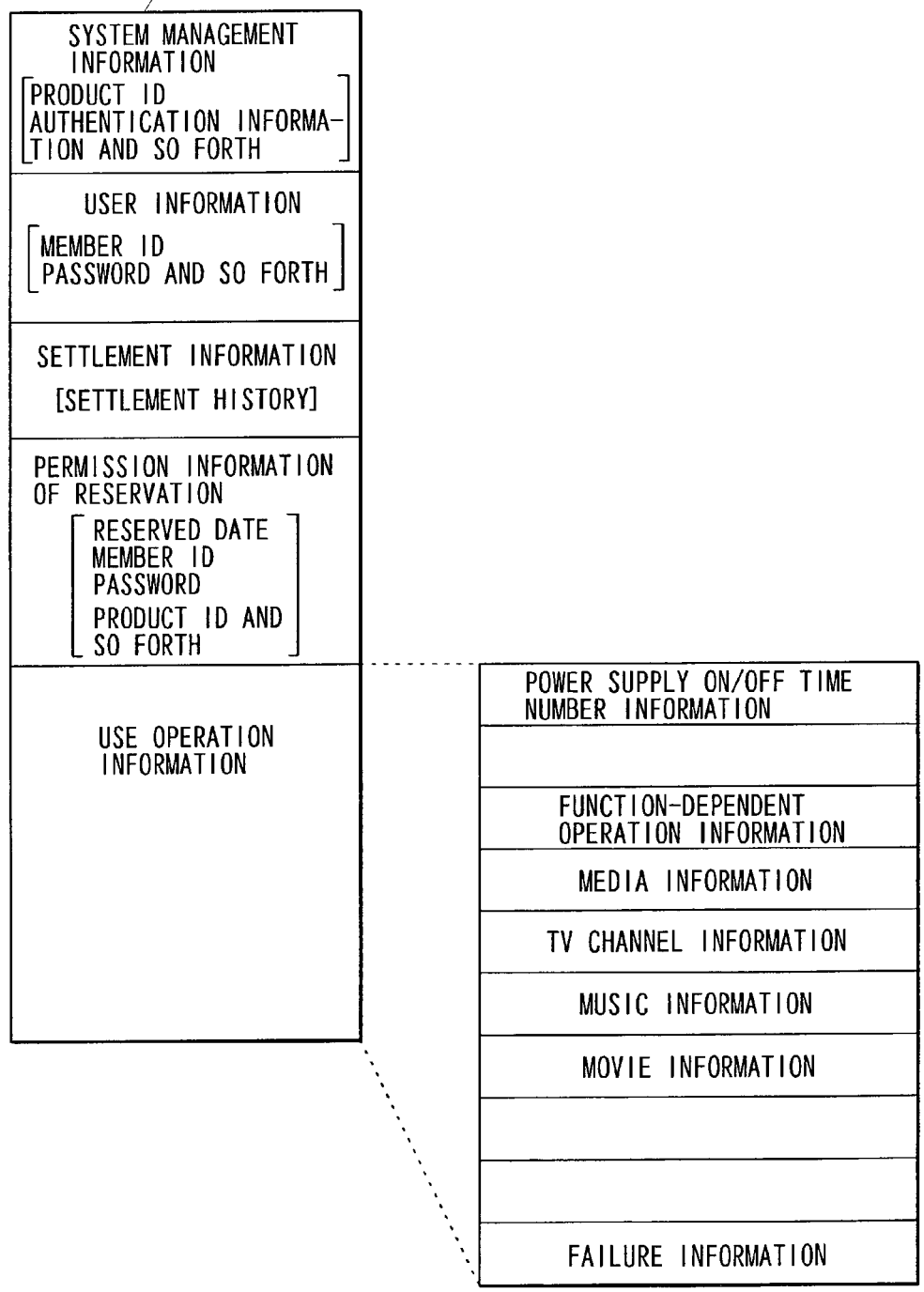
FIG. 55 is a view illustrating stored contents of a memory provided in the electronic apparatus used in the fifth embodiment.

FIG. 55 illustrates an example of stored contents of the nonvolatile memory 753 of the charging processing section 75. Referring to FIG. 55, data are classified into system management information, user information, settlement information, reservation permission information and operation information and stored at predetermined addresses in the nonvolatile memory 753.

As the system management information, product IDs, use time limitation setting information of a product where, for example, the use time of the product is limited based on a contract or the like, authentication information and so forth are registered. As the user information, member IDs and personal information such as the name, age, bank account or credit number and so forth of each user are registered. As the settlement information, the number of times of settlement, location and date information and so forth are recorded.

As the reservation permission information, reserved days and hours, member IDs, passwords, product IDs and so forth are stored.

As the operation information, information of the number of times of switching on and off of the power supply, function-dependent operation information including information of function-dependent charging periods of time, medium information of a CD, an MD or a DVD, television (TV) channel information including information of for what time period what channel is enjoyed, music information including information of what tune of what artist is reproduced, movie information including information of the title of a movie enjoyed, failure information and so forth are stored. Further, where the electronic apparatus 70 has a downloading function, also download time information and so forth are stored.

The operation information is sent to the time charge management company 51, by which a charge is calculated in accordance with conditions of a contrast based on the information and is imposed on the member.

The electronic apparatus 70 in the fifth embodiment is connected to a personal computer 80 through the interface section 76 as seen in FIG. 56. The electronic apparatus 70 receives a data transfer request from the personal computer 80, reads out the product ID information, member ID information and operation information stored in the memory 753 thereof and transfers the read out information to a storage section such as a hard disk of the personal computer 80.

The personal computer 80 is connected to a charging management system 512 of the time charge management company 51 over a digital communication network 81 such as the Internet. When a settlement time is approaching, the charging management system 512 notifies the personal computer 80 that the settlement time is approaching using an electronic mail or the like to urge the personal computer 80 to transfer the operation information and so forth of the electronic apparatus 70 to the charging management system 512. To a user with whom an electronic mail is not available, an ordinary postal system is used to send a mail to notify the user that the settlement time is approaching.

Figure 57A:
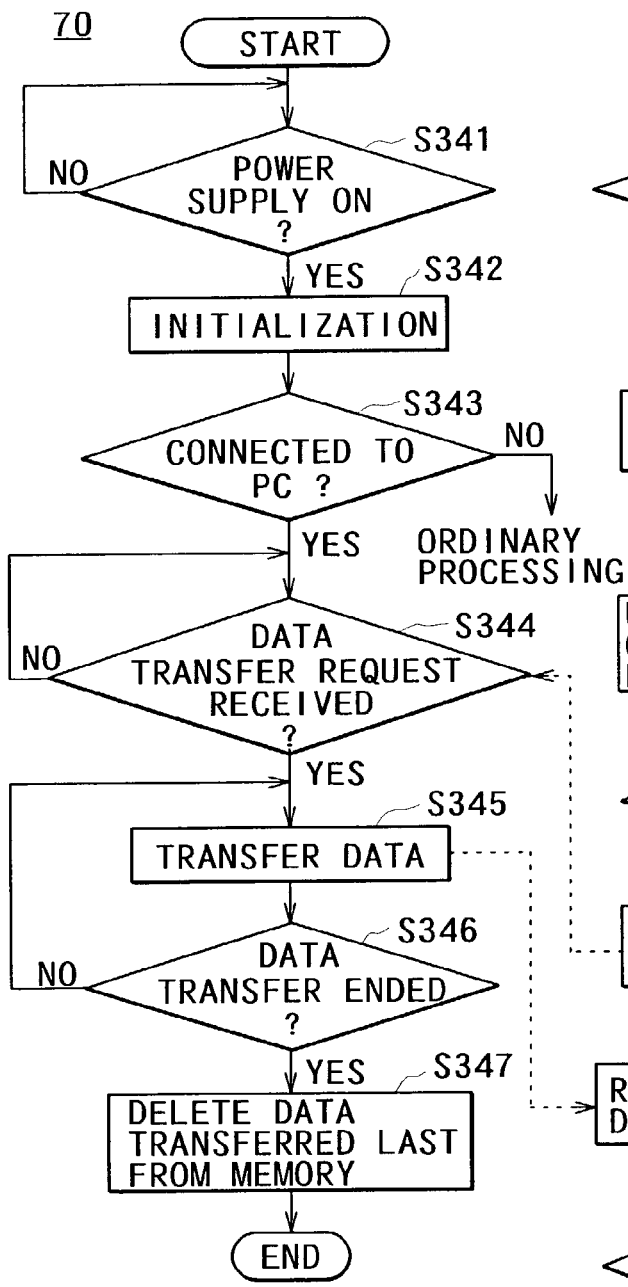
FIGS. 57A and 57B are flow charts illustrating data transfer processes involved in the settlement process in the charging system of the fifth embodiment and performed by the electronic apparatus and a personal computer of the user side, respectively.
Figure 57B:
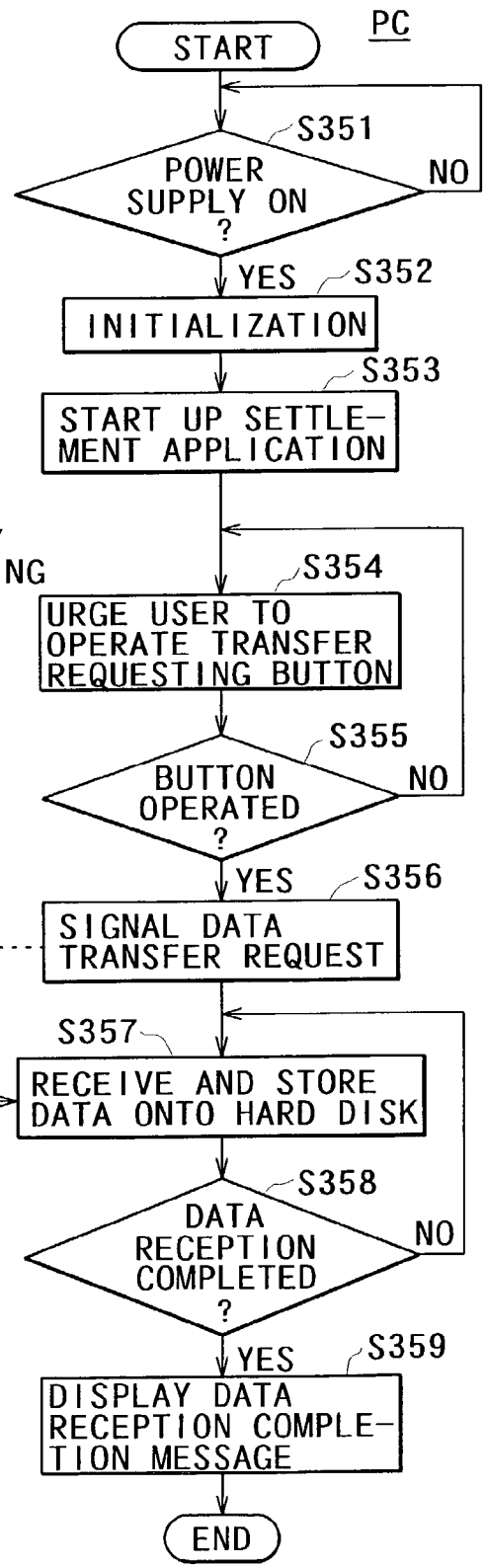

In response to the notification, the user connects the electronic apparatus 70 to the personal computer 80 and performs operation for transferring the data. FIGS. 57A and 57B illustrate flows of the transferring operation, and particularly FIG. 57A illustrates processing by the electronic apparatus 70 while FIG. 57B illustrates processing by the personal computer 80.

Referring first to FIG. 57A, when the power supply to the electronic apparatus 70 is switched on (step S341), the electronic apparatus 70 is initialized (step S342). Then, the electronic apparatus 70 discriminates whether or not it is connected to the personal computer 80 (step S343). If the electronic apparatus 70 discriminates that it is connected to the personal computer 80, then it waits for arrival of a data transfer request from the personal computer 80 (step S344).

Then, when a data transfer request from the personal computer 80 is received, the electronic apparatus 70 transfers the operation information and the information of product IDs and member IDs stored in the memory 753 (step S345). After the transfer of the data comes to an end (step S346), the electronic apparatus 70 deletes the data transferred upon the last settlement from the memory (step S347), thereby ending the processing.

The reason why the data in the present operation cycle are left stored also after the transfer thereof whereas the data in the last operation cycle are erased is that, while the memory capacity is taken into consideration, when the data transfer results in failure, for example, because of a trouble on a transmission line, data transfer may be required once again in response to a request from the charging management system 512 side and that, since a request for data transfer once again from the charging management system 512 has not been received before the data transfer in the present operation cycle, there is no trouble even if the last data are erased.

It is to be noted that, where the memory capacity is sufficiently great, not the last data but only the second or third last data may be left stored so that the data may be available for a time period as long as possible.

Referring now to FIG. 57b, on the personal computer 80, when the power supply is switched on (step S351), initialization is performed (step S352). Then, the personal computer 80 starts up a settlement application in response to an instruction of the user (step S353). Then, the personal computer 80 signals a message for urging the user to operate a transfer requesting button icon (step S354). If the user operates the transfer requesting button in response to the message (step S355), then the personal computer 80 signals a data transfer request to the electronic apparatus 70 (step S356).

In response to the data transfer request, data of operation information and so forth are transferred from the electronic apparatus 70 to the personal computer 80. The personal computer 80 thus receives and stores the data onto the hard disk (step S357). Then, when the personal computer 80 confirms completion of reception of the data from the electronic apparatus 70 (step S358), it displays a data reception completion message (step S359), thereby ending the processing routine.

Figure 58:
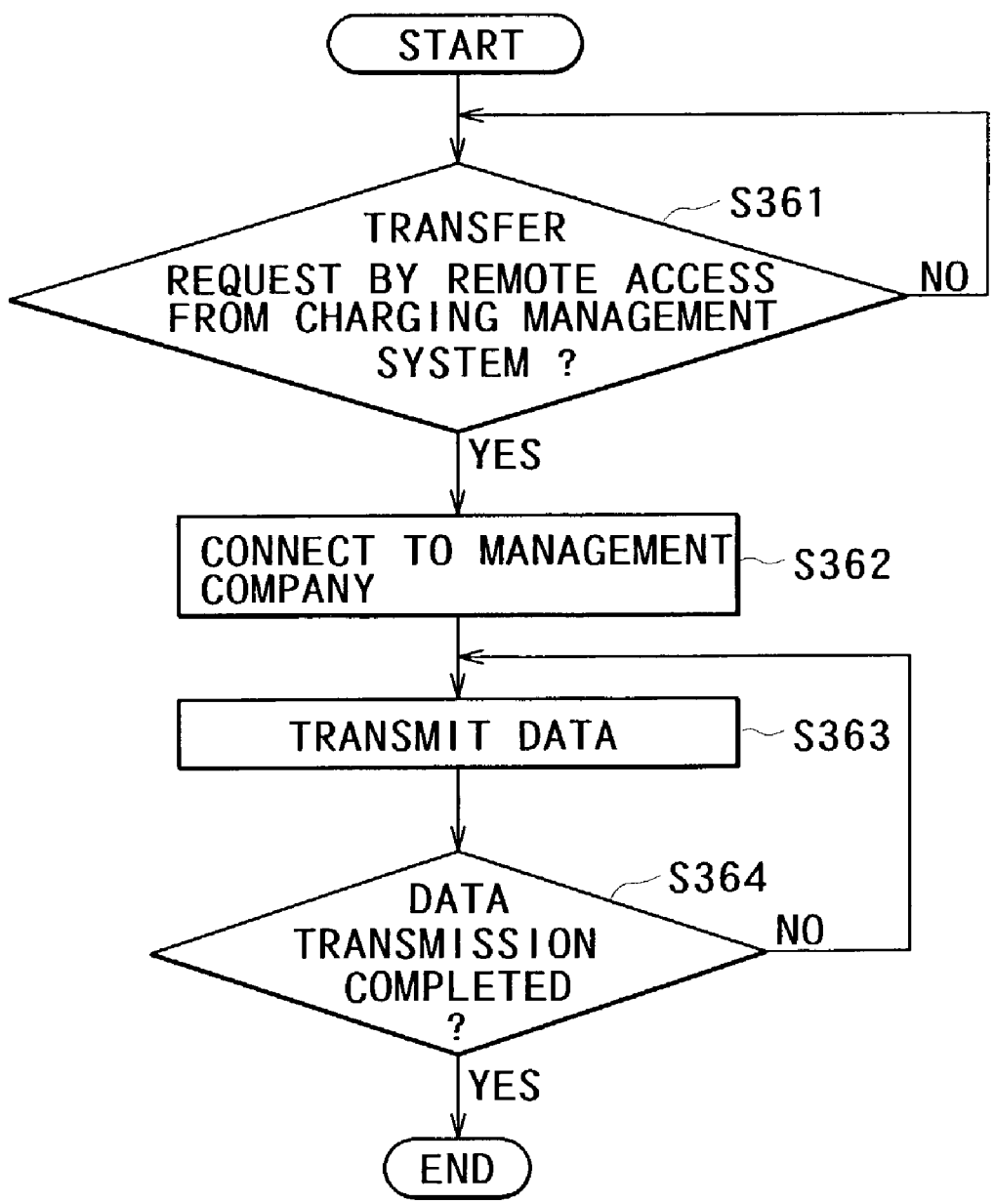
FIG. 58 is a flow chart illustrating a data transfer processing involved in the settlement process in the charging system of the fifth embodiment and performed by the personal computer.

Referring now to FIG. 58, if the personal computer 80 receives a transfer request by remote accessing from the charging management system 512 of the time charge management company 51 (step S361), then it automatically enters a transfer mode and establishes a connection to the charging management system 512 of the time charge management company 51 (step S362). Then, the personal computer 80 transfers data of operation information and so forth stored on the hard disk thereof to the charging management system 512 (step S363). Then, when the personal computer 80 confirms completion of the data transfer (step S364), it ends the automatic transfer mode.

Figure 59:
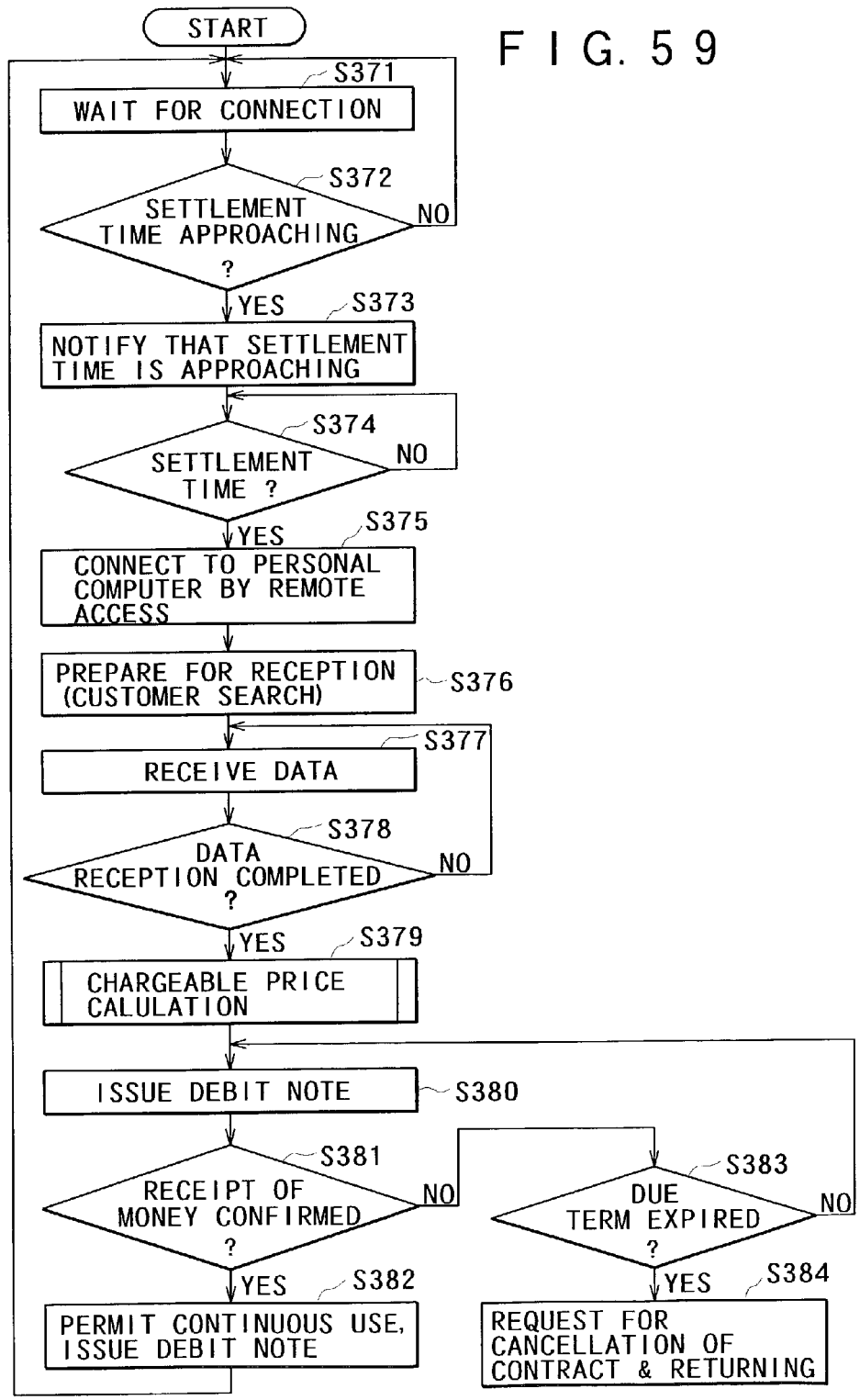
FIG. 59 is a flow chart illustrating a settlement process in the charging system of the fifth embodiment and performed by the time charge management company side.

Operation of the charging management system 512 of the time charge management company 51 in this instance is illustrated in FIG. 59.

Referring to FIG. 59, the charging management system 512 is in a standby state for connection to an electronic apparatus until a settlement time approaches (steps S371 and S372). Then, when the charging management system 512 detects that the settlement time approaches (step S372), it notifies the user side of this by an electronic mail or the like (step S373).

Then, when the settlement time comes (step S374), the charging management system 512 establishes a connection to the personal computer 80 by remote accessing (step S375) and makes preparations for reception of data (step S376). While the preparations for reception are proceeding, the personal computer 80 performs a customer research.

Thus, data are transferred from the personal computer 80 as described above. Therefore, the charging management system 512 receives all of the data (steps S377 and S378). After the reception of the data is completed, the charging management system 512 multiplies chargeable time periods included in the function-dependent operation information by corresponding time unit prices to calculate a chargeable price which is a price for the use time period at present (step S379).

After the calculation of the chargeable price comes to an end, the charging management system 512 issues a debit note to the user (member) (step S380). Also the debit note may be issued by an electronic mail or ordinary mail. The user receiving the debit note will pay the price through a store such as a convenience store as seen in FIG. 56. Alternatively, the user may pay the price by automatic transfer from a bank account or an account of a credit company.

Then, the charging management system 512 confirms receipt of money from the user (step S381). If the receipt of money is confirmed, then the charging management system 512 permits continued use of the electronic apparatus and issues a quittance (step S382). On the other hand, if the charging management system 512 fails in the confirmation of the receipt of money from the user, then it waits for the reception till the due date (step S383). Then, if the due date expires, then the charging management system 512 issues a request for cancellation of the use contract and returning of the electronic apparatus. For example, the charging management system 512 signals a returning requesting signal to the personal computer 80 (step S384).

Figure 60:
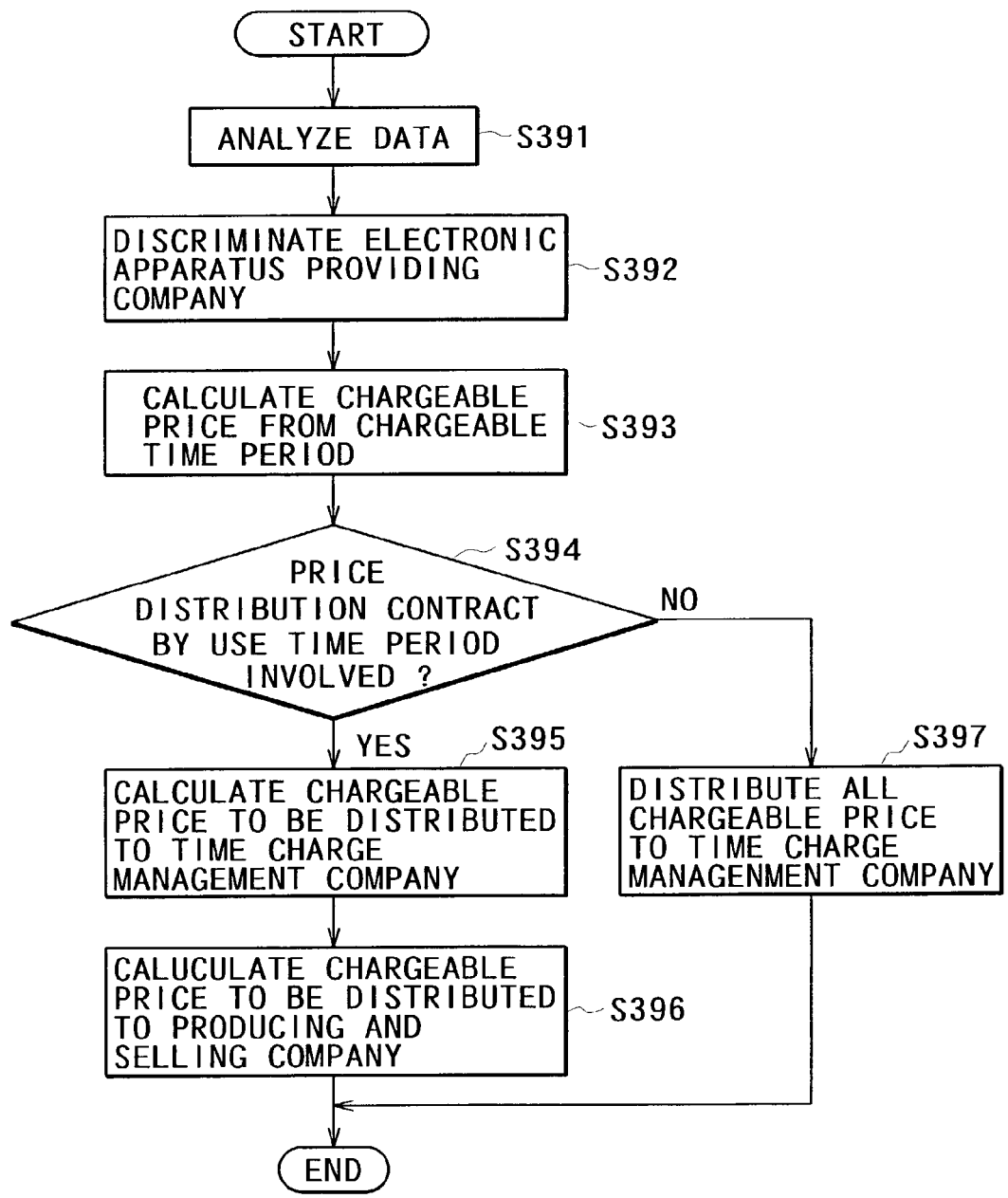
FIG. 60 is a flow chart illustrating detailed processing at step S379 of FIG. 59.

FIG. 60 illustrates a chargeable price calculation process at step S379 in the process of the charging management system 512 illustrated in FIG. 59. The chargeable price calculation process illustrated in FIG. 59 takes also contents of the contract concluded between the product manufacturing and selling company 52 and the time charge management company 51 into consideration.

A database 513 of the charging management system 512 of the time charge management company 51 stores not only customer information and operation information but also product information so that it can be recognized from a corresponding relationship between product IDs and the product manufacturing and selling company 52 what product has been produced by what product manufacturing and selling company. The database 513 also stores information of contract conditions regarding whether a contract regarding each of the product manufacturing and selling companies and its product is a contract only of sales or a contract which involves acceptance of distribution of a price based on a use time period (including a contract which involves only acceptance of distribution of a price based on a use time period).

Referring to FIG. 60, the charging management system 512 first analyzes reception data (step S391) and discriminates the product manufacturing and selling company 52 of the electronic apparatus 70 from the product ID and further discriminates the contract conditions of the product manufacturing and selling company 52 (step S392). Then, the charging management system 512 uses information of a chargeable time period in the data to calculate a chargeable price in such a manner as described hereinabove (step S393).

Then, the charging management system 512 discriminates, from the contract conditions discriminated at step S392, whether or not the contract regarding the product involves acceptance of distribution of a price based on a used time period (step S394). If the contract involves such acceptance of distribution of a price, then the charging management system 512 calculates an amount of money to be distributed to the time charge management company 51 from within the chargeable price determined at step S393 and stores the calculated amount of money into a dividend memory section of the charging management system 512 from within the memory provided in the charging management system 512 (step S395). Further, the charging management system 512 calculates an amount of money to be distributed to the product manufacturing and selling company 52 from within the chargeable price determined at step S393 and stores the calculated amount of money into the dividend memory section of the product manufacturing and selling company 52 (step S396).

If the charging management system 512 discriminates at step S394 that the contract regarding the product does not involve acceptance of distribution of a price based on a used time period, then it determines that all of the chargeable price determined is a dividend to the time charge management company 51 and stores the chargeable price into the dividend memory section of the time charge management company 51 (step S397).

Also in the case of the electronic apparatus 70 which by itself cannot communicate directly with the charging management system 512 but transfers data through the personal computer 80 as in the fifth embodiment, where the settlement term is a predetermined term such as every one month, the calendar function of the clock section 752 provided in the charging processing section 75 of the electronic apparatus 70 can be used to notify the user that a settlement date is approaching and urge the user to transfer data for the settlement process.

FIG. 61 illustrates a processing routine regarding a settlement time and data transfer process of the electronic apparatus 70 in the case just described. The processing routine is rendered operative by interruption after every fixed time period.

Referring to FIG. 61, after the processing routine is started up by interruption, the charging processing section 75 first discriminates whether a settlement time comes or is approaching (step S401). If the settlement time does not come, then it escapes from the processing routine. On the other hand, if the settlement time comes, then the charging processing section 75 requests the microcomputer section 71 to issue a message of arrival of the settlement time. The microcomputer section 71 displays the message of arrival of the settlement time on the display section 74 to notify the user (step S402) to urge the user to transfer data for the settlement process.

Then, the control section 751 discriminates whether or not the electronic apparatus 70 is connected to the personal computer 80 by the user in response to the message (step S403). If the electronic apparatus 70 is not connected to the personal computer 80, then the charging processing section 75 discriminates whether or not the settlement term has expired (step S405). If the charging processing section 75 discriminates that the settlement term has not expired, then it escapes from the processing routine immediately.

On the other hand, if it is discriminated at step S405 that the settlement term has expired, then the charging processing section 75 issues a request to the microcomputer section 71 to stop or restrict operation of the electronic apparatus 70. Consequently, the electronic apparatus 70 is placed into a disabled or restricted operation condition (step S406).

If it is discriminated at step S403 that the electronic apparatus 70 is connected to the personal computer 80, then the microcomputer section 71 discriminates whether or not the data transfer button is on (step S404). If the microcomputer section 71 discriminates that the data transfer button is not on, then the control section 751 discriminates whether or not the settlement term has expired (step S405). If it is discriminated that the settlement term has not expired, then it escapes from the processing routine immediately.

On the other hand, if the control section 751 discriminates that the settlement term has expired, then the charging processing section 75 issues a request to the microcomputer section 71 to stop or restrict operation of the electronic apparatus 70. Consequently, the electronic apparatus 70 is placed into a disabled or restricted operation condition (step S406).

On the other hand, if it is discriminated at step S404 that the transfer button is on, then operation information and information of products IDs and member IDs stored in the memory 753 are transferred (step S407). After the transfer of the data comes to an end (step S408), the data transferred upon the last settlement are erased from the memory (step S409), whereafter the processing routine is quitted.

In the fifth embodiment, the charging management system 512 can collect and analyze operation information from the electronic apparatus 70 to examine a trend of use of the user. For example, the charging management system 512 can grasp which function has been used most and feed back the information for improvement in development of a next product or can remove a function which is not used.

Further, in the fifth embodiment, since an equivalent is paid for a time period for which music software or video software is enjoyed, even if contents recorded on a recording medium reproduced by an electronic apparatus are a copy, the price can be recovered. Accordingly, there is a merit to the proprietor that the royalty for copyright can be acquired precisely.

While, in the description of the fifth embodiment, the weights for use for calculation of chargeable time periods for the individual functions are set depending upon the load factor of the CPU, it is otherwise possible to prepare a correspondence table of the weighting coefficients for the individual functions in the nonvolatile memory 753 of the charging processing section 75 and read out, for the individual functions, corresponding ones of the weighting coefficients from the nonvolatile memory 753 and then use the read out weighting coefficients for calculation of the chargeable periods of time.

Also it is possible to store the type-dependent coefficient of an apparatus in advance in the nonvolatile memory 753 corresponding to an electronic apparatus in which the charging processing section 75 is incorporated and use it in calculation of the chargeable time period.

Further, while, in the fifth embodiment described above, the chargeable time period is calculated by the charging processing section 75 built in the electronic apparatus 70, it is otherwise possible to transfer the use time period TI and the operation information such as on/off information of a function button to the charging management system 512 side so that also the charging management system 512 side may perform calculation of the chargeable time period in the same manner as in the process of the charging processing section 75 described above.

Further, while data transfer for settlement to the personal computer 80 is performed through remote accessing, data may naturally be transferred to the charging management system 512 through the personal computer 80 in response to a manual operation of the user.

Further, while data transfer from the electronic apparatus 70 to the personal computer 80 is performed by the electronic apparatus 70 in response to a data transfer request issued from the personal computer 80, it is otherwise possible to provide a data transfer button on the electronic apparatus 70 such that a data transfer request is set from the electronic apparatus 70 side and operation information and other necessary information are transferred to the personal computer 80.

Sixth Embodiment

This sixth embodiment has a general configuration quite the same as that of the fifth embodiment shown in FIG. 34.

While the fifth embodiment described above uses a personal computer for data transfer for a settlement process, in the sixth embodiment, a radio communication function is used to establish a connection to the charging management system of a time charge management company to directly perform data transfer of operation data.

FIG. 62 shows an example of a configuration of the electronic apparatus 70 in the sixth embodiment. Referring to FIG. 62, the electronic apparatus 70 shown has the same configuration to that of the electronic apparatus 70 in the fifth embodiment except that it includes a radio communication section 77 and a transmission/reception antenna 78 in place of the interface section 76 of the electronic apparatus 70 in the fifth embodiment.

FIG. 63 shows an example of a configuration for transfer of operation data in the sixth embodiment. In the sixth embodiment, also the charging management system 512 of the time charge management company 51 includes a radio communication section 514 and an antenna 515 so that it can communicate various data with the electronic apparatus 70 over a radio channel.

Figure 64:
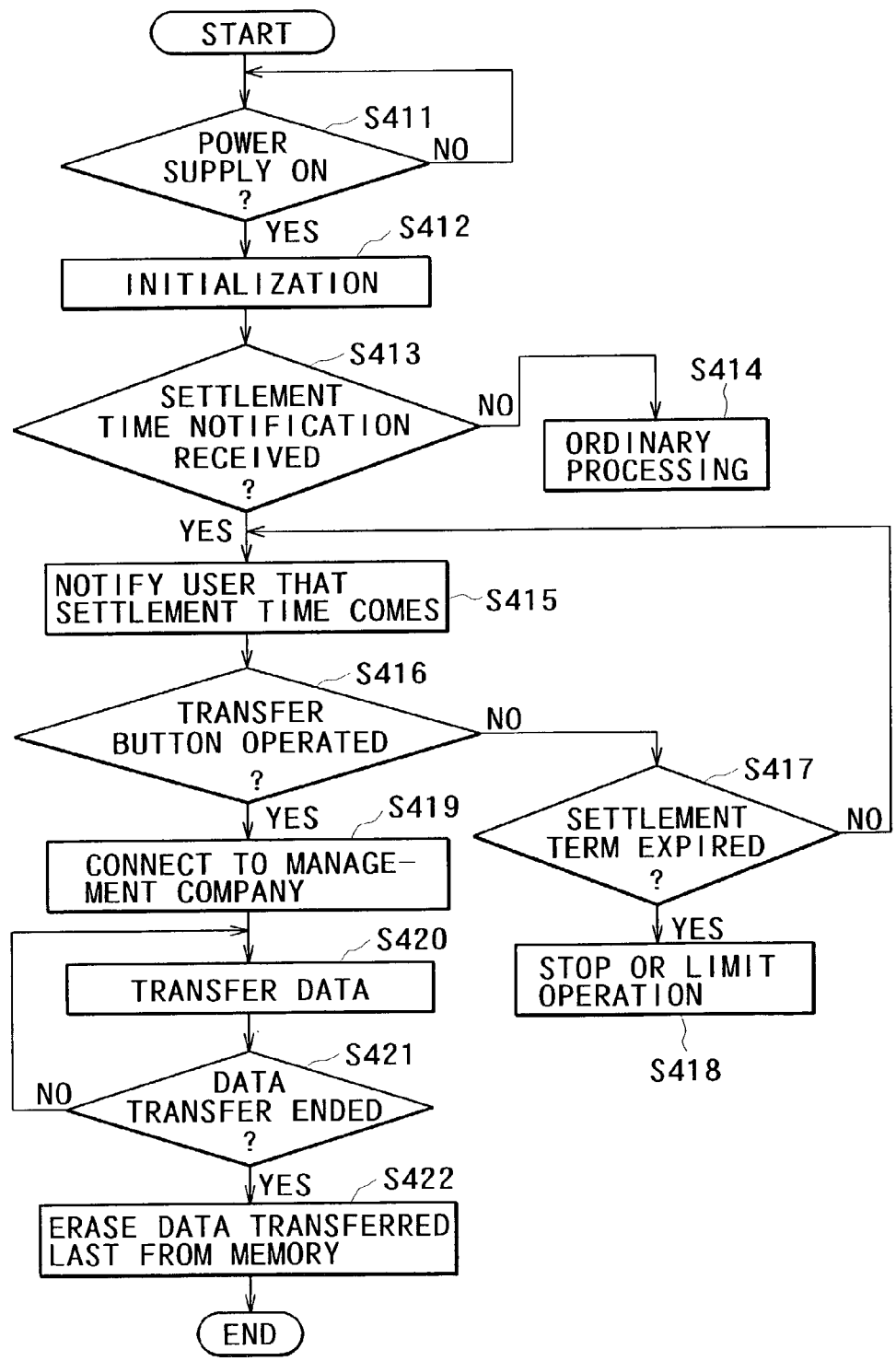
FIG. 64 is a flow chart illustrating a data transfer processing involved in the settlement process in the charging system of the sixth embodiment.

FIG. 64 illustrates a flow of operation of a data transfer process for settlement of the electronic apparatus 70 in the sixth embodiment.

Referring to FIG. 64, when the power supply to the electronic apparatus 70 is switched on (step S411), it is initialized (step S412). Then, in the sixth embodiment, when a settlement time comes, a settlement time notification is sent from the charging management system 512 to the electronic apparatus 70 over a radio channel. The charging processing section 75 of the electronic apparatus 70 supervises arrival of the settlement time notification (step S413), and executes an ordinary process such as the calculation process for a use time period described hereinabove and so forth until the settlement time notification is received (step S414).

Then, when arrival of the settlement time notification is detected, the charging processing section 75 requests the microcomputer section 71 to issue a message of the arrival of the settlement time. The microcomputer section 71 displays the message of the arrival of the settlement time on the display section 74 (step S415) to urge the user to transfer data for the settlement process.

Then, the charging processing section 75 supervises information regarding an operated function button from the microcomputer section 71 to supervise whether or not the transfer button is operated (step S416).

Then, the charging processing section 75 supervises whether or not the transfer button is operated within the settlement term (step S417). The charging processing section 75 starts up a timer thereof when it receives the settlement time notification to measure the period of the settlement term.

If it is discriminated at step S417 that an operation of the transfer button is not performed even after the settlement term expires, then the charging processing section 75 issues a request to the microcomputer section 71 to stop or restrict operation of the electronic apparatus 70. Consequently, the electronic apparatus 70 is placed into a disabled or restricted operation condition (step S418).

On the other hand, if it is discriminated at step S416 that the transfer button is on, then the charging processing section 75 connects a radio channel and the charging management system 512 of the time charge management company 51 (step S491) and transfers the operation information and the information of the product IDs and the member IDs stored in the nonvolatile memory 753 (step S420). After the transfer of the data comes to an end (step S421), the charging processing section 75 deletes the data transferred upon the last settlement from the memory (step S422), thereby ending the processing routine.

While, in the sixth embodiment described above, a radio channel is used to perform communication between the electronic apparatus 70 and the charging management system 512, the same processing as that described above can also be performed where the electronic apparatus and the charging management system of the time charge management company communicate directly with each other over a public network such as a telephone network (an ADSL (Asymmetric Digital Subscriber Line), an ISDN (Integrated Services Digital Network), a portable telephone communication network, a PHS (Personal Handyphone System) telephone network, or the internet), a privately leased line or a CATV communication network in place of the radio communication.

Seventh Embodiment

This seventh embodiment has a general configuration same as that of the fifth embodiment shown in FIG. 34.

While, in the fifth and sixth embodiments described above, the charging processing section 75 is built in, in the seventh embodiment, the charging processing section 75 is configured as a removable charging processing apparatus 90.

Figure 65:
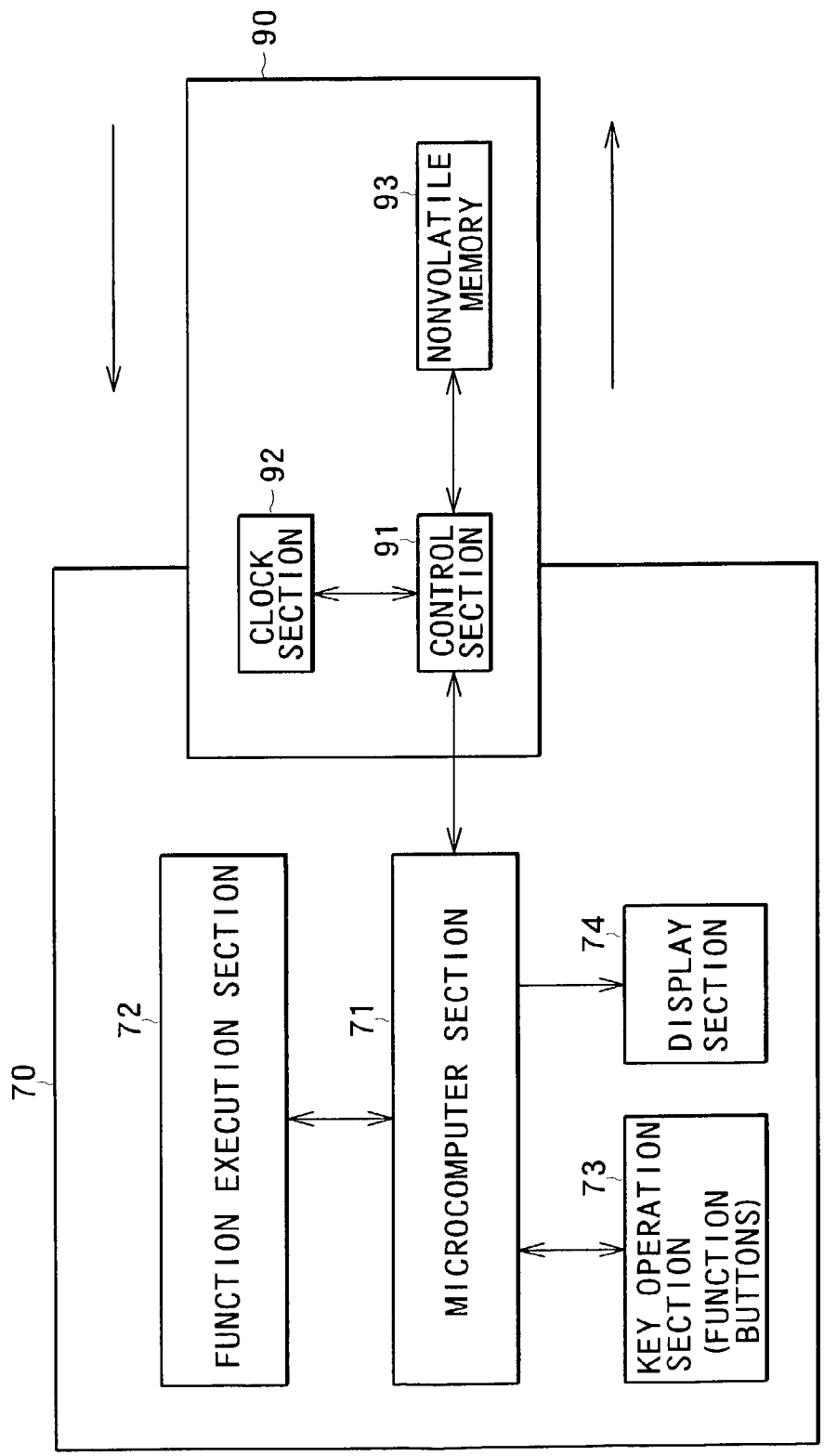
FIG. 65 is a block diagram showing an example of a configuration of an electronic apparatus used in a seventh embodiment of the present invention.

FIG. 65 shows a configuration of an electronic apparatus 70 in the seventh embodiment where the charging processing apparatus 90 is loaded in the electronic apparatus 70. Though not shown in FIG. 65, the electronic apparatus 70 has a slot (connector) for allowing removable loading of the charging processing apparatus 90 therein. If the charging processing apparatus 90 is inserted into the slot, then the charging processing apparatus 90 and the microcomputer section 71 are connected to each other as seen in FIG. 65.

The charging processing apparatus 90 has a configuration same as that of the charging processing section 75 and includes a control section 91, a clock section 92 and a nonvolatile memory 93.

In the same way as in the fifth embodiment, in order to transfer data for a settlement process through the personal computer 80, the charging processing apparatus 90 is loaded into a transfer adapter 201 which includes an interface section 202 for allowing connection to the personal computer 80 as seen in FIG. 66.

The transfer adapter 201 has a slot (not shown) for removably receiving the charging processing apparatus 90 in the same way as in the electronic apparatus 70. Thus, if the charging processing apparatus 90 is inserted into the slot, then the control section 91 of the charging processing apparatus 90 is connected to the interface section 202. The interface section 202 is the same as the interface section 76 of the electronic apparatus 70 in the fifth embodiment shown in FIG. 52. Accordingly, if a data transfer request is sent from the personal computer 80 to the charging processing apparatus 90 through the transfer adapter 201, then data transfer can be performed.

Figure 67:
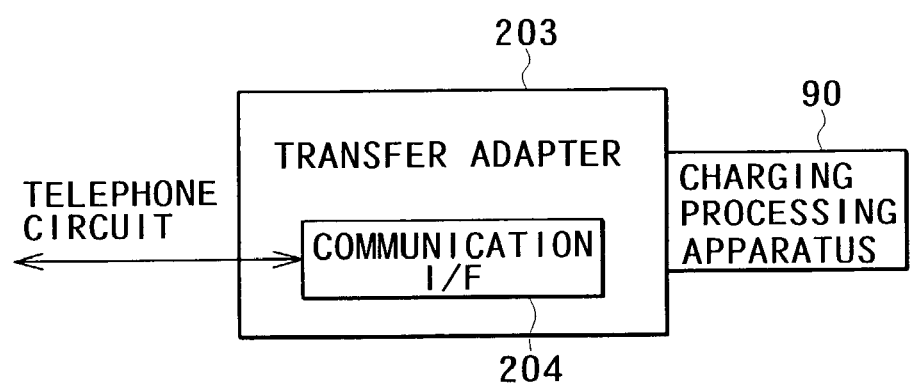
FIG. 67 is a flow chart illustrating another data transfer process involved in the settlement process in the seventh sixth embodiment.

Further, if such a transfer adapter 203 connected to a telephone line as shown in FIG. 67 is used, then the charging processing apparatus 90 can be connected directly to the charging management system 512 without intervention of the personal computer 80 to transfer data from the charging processing apparatus 90.

The transfer adapter 203 shown in FIG. 67 has a slot not shown for removably receiving the charging processing apparatus 90 in the same way as in the transfer adapter 201. If the charging processing apparatus 90 is inserted into the slot, then the control section 91 of the charging processing apparatus 90 is connected to a communication interface section 204 connected to the telephone line.

It is to be noted that, if the communication interface section 204 in FIG. 67 is replaced by a radio communication section, then the charging processing apparatus 90 can be connected directly to the charging management system 512 without intervention of the personal computer 80 over a public network such as, for example, a telephone network (an ADSL, an ISDN, a portable telephone communication network, a PHS telephone network or the Internet), a privately leased line or a CATV communication network to transfer data from the charging processing apparatus 90 in the same manner as in the sixth embodiment described hereinabove.

Figure 68:
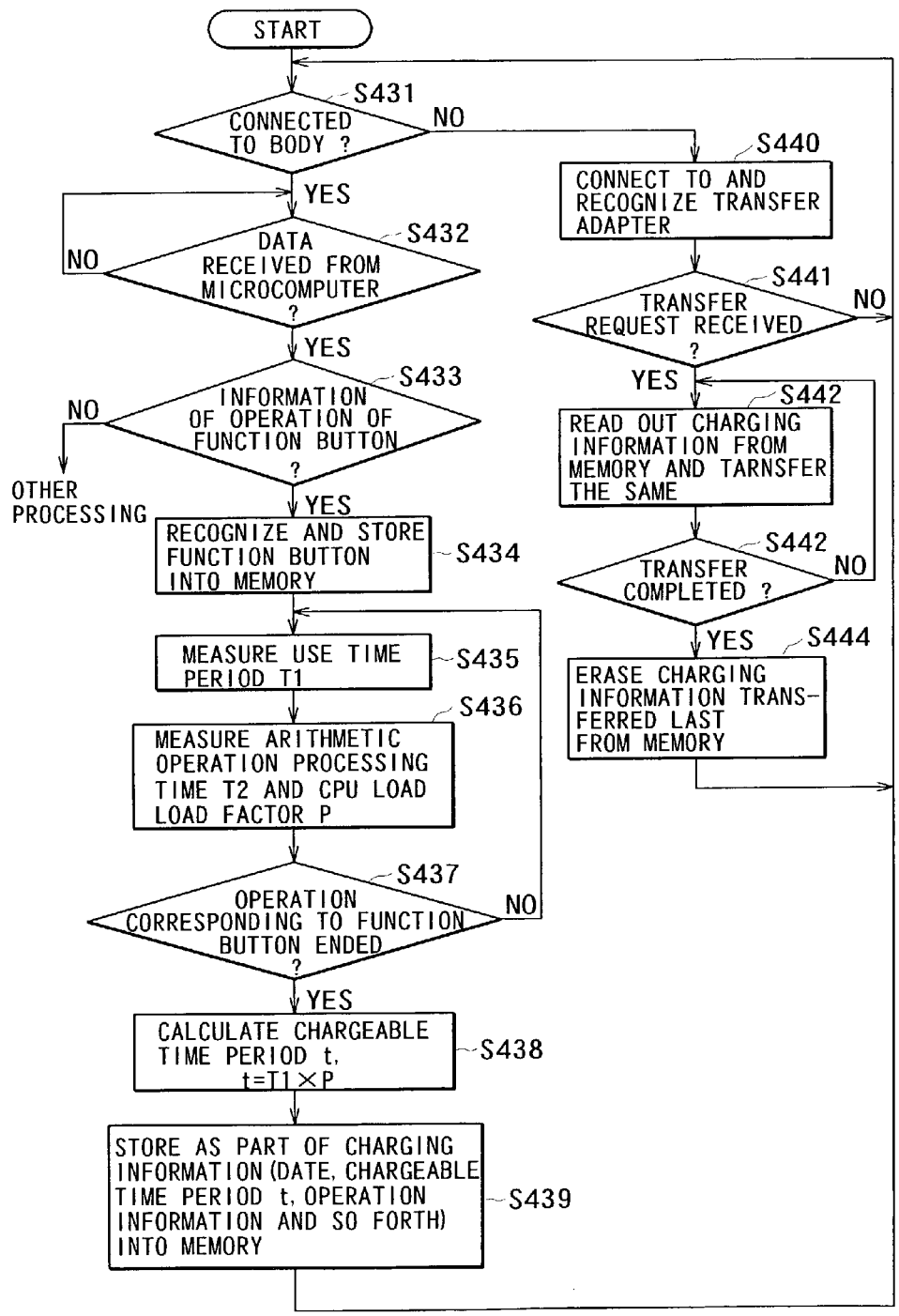
FIG. 68 is a flow chart illustrating operation of an electronic apparatus used in the seventh embodiment.

FIG. 68 illustrates an example of operation of the charging processing apparatus 90 where the transfer adapter 201 of FIG. 66 is used.

Referring to FIG. 68, the control section 91 of the charging processing apparatus 90 discriminates whether or not the charging processing apparatus 90 is connected to the body of the electronic apparatus 70 (step S431). If the control section 91 recognizes that the charging processing apparatus 90 is connected to the electronic apparatus 70, then it waits for reception of data from the microcomputer section 71 (step S432).

Then, if the control section 91 discriminates that data from the microcomputer section 71 is received, then it discriminates whether or not the data represents information of operation of a function button (step S433). If the data is not information of operation of a function button, then the control section 91 executes a corresponding process. However, if the data is information of operation of a function button, then the control section 91 recognizes what the operated function button is, and stores button type information representing the recognized function button into the nonvolatile memory 93 (step S434).

Then, the control section 91 measures a time period of execution of the operated function, that is, the use time period Ti of the operated function, using information of the clock section 92 (step S435). Thereafter, the control section 91 measures an arithmetic operation processing time period, which is a time period within which the CPU of the microcomputer section 71 operates continuously, that is, the time period T2 except a sleeping time period, and calculates the load factor P of the CPU of the microcomputer section 71 (step S436). Although the load factor P of the CPU of the microcomputer section 71 is arithmetically operated repetitively during execution of the process illustrated in FIG. 68, it may otherwise be arithmetically operated at a point of time when execution of the process comes to an end.

For the calculation of the load factor P, the expression $$P=(T2/T1) \times K$$

is used as described hereinabove. In the expression, K is the apparatus type-dependent coefficient and is a variable coefficient which depends upon a video apparatus, audio apparatus, a television receiver, a medium type or the like.

The measurement of the use time period T1 at step S435 and the measurement of the time period T2 and the load factor P at step S436 are repetitively executed until operation of the function being executed comes to an end (step S437).

Then, if it is discriminated that the operation of the function being executed comes to an end, then the control section 91 of the charging processing apparatus 90 calculates the chargeable time period t using a calculation expression (step S438):

chargeable time period $t$=use time period $T1 \times$CPU load factor $P$

Here, since the chargeable time period t is calculated by $t=T2 \times K$ from the expression given above, the measurement only of the time period T2 may be performed without measuring the use time period T1.

Then, the control section 91 of the charging processing apparatus 90 stores information of the chargeable time period t of a result of the calculation as part of charging information including a date, the chargeable time period t, operation information and so forth into the memory 93 (step S439). Then, the processing returns to step S431.

If it is discriminated at step S431 that the charging processing apparatus 90 is not connected to the body of the electronic apparatus 70, then the control section 91 recognizes that the charging processing apparatus 90 is connected to the transfer adapter 201 (step S440). Then, the control section 91 discriminates whether or not a data transfer request from the personal computer 80 is received (step S441). If a data transfer request is not received, then the processing returns to step S431.

On the other hand, if the control section 91 discriminates that a data transfer request is received, then it reads out the charging information from the nonvolatile memory 93 and transfers it to the personal computer 80 through the transfer adapter 201 (step S442). Then, when the control section 91 recognizes completion of the data transfer (step S443), it erases the charging information transferred by the last data transfer from the nonvolatile memory 93 (step S444), whereafter the processing returns to step S431.

Eighth Embodiment

While, in the fifth to seventh embodiments, the price based on a use time period is paid later (by deferred payment method), in the eighth embodiment, the price is paid in advance (by advance payment method, or prepaid method). Thus, in the eighth embodiment, a prepaid card is used.

Figure 69:
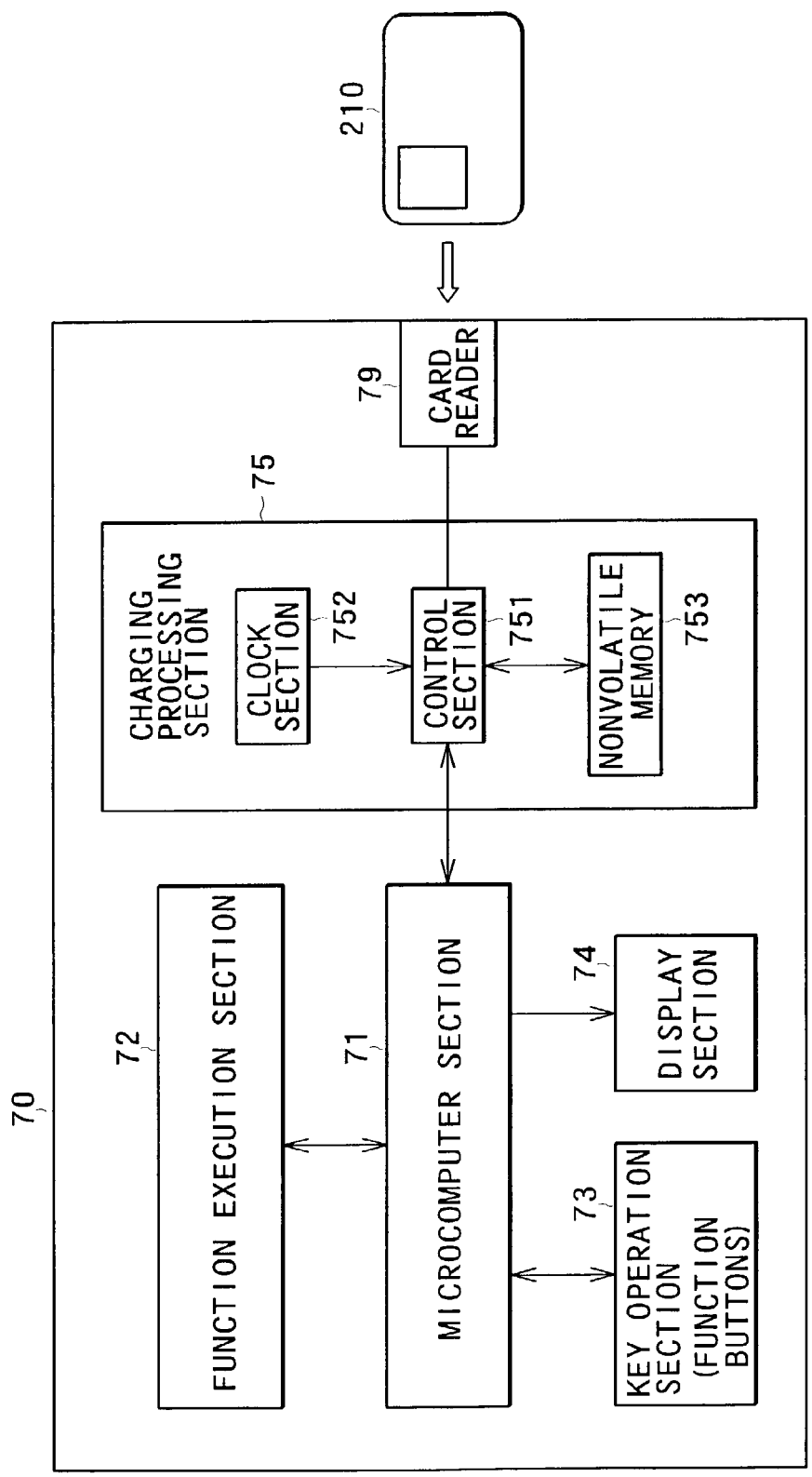
FIG. 69 is a block diagram showing an example of a configuration of an electronic apparatus used in an eighth embodiment of the present invention.

FIG. 69 shows an example of a configuration of the electronic apparatus 70 in the eighth embodiment. In the eighth embodiment, the electronic apparatus 70 includes a card reader 79 for reading stored information of a prepaid card 210 in place of the interface section 76 in the fifth embodiment described hereinabove with reference to FIG. 52 or the radio communication section 77 in the sixth embodiment described hereinabove with reference to FIG. 62.

The charging processing section 75 includes a control section 751, a clock section 752 and a nonvolatile memory 753 and thus has the same hardware configuration to that in the fifth or sixth embodiment. The memory 753 may be provided externally of the charging processing section 75 in the same way as in the fifth or sixth embodiment.

However, the control section 751 has a software configuration different from that in the fifth or sixth embodiment. In particular, although the software regarding the measurement of a used time period and the measurement of a chargeable time period is common, the software configuration of the control section 751 in the eighth embodiment is different in that the electronic apparatus 70 executes a settlement process based on charging information stored in the nonvolatile memory 753 and stored information of the prepaid card 210.

The prepaid card 210 has information of a usable time period written in advance therein, and the useable time period is re-written into a time period decremented in accordance with a use time period of the electronic apparatus 70 of the user by the charging processing section 75 of the electronic apparatus 70. Accordingly, the prepaid card 210 has a remaining time period of the usable time period stored therein.

Figure 70:
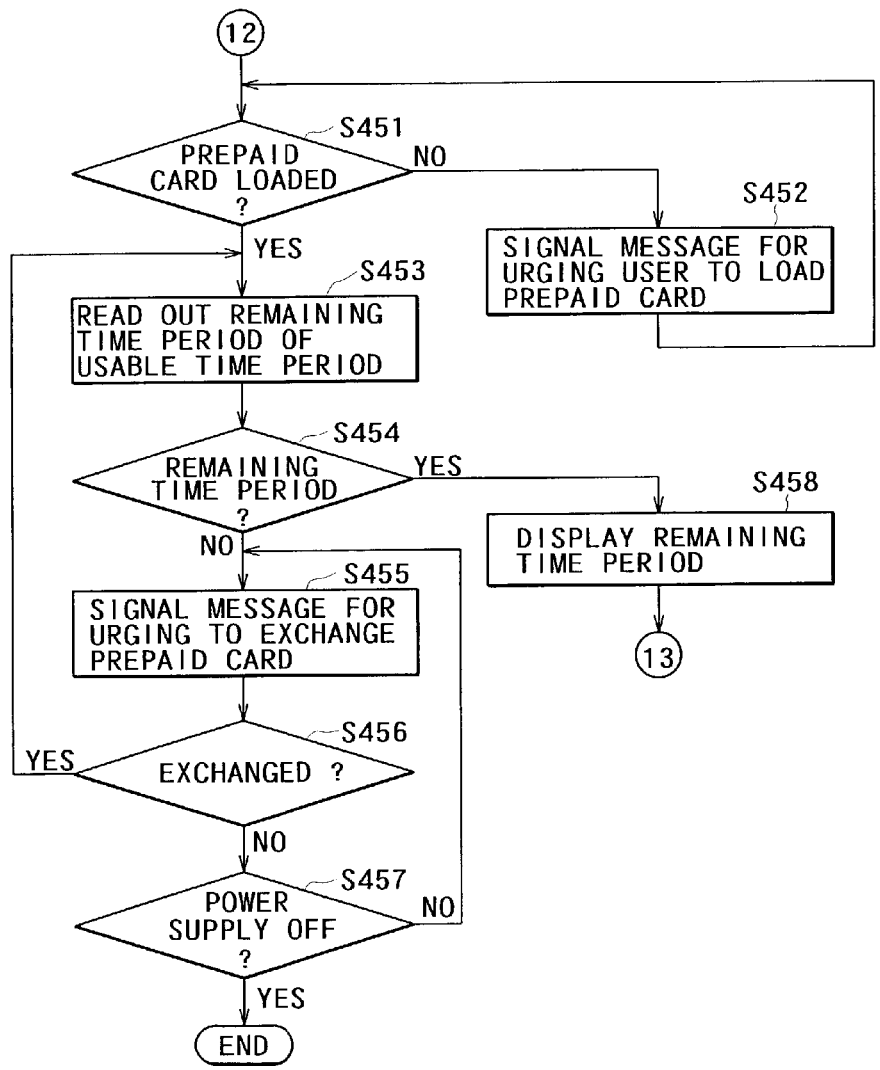
FIGS. 70 and 71 are flow charts illustrating operation of the electronic apparatus of FIG. 69.
Figure 71:
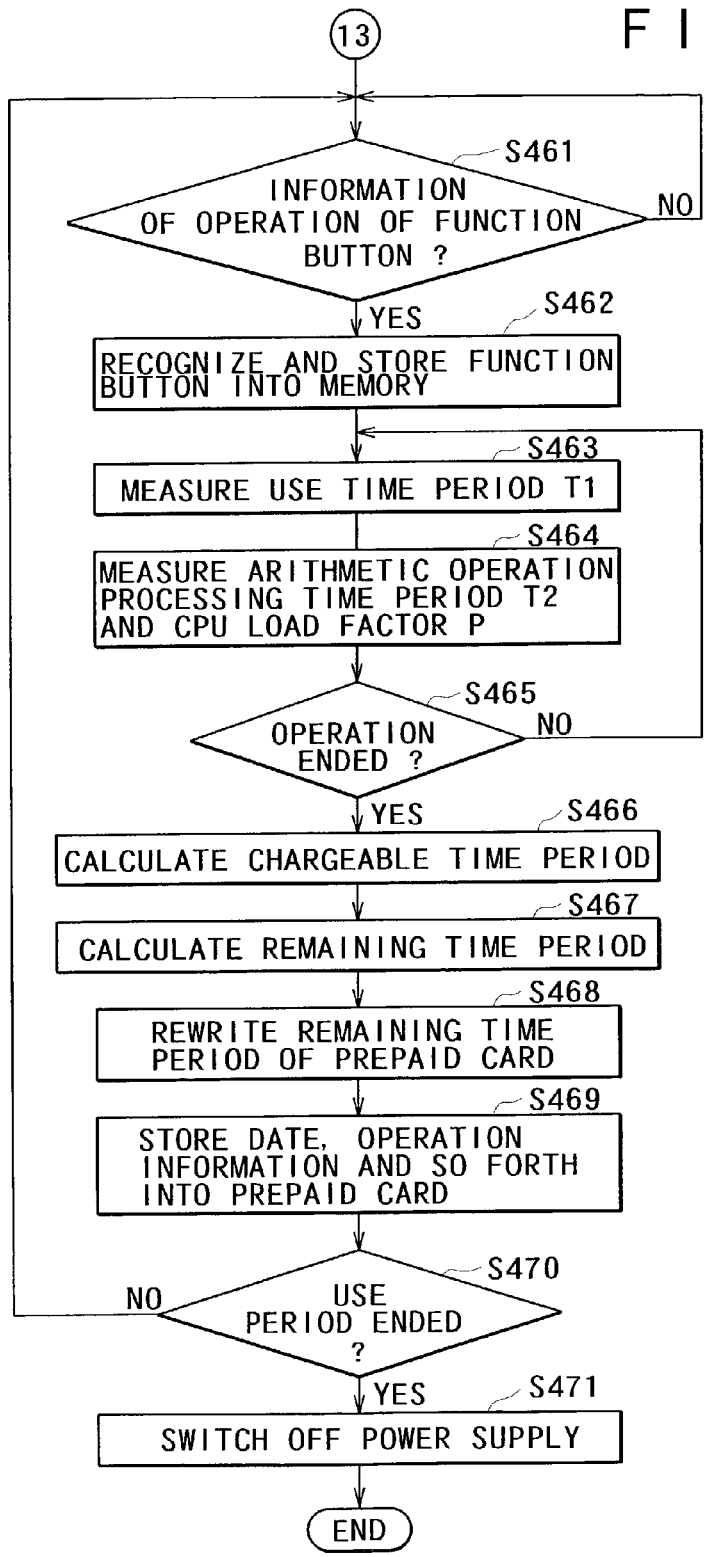

FIGS. 70 and 71 illustrate operation of the electronic apparatus 70 in the eighth embodiment. Also in the eighth embodiment, after the power supply to the electronic apparatus 70 is switched on, membership authentication and authentication of a use reservation date are performed. However, processing for such authentication is the same as that at steps S321 to S327 described hereinabove with reference to FIG. 53, and therefore, steps corresponding to the steps S321 to S327 are omitted in FIG. 70 while steps beginning with the step S451 next to the step S327 of FIG. 53 are illustrated in FIG. 70.

Referring first to FIG. 70, the control section 751 first discriminates at step S451 whether or not a prepaid card 210 is loaded in the electronic apparatus 70. If no prepaid card 210 is loaded in the electronic apparatus 70, then the control section 751 displays a message for urging the user to load its prepaid card 210 on the screen of the display section 74 through the microcomputer section 71 (step S452).

Then, if the control section 751 discriminates that a prepaid card 210 is loaded in the electronic apparatus 70, then it reads out the remaining time period of the usable time period from the prepaid card 210 (step S453) and confirms whether or not the remaining time period is zero (step S454). If the remaining time period is zero, then the control section 751 displays a message "The remaining time period of the prepaid card is zero and therefore must be replaced." On the screen of the display section 74 through the microcomputer section 71 (step S455).

Then, the control section 751 waits for replacement of the prepaid card 210 (step S456). If the prepaid card 210 is not replaced, then the control section 751 discriminates whether or not the power supply to the electronic apparatus 70 is switched off (step F457). If the power supply is switched off, then the control section 751 ends its processing. On the other hand, if the power supply is not switched off, then the processing returns to step S455, at which the control section 751 displays the message for urging the user to replace the prepaid card 210 on the screen of the display section 74.

On the other hand, if the control section 751 confirms at step S456 that the prepaid card 210 is replaced, then it reads out the remaining time period of the usable time period of the newly loaded prepaid card 210 (step S453) and then confirms whether or not the remaining time period is zero (step S454). If the remaining time period is not zero, then the control section 751 displays the remaining time period on the screen of the display section 74 through the microcomputer section 71 (step S458).

Then, the control section 751 waits for reception of information of a function button from the microcomputer section 71 (step S461 of FIG. 71). If information of operation of a function button is received, then the control section 751 discriminates what the operated function button is and stores the button type information into the nonvolatile memory 753 (step S462).

Then, the control section 751 measures a time period of execution of the operated function, that is, the use time period TI, using information of the clock section 752 (step S463). Thereafter, the control section 751 measures a time period of arithmetic operation processing which is a time period within which the CPU of the microcomputer section 71 continuously operates, that is, the time period T2 except a time period of sleeping, and calculates the load factor P of the CPU of the microcomputer section 71 (step S464). Although the load factor P of the CPU of the microcomputer section 71 is arithmetically operated repetitively during execution of the process illustrated in FIG. 71, it may otherwise be arithmetically operated at a point of time when execution of the process comes to an end.

For the calculation of the load factor P, the expression $$P = (T2/T1) \times K$$

is used as described hereinabove. In the expression, K is the apparatus type-dependent coefficient and is a variable coefficient which depends upon a video apparatus, audio apparatus, a television receiver, a medium type or the like.

The measurement of the use time period Ti at step S463 and the measurement of the arithmetic operation processing time period T2 and the CPU load factor P at step S464 are repetitively executed until operation of the function being executed comes to an end (step S465).

Then, if it is discriminated that the operation of the function being executed comes to an end, then the control section 751 of the charging processing apparatus 90 calculates the chargeable time period t using the calculation expression (step S466):

$$\text{chargeable time period } t = \text{use time period } T1 \times \text{CPU load factor } P$$

Here, since the chargeable time period t is calculated by t=T2×K from the expression given above, the measurement only of the arithmetic operation processing time period T2 may be performed without measuring the use time period T1.

Then, the control section 751 calculates the remaining time period of the usable time period using the information of the chargeable time period t of a result of the calculation (step S467) and rewrites the remaining time period of the prepaid card 210 with the remaining time period of the result of the calculation (step S468). Further, the control section 751 writes also information of the date and operation information and so forth into the prepaid card 210 (step S469). Such information is read out from the prepaid card 210 by the time charge management company 51 and used as a material for a marketing research or the like.

Then, the microcomputer section 71 issues a request to the control section 751 of the charging processing section 75 to discriminate whether or not the reserved use time period comes to an end (step S470). If the reserved use time period does not come to an end, then the processing returns to step S461 to wait for another operation of a function button. On the other hand, if the microcomputer section 71 discriminates that the reserved use time period comes to an end, then it switches off the power supply to the electronic apparatus 70 (step S340), thereby ending the processing routine.

It is to be noted that, although the foregoing description does not include description of disconnection of the power supply to the electronic apparatus 70 within the reserved use period, arbitrarily disconnect the power supply to the electronic apparatus 70 at any time within the reserved use period. When the power supply is disconnected in this manner, information regarding the substantial use time period of the electronic apparatus 70 before the disconnection of the power supply is successively accumulated to the use time period till the time at which the power supply was disconnected last, and the accumulated use time period is stored into the nonvolatile memory 753 of the charging processing section 75.

Further, if the power supply is disconnected once, then in the example described above, when the power supply is connected subsequently, the member authentication and the authentication of the use time are performed again. However, such member authentication and authentication of the use time as described above may be performed only when the power supply to the electronic apparatus is made available for the first time after the electronic apparatus is passed to the user.

It is to be noted that the prepaid card 210 may be sold not only by the providing company which provides the electronic apparatus or the time charge management company 51 but also by such stores as a convenience store. In the latter case, in order to allow a prepaid card which stores valuable materials such as operation information and has the remaining time period of zero to be returned to the dealer, it is desirable to construct a system for presenting a use time period service card or data to a user who returns its prepaid card.

Ninth Embodiment

While the eighth embodiment described above involves settlement by the electronic apparatus 70 using a prepaid card, the ninth embodiment uses not a prepaid card but an IC bank card. The electronic apparatus 70 has a hardware configuration same as that in the eighth embodiment. Therefore, overlapping description of the hardware configuration of the electronic apparatus 70 is omitted herein to avoid redundancy.

Thus, in the ninth embodiment, not the prepayment but the deferred payment is used. Therefore, for example, the flow charts of FIGS. 53 and 54 representing the use execution process of an electronic apparatus in the fifth embodiment described hereinabove are modified such that, as processing after a chargeable time period is stored into the memory 753 at step S338, the charging processing section 75 calculates a chargeable price corresponding to the chargeable time period, and the chargeable price is paid from an IC bank card. Also operation information and so forth are written into the IC bank card.

In the ninth embodiment, the operation information and so forth written in the IC bank card are transferred from the bank to the time charge management company 51. Further, since the operation information and so forth are written also in the memory 753 of the electronic apparatus 70, they may be transferred from the electronic apparatus 70 to the time charge management company 51.

It is to be noted that a usable time period may be converted into the imaginary currency UT (Used Time) described hereinabove in connection with the third embodiment and the value obtained by the conversion may be used as the payment information in the ninth embodiment.

Tenth Embodiment

While the eighth embodiment described above uses the prepayment system using a prepaid card, charging of the prepayment system may be performed by the electronic apparatus 70 using the nonvolatile memory 753 of the charging processing section 75 without using a prepaid card.

In this instance, the charging processing section may be the charging processing section 75 built in the-electronic apparatus 70 as in the fifth embodiment or may have a configuration of the charging processing apparatus 90 of an apparatus type as in the seventh embodiment.

The electronic apparatus in the tenth embodiment is configured such that it can be connected to the charging management system 512 of the time charge management company 51 through the personal computer 80 and a digital communication network in the same way as in the fifth embodiment.

Further, as the prepayment information in the tenth embodiment, a value obtained by converting a usable time period into the imaginary currency UT (Used Time) described hereinabove in connection with the third embodiment is used.

Figure 72:
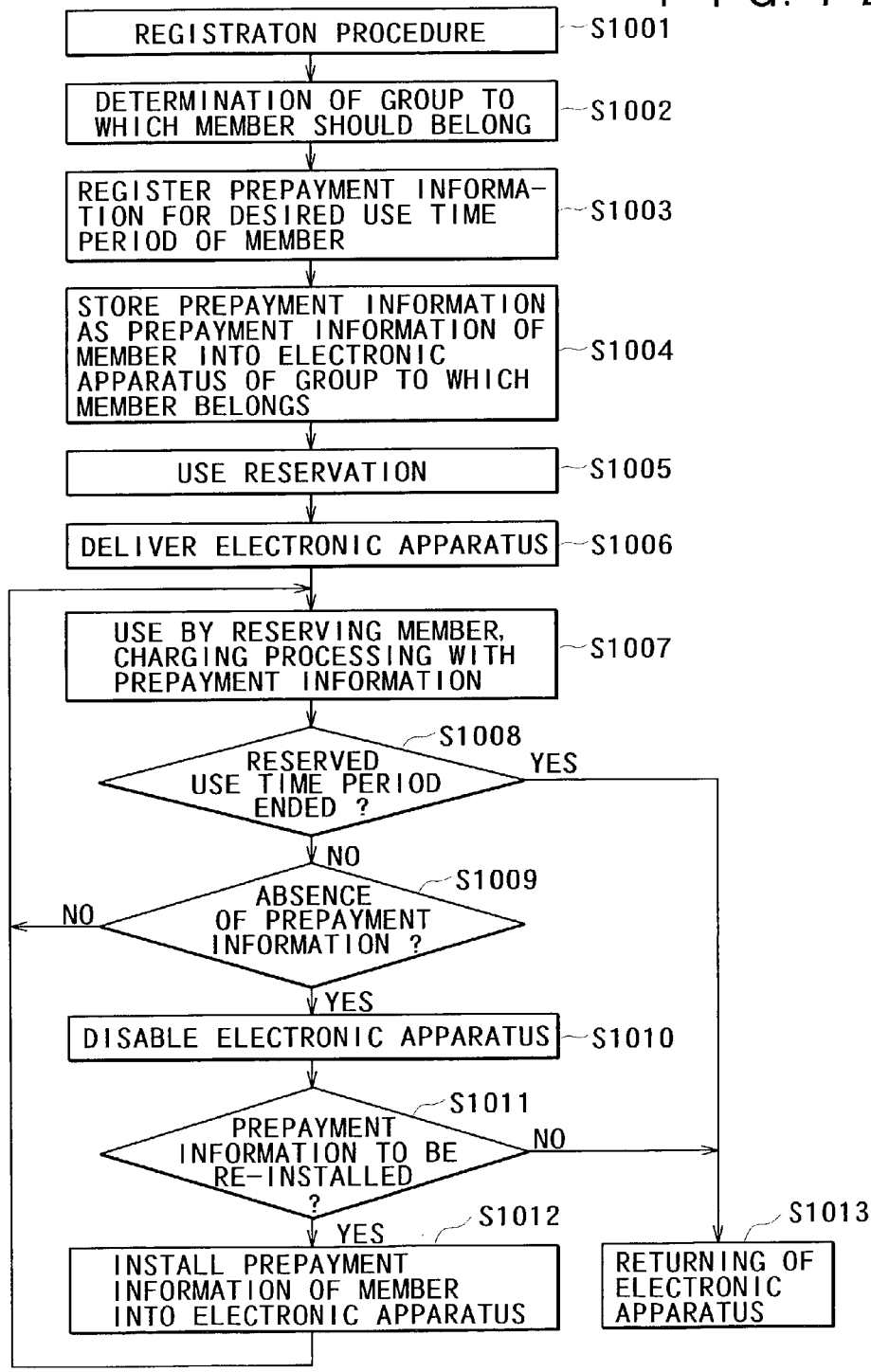
FIG. 72 is a flow chart illustrating a general flow of operation in a charging system of a tenth embodiment of the present invention.

FIG. 72 illustrates a flow of a procedure regarding processing from membership registration to use of an electronic apparatus as an example of a charging object apparatus and charging processing on the use in the tenth embodiment.

A customer performs membership registration into the time charge management company 51 (step S1001) so that it becomes a member. The membership registration may be performed at a storefront or may be Web registration. In response to the membership registration, the time charge management company 51 determines a group to which the member should belong as described hereinabove in connection with the fifth embodiment (step S1002).

In the tenth embodiment, the number of groups to be formed is equal to the number of electronic apparatus used as charging object apparatus. The electronic apparatus are applied fixedly to the individual groups. Accordingly, once a group organization of members is determined, a particular one of the electronic apparatus is used fixedly by the members of the group.

Each member registers, after a group to which the member should belong is determined, prepayment information representing a desired length of a use time period into the time charge management company 51. As the prepayment information, the member buys the imaginary currency UT from the time charge management company 51 (step S1003). The charging management system 512 of the time charge management company 51 converts the imaginary currency UT bought by the member into an amount of money and settles the amount of money in accordance with a payment method registered for the member.

Further, the time charge management company 51 stores the registered prepayment information into the nonvolatile memory 753 of the charging processing section 75 of the electronic apparatus 70 for the registered member together with the member ID and the password of the member (step S1004). Accordingly, the nonvolatile memory 753 of the charging processing section 75 of the electronic apparatus 70 stores prepayment information of all of the members who belong to the group by which the electronic apparatus 70 is used together with the member IDs and the passwords of the members.

In the same way as in the embodiments described hereinabove, the member performs use reservation for a desired use time (step S1005). When the reserved use time comes, the electronic apparatus 70 of the reservation object is passed (or distributed) to the user (step S1006).

Then, the user is subject to membership authentication and authentication of the use time and then subject to authentication of the remaining amount of the prepayment information. Thereafter, use of the electronic apparatus 70 by the user is permitted, and the user can start the use of the electronic apparatus 70. Then, the electronic apparatus 70 performs a charging process for the substantial time period of use of the electronic apparatus 70 based on the prepayment information (step S1007).

When the reserved time period of use comes to an end (step S1008), the member returns the electronic apparatus 70. Naturally, however, within the reserved time period of use, the user can continue the use as far as the prepayment information indicates some remaining amount (step S1009).

If the remaining amount of the prepayment information is consumed while the electronic apparatus 70 is used (step S1009), then the member can issue a request to purchase prepayment information to the time charge management company 51. If the prepayment information indicates no remaining amount, the electronic apparatus 70 is compulsorily disabled (step S1010). Therefore, the user will determine whether or not a request to purchase prepayment information should be issued to the time charge management company 51 to re-install the prepayment information into the electronic apparatus 70 (step S1011).

If the user determines that such prepayment information should not be re-installed, then the user returns the electronic apparatus 70 since the electronic apparatus 70 is disabled (step S1013). If the user determines that such prepayment information should be re-installed, then the user accesses the time charge management company 51 as a Web server through the personal computer 80 to buy the imaginary currency UT and re-install the prepayment information into the electronic apparatus 70 as hereinafter described (step S1012). As a result, the electronic apparatus 70 is enabled again (step S1007), and if the time is within the reserved time period of use (step S1008), then the user can continue the use as far as the prepayment information indicates some remaining amount (step S1009).

It is to be noted that, if the user wants to prolong the reserved time period of use, then this may be permitted with payment charged with an increased unit price. Further, if the electronic apparatus 70 is not returned even after the reserved term of use expires, then a warning may be issued to the member and a charge may be imposed on the user with a unit price higher than an ordinary unit price regarding that the user has used the electronic apparatus 70 within the overall time period elapsed. Furthermore, such a penalty as to limit any later reservation of use of a user who has made such illegal use as described above may be imposed on the user.

Figure 73:
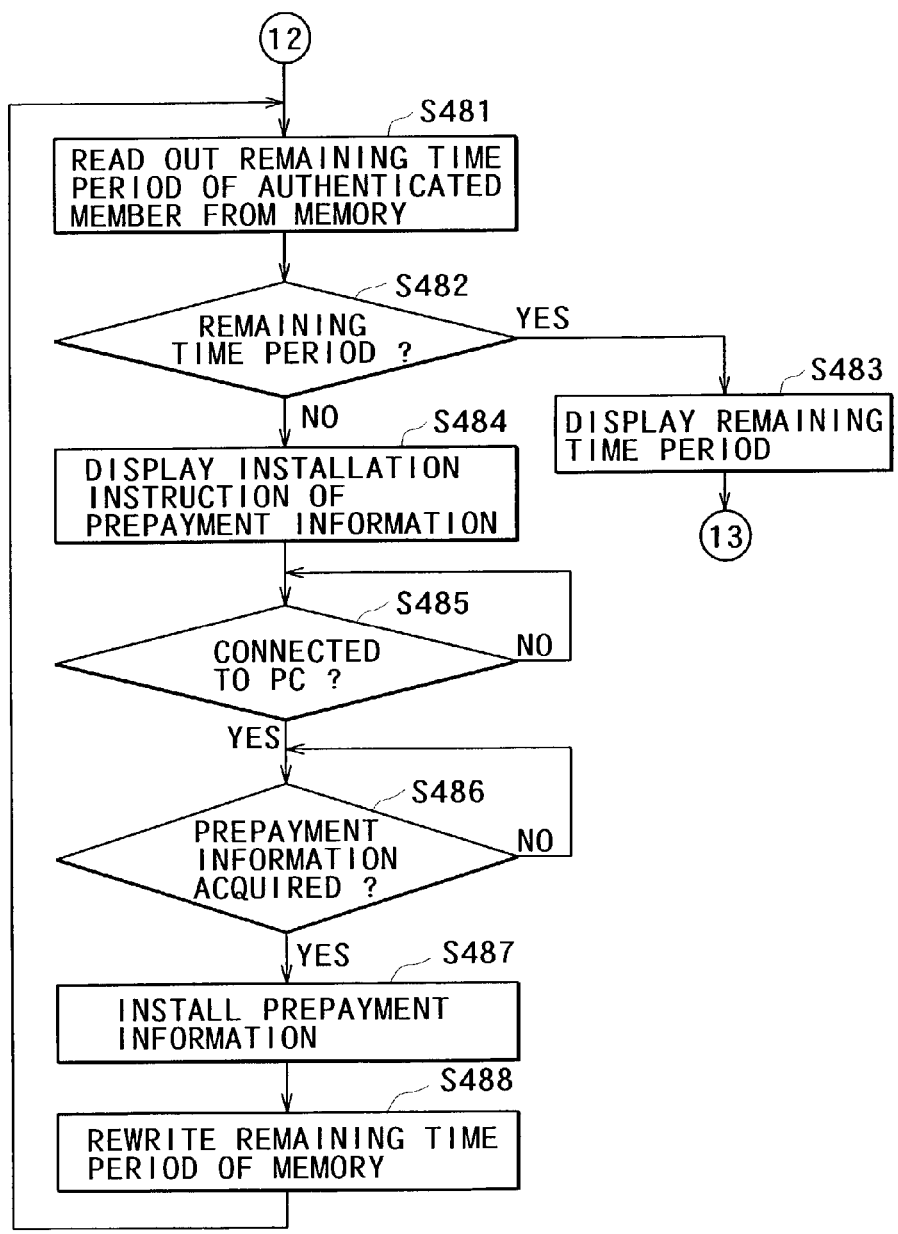
FIG. 73 is a flow chart illustrating operation of an electronic apparatus used in the tenth embodiment.

FIG. 73 illustrates operation of the electronic apparatus 70 in the tenth embodiment. It is to be noted that, also in the tenth embodiment, after the power supply to the electronic apparatus 70 is switched on, membership authentication and authentication of a use reservation date are performed. However, processing for such authentication is the same as that at steps S321 to S327 described hereinabove with reference to FIG. 53. Therefore, steps corresponding to the steps S321 to S327 are omitted in FIG. 73, and steps beginning with the step S481 next to the step S327 of FIG. 53 are illustrated in FIG. 73.

Further, the use time period measurement processing and charging processing steps following the step S483 of FIG. 73 are the same as the processing at steps S461 to S471 described hereinabove with reference to FIG. 71, and therefore, they are omitted in FIG. 73.

Referring to FIG. 73, in the tenth embodiment, the control section 751 reads out prepayment information (remaining time information) regarding the authenticated member stored in the nonvolatile memory 753 (step S481). Then, the control section 751 confirms whether or not the remaining time is zero (step S482).

If the remaining time is zero, then the control section 751 displays a message "The remaining time of the prepayment information is zero. Therefore, new prepayment information need be installed (re-installed)." on the screen of the display section 74 through the microcomputer section 71 (step S484).

The user observing the message will connect the electronic apparatus 70 to the personal computer 80 and install prepayment information.

The electronic apparatus 70 confirms whether or not it is connected to the personal computer 80 (step S485). The user will use the personal computer 80 to acquire prepayment information, which is information regarding a usable time period, from the time charge management company 51. The acquired prepayment information is transferred to the electronic apparatus 70.

The electronic apparatus 70 supervises whether or not such prepayment information is transmitted from the personal computer 80 (step S486). If the electronic apparatus 70 confirms reception of prepayment information, then it writes the received prepayment information as prepayment information of the authenticated member into the nonvolatile memory 753 of the charging processing section 75 thereby to install the prepayment information (step S487). Consequently, the prepayment information for the user in the nonvolatile memory

753, that is, the remaining time period of the usable time period, is rewritten (step S488).

Thereafter, the processing returns to step S481, at which the control section 751 reads out the remaining time period of the usable time period as the prepayment information of the member from the nonvolatile memory 753 and confirms that the remaining time is not zero (step S482). Then, the control section 751 displays the remaining time period on the screen of the display section 74 through the microcomputer section 71 (step S483).

After the step S483, the processing advances to step S461 of FIG. 71, and such operation as described hereinabove with reference to FIG. 71 in connection with a prepaid card is performed. However, the object of rewriting of a remaining time period of a usable time period and rewriting of operation information at steps S468 and S469 is changed from a prepaid card to the nonvolatile memory 753 of the charging processing section 75.

Subsequently, installation of prepayment information using the personal computer 80 is described with reference to FIG. 74. This process corresponds to the Web registration of prepayment information for a desired use time period by a member illustrated in FIG. 72.

Figure 74:
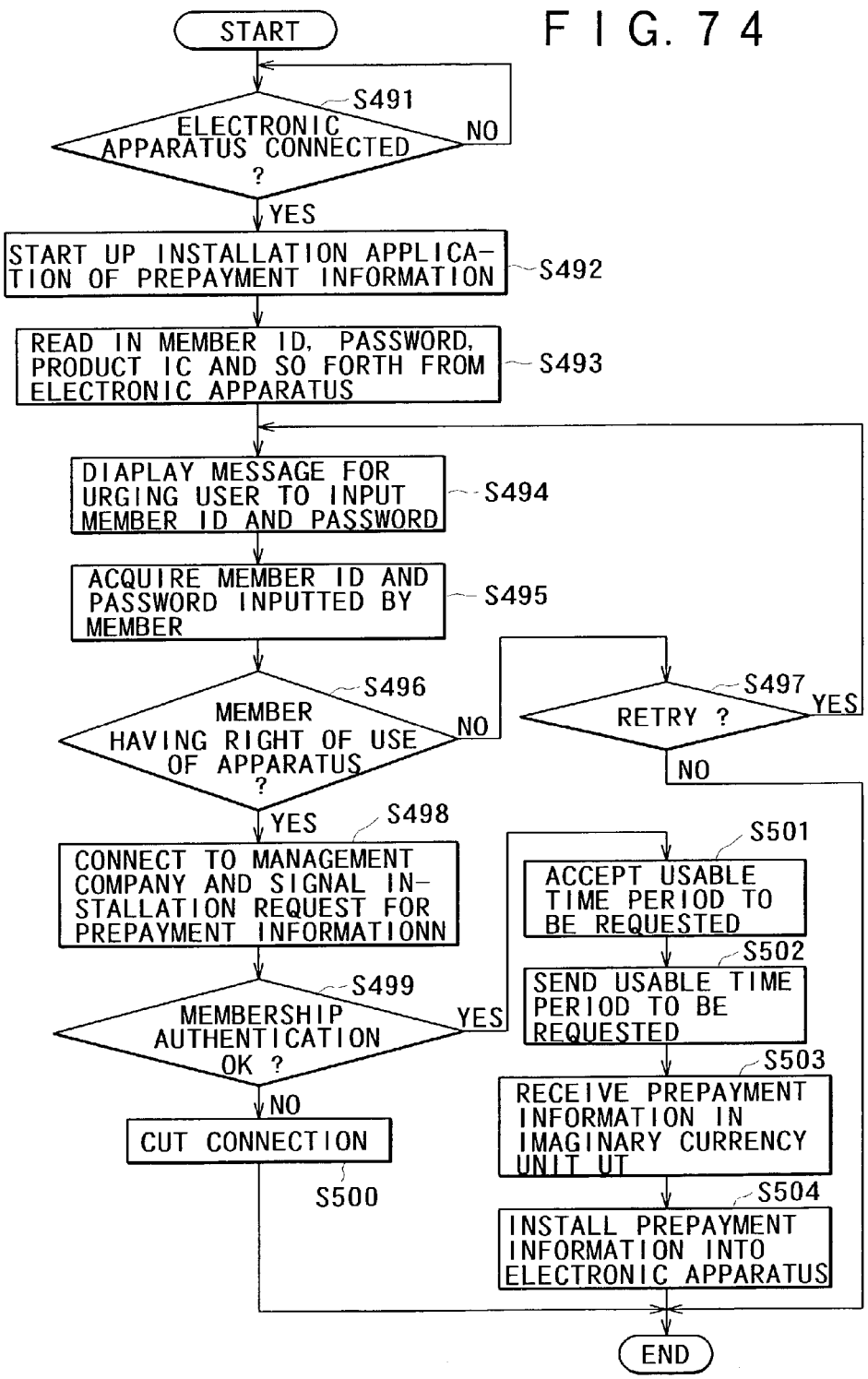
FIG. 74 is a flow chart illustrating operation of a personal computer used in the tenth embodiment.

Referring to FIG. 74, the electronic apparatus 70 first confirms whether or not it is connected to the personal computer 80 (step S491). If connection of the electronic apparatus 70 is confirmed, then a prepayment information installation application is started up in response to an instruction of the user (step S492).

Then, information necessary for membership authentication such as the member ID, password, and the product ID is read out from the nonvolatile memory 753 of the charging processing section 75 of the electronic apparatus 70 (step S493). Then, a message for urging the user to input its member ID and password is displayed (step S494), and a member ID and a password inputted in response to the display are acquired (step S495).

Then, the member ID and the password inputted by the member and the member ID and the password of the authenticated member read out from the electronic apparatus 70 are collated with each other to authenticate and confirm whether or not the member has the right of use of the electronic apparatus 70, that is, whether or not the member is one of the members in the group by which the electronic apparatus 70 is used (step S496).

If the authentication results in failure, then it is discriminated whether or not the member tries to re-input its member ID and password (step S497). If the member tries to re-input the member ID and password, then the processing returns to step S495, at which the member ID and the password of the member are acquired to perform authentication and confirmation of the member again. If the member does not want to re-input its member ID and password at step S497, then the processing routine is ended.

If it is authenticated and confirmed at step S496 that the member has the right of use of the electronic apparatus 70, then a connection is established to the charging management system 512 of the time charge management company 51 through a data communication network such as the Internet, and a prepayment information installation request is signaled to the charging management system 512 together with the information necessary for membership authentication read out at step S493 (step S498).

Upon reception of the installation request, the charging management system 512 performs membership authentication and notifies the personal computer 80 of a result of the authentication. The personal computer 80 discriminates based on the notification whether or not the membership authentication is successful (step S499). If the membership authentication results in failure, then the connection to the charging management system 512 is cut (step S500), and the processing routine is ended thereby.

On the other hand, if the membership authentication is successful at step S499, inputting of a usable time period to be requested for registration from the user is accepted (step S501). Then, information of the accepted usable time period is sent to the charging management system 512 (step S502).

As described hereinabove, the charging management system 512 in the present embodiment uses a value obtained by converting the received usable time period into the imaginary currency UT (Used Time) as prepayment information. The charging management system 512 settles the price corresponding to the prepayment information in accordance with a settlement method registered by the user identified with the member ID.

Then, the personal computer 80 receives the prepayment information represented by the imaginary currency UT from the charging management system 512 (step S503) and transfers the received prepayment information to the electronic apparatus 70 so that the prepayment information is installed as information of the usable time period of the authenticated member into the electronic apparatus 70 (step S504).

In the tenth embodiment, the electronic apparatus 70 decrements the usable time period information represented by the imaginary currency UT for each unit time to successively decrease the remaining time period of the usable time period. For example, the remaining time period of the usable time period is decremented by ten UT when the chargeable time period is one minute. The remaining time period of the usable time period is displayed as time information converted from the information represented in a unit of the imaginary currency UT.

It is to be noted that, also in the fifth to tenth embodiments, it is possible to calculate a cumulative use time period in the same manner as in the first embodiment and use such a time unit table of the depreciation type as shown in FIG. 13 to perform charging of the depreciation type.

Eleventh Embodiment

The eleventh embodiment is directed to an electronic apparatus. While the electronic apparatus 70 in the embodiments described hereinabove is produced in advance as a model for time charging, the electronic apparatus in the eleventh embodiment can be changed over between a model for ordinary sales and a model for time charging by inputting a password.

Figure 75:
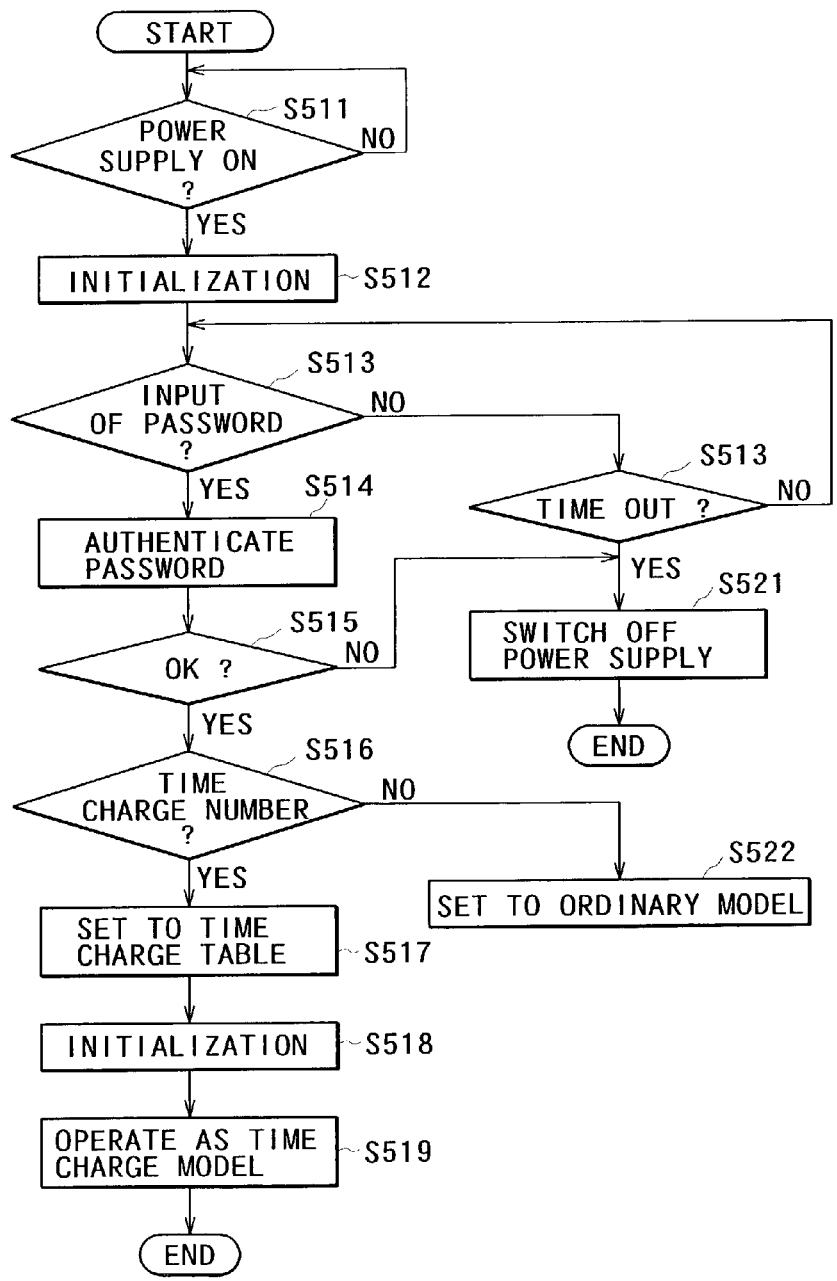
FIG. 75 is a flow chart illustrating a model changing over process of an electronic apparatus used in an eleventh embodiment of the present invention.

FIG. 75 illustrates a model changing over process of the electronic apparatus 70 in the eleventh embodiment.

First, after the power supply to the electronic apparatus 70 is switched on (step S511), the electronic apparatus 70 performs initialization (step S512) and waits for inputting of a password (step S513). If the microcomputer section 71 of the electronic apparatus 70 detects that no password is inputted for a fixed time period (step S520), then it automatically switches off the power supply to the electronic apparatus 70 (step S521) and ends the processing routine.

On the other hand, if the microcomputer section 71 detects inputting of a password at step S513, then it authenticates the inputted password (step S514). If the inputted password is not a predetermined password (step S515), then the power supply to the electronic apparatus is automatically switched off (step S521) and the processing routine is ended.

On the other hand, if the inputted password is the predetermined one (step S515), then the microcomputer section 71 discriminates whether or not the password is a time charge number (step S516). The time charge number is a number applied to the time charge model.

If the microcomputer section 71 discriminates at step S516 that the password is not a time charge number, then the electronic apparatus 70 is set to the ordinary sales model (step S522). Where the electronic apparatus 70 is set as the ordinary sales model, the charging processing section 75 therein does not operate.

On the other hand, if the microcomputer section 71 discriminates at step S516 that the password is a time charge number, then the electronic apparatus 70 is set to the time charge model and the charging processing section 75 is enabled (step S517). Thereafter, the electronic apparatus 70 is initialized (step S518) and therefore operates in such a manner as described hereinabove in connection with the preceding embodiments as the time charge model (step S519).

In the flow chart of FIG. 75, irrespective of whether the electronic apparatus 70 is set to the ordinary sales model or the time charge model, password authentication is performed. However, the flow chart may be modified such that password authentication is required only when the electronic apparatus 70 is set to the time charge model or conversely only when the electronic apparatus 70 is set to the ordinary sales model.

In this manner, with the electronic apparatus in the eleventh embodiment, since it can be set to the ordinary sales model or the time charge model only by inputting a password, there is no necessity to produce such two different models separately from each other. This gives rise to an another advantage that reduction of the cost by a mass production effect can be anticipated.

Twelfth Embodiment

The twelfth embodiment uses prepayment. However, the twelfth embodiment does not use a prepaid card or an IC bank card, but uses imaginary money of the coin type, which has a built-in electronic circuit including a storage section for storing operation data and so forth, an arithmetic operation section for performing calculation of a charge for use and a transmission-reception section for data. It is to be noted that, in the following description, the imaginary money of the coin type is referred to as electronic coin.

Further, in the twelfth embodiment, the imaginary currency UT described hereinabove in connection with the third and tenth embodiments is used as the currency for an equivalent to a use time period to store in the storage section of the built-in electronic circuit of the electronic coin. It is to be noted that the unit of the imaginary currency is one UT as described hereinabove.

Also the twelfth embodiment presupposes such a business model as described hereinabove with reference to FIG. 34, it uses such a mechanism as shown in FIG. 76 for a charging process in which en electronic coin is used for payment of an equivalent to a use period of time.

First, as described hereinabove, a user performs membership registration into the time charge management company 51 to become a member 56, and is provided with an electronic apparatus 70 with regard to a contract with the time charge management company 51 and receives an electronic coin 300. In the storage section of the electronic coin 300, a UT number by the imaginary currency UT corresponding to the amount of money paid by the member 56 is stored. The UT number corresponds to the usable time period. Also user information such as the name (user name), user ID and personal identification number of the registered member 56 is stored in the storage section of the electronic coin 300.

The member 56 is permitted to use the electronic apparatus 70 by throwing an electronic coin 300, whose UT number of the imaginary currency UT is not zero, that is, whose usable time period is not zero, into the electronic apparatus 70. In this instance, the electronic apparatus 70 performs a charging process in accordance with a use time period in the same manner as in the case of a prepaid card described hereinabove. In this instance, however, the charging process is performed using a value of the imaginary currency UT converted from the use time period. In particular, the electronic apparatus 70 performs a process of decrementing the UT number of the imaginary currency UT stored in the storage section of the electronic coin 300 in accordance with the use time period. Upon such charging processing, the electronic apparatus 70 writes use history information into the storage section of the electronic coin 300. The use history information includes the year, month and day of the use, the use time period and so forth.

The member 56 who is a user can use a UT selling/buying kiosk terminal 400 to buy the imaginary currency UT when the remaining UT number of the imaginary currency UT stored in the storage section of the electronic coin 300 is poor. Further, in the twelfth embodiment, it is possible for the member 56 to sell an unnecessary amount of the imaginary currency UT through the UT selling/buying kiosk terminal 400.

The UT selling/buying kiosk terminal 400 is connected to the time charge management company 51 through a digital communication network 59. Thus, in response to a request from the time charge management company 51 or by autonomous processing of the UT selling/buying kiosk terminal 400, information regarding buying and selling of the imaginary currency UT and use history information read out from the electronic coin 300 are transferred from the UT selling/buying kiosk terminal 400 to the time charge management company 51.

Further, in the twelfth embodiment, the imaginary currency UT is handled as variable currency as hereinafter described. As one of variation factors, a history in the past regarding the use time period, for example, a cumulative value of the use time period in a unit of a day or a month, is used. In particular, for example, if the use time period in the last month is short, the exchange rate of the imaginary currency UT for the current month is set comparatively low. On the contrary, if the use time period in the last month is long, the exchange rate of the imaginary currency UT for the current month is set comparatively high. In order to vary the exchange rate, the exchanging amount of money for one UT is varied. Although it is otherwise possible to vary the use time period per one UT, since such variation of the exchanging amount of money as described above does not involve variation of the use time period per one UT, this eliminates the necessity to take a change of the rate in calculation of the use time period into consideration.

The sold or bought quantity of the imaginary currency UT is used as another one of the variation factors. In other word, when the quantity of the imaginary currency UT is great, the exchange rate of the imaginary currency UT is set to a comparatively high value, but when the quantity of the imaginary currency UT is small, the exchange rate of the imaginary currency UT is set to a comparatively low value. In this instance, as regards the quantity of the imaginary currency UT sold and bought, not only information of the quantity of the sold and bought imaginary currency UT acquired from the UT selling/buying kiosk terminal 400 but also the quantity of the imaginary currency UT sold and bought on the market are taken into consideration because, in the twelfth embodiment, the imaginary currency UT can be sold and bought on a selling and buying market 250 provided for selling and buying the imaginary currency UT as seen in FIG. 76.

The exchange rate of the imaginary currency UT set in such a manner as described above is determined, for example, in a unit of a month and transferred to the kiosk terminal 400 through the digital communication network 59 so that it is used as an exchange rate for selling and buying of the imaginary currency UT for the current month. Accordingly, the member 56 can refer to the exchange rate to sell or buy the imaginary currency UT.

Where the imaginary currency UT is handled as variable currency so that the exchange rate thereof with actual currency may be variable, it can be anticipated to reduce the seasonal variation of the use time period of the electronic apparatus 70 to average the use time period thereby to raise the operating ratio of the electronic apparatus 70. Further, by raising the operating ratio of the electronic apparatus 70, the stock electronic apparatus as use object produces can be reduced.

Figure 77:
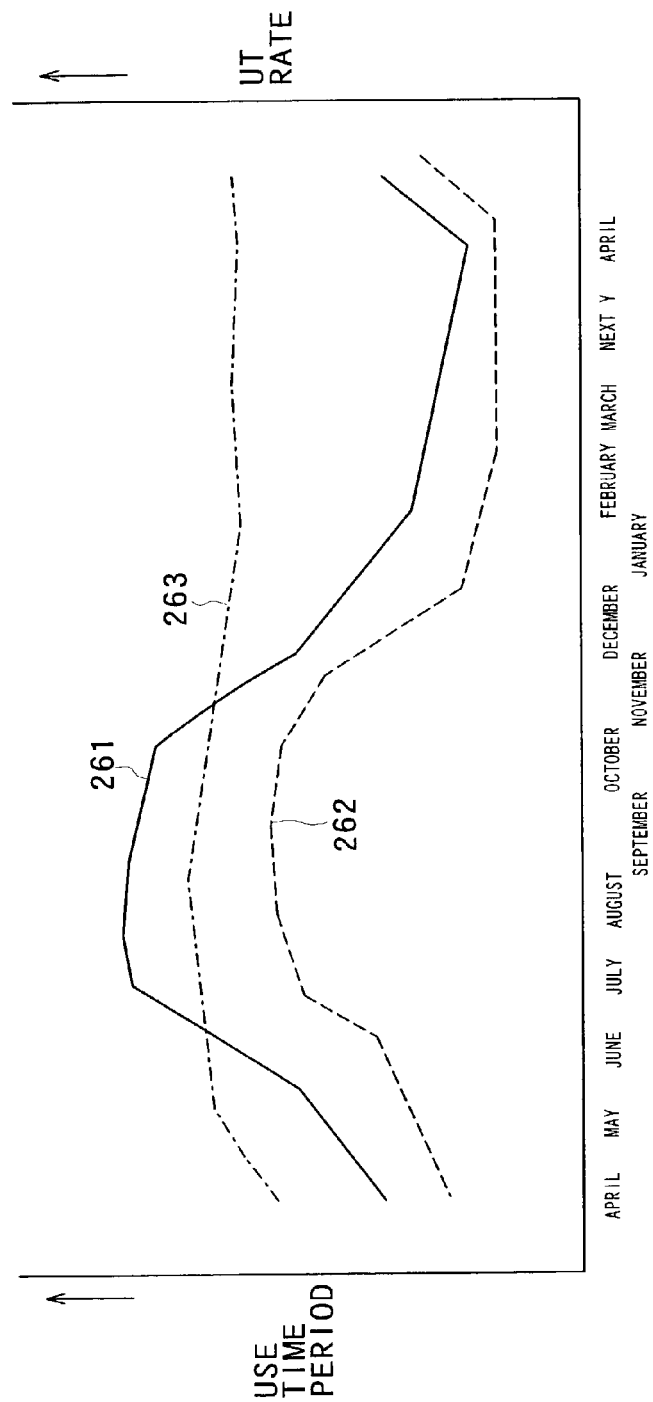
FIG. 77 is a diagram illustrating a variation of the equivalent for a use time period in the twelfth embodiment.

For example, where the situation of use of a product with regard to which a charge is to be imposed on a use time period varies from an economical, seasonal, political or like factor, if the charging rate for the use time period is fixed, then the use time period of the electronic apparatus 70 varies as indicated by a thick solid line 261 in FIG. 77.

On the other hand, if the exchange rate of the imaginary currency UT is varied as indicated by a broken line 262 in FIG. 77 taking the variation of the use time period into consideration, then it can be anticipated that the use time period when the exchange rate is high decreases whereas the use time period when the exchange rate is low increases. Therefore, it can be anticipated that the use time period of the electronic apparatus 70 is uniformed and exhibits a minimized seasonal variation as indicated by a thin sold line 263 in FIG. 77.

Further, that the imaginary currency UT itself is handled as an object of selling and buying can be beneficial to a user. For example, it is possible for a user to buy the imaginary currency UT when the exchange rate is comparatively low but sell the imaginary currency UT when the exchange rate is comparatively high thereby to obtain marginal profits.

[Examples of the Structure of the Electronic Coin]

Now, several examples of the structure of the electronic coin 300 shown in FIG. 76 are described. FIGS. 78A and 78B show the structure of a first example of the electronic coin 300. FIG. 78A is a front elevational view of the first example of the electronic coin 300. FIG. 78B is a sectional view taken along line Y-Y of FIG. 78A.

Referring to FIGS. 78A and 78B, the electronic coin 300 of the example shown includes a flattened disk 301 made of a metal or a resin and having a circular recess 302 formed at a central portion thereof, an electronic circuit 303 accommodated in the circular recess 302, and a filler 304 filled in the recess 302 to secure the electronic circuit 303. For the filler 304, for example, an ultraviolet curing resin or the like is used. In this instance, the depth L2 of the recess 302 is smaller than the thickness L1 of the disk 301 and is set to approximately, for example, L2=L½. The recess 302 and the electronic circuit 303 are isolated from each other.

Referring to FIG. 79, the electronic circuit 303 shown includes a control section 3031 formed from a microcomputer, a memory 3032, a clock section 3033, a transmission section 3034, and a reception section 3035. The transmission section 3034 and the reception section 3035 transmit and receive data wirelessly. For the radio transmission/reception of data, any of a method using a radio wave, using light such as infrared rays, or using an ultrasonic wave may be used.

FIGS. 80A and 80B show a second example of the structure of the electronic coin 300. FIG. 80A is a front elevational view of the electronic coin 300. FIG. 80B is a sectional view taken along line Y-Y of FIG. 80A. Further, FIGS. 81A, 81B and 81C illustrate an outline of different steps of a process of producing the electronic coin 300 shown in FIGS. 80A and 80B.

Referring to FIGS. 80A, 80B and 81A to 81C, also the electronic coin 300 of the example shown includes a flattened disk 301 made of a metal or a resin and an electronic circuit 303 embedded in a central portion of the disk 301. However, in the present example, the embedded electronic circuit 303 cannot be removed readily from the disk 301.

In particular, as seen in FIG. 80A, a through-hole 305 is formed at a central portion of the disk 301 in a concentric relationship with an outer circumference of the disk 301. Further, a pair of tapering faces 305A and 305B are formed on an outer wall face of the through-hole 305 such that the diameters thereof increase toward the opposite surfaces of the disk 301 as seen in FIG. 80B. Furthermore, a plurality of projections 306 for retaining the electronic circuit 303 are provided on the inner wall face of the through-hole 305.

Upon production of the electronic coin 300, the electronic circuit 303 is accommodated into the through-hole 305 such that it is placed onto and retained by the projections 306 as seen in FIG. 81B. Then, while the condition shown in FIG. 81 is kept, the filler 307 is filled into the entire through-hole 305 as seen in FIG. 81C. For the filler 307, an ultraviolet curing resin can be used in the same way as described above.

With the structure of the electronic coin of the second embodiment described above, the tapering faces 305A and 305B of the through-hole 305 prevent letting off the electronic circuit 303 embedded in the filler 307 from the disk 301.

[Example of a Configuration of the Electronic Apparatus]

Figure 82:
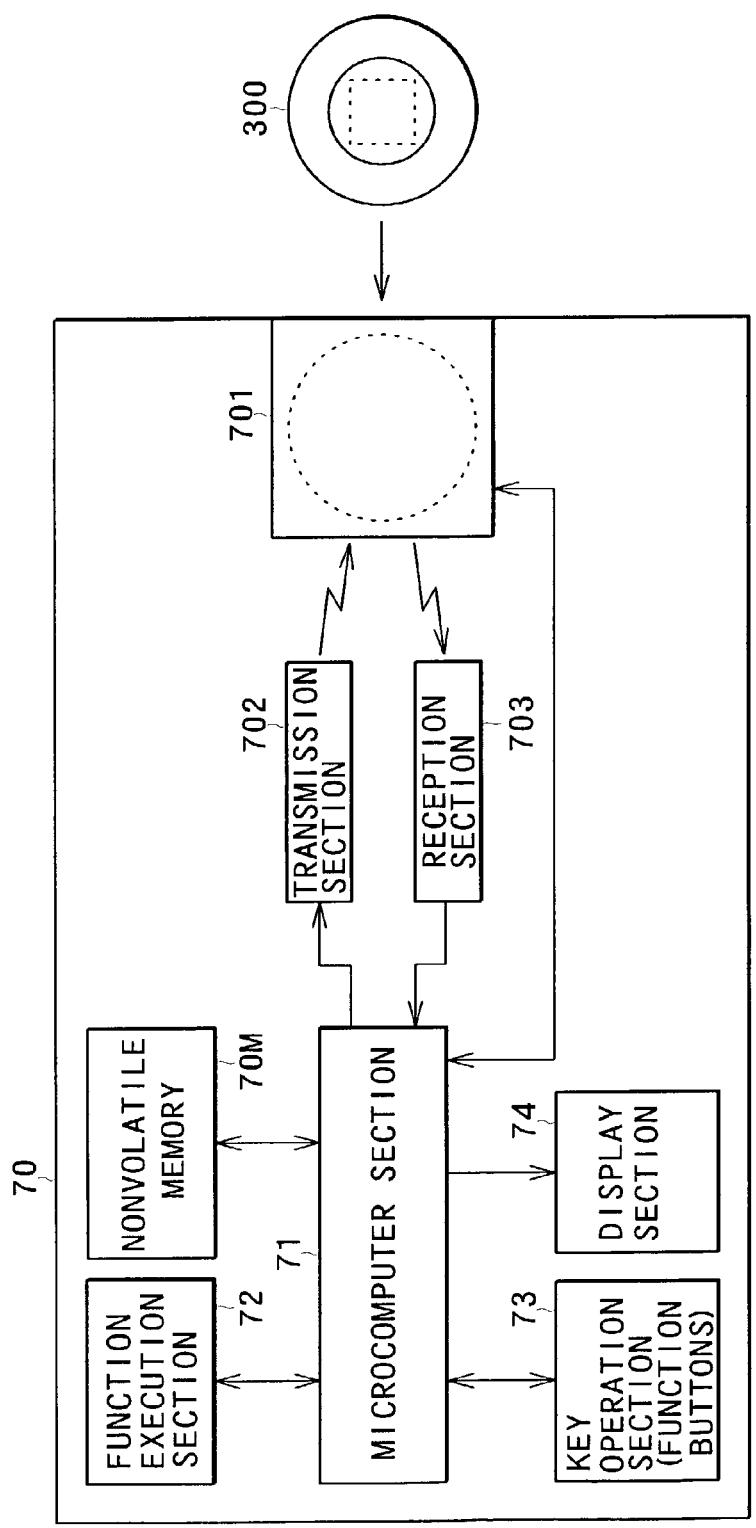
FIG. 82 is a block diagram showing an example of a configuration of an electronic apparatus used in the twelfth embodiment.

Now, a hardware configuration of the electronic apparatus 70 in the twelfth embodiment is described with reference to FIG. 82.

The electronic apparatus 70 shown includes an electronic coin loading/unloading mechanism 701. The electronic apparatus 70 is enabled to use if an electronic coin 300 is loaded into the electronic coin loading/unloading mechanism 701. However, even if an electronic coin 300 is loaded into the electronic coin loading/unloading mechanism 701, if the remaining UT number stored in the memory 3032 of the electronic circuit 303 built in the electronic coin 300 is zero, then use of the electronic apparatus 70 is not permitted.

Loading/unloading of an electronic coin 300 is performed by the electronic coin loading/unloading mechanism 701 that is controlled by the microcomputer section 71 in response to a user's operation of a loading/unloading button as a trigger. It is to be noted that, in such a case that the remaining UT number of the electronic coin 300 is zero, unloading of the electronic coin 300 may be performed automatically by the electronic apparatus 70.

The electronic apparatus 70 in the twelfth embodiment does not include a charging processing section. A charging process is executed in such a manner as hereinafter described by the control section 3031 of the electronic circuit 303 built in the electronic coin 300. However, it is otherwise possible to provide a charging processing section in the electronic apparatus 70 and transfer a result of a charging process by the charging processing section to the electronic coin 300.

However, the electronic apparatus 70 in the twelfth embodiment includes a nonvolatile memory 70M connected to the microcomputer section 71 for storing such permission information as described hereinabove for a reservation of use thereof. The permission information is written into the nonvolatile memory 70M by the time charge management company 51. Though not shown, an interface for reading in data from the outside is connected to the microcomputer section 71 in order to allow such writing into the nonvolatile memory 70M.

The electronic apparatus 70 in the twelfth embodiment further includes a transmission section 702 and a reception section 703 for transmitting and receiving data to and from the electronic coin 300. Further, a function execution section 72, a key operation section 73 and a display section 74 are connected to the microcomputer section 71 of the electronic apparatus 70 in the same way as in the configuration shown in FIG. 65.

[Operation of the Electronic Apparatus]

Figure 83:
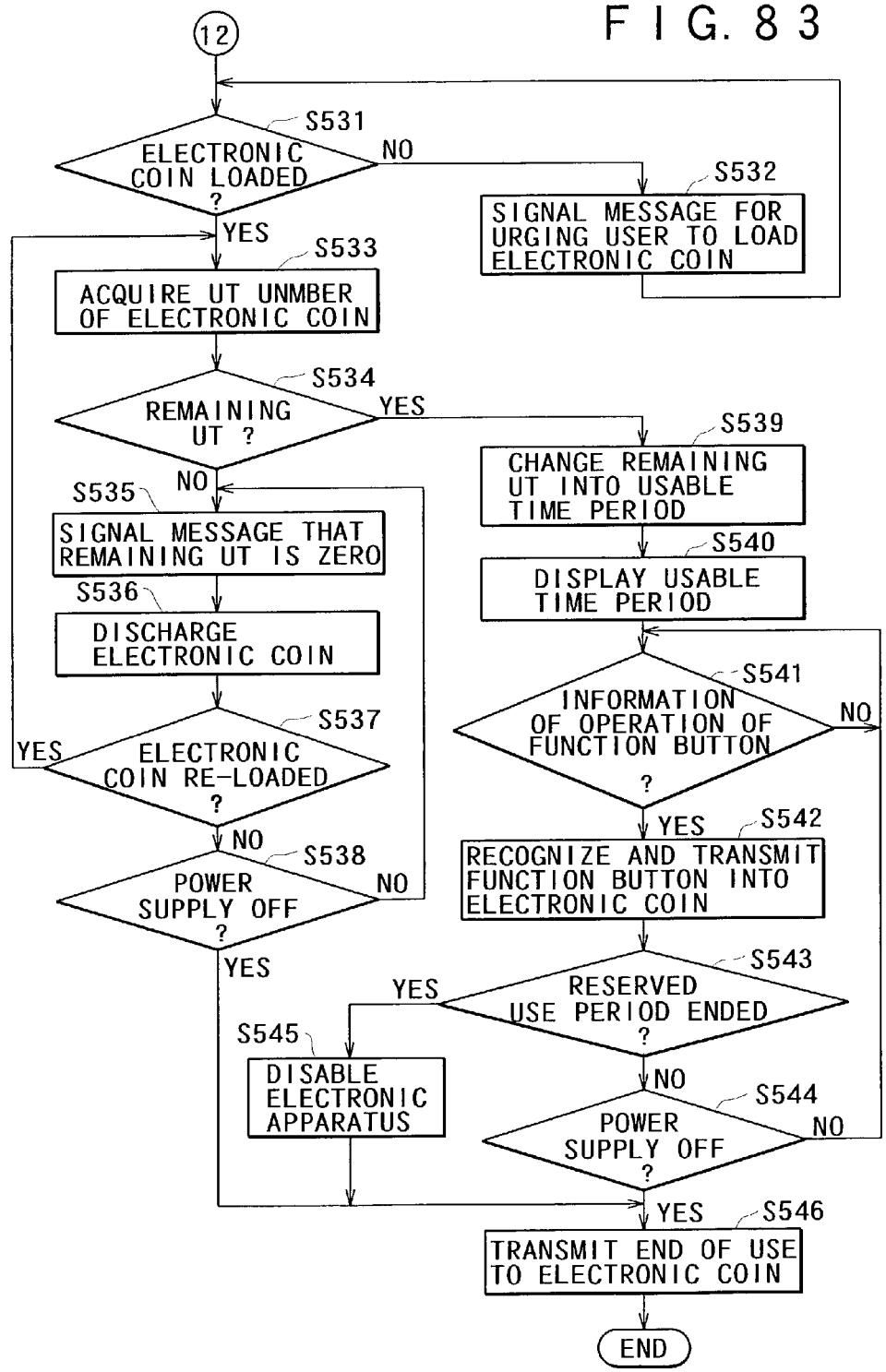
FIG. 83 is a flow chart illustrating processing operation of the electronic apparatus in the twelfth embodiment.

FIG. 83 illustrates operation of the electronic apparatus 70 in the twelfth embodiment. The process of FIG. 83 is executed principally by the microcomputer section 71.

Also in the twelfth embodiment, after the power supply to the electronic apparatus 70 is switched on, membership authentication and authentication of a use reservation date are performed based on the permission information stored in the nonvolatile memory 70M. However, since the processing therefor is the same as that at steps S321 to S327 described hereinabove with reference to FIG. 53, overlapping description of it is omitted herein to avoid redundancy. Thus, FIG. 83 illustrates steps beginning with the step S531, which is executed following the step S327 of FIG. 53.

In the processing of FIG. 83, if the membership authentication and the authentication regarding the reservation use time are successful and use of the electronic apparatus 70 is permitted, then the microcomputer section 71 discriminates whether or not an electronic coin 300 is loaded in the electronic apparatus 70 (step S531). If no electronic coin 300 is loaded in the electronic apparatus 70, then the microcomputer section 71 displays a message for urging the user to load an electronic coin 300 on the screen of the display section 74 (step S532).

Then, if the microcomputer section 71 discriminates that an electronic coin 300 is loaded in the electronic apparatus 70, then it sends a transfer request for UT information to the electronic coin 300 through the transmission section 702 and receives information of the UT number sent through the reception section 703 from the electronic coin 300 in response to the transfer request (step S533). Then, the microcomputer section 71 confirms whether or not the electronic coin 300 includes some remaining UT (step S534). If the remaining UT is zero, then the microcomputer section 71 displays a message "The electronic coin need be replaced because the remaining UT of the electronic coin is zero." on the screen of the display section 74 (step S535).

Then, the microcomputer section 71 unloads the electronic coin 300 (step S536) and waits for loading of another electronic coin 300 (step S537). However, if no new electronic coin 300 is loaded into the electronic apparatus 70, then the microcomputer section 71 discriminates whether or not the power supply to the electronic apparatus 70 is switched off (step S538). If the microcomputer section 71 discriminates that the power supply to the electronic apparatus 70 is switched off, then the microcomputer section 71 transmits an end of use to the electronic coin 300 (step S546), thereby ending the processing. On the other hand, if the microcomputer section 71 discriminates that the power supply to the electronic apparatus 70 is not switched off, then the processing returns to step S535, at which it displays the message for urging the user to replace the electronic coin on the screen of the display section 74.

On the other hand, if the microcomputer section 71 confirms at step S537 that the electronic coin 300 is replaced, then the processing returns to step S533, at which the microcomputer section 71 reads out the remaining UT of the newly loaded electronic coin 300 to confirm whether or not the remaining UT is zero (step S534). Then, if the remaining UT is not zero, then the microcomputer section 71 converts the remaining UT into a usable time period (step S539) and displays the usable time period on the screen of the display section 74 (step S540).

Then, the microcomputer section 71 discriminates whether or not a function button on the key operation section 73 is operated (step S541). If the microcomputer section 71 discriminates that a function button is operated, then it recognizes what the operated function button is and transmits button type information of the operated function button to the electronic coin 300 through the transmission section 702 (step S542).

Then, the microcomputer section 71 discriminates whether or not the reserved use period comes to an end (step S543). If the microcomputer section 71 discriminates that the reserved use period does not come to an end, then it discriminates whether or not the power supply to the electronic apparatus 70 is switched off (step S544). If the power supply is not off, then the processing returns to step S541 so that the processing beginning with step S541 is repeated.

On the other hand, if it is discriminated at step S543 that the reserved use period comes to an end, then the microcomputer section 71 compulsorily disables the electronic apparatus 70 (step S545) and transmits information of the end of use to the electronic coin 300 through the transmission section 702 (step S546). On the other hand, if it is discriminated at step S544 that the power supply to the electronic apparatus 70 is switched off, then the microcomputer section 71 transmits information of the end of use to the electronic coin 300 through the transmission section 702 (step S546). Then, the microcomputer section 71 ends the processing.

[Operation of the Electronic Coin]

Figure 84:
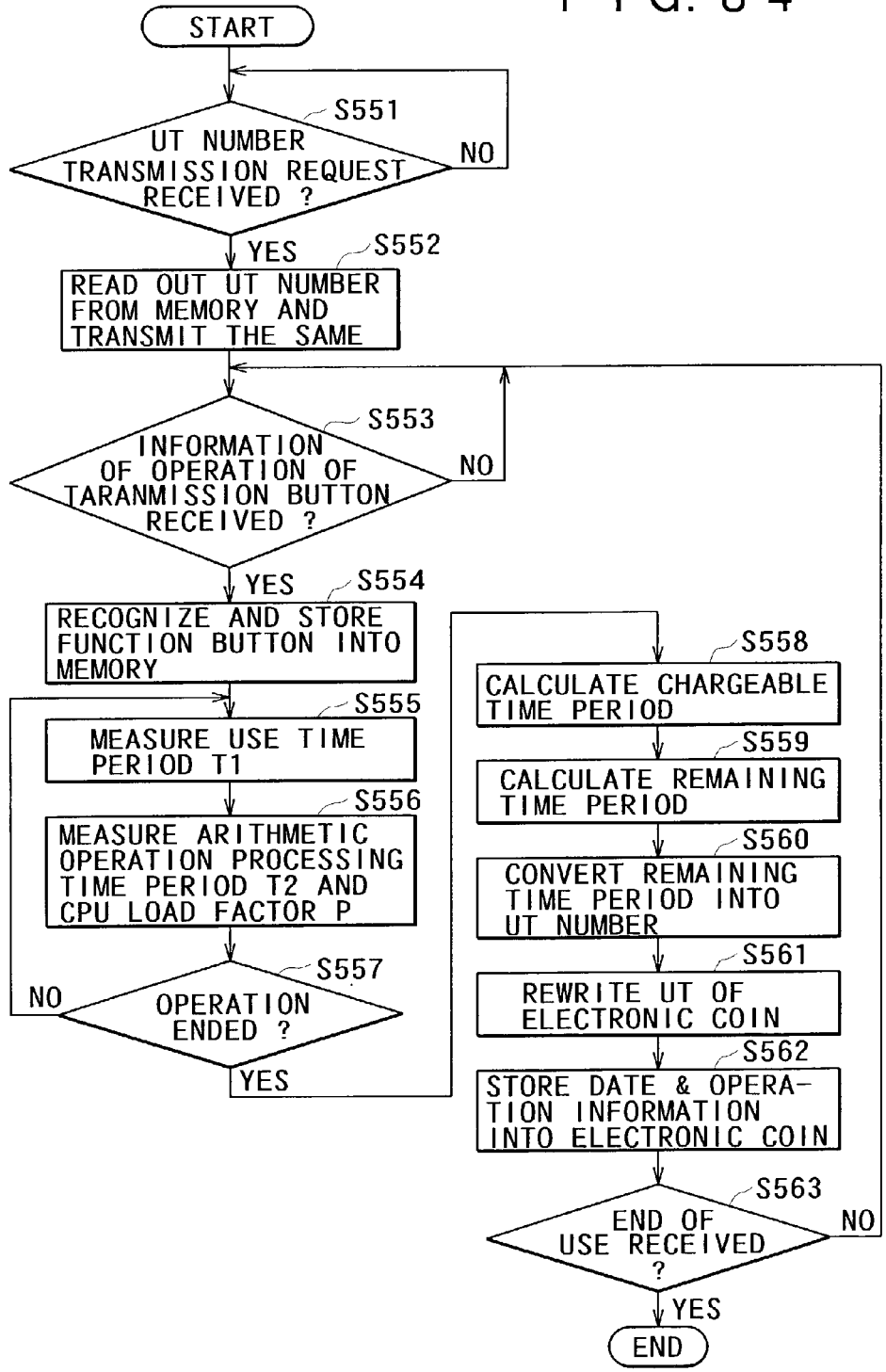
FIG. 84 is a flow chart illustrating processing operation of the electronic circuit built in the electronic coin used in the twelfth embodiment.

Subsequently, processing operation of the electronic circuit 303 of the electronic coin 300 when the electronic coin 300 is loaded into the electronic apparatus 70 is described with reference to FIG. 84. The processing operation of the electronic circuit 303 illustrated in the flow chart of FIG. 84 is started when the control section 3031 of the electronic coin 300 detects that the electronic coin 300 is loaded into the electronic coin loading/unloading mechanism 701 of the electronic apparatus 70.

In order to detect that the electronic coin 300 is loaded into the electronic coin loading/unloading mechanism 701 of the electronic apparatus 70, an optical or electronic detection element may be provided in the electronic coin loading/unloading mechanism 701 of the electronic apparatus 70 such that, when loading of the electronic coin 300 is detected by the optical or electronic detection element, a loading detection signal may be sent through the transmission section 702. However, the electronic coin 300 may alternatively or additionally include an optical or electronic detection element. Therefore, the electronic coin 300 also detects that the electronic coin 300 is loaded into the electronic coin loading/unloading mechanism 701 of the electronic apparatus 70.

If the electronic coin 300 is loaded into the electronic apparatus 70, then a UT number transmission request is sent from the electronic apparatus 70 to the electronic coin 300.

Then, when the electronic circuit 303 confirms reception of the transmission request (step S551), it reads out the remaining UT number from the memory 3032 and transmits it to the electronic apparatus 70 through the transmission section 3034 (step S552).

Then, the electronic circuit 303 waits for reception of operation information of a function button from the electronic apparatus 70 (step S553). If the electronic circuit 303 receives operation information of a function button from the electronic apparatus 70, then it recognizes the operated function button and stores the information of the function button into the memory 3032 (step S554).

Then, the control section 3031 measures a time period of execution of the operated function, that is, the use time period TI, using time information of the clock section 3033 (step S555). Then, while information is communicated between the electronic apparatus 70 and the electronic coin 300, the control section 3031 measures an arithmetic operation processing time period, which is a time period that the CPU of the microcomputer section 71 operates continuously. In other word, the control section 3031 measures the time period T2 except a sleep time period, and calculates the load factor P of the CPU of the microcomputer section 71 (step S556). Although the load factor P of the CPU of the microcomputer section 71 is arithmetically operated repetitively during execution of the process illustrated in FIG. 84, it may otherwise be arithmetically operated at a point of time when execution of the process comes to an end.

For the calculation of the load factor P, the expression $$P=(T2/T1) \times K$$

is used as described hereinabove. In the expression, K is the apparatus type-dependent coefficient and is a variable coefficient depending on a video apparatus, audio apparatus, a television receiver, a medium type or the like.

The measurement of the use time period T1 at step S555 and the measurement of the time period T2 and the load factor P at step S556 are repetitively executed until operation of the function being executed comes to an end (step S557).

Then, if it is discriminated that the operation of the function being executed comes to an end, then the control section 3031 of the electronic coin 300 calculates the chargeable time period t using the calculation expression (step S558):

$$\text{chargeable time period } t = \text{use time period } T1 \times \text{CPU load factor } P$$

Here, since the chargeable time period t is calculated by $t=T2 \times K$ from the expression given above, the measurement only of the time period T2 may be performed without measuring the use time period T1.

Then, the control section 3031 calculates the remaining time period of the usable time period using the information of the chargeable time period t of a result of the calculation (step S559) and converts the remaining time period of a result of the calculation into a UT number (step S560). Then, the control section 3031 decrements the UT number of the memory 3032 of the electronic coin 300 by the UT number obtained by the conversion and rewrites the remaining UT number with a result of the decrementing (step S561). The control section 3031 writes also operation information including the date and the use time period into the memory 3032 of the electronic coin 300 (step S562). The information written in the memory 3032 of the electronic coin 300 is read out from the electronic coin 300 by the UT selling/buying kiosk terminal 400 as hereinafter described and sent to the time charge management company 51, by which it is used as a material for a marketing research or the like.

Thereafter, the control section 3031 discriminates whether or not an end of use is received from the electronic apparatus 70 (step S563). If an end of use is not received, then the processing returns to step S553, and the control section 3031 waits for a next operation of a function button. On the other hand, if an end of use is received, then the processing routine is ended.

It is to be noted that, while the electronic coin 300 described above performs a charging process, a charging processing section may alternatively be provided in the electronic apparatus 70 as in the configuration shown in FIG. 52 such that a result of a charging process is transferred from the charging processing section to the electronic coin 300.

[Example of a Configuration of the UT Selling/Buying Kiosk Terminal]

Figure 85:
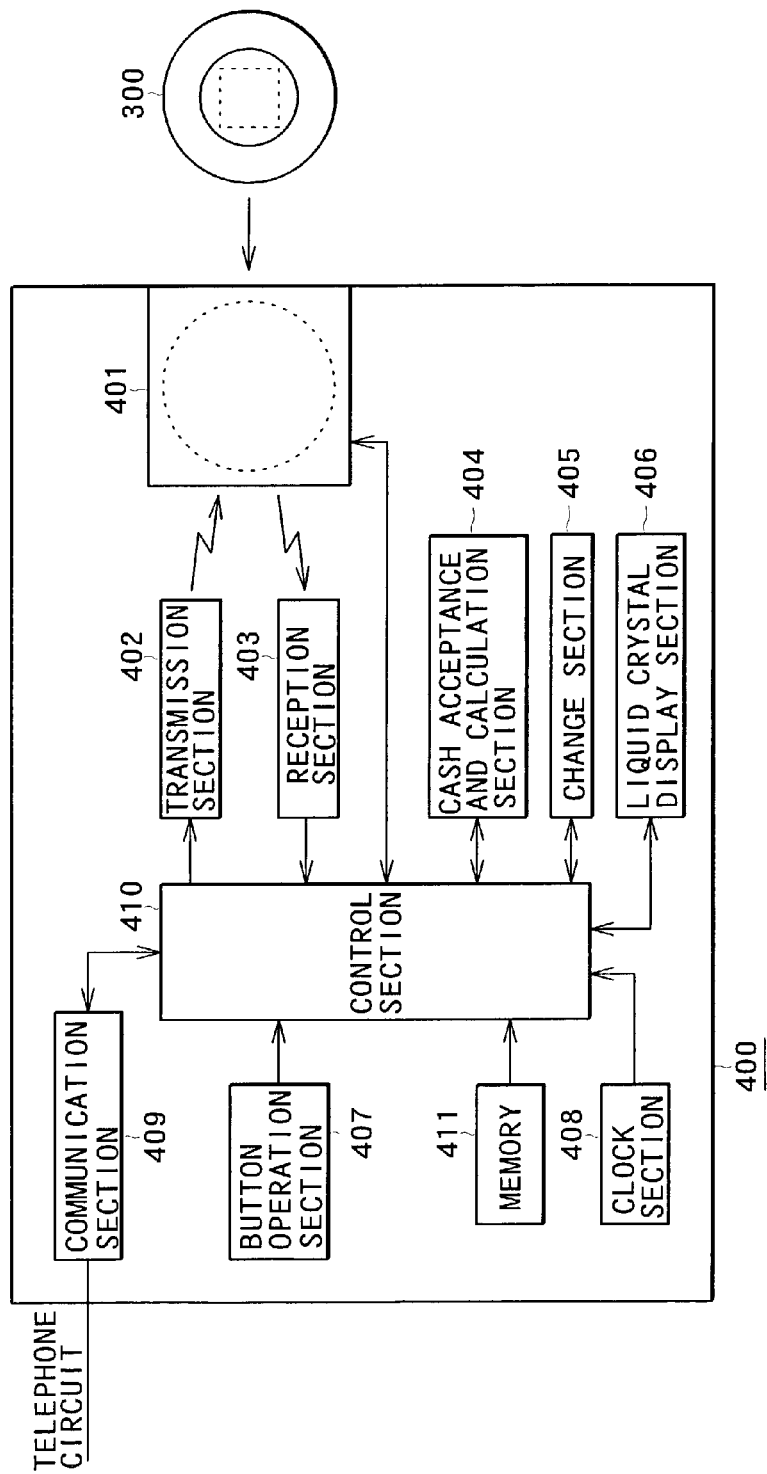
FIG. 85 is a block diagram showing a configuration of an example of a terminal apparatus used in the twelfth embodiment.

Now, an example of a configuration of the UT selling/buying kiosk terminal 400 is described with reference to FIGS. 85 and 86. FIG. 85 shows an example of an internal configuration of the UT selling/buying kiosk terminal 400.

Referring first to FIG. 85, the UT selling/buying kiosk terminal 400 includes a control section 410 formed from a microcomputer, an electronic coin loading/unloading section 401, a transmission section 402 for transmitting write data to the electronic coin 300, a reception section 403 for receiving data read out from the memory 3032 and transmitted thereto from the electronic coin 300, a cash acceptance and calculation section 404, a change section 405, a display section 406 formed from a liquid crystal display (LCD) unit, a button operation section 407 including numeral buttons, a UT buying button and a UT selling button, which are hereinafter described, and other necessary buttons, a clock section 408, a communication section 409 connected to the digital communication network 59 through a telephone network or the like for communicating with the time charge management company 51, and a memory 411.

Figure 86:
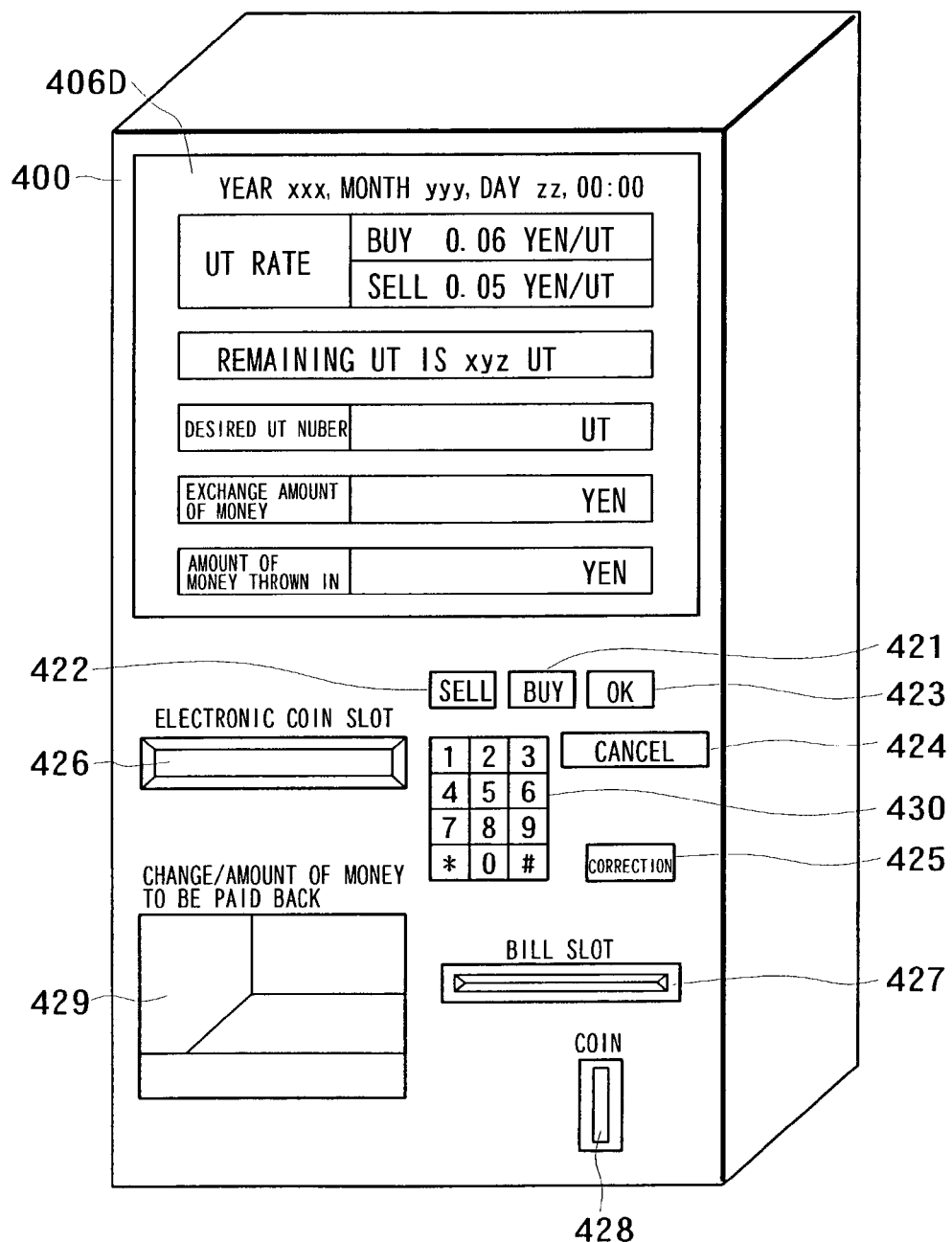
FIG. 86 is a schematic view showing a configuration of a front surface panel section of an example of the terminal apparatus used in the twelfth embodiment.

FIG. 86 shows an example of the surface of an operation panel of the UT selling/buying kiosk terminal 400. Referring to FIG. 86, a display screen 406D of the display section 406 is provided on the operation panel surface, and also a plurality of buttons included in the button operation section 407 described above are provided on the operation panel surface. More particularly, the numeral buttons 430, UT buying button 421 and UT selling button 422 as well as an OK button 423, a cancel button 424 and a correction button 425 are provided on the operation panel surface.

Further, an electronic coin slot 426, a bill slot 427, a coin slot 428 and a returning money receiver 429 are provided on the operation panel surface.

The UT selling/buying kiosk terminal 400 can be used not only for buying of the imaginary currency UT but also selling of the imaginary currency UT. An exchange rate of the imaginary currency UT for selling and buying is sent from the time charge management company 51 to the UT selling/buying kiosk terminal 400 over the digital communication network 59. The exchange rate is published also on a homepage of the time charge management company 51 on the Internet.

In the present example, the charging management system of the time charge management company 51 determines a UT exchange rate in a unit of one month as hereinafter described. However, the exchange rate may be changed not in a unit of one month but in a unit of one week or one day.

The memory 411 of the UT selling/buying kiosk terminal 400 stores the information of the exchange rate. Then, the control section 410 of the UT selling/buying kiosk terminal 400 reads out the information of the exchange rate from the memory 411 and displays an exchange rate for buying (buying UT rate) and an exchange rate for selling (selling UT rate)

of the imaginary currency UT on the display screen 406D as shown in FIG. 86. By referring to the UT rates published on the homepage or displayed on the UT selling/buying kiosk terminal 400, the user can buy the imaginary currency UT by selecting a month that the exchange rate is comparatively low and can sell the imaginary currency UT by selecting a month that the exchange rate is comparatively high.

Further, if an electronic coin 300 is loaded into the UT selling/buying kiosk terminal 400 through the electronic coin slot 426, then the UT selling/buying kiosk terminal 400 displays the remaining UT number of the electronic coin 300 on the display screen 406D thereof as seen in FIG. 86. Consequently, the user can confirm the remaining UT number of the electronic coin 300. If the user wants to merely confirm the remaining UT number, then the user will depress the cancel button 424. Consequently, the electronic coin 300 is discharged from the electronic coin slot 426.

However, if the user wants to buy the imaginary currency UT, the user will depress not the cancel button 424 but the UT buying button 421 and input the UT number to be bought using the numeral buttons 430. On the other hand, if the user wants to sell the imaginary currency UT, then the user will depress the UT selling button 422 and input the UT number to be sold using the numeral buttons 430. The inputted UT number is displayed on the display screen 406D. Through the display, the user can confirm the inputted UT number. Further, the user can depress the correction button 425 to correct the inputted UT number to re-input another UT number.

The UT selling/buying kiosk terminal 400 converts the inputted desired UT number using the exchange rate of the current month and displays a resulting value of the conversion as an exchange amount of money on the display screen 406D. When the user who buys or sells the imaginary currency UT confirms the inputted desired UT number and the exchange amount of money, the user will depress the OK button 423.

Consequently, if the user selects buying of the imaginary currency UT, then the UT selling/buying kiosk terminal 400 displays a message requesting the user to pay the cash on the display screen 406D and enters a cash payment accepting preparation mode. Thus, the user will throw in necessary cash into the bill slot 427 and/or the coin slot 428. The amount of money thrown in is displayed on the screen of the display screen 406D. If the cash of an amount of money equal to or greater than the exchange amount of money, then the UT selling/buying kiosk terminal 400 accepts the exchange amount of money and writes the UT number after incremented by the bought UT number into the memory 3032 of the electronic coin 300. If some change remains, then the UT selling/buying kiosk terminal 400 returns the change and discharges the electronic coin 300 from the electronic coin slot 426.

Further, if the user selects selling of the imaginary currency UT, and the OK button 423 is depressed, the UT selling/buying kiosk terminal 400 discharges cash of an amount of money displayed as the exchange amount of money on the display screen 406D through the returning money receiver 429. Further, the UT selling/buying kiosk terminal 400 rewrites the remaining UT number in the memory of the electronic coin 300 with the remaining UT number after decremented by the sold UT number and discharge the electronic coin 300 from the electronic coin slot 426.

[Operation of the UT Selling/Buying Kiosk Terminal 400]

Operation of the UT selling/buying kiosk terminal 400 when the imaginary currency UT is sold or bought through the electronic coin 300 is described with reference to FIGS. 87 and 88. The operation of the UT selling/buying kiosk terminal 400 is executed principally as controlling operation by the control section 410.

Figure 87:
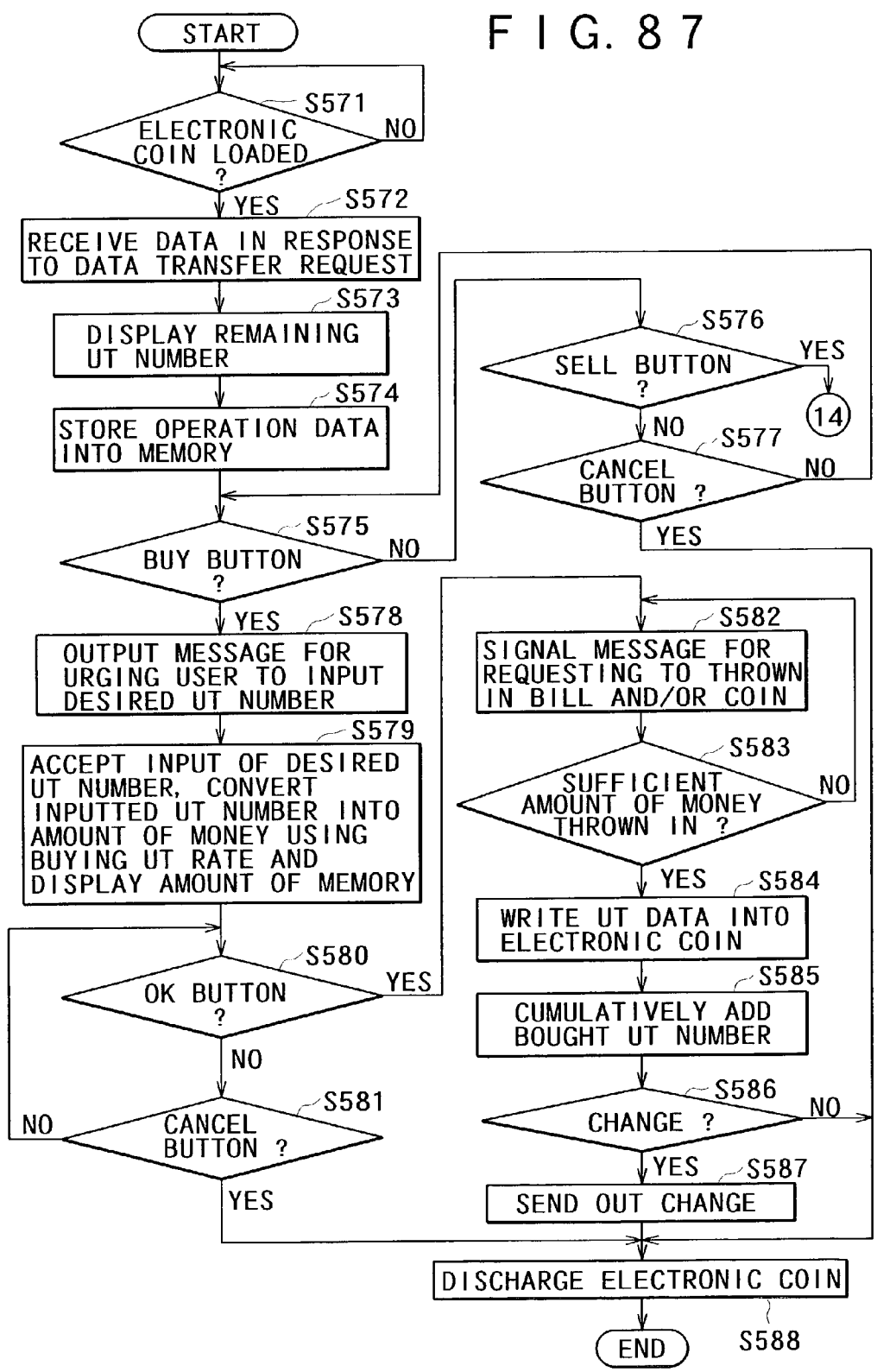
FIGS. 87 and 88 are flow charts illustrating processing operation of the terminal apparatus shown in FIG. 86.

Referring first to FIG. 87, the UT selling/buying kiosk terminal 400 discriminates through the optical or electronic element described hereinabove whether or not an electronic coin 300 is thrown in from the electronic coin slot 426 (step S571). If it is discriminated that an electronic coin 300 is thrown in, then the UT selling/buying kiosk terminal 400 transmits a data transfer request to the electronic coin 300 and receives the remaining UT number and operation data from the electronic coin 300 in response to the data transfer request (step S572). Then, the UT selling/buying kiosk terminal 400 displays the received remaining UT number on the display screen 406D (step S573) and stores the operation data into the memory 411 (step S574).

Then, the UT selling/buying kiosk terminal 400 discriminates whether or not the UT buying button 421 is depressed by the user (step S575). If the UT selling/buying kiosk terminal 400 discriminates that the UT buying button 421 is not depressed, then it discriminates whether or not the UT selling button 422 is depressed by the user (step S576). If the UT selling/buying kiosk terminal 400 discriminates that the UT selling button 422 is not depressed either, then it discriminates whether or not the cancel button 424 is depressed (step S577). If the UT selling/buying kiosk terminal 400 discriminates that the cancel button 424 is depressed, then it discharges the electronic coin 300 therefrom (step S588) and ends its processing. On the other hand, if the UT selling/buying kiosk terminal 400 discriminates that the cancel button 424 is not depressed, then the processing returns to step S575, at which it waits for an operation of the UT buying button 421 or the UT selling button 422.

If it is discriminated at step S575 that the UT buying button 421 is depressed, then the UT selling/buying kiosk terminal 400 displays a message for urging the user to input its desired UT number on the display screen 406D (step S578). The user will observe the display and input its desired UT number. Thus, the UT selling/buying kiosk terminal 400 accepts and converts the inputted desired UT number into an amount of money using the UT rate for buying of the current month, and displays the amount of money as an exchange amount of money on the display screen 406D (step S579).

As described above, when the user wants to settle the desired UT number, it depresses the OK button 423. When the user wants to stop buying of the imaginary currency UT, then it depresses the cancel button 424. Thus, the UT selling/buying kiosk terminal 400 discriminates whether or not the OK button 423 is depressed (step S580). If the OK button 423 is not depressed, then the UT selling/buying kiosk terminal 400 discriminates whether or not the cancel button 424 is depressed (step S581). If the cancel button 424 is depressed, the processing advances to step S588. The UT selling/buying kiosk terminal 400 discharges the electronic coin 300 and ends its processing. However, if it is discriminated at step S581 that the cancel button 424 is not depressed, then the processing returns to step S580. The UT selling/buying kiosk terminal 400 waits for an operation of the OK button 423.

If it is discriminated at step S580 that the OK button 423 is depressed, the UT selling/buying kiosk terminal 400 signals a message for requesting throwing in of the exchange amount of money (step S582). Then, the UT selling/buying kiosk terminal 400 counts bills and/or coins thrown in by the user and discriminates whether or not bills and/or coins of an amount of money sufficient for the exchange amount of money have been thrown in (step S583). If the UT selling/buying kiosk terminal 400 confirms throwing in of a sufficient amount of money, then it accepts the amount of money equal to the displayed amount of money and sends data of the total UT number, which is the remaining UT number and the UT number bought newly, and a remaining UT number rewriting request (step S584). The electronic coin 300 thus rewrites the remaining UT number of the memory 3032 with the received UT number.

Then, the UT selling/buying kiosk terminal 400 cumulatively adds the newly bought UT number to the already bought UT number and stores a resulting value into the memory 411 (step S585). Then, the UT selling/buying kiosk terminal 400 discriminates whether or not a change is required for the amount of money thrown in by the user with respect to the exchange amount of money (step S586). If a change is required, the UT selling/buying kiosk terminal 400 sends out the change to the returning money receiver 429 (step S587), whereafter the processing advances to step S588. However, if no change is required, then the processing advances directly to step S588. At step S588, the UT selling/buying kiosk terminal 400 discharges the electronic coin 300 and then ends its processing.

Figure 88:
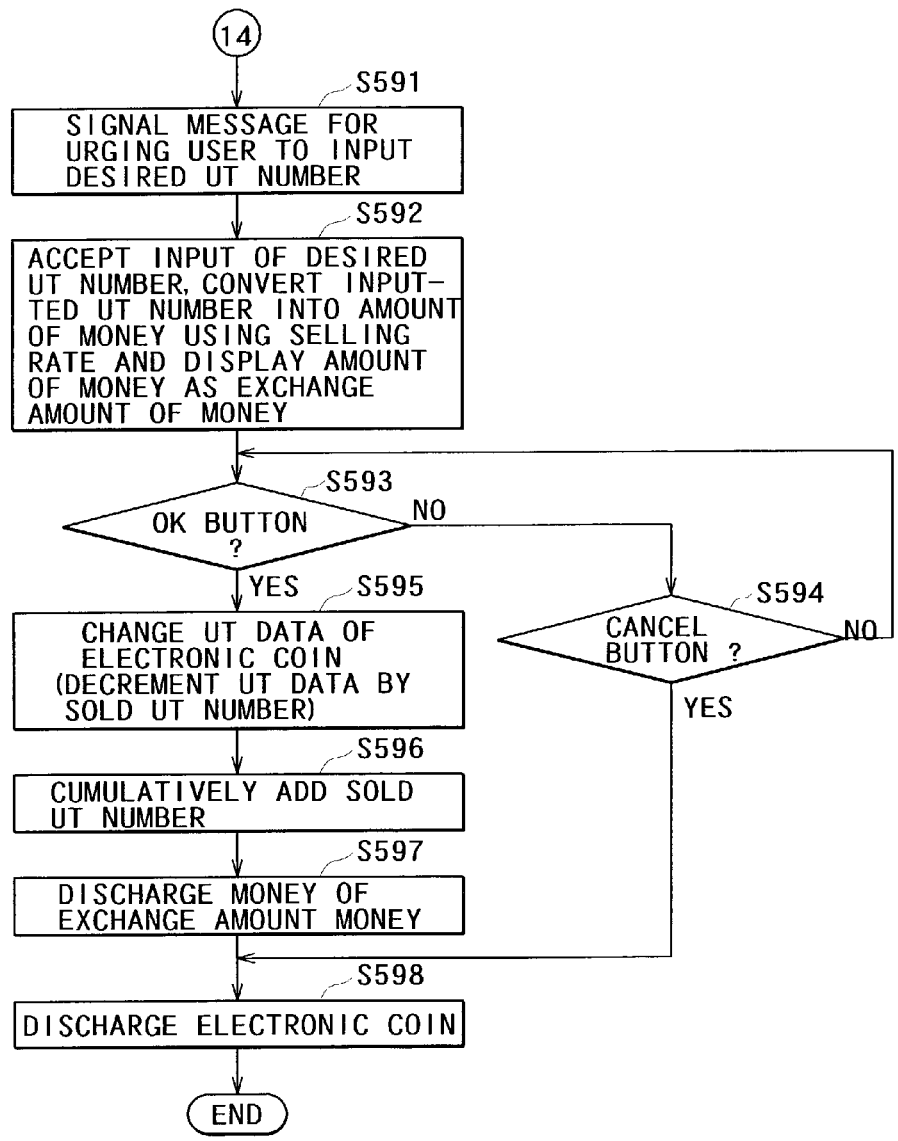

On the other hand, if it is discriminated at step S576 that the UT selling button 422 is depressed, the UT selling/buying kiosk terminal 400 displays a message for urging the user to input a desired UT number on the display screen 406D (step S591 of FIG. 88). The user will observe the display and input a UT number desired to be sold. Consequently, the UT selling/buying kiosk terminal 400 accepts the inputted desired UT number and converts the inputted UT number into an amount of money using the UT rate for selling of the current month, and displays the amount of money as an exchange amount of money on the display screen 406D (step S592).

As described above, when the user wants to settle the desired UT number, it depresses the OK button 423. When the user wants to stop selling of the imaginary currency UT, it depresses the cancel button 424. Thus, the UT selling/buying kiosk terminal 400 discriminates whether or not the OK button 423 is depressed (step S593). If the OK button 423 is not depressed, the UT selling/buying kiosk terminal 400 discriminates whether or not the cancel button 424 is depressed (step S594). If the cancel button 424 is depressed, the processing advances to step S598. The UT selling/buying kiosk terminal 400 discharges the electronic coin 300, thereby ending the processing. If it is discriminated at step S594 that the cancel button 424 is not depressed, then the processing returns to step S593. The UT selling/buying kiosk terminal 400 waits for an operation of the OK button 423.

If it is discriminated at step S593 that the OK button 423 is depressed, then the UT selling/buying kiosk terminal 400 sends data of a UT number obtained by subtracting the sold UT number from the remaining UT number and a remaining UT number rewriting request to the electronic coin 300. The electronic coin 300 rewrites the remaining UT number of the memory 3032 with the received UT number (step S595).

Then, the UT selling/buying kiosk terminal 400 cumulatively adds the sold UT number to the sold UT number in the past and stores a resulting value into the memory 411 (step S596). Then, the UT selling/buying kiosk terminal 400 sends out the exchange amount of money to the returning money receiver 429 (step S597) and discharges the electronic coin 300 (step S598), thereby ending the processing.

As described above, the UT selling/buying kiosk terminal 400 acquires, upon selling or buying of the imaginary currency UT, operation data stored in the memory 3032 of the electronic coin 300 and stores the operation data into the memory 411. Further, the UT selling/buying kiosk terminal 400 stores also data of the sold or bought UT number into the memory 411. The data stored in the UT selling/buying kiosk terminal 400 are transmitted to the time charge management company 51 when a transmission request is received from the time charge management company 51.

Figure 89:
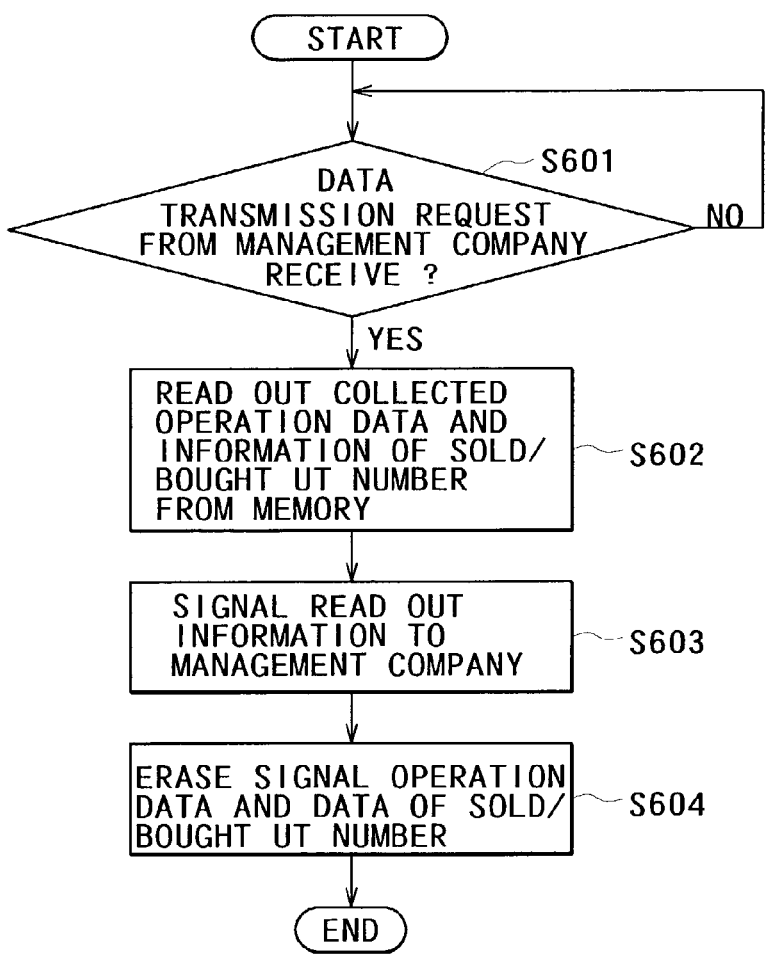
FIG. 89 is a flow chart illustrating different processing operation of the terminal apparatus shown in FIG. 86.

Processing operation of the UT selling/buying kiosk terminal 400 when a transmission request from the time charge management company 51 is received is described with reference to FIG. 89.

First, the UT selling/buying kiosk terminal 400 supervises whether or not a transmission request from the time charge management company 51 is received (step S601). If a transmission request is received, then the UT selling/buying kiosk terminal 400 reads out operation data including information regarding the use time period collected from the electronic coin 300 and data of the bought UT number and the sold UT number from the memory 411 (step S602), and transmits the read out data to the time charge management company 51 (step S603). Thereafter, the UT selling/buying kiosk terminal 400 erases the operation data and the data of the sold or bought UT number from the memory 411 (step S604).

The charging management system of the time charge management company 51 in the present embodiment determines, at the end of every month, the exchange rate of the imaginary currency UT for the next month from the cumulative value of the use time period of the electronic apparatus 70 and the cumulative value of the sold and bought number of the imaginary currency UT in the month, and publishes the exchange rate on the homepage and sends the exchange rate to the UT selling/buying kiosk terminal 400 so that the exchange rate may be used as the exchange rate for the next month by the UT selling/buying kiosk terminal 400.

[Processing Operation of the Charging Management System of the Time Charge Management Company]

Figure 90:
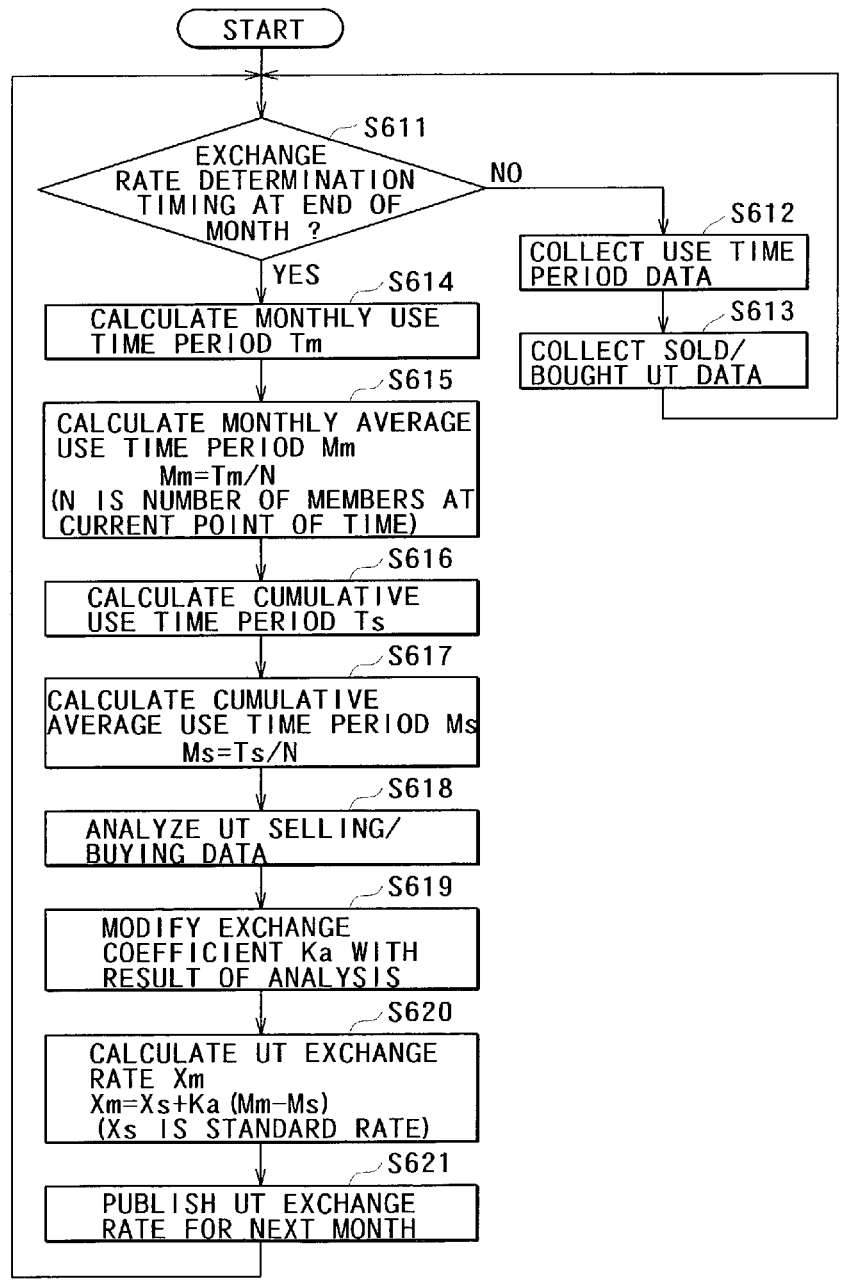
FIG. 90 is a flow chart illustrating processing operation of a charging management system used in the twelfth embodiment.

Processing of the charging management system 512 of the time charge management company 51 is described with reference to FIG. 90. The flow chart of FIG. 90 illustrates operation of, for example, the control section in the charging management system 512.

The charging management system 512 first discriminates whether or not a determination time for the exchange rate of the imaginary currency UT is reached (step S611). If a determining time for the exchange rate is not reached, then the charging management system 512 collects data of the use time period of the electronic apparatus 70 from the UT selling/buying kiosk terminal 400 as described hereinabove (step S612) and collects data of the sold or bought UT number (step S613).

On the other hand, if it is discriminated at step S611 that a determination time for the exchange rate is reached, then the charging management system 512 calculates a sum total Tm of the used time period in the month from the collected data of the use time period (step S614). Then, where the number of members at the point of time is N, the charging management system 512 determines a monthly average use time period Mm in accordance with the following expression (step S615):

$$Mm = Tm/N$$

Then, the charging management system 512 calculates a cumulative use time period Ts up to then regarding the electronic apparatus 70 (step S616). Then, the charging management system 512 divides the cumulative use time period Ts by the total member number N obtained by adding all of the cumulative number of members for the individual months to determine a cumulative average use time period Ms. In particular, the charging management system 512 determines the cumulative average use time period Ms in accordance with the following expression (step S617):

$$Ms = Ts/N$$

Then, the charging management system 512 analyzes the collected data of the sold and bought UT number (step S618) and modifies an exchange coefficient Ka to be used for determination of the exchange rate with a result of the analysis (step S619). In this instance, if the bought UT number is greater than the sold UT number, the exchange coefficient Ka is modified in a direction such that the UT exchange rate is raised, but if the bought UT number is smaller than the sold UT number, then the exchange coefficient Ka is modified in another direction such that the UT exchange rate is lowered.

Then, the charging management system 512 determines a UT exchange rate Xm for the next month in accordance with the following expression (step S620):

$$Xm = Xs + Ka(Mm - Ms)$$

where Xs is the standard UT exchange rate. The standard UT exchange rate Xs is an exchange rate of the imaginary currency UT with respect to a standard charging unit determined in advance for the use time period of the electronic apparatus 70. In the expression above, the standard UT exchange rate Xs may be replaced by the UT exchange rate of the last month.

Then, the charging management system 512 publishes the UT exchange rate determined in such a manner as described above as the exchange rate for the next month on the homepage and sends the UT exchange rate to the UT selling/buying kiosk terminal 400 (step S621).

The charging management system of the time charge management company 51 determines the UT exchange rate for the next month taking the use time period and the sold and bought UT number into consideration as described above.

In this instance, as the monthly average use time period Mm of the current month is shorter than the cumulative average use time period in the past and as the bought number of the imaginary currency UT decreases, the UT exchange rate for the next month becomes lower. Accordingly, the equivalent to the use of the electronic apparatus 70 becomes lower, and therefore, the use of the electronic apparatus 70 is urged. Further, the buying desire for the imaginary currency UT is promoted and the bought UT number increases. However, the sold UT number decreases.

On the other hand, as the monthly average use time period Mm of the current month is longer than the cumulative average use time period in the past and as the bought number of the imaginary currency UT increases, the UT exchange rate for the next month becomes higher. Accordingly, the equivalent to the use of the electronic apparatus 70 becomes higher, and therefore, the use of the electronic apparatus 70 is suppressed. Further, the buying desire for the imaginary currency UT is degraded and the bought UT number decreases. However, the sold UT number increases.

As described above, according to the present embodiment, since the imaginary currency UT is handled as a variable currency, the use of the electronic apparatus 70 by the user can be averaged with a seasonal variation thereof minimized.

It is to be noted that the sold and bought UT number collected by the charging management system of the time charge management company includes not only the sold and bought UT number from the UT selling/buying kiosk terminal 400 but also the sold and bought UT number of the selling and buying market 250 shown in FIG. 76. Subsequently, description is given on the selling and buying market 250.

[Imaginary UT Selling and Buying Market]

Figure 91:
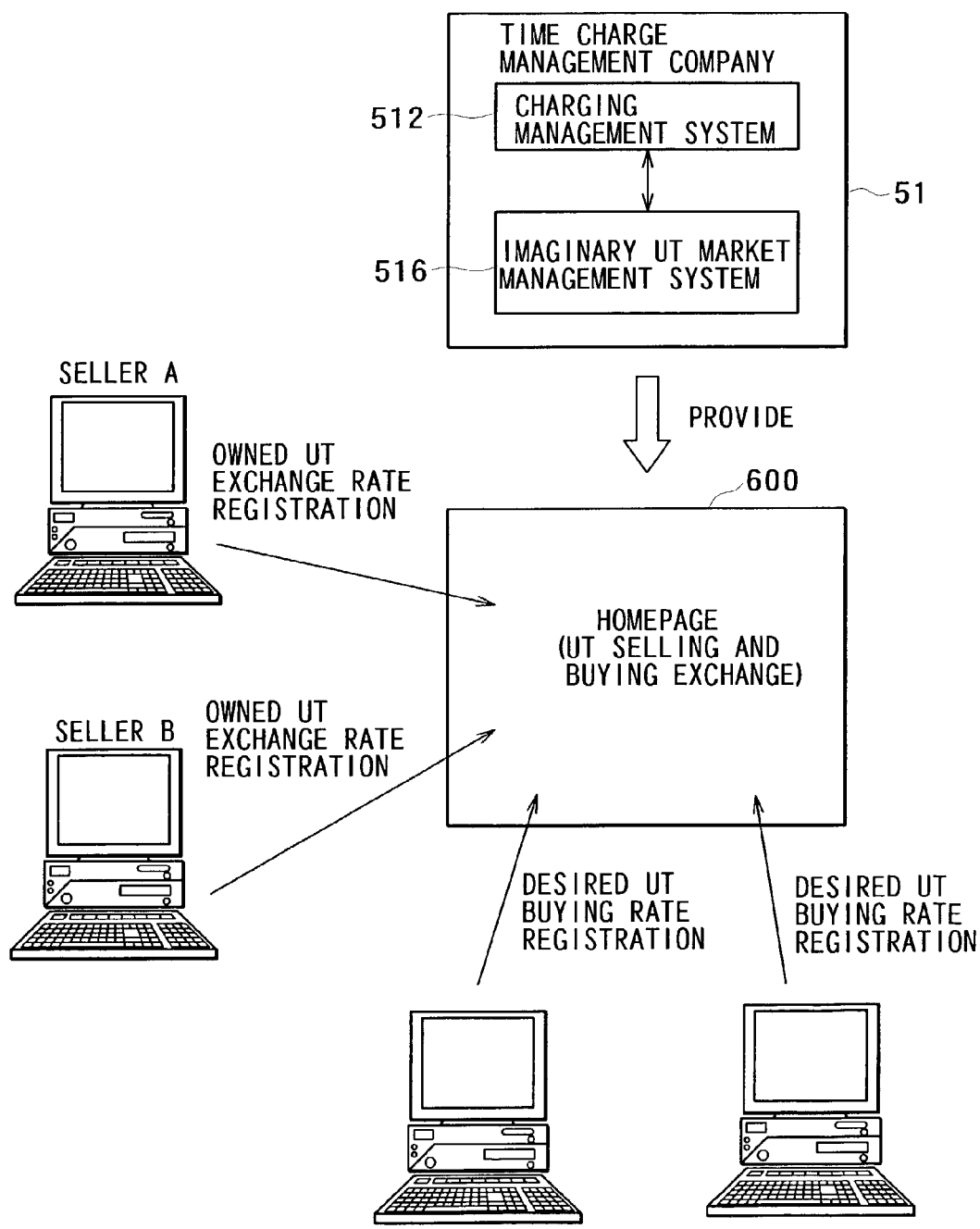
FIG. 91 is a diagrammatic view illustrating a concept of an imaginary selling/buying market of an imaginary currency UT in the twelfth embodiment.

FIG. 91 illustrates a mechanism of the selling and buying market 250. Referring to FIG. 91, a homepage 600 provided by an imaginary UT market management system 516 of the time charge management company 51 serves as a base of the imaginary UT buying and selling market. Only the members registered in the time charge management company 51 are permitted to buy and sell the imaginary currency UT on the homepage 600. The charging management system 512 performs membership authentication of a user who issues a registration request as a seller or a buyer and rejects the registration if the user is not a member.

A member who wants to sell the imaginary currency UT owned thereby performs seller registration through the homepage 600 to register a desired UT selling rate. The seller registration and the incidental desired UT selling rate registration can be changed only after a fixed time period elapses after the registration. The charging management system 512 stores the date of the seller registration of the member and accepts an alteration to the seller registration and an alteration to the desired UT selling rate after the fixed time period elapses counting from the registration date.

Meanwhile, a member who makes seller registration is restricted so that it cannot become a buyer of the imaginary currency UT while it remains a seller. If a member registered as a seller accesses as a buyer, then the imaginary UT market management system 516 rejects the UT buying access as an illegal access.

Buyer registration, that is, UT buying request, can be performed at any time. Upon registration of such UT buying request, a desired UT buying rate and a desired buying UT number are registered. Consequently, the imaginary UT market management system 516 reports one of the desired UT selling rates of sellers registered therein that is closest to the desired UT buying rate. If the buyer accepts buying at the rate, then the transaction comes into existence. The buyer can reject buying at the rate and re-register an altered desired UT buying rate. In this instance, as regards registration of a buying rate, first come, first served. Therefore, after such re-registration, the buyer may not buy the imaginary currency UT at the buying rate presented before the re-registration.

Figure 92:
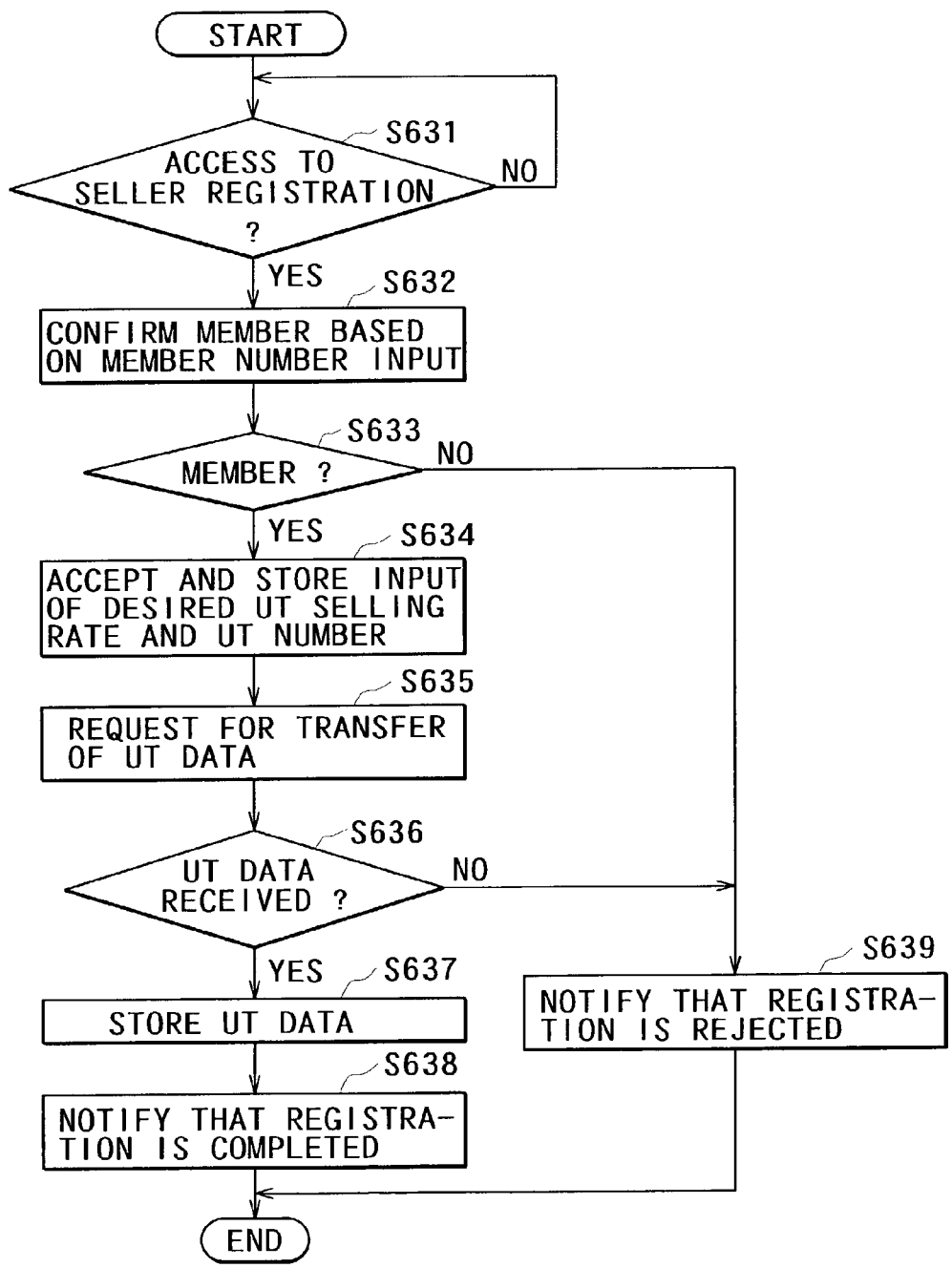
FIG. 92 is a flow chart illustrating processing operation upon seller registration in the imaginary selling/buying market of the imaginary currency UT in the twelfth embodiment.

FIG. 92 illustrates processing operation of the imaginary UT market management system 516 upon seller registration. The processing operation of the flow chart of FIG. 92 is performed, for example, by a control section in the imaginary UT market management system 516.

Referring to FIG. 92, the imaginary UT market management system 516 first discriminates whether or not an access of a seller registration request is received (step S631). If the imaginary UT market management system 516 discriminates that such an access is received, then it performs membership confirmation based on an input of a member number of the accessing person (step S632). Then, the imaginary UT market management system 516 discriminates based on a result of the membership confirmation whether or not the accessing person is a member (step S633). If it is discriminated that the accessing person is not a member, then the imaginary UT market management system 516 notifies the accessing person through the homepage 600 that the seller registration of the accessing person is rejected (step S639), thereby ending the processing routine.

On the other hand, if it is discriminated at step S633 that the accessing person is a member, then the imaginary UT market management system 516 waits for inputting of a desired UT selling rate and a selling UT number and accepts such inputted desired UT selling rate and selling UT number, and then stores them together with the member number and the registration year, month and day into a memory provided in the imaginary UT market management system 516 (step S634).

Then, the imaginary UT market management system 516 issues a transfer request of the registered UT number of UT data to the member registered as a seller (step S635).

A UT data transfer adapter (not shown) is lent in advance to any member who wants to sell or buy the imaginary currency UT on the imaginary UT selling and buying market 250. Any member who wants to sell or buy the imaginary currency UT will connect the transfer adapter to a personal computer and throw an electronic coin 300 into the adapter. Then, if the member who is a seller inputs a desired UT selling number through the computer and inputs a transfer request, then the personal computer uses a transfer application of the adapter to accept the designated UT number from the electronic coin 300 and transmit it to the imaginary UT market management system 516. The electronic coin 300 rewrites the remaining UT number of the memory 3032 with a value decremented by the transmitted UT number.

The imaginary UT market management system 516 confirms whether or not UT data from the seller are received (Step S636), and if it discriminates that UT data are not received, then it notifies the member that the member cannot be registered as a seller and deletes the relating contents registered in the memory (step S639).

On the other hand, if UT data are received, then the imaginary UT market management system 516 stores the received UT data in a coordinated relationship with the registration information of the member into the memory (step S637). Thereafter, the imaginary UT market management system 516 notifies the member of completion of the registration (step S638), thereby ending the seller registration processing routine.

Figure 93:
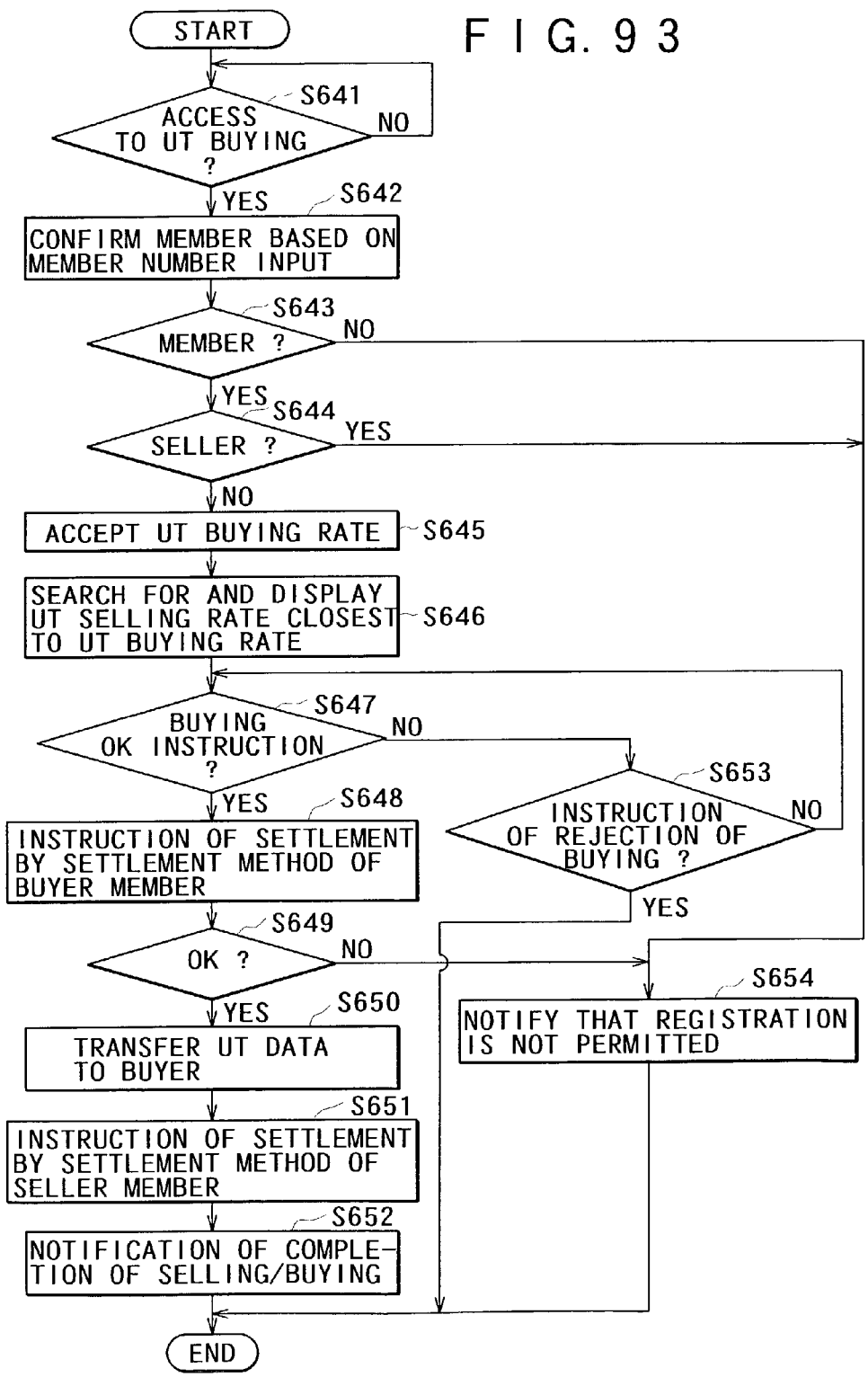
FIG. 93 is a flow chart illustrating processing operation upon buyer registration in the imaginary selling/buying market of the imaginary currency UT in the twelfth embodiment.

Subsequently, processing operation of the imaginary UT market management system 516 when a buyer registers a UT buying request and buys the imaginary currency UT is described with reference to FIG. 93. The flow chart of FIG. 93 illustrates operation performed, for example, by the control section in the imaginary UT market management system 516.

The imaginary UT market management system 516 first discriminates whether or not there is an access of a UT buying request (step S641). If the imaginary UT market management system 516 discriminates that there is an access of a UT buying request, then it performs membership confirmation based on an input of a member number of the accessing person (step S642). Then, the imaginary UT market management system 516 discriminates based on a result of the membership confirmation whether or not the accessing person is a member (step S643). If the imaginary UT market management system 516 discriminates that the accessing person is not a member, then it notifies the accessing person through the homepage that the registration for the accessing person is not permitted (step S654), thereby ending the processing routine.

At step S643, if the imaginary UT market management system 516 discriminates that the accessing person is a member, the imaginary UT market management system 516 discriminates whether or not the member is registered as a seller (step S644). If the member is registered as a seller, the imaginary UT market management system 516 notifies the member that the registration is unavailable (step S654), thereby ending the processing routine.

At step S644, if the imaginary UT market management system 516 discriminated that the member is not a seller, the imaginary UT market management system 516 accepts registration of the member as a buyer and accept an input of a desired UT buying rate and UT number (step S645). Then, the imaginary UT market management system 516 searches for a selling rate, which is closest to the accepted desired UT buying rate, from among registered desired UT selling rates by sellers' registration stored in the memory and displays the searched out selling rate on the homepage (step S646).

If the member of the buyer who sees the UT selling rate on the homepage wants to buy the imaginary currency UT at the rate, then it inputs a buying acceptance instruction. On the contrary, if the member rejects buying at the rate, then it inputs a buying rejection input. Thus, the imaginary UT market management system 516 discriminates whether or not a buying acceptance instruction is inputted (step S647). If a buying acceptance instruction is not inputted, then the imaginary UT market management system 516 discriminates whether or not a buying rejection instruction is inputted (step S653). If a buying rejection instruction is not inputted, then the processing returns to step S647, at which the imaginary UT market management system 516 waits for inputting of a buying acceptance instruction. Then, if a buying rejection instruction is inputted, then the processing routine is ended. Desired buying rate changing instruction is performed by the member performing buyer registration again.

If it is discriminated at step S647 that a buying acceptance instruction is inputted, then the imaginary UT market management system 516 refers to a database of the member of the buyer and instructs the charging management system 512 of a settlement method of the member registered in the database (step S648).

Thus, a notification regarding whether or not settlement for the member is possible is returned from the charging management system 512. Therefore, the imaginary UT market management system 516 discriminates based on the notification whether or not settlement is possible (step S649). If it is discriminated that settlement is impossible from some reason, then the processing advances to step S654, at which the imaginary UT market management system 516 notifies the accessing person through the homepage that the registration is not permitted, thereby ending the processing routine.

If it is discriminated at step S649 that settlement is possible, then the imaginary UT market management system 516 transfers the bought UT data to the member of the buyer (step S650). The member of the buyer receives the UT data transferred thereto through the personal computer thereof and the adapter and rewrites the remaining UT number of the memory 3032 of the electronic coin 300 so that it may have a value increased by the bought UT number.

Thereafter, the imaginary UT market management system 516 refers to a database also of the member of the seller and instructs the charging management system 512 of settlement by a settlement method of the member registered in the database (step S651). Then, the imaginary UT market management system 516 notifies the buyer of completion of the selling and buying through the homepage (step S652), thereby ending the processing routine.

Buying and selling of the imaginary currency UT is performed in such a manner as described above. It is to be noted that, even when the UT number registered by a seller and the UT number desired by a buyer to buy do not coincide with each other, if the UT number registered by the seller is greater than the UT number desired to buy, then buying and selling of the imaginary currency UT between them can be materialized. Further, also when a plurality of sellers indicate an equal selling rate and the sum total of the UT numbers of the sellers is greater than the UT number desired to buy, selling and buying between them can be materialized. In this instance, the imaginary currency UT may be sold preferentially from the selling person who has registered comparatively early.

Also the number of the imaginary currency UT sold and bought in this manner is used for determination of the UT exchange rate for the next month described hereinabove. To this end, the imaginary UT market management system 516 reports the number of the imaginary currency UT sold and bought in the month to the charging management system.

According to the twelfth embodiment described above, since the imaginary currency UT is used, the unit price for the use time period can be varied readily, and an imaginary UT market can be provided to buy the imaginary currency at a desired exchange rate, which is very convenient.

In the twelfth embodiment described above, while the electronic circuit of the electronic coin 300 performs a charging process for the used time period, it is otherwise possible to use another configuration wherein a charging processing section is provided in the electronic apparatus 70 and the electronic coin 300 receives a result of a charging process for the used time period from the charging processing section.

In the embodiments described hereinabove, while the charging object apparatus are electronic apparatus, the present invention can be applied to any apparatus by adding an electronic apparatus section having such functions as described hereinabove.

While preferred embodiments of the present invention have been described using specific terms, such description is for illustrative purposes only, and it is to be understood that changes and variations may be made without departing from the spirit or scope of the following claims.

What is claimed is:

1. A management apparatus, comprising:
   means for storing reservation information including information regarding reservations of exclusive use times of a charging object apparatus by a plurality of users;
   means for determining whether an exclusive use time reservation request received from a particular user of the plurality of users should be granted or denied by evaluating whether a proposed exclusive use time specified in the exclusive use time reservation request conflicts with any of the reservations of exclusive use times stored in the means for storing;
   updating means for, when the exclusive use time reservation request from the particular user of the plurality of users is granted, updating the reservation information stored in said means for storing to reflect a reservation of an exclusive use time of the charging object apparatus by the particular user of the plurality of users;
   accounting means for issuing a request for payment to the particular user of the plurality of users in an amount based upon a measured period of use of the charging object apparatus by the particular user of the plurality of users;
   means for calculating the amount based on an adjusted exchange rate $X_m$, where $X_m = X_s + K_a(M_m - M_s)$, $X_s$ is a standard exchange rate, $K_a$ is an exchange coefficient, $M_m$ is an average use time for the plurality of users for a particular month, and $M_s$ is an average cumulative use time for the plurality of users over a time period of use of the charging object apparatus; and
   permission information signaling means for signaling, when the exclusive use time reservation request from the particular user of the plurality of users is granted, permission information to outside of the management apparatus for permitting use of said charging object apparatus by the particular user of the plurality of users.

2. A management apparatus according to claim 1, wherein said permission information signaling means signals the permission information to said charging object apparatus over a communication network.

3. A management apparatus according to claim 1, wherein said permission information signaling means signals the permission information to a communication apparatus connected thereto over a communication network.

4. A management apparatus according to claim 1, further comprising reception means for receiving from the charging object apparatus over a communication network information including the use time period of said charging object apparatus.

5. A management apparatus according to claim 1, wherein the information that the reservation of use is requested is received from a communication apparatus connected to said management apparatus over a communication network.

6. A management apparatus, comprising:
   grouping means for distributing member registration information representing registered members each into one of a plural number of groups equal to a number of charging object apparatuses;
   means for storing reservation information regarding times at which the members are scheduled to use said charging object apparatuses for each of the groups;
   means for determining whether an exclusive use time reservation request received from a particular member of the members should be granted or denied by evaluating whether a proposed exclusive use time specified in the exclusive use time reservation request conflicts with any of the times at which other members in the same group as the particular member of the members are scheduled to use one of the charging object apparatuses;
   updating means for, when the exclusive use time reservation request from the particular member of the members is granted, updating the reservation information stored in said means for storing regarding the group in which the one of the members is included to reflect a reservation of an exclusive use time of the one of the charging object apparatuses by the one of members;
   accounting means for issuing a request for payment to the particular member of the members in an amount based upon a measured period of use of the one of the charging object apparatuses by the particular member of the members;
   means for calculating the amount based on an adjusted exchange rate $X_m$, where $X_m = X_s + K_a(M_m - M_s)$, $X_s$ is a standard exchange rate, $K_a$ is an exchange coefficient, $M_m$ is an average use time for the plurality of members for a particular month, and $M_s$ is an average cumulative use time for the members over a time period of use of the charging object apparatus; and
   permission information signaling means for signaling, when the exclusive use time reservation request of the particular member of the members is granted, permission information to outside of the management apparatus for permitting use of the one of the charging object apparatuses by the particular member of the members and identifying a time at which the one of the charging object apparatuses is scheduled to be used by the particular member of the members.

7. A management apparatus according to claim 6, further comprising member registration information acceptance means for accepting the member registration information, said grouping means grouping the member registration information based on the registration information accepted by said registration information acceptance means such that information representing reservation time zones in which use of said charging object apparatus is desired in each of the groups.

8. A management apparatus according to claim 6, further comprising member registration information acceptance means for accepting the member registration information, said grouping means grouping the member registration information based on address information of the members included in the registration information accepted by said registration information acceptance means such that the member registration information representing a plurality of members having addresses near to one another is included in one group.

9. A management apparatus according to claim 8, wherein said grouping means performs the grouping such that, from within the member registration information accepted by said registration information acceptance means, the member registration information in which particular information of the members other than the address information is different from one another is included in the same group.

10. A management apparatus according to claim 9, wherein the particular information of the members other than the address information is information representing reservation time zones in which the members desire to use said charging object apparatus, and said grouping means classifies the member registration information representing a plurality of members whose addresses are near to one another into groups of the member registration information, each of which includes information representing a reservation time zone in which use of said charging object apparatus is desired and distributes the member registration information included in the classified groups to a plural number of groups equal to the number of said charging object apparatus.

11. A management apparatus according to claim 10, wherein the reservation time zones in which use of said charging object apparatus is desired are time zones in which the members stay at home.

12. A management apparatus according to claim 6, further comprising member registration information acceptance means for accepting the member registration information, said grouping means grouping the member registration information of a plurality of members based on the member registration information such that reservation time zones in which the charging object apparatus is used are decentralized.

13. A management apparatus according to claim 12, wherein said grouping means performs the grouping process successively using items extracted from the member registration information so as to be used for grouping in accordance with priority levels determined in advance for the items used for the grouping, and thereupon, said grouping means performs the grouping process based on classification types determined in advance for the items used for the grouping such that the member registration information which has a same item may be included in one group or the member registration information which has the same item may be included in different groups.

14. A method, comprising steps of:
using a management apparatus to perform a method comprising steps of:
storing, by a web server, reservation information including at least information regarding reservations of exclusive use times of a charging object apparatus by a plurality of users;
determining by a management apparatus whether an exclusive use time reservation request received from a particular user of the plurality of users should be granted or denied by evaluating whether a proposed exclusive use time specified in the exclusive use time reservation request conflicts with any of the stored reservations of exclusive use times;

and based on said determination that the exclusive use time reservation request from the particular user of the plurality of users is granted, updating the stored reservation information to reflect a reservation of an exclusive use time by the particular user of the plurality of users;
determining by the charging object apparatus an amount of payment to request based upon a measured period of use of the charging object apparatus by the particular user, and calculated based on an adjusted exchange rate Xm, $$Xm=Xs+Ka(Mm-Ms),$$

wherein Xm is the adjusted exchange rate, Xs is a standard exchange rate, Ka is an exchange coefficient, Mm is an average use time for the plurality of users for a particular month, and Ms is an average cumulative use time for the plurality of users over a time period of use of the charging object apparatus;
issuing by the charging object apparatus a request for payment to the one of the plurality of users for the amount and
and further based on the determination that the exclusive use time reservation request from the particular user of the plurality of users is granted by the management apparatus, signaling permission information to outside of the management apparatus for permitting use of said charging object apparatus by the particular user of the plurality of users; and
using said charging object apparatus to perform a method comprising steps of:
acquiring the permission information signaled from said management apparatus;
discriminating, based on the permission information, whether or not use of said charging object apparatus by the user should be permitted;
measuring a period of actual substantial use of the charging object apparatus by the user; and
communicating payment amount information by the charging object apparatus to the management apparatus.

15. A method, comprising steps of:
using a management apparatus to perform a method comprising steps of:
distributing by a web server member registration information representing registered members each into one of a plural number of groups equal to a number of charging object apparatuses;
storing by the web server reservation information regarding times at which the members are scheduled to use said charging object apparatuses for each of the groups;
determining by the management apparatus whether an exclusive use time reservation request received from particular member of the members should be granted or denied by evaluating whether a proposed exclusive use time specified in the exclusive use time reservation request conflicts with the times at which other members in the same group as the particular member of the members are scheduled to use one of the charging object apparatuses;
determining by the charging object apparatus an amount of payment to request based upon a measured period of use of the charging object apparatus by the particular user, and calculated based on an adjusted exchange rate, $$Xm=Xs+Ka(Mm-Ms),$$

wherein Xm is the adjusted exchange rate, Xs is a standard exchange rate, Ka is an exchange coefficient, Mm is an average use time for the plurality of users for a particular month, and Ms is an average cumulative use time for the plurality of users over a time period of use of the charging object apparatus;

issuing by the charging object apparatus a request for payment to the one of the plurality of users for the amount and and further based on the determination that the exclusive use time reservation request from the particular user of the plurality of users is granted by the management apparatus, signaling permission information to outside of the management apparatus for permitting use of said charging object apparatus by the particular user of the plurality of users; and using said charging object apparatus to perform a method comprising steps of:

acquiring the permission information signaled from said management apparatus;

discriminating, based on the permission information, whether or not use of said charging object apparatus by the user should be permitted;

measuring a period of actual substantial use of the charging object apparatus by the user;

communicating information which makes an object of charging based on the measured period of use of the charging object apparatus by the member to the management apparatus.

16. The management apparatus of claim 1, wherein the permission information that the permission information signaling means signals outside of the management apparatus comprises each of a user identifier that identifies the particular user of the plurality of users and a product identifier that identifies the charging object apparatus.

17. The management apparatus of claim 7, wherein the permission information that the permission information signaling means signals outside of the management apparatus comprises each of a user identifier that identifies the particular member of the members and a product identifier that identifies the one of the charging object apparatuses.

18. The method of claim 14, wherein the step of signaling permission information to outside of the management apparatus comprises signaling permission information that comprises each of a user identifier that identifies the particular user of the plurality of users and a product identifier that identifies the charging object apparatus to outside of the management apparatus.

19. The method of claim 15, wherein the step of signaling permission information to outside of the management apparatus comprises signaling permission information that comprises each of a user identifier that identifies the particular member of the members and a product identifier that identifies the one of the charging object apparatuses to outside of the management apparatus.

* * * * *